US008139742B2

(12) United States Patent
Klos et al.

(10) Patent No.: US 8,139,742 B2
(45) Date of Patent: Mar. 20, 2012

(54) APPARATUS AND METHOD FOR FACILITATING SERVICE MANAGEMENT OF COMMUNICATIONS SERVICES IN A COMMUNICATIONS NETWORK

(75) Inventors: Timothy Klos, High Ridge, MO (US); Terry Gilmore, Glen Carbon, IL (US); Gary Martens, Florissant, MO (US); Sue Merz, St. Charles, MO (US); Terry Vieth, Columbia, IL (US); William Bowling, Florissant, MO (US); Mark Sexton, St. Louis, MO (US); John Vallely, Florissant, MO (US); Mary Clark, Florissant, MO (US); Randall Leet, Eureka, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1543 days.

(21) Appl. No.: 11/535,103

(22) Filed: Sep. 26, 2006

(65) Prior Publication Data
US 2007/0121850 A1 May 31, 2007

Related U.S. Application Data

(63) Continuation of application No. 10/436,121, filed on May 13, 2003, now Pat. No. 7,167,550, which is a continuation of application No. 09/023,923, filed on Feb. 13, 1998, now Pat. No. 6,778,651, which is a continuation of application No. 08/831,892, filed on Apr. 3, 1997, now abandoned.

(51) Int. Cl.
*H04M 3/42* (2006.01)
(52) U.S. Cl. .......... 379/201.12; 379/201.01; 379/201.04
(58) Field of Classification Search ............. 379/201.12, 379/201.01, 201.04, 265.01–265.14
See application file for complete search history.

(56) References Cited

U.S. PATENT DOCUMENTS

| | | | |
|---|---|---|---|
| 4,232,199 A | 11/1980 | Boatwright et al. | |
| 4,266,098 A | 5/1981 | Novak | |
| 4,296,463 A | 10/1981 | Dalboussiere et al. | |
| 4,429,188 A | 1/1984 | Allen et al. | |
| 4,611,094 A | 9/1986 | Asmuth et al. | |
| 4,611,096 A | 9/1986 | Asmuth et al. | |
| 4,788,718 A | 11/1988 | McNabb | |

(Continued)

FOREIGN PATENT DOCUMENTS

EP 0611083 8/1994

(Continued)

OTHER PUBLICATIONS

Advanced Intelligent Network (AIN) 0.1 Switching Systems Generic Requirements (Bellcore TR-NWT-001284), Issue 1, Aug. 1992.

(Continued)

*Primary Examiner* — William Deane, Jr.
(74) *Attorney, Agent, or Firm* — Greenblum & Bernstein, P.L.C.

(57) ABSTRACT

A service order management system provisions service orders in a communications network having multiple network elements. The service order management system includes an order manager and an interface. The order manager, which receives requests representative of service orders for at least one communications service from dissimilar service order sources, includes an input process and an output process which determine, at least in part, service implementing information provided to the network elements to implement the at least one communications service. The interface is configured to interface the service order management system with the dissimilar service order sources.

27 Claims, 67 Drawing Sheets

U.S. PATENT DOCUMENTS

| | | | |
|---|---|---|---|
| 4,860,347 A | 8/1989 | Costello | |
| 4,899,373 A | 2/1990 | Lee et al. | |
| 5,054,055 A | 10/1991 | Hanle et al. | |
| 5,109,408 A | 4/1992 | Greenspan et al. | |
| 5,200,995 A | 4/1993 | Gaukel et al. | |
| 5,241,588 A | 8/1993 | Babson, III et al. | |
| 5,247,571 A | 9/1993 | Kay et al. | |
| 5,294,229 A | 3/1994 | Hartzell et al. | |
| 5,333,185 A | 7/1994 | Burke et al. | |
| 5,337,351 A | 8/1994 | Manabe et al. | |
| 5,345,380 A | 9/1994 | Babson, III et al. | |
| 5,353,331 A | 10/1994 | Emery et al. | |
| 5,398,220 A | 3/1995 | Barker | |
| 5,404,396 A | 4/1995 | Brennan | |
| 5,436,957 A | 7/1995 | McConnell | |
| 5,438,568 A | 8/1995 | Weisser, Jr. | |
| 5,444,768 A | 8/1995 | Lemaire et al. | |
| 5,448,631 A | 9/1995 | Cain | |
| 5,467,388 A | 11/1995 | Redd, Jr. et al. | |
| 5,479,487 A | 12/1995 | Hammond | |
| 5,483,582 A | 1/1996 | Pugh et al. | |
| 5,533,102 A | 7/1996 | Robinson et al. | |
| 5,548,566 A | 8/1996 | Barker | |
| 5,550,909 A | 8/1996 | Chanda et al. | |
| 5,572,583 A | 11/1996 | Wheeler, Jr. et al. | |
| 5,579,384 A * | 11/1996 | Seymour | 379/243 |
| 5,583,564 A | 12/1996 | Rao et al. | |
| 5,592,541 A | 1/1997 | Fleischer, III et al. | |
| 5,615,252 A | 3/1997 | Sizer, II et al. | |
| 5,625,676 A | 4/1997 | Greco et al. | |
| 5,629,978 A | 5/1997 | Blumhardt et al. | |
| 5,642,410 A | 6/1997 | Walsh et al. | |
| 5,655,013 A | 8/1997 | Gainsboro | |
| 5,657,451 A | 8/1997 | Khello | |
| 5,680,446 A | 10/1997 | Fleischer, III et al. | |
| 5,687,212 A | 11/1997 | Kinser, Jr. et al. | |
| 5,696,815 A | 12/1997 | Smyk | |
| 5,740,438 A | 4/1998 | Ratciff et al. | |
| 5,742,668 A | 4/1998 | Pepe et al. | |
| 5,751,707 A | 5/1998 | Voit et al. | |
| 5,754,636 A | 5/1998 | Bayless et al. | |
| 5,758,351 A | 5/1998 | Gibson et al. | |
| 5,764,748 A | 6/1998 | Rosenthal et al. | |
| 5,787,237 A | 7/1998 | Reilly | |
| 5,790,173 A | 8/1998 | Strauss et al. | |
| 5,796,806 A | 8/1998 | Birckbichler | |
| 5,796,950 A | 8/1998 | Sips et al. | |
| 5,799,073 A | 8/1998 | Fleischer, III | |
| 5,802,157 A | 9/1998 | Clarke et al. | |
| 5,802,159 A | 9/1998 | Smolentzov et al. | |
| 5,805,587 A | 9/1998 | Norris et al. | |
| 5,822,419 A | 10/1998 | Enstone et al. | |
| 5,864,613 A | 1/1999 | Flood | |
| 5,867,562 A | 2/1999 | Scherer | |
| 5,870,549 A | 2/1999 | Bono, II | |
| 5,881,144 A | 3/1999 | Havens | |
| 5,892,822 A | 4/1999 | Gottlieb et al. | |
| 5,915,008 A | 6/1999 | Dulman | |
| 5,917,817 A | 6/1999 | Dunn et al. | |
| 5,920,618 A | 7/1999 | Fleischer, III | |
| 5,933,490 A | 8/1999 | White et al. | |
| 5,933,778 A | 8/1999 | Buhrmann et al. | |
| 5,937,050 A | 8/1999 | Yue et al. | |
| 5,940,488 A | 8/1999 | DeGrazia et al. | |
| 5,946,381 A | 8/1999 | Danne et al. | |
| 5,958,016 A | 9/1999 | Chang et al. | |
| 5,982,774 A | 11/1999 | Foladare et al. | |
| 5,982,870 A | 11/1999 | Pershan et al. | |
| 5,983,276 A * | 11/1999 | Beckett et al. | 709/232 |
| 5,999,611 A | 12/1999 | Tatchell et al. | |
| 6,028,917 A | 2/2000 | Creamer et al. | |
| 6,032,184 A | 2/2000 | Cogger et al. | |
| 6,038,296 A | 3/2000 | Brunson et al. | |
| 6,058,175 A | 5/2000 | Schultz | |
| 6,058,178 A | 5/2000 | McKendry et al. | |
| 6,097,802 A | 8/2000 | Fleischer, III et al. | |
| 6,104,799 A | 8/2000 | Jain et al. | |
| 6,115,040 A | 9/2000 | Bladow et al. | |
| 6,118,780 A | 9/2000 | Dunn et al. | |
| 6,134,310 A | 10/2000 | Swan et al. | |
| 6,144,663 A | 11/2000 | Hallenstal | |
| 6,160,877 A | 12/2000 | Tatchell et al. | |
| 6,161,128 A | 12/2000 | Smyk | |
| 6,167,122 A | 12/2000 | Titmuss et al. | |
| 6,173,437 B1 | 1/2001 | Polcyn | |
| 6,192,118 B1 | 2/2001 | Bayless et al. | |
| 6,195,678 B1 | 2/2001 | Komuro | |
| 6,195,697 B1 | 2/2001 | Bowman-Amuah | |
| 6,212,561 B1 | 4/2001 | Sitaraman et al. | |
| 6,233,330 B1 | 5/2001 | McClure et al. | |
| 6,240,186 B1 * | 5/2001 | Hyde et al. | 380/255 |
| 6,240,441 B1 | 5/2001 | Beckett et al. | |
| 6,246,751 B1 | 6/2001 | Bergl et al. | |
| 6,246,756 B1 | 6/2001 | Borland et al. | |
| 6,259,449 B1 | 7/2001 | Saxena et al. | |
| 6,263,064 B1 | 7/2001 | O'Neal et al. | |
| 6,304,641 B1 | 10/2001 | Cullie et al. | |
| 6,317,484 B1 | 11/2001 | McAllister | |
| 6,320,948 B1 | 11/2001 | Heilmann et al. | |
| 6,330,598 B1 | 12/2001 | Beckwith et al. | |
| 6,337,899 B1 | 1/2002 | Alcendor et al. | |
| 6,445,694 B1 | 9/2002 | Swartz | |
| 6,453,164 B1 | 9/2002 | Fuller et al. | |
| 6,456,706 B1 | 9/2002 | Blood et al. | |
| 6,463,145 B1 | 10/2002 | O'Neal et al. | |
| 6,529,596 B1 | 3/2003 | Asprey et al. | |
| 6,549,619 B1 | 4/2003 | Bell et al. | |
| 6,574,661 B1 | 6/2003 | Delano et al. | |
| 6,631,186 B1 | 10/2003 | Adams et al. | |
| 6,631,416 B2 | 10/2003 | Bendinelli et al. | |
| 6,640,239 B1 | 10/2003 | Gidwani | |
| 6,662,221 B1 | 12/2003 | Gonda et al. | |
| 6,671,365 B2 | 12/2003 | Kemppainen | |
| 6,678,827 B1 | 1/2004 | Rothermel et al. | |
| 6,724,896 B1 * | 4/2004 | Beckett et al. | 380/255 |
| 6,748,439 B1 | 6/2004 | Monachello et al. | |
| 6,788,939 B2 | 9/2004 | Truong et al. | |
| 6,931,115 B1 | 8/2005 | Okamura | |
| 2001/0048738 A1 | 12/2001 | Baniak et al. | |
| 2001/0049737 A1 | 12/2001 | Carolan et al. | |
| 2002/0054587 A1 | 5/2002 | Baker et al. | |
| 2002/0168055 A1 | 11/2002 | Crockett et al. | |
| 2003/0007621 A1 | 1/2003 | Graves et al. | |
| 2003/0076941 A1 | 4/2003 | Tiliks et al. | |
| 2003/0079028 A1 | 4/2003 | Tortum et al. | |
| 2003/0161459 A1 | 8/2003 | McBlain et al. | |
| 2003/0200321 A1 | 10/2003 | Chen et al. | |
| 2004/0199624 A1 | 10/2004 | Poisson et al. | |
| 2004/0243708 A1 | 12/2004 | Stebbings | |
| 2005/0114794 A1 | 5/2005 | Grimes et al. | |

FOREIGN PATENT DOCUMENTS

| | | |
|---|---|---|
| EP | 0740480 | 10/1996 |
| WO | 92/09164 | 5/1992 |
| WO | 99/16230 | 4/1999 |
| WO | 99/20058 | 4/1999 |
| WO | 00/65857 | 11/2000 |
| WO | 01/35240 | 5/2001 |

OTHER PUBLICATIONS

Advanced Intelligent Network (AIN) 0.1 Switch-Service Control Point (SCP) Application Protocol Interface Generic Requirements (Bellcore TR-NWT-001285), Issue 1, Aug. 1992.

BT Technology Journal, vol. 13, No. 2. Apr. 1995, Ipswich GB. pp. 132-142, Marshall et al., "The information services supermarket".

Internet web pages by Dazil Internet Services, "Caller EyeDee," downloaded Dec. 2001.

Internet Web Pages by Z-Tel, "Personal Communications Center", dated Apr. 13, 2000 and May 15, 2000.

Internet Web Pages by TOSC International, "Cool Call", dated May 4, 2000.

Internet Web Pages by Phone.Com, "My Phone Services"., dated May 4, 2000.

Lennox et al., "Call processing Language Framework and Requirements", RFC 2824, published May 2000.

Lennox et al., "CPL: A Language for User Control of Internet Telephony Services", Internet Engineering Task Force, IPTEL WG, published Oct. 25, 2000.

J. Rosenberg, "Introduction to CPL", Dynamicsoft, Winter 2001 Von Developers Conference, published Feb. 25, 2001.

"Next Generation Phone System", Internet web pages by CommWeb.com, Aug. 2, 2001.

"Teleglobe International Toll Free Services," www.teleglobe.com (Dec. 2002).

"Sprint Wholesale Toll-Free Services," http://www.sprintbiz.com/wholesale/products/toll_free_services.pdf (Jan. 2001).

"MegaHub® PACE™ SMS—Service Management System—Advanced Intelligent Network Systems", DSC Communications Corporation, Issue 0.4, Jul. 17, 1994.

Berman, Roger K., and Brewster, John H., "Perspectives on the AIN Architecture", IEEE Communications Magazine, Feb. 1992, pp. 27-32.

Kramer, T., "Standalone Call Accounting: The Hardware, the Software, and the Enterprise", Communications Convergence, Mar. 5, 2001.

* cited by examiner

APPARATUS AND METHOD FOR FACILITATING SERVICE MANAGEMENT OF COMMUNICATIONS SERVICES IN A COMMUNICATIONS NETWORK

This application is a Continuation of application Ser. No. 10/436,121, filed on May 13, 2003, which is a Continuation of application Ser. No. 09/023,923, filed on Feb. 13, 1998 (now issued U.S. Pat. No. 6,778,651), which is a Continuation of application Ser. No. 08/831,892, filed on Apr. 3, 1997, the respective contents of which are incorporated by reference in their entireties.

COPYRIGHT NOTICE

A portion of the disclosure of this patent document contains or refers to materials which are subject to copyright protection. The copyright owner has no objection to the facsimile reproduction by anyone of the patent disclosure, as it appears in the Patent and Trademark Office's patent files or records, but otherwise reserves all copyright rights whatsoever.

BACKGROUND OF THE INVENTION

1. Field of the Invention

The present invention generally relates to an apparatus for provisioning telephony services. More particularly, the present invention relates to a service management system for automating the provisioning flow of Advanced Intelligent Network (AIN) telephony services.

2. Acronyms and Definitions

The written description provided herein contains acronyms and terms which refer to various communication services and system components. Although known, use of several of these acronyms and terms is not strictly standardized in the art. For purposes of the written description herein, the acronyms and terms will be defined as follows:

| | |
|---|---|
| AIN | Advanced Intelligent Network |
| AIN-IP | Advanced Intelligent Network Intelligent Peripheral |
| API | Application Programming Interface |
| AR | Activation Request |
| ASN.1 | Abstract Syntax Notation One |
| B | Build Service Order Type |
| BOC | Bell Operating Company |
| BOSS | Billing Order Support System |
| BTN | Billing Telephone Number |
| C | Change Service Order Type |
| C0 | SMS to SOAC Route Control Header Section |
| C3 | SOAC to SMS Route Control Header Section |
| CABS | Customer Access Billing System |
| CAN | Cancellation Service Order Pass |
| CAR | Cancellation Activation Request |
| CCS | Common Channel Signaling |
| CDW | Corporate Data Warehouse |
| CID | Caller IntelliData ® |
| CIDB | Customer Information Database |
| CISE | SOAC Interface DNS Name |
| CLOPT | Command Line Option |
| CMISE | Common Message Information Services Element |
| CNA | Customer Network Administrator |
| CNOC | Centralized Network Operations Center |
| CO | Central Office |
| COM | Communications |
| COMPLEX | Refers to a Service that cannot be Provisioned on a Standard SPACE Template which is Provisioned Manually |
| COR | Correction Service Order Pass |
| CPC | Correction Post Completion Service Order Pass |
| CPR | Call Processing Record |
| CRIS | Customer Records Information System |
| CTC | Control Code within Subscriber Section of a Service Order |
| D | Disconnect Service Order Type |
| DAEMON | UNIX Background Process |
| DATAGATE ® | Client/Server Communication Software |
| DB | Database |
| DBMS | Database Management System |
| DCI | Distributed Computing Integrator |
| DD | Due Date |
| DG | see DATAGATE ® |
| DNS | Domain Name Server |
| DRS | Data and Reports System |
| DTMF | Dual-Tone Multiple-Frequency |
| EASE | Easy Access Sales Environment ® |
| ECRS | Enhanced Customer Reports System |
| EO | End Office |
| F | From Service Order Type |
| FCIF | Flexible Computing Interface Format |
| FID | Feature Identifier |
| FIM | Feature Interaction Manager |
| FML | Field Manipulation Language |
| FT AR | Flow Through Activation Requests |
| GOM | Generic Order Management |
| GP | Group Section of a Service Order |
| GUI | Graphical User Interface |
| HOL | Historical Order Log |
| ICF | Intelligent Call Forwarding |
| IMG | Image Section of a Service Order |
| Inward Activity | The Addition of AIN Services to an Account |
| ISCP | Integrated Service Control Point |
| LSP | Local Service Provider |
| MA AR | Manual Assistance Activation Requests |
| MARCH ™ | Memory Administration Recent Change |
| MSG | Message Section of a SOAC Reply |
| MVS-WSF2 | IBM Multiple Virtual System —Writer Service Facility |
| N | New Connect Service Order Type |
| NE | Network Element |
| NEGACK | Negative Acknowledgment |
| NOC | Network Operations Center |
| NPA | Number Plan Area |
| NXX | Central Office Code |
| OA&M | Operations Administration & Maintenance |
| ODR | Order Section of a Service Order |
| ORDNO | Order Number Field |
| OS | Operating System |
| OSS | Operations Support Systems |
| OT | Order Type Field |
| Outward Activity | The Deletion of AIN Services from an Account |
| PATROL | Vendor Supplied Software Alert System Used to Issue Messages to Pagers, etc. |
| PCIF | Personal Computer Interface Between Customer Personal Computers and the SMS System |
| PCN | Post Completion Notice Service Order Pass |
| PCS | Pieces Database |
| PID | Positive Identifier |
| POSACK | Positive Acknowledgment |
| PRE | Pre-Completion Service Order Pass |
| PSTN | Public Switched Telephone Network |
| R | Remove Service Order Type |
| RCMAC | Recent Change Memory Administration Center |
| RPC | Remote Procedure Call |
| RSC | Resource Section of a Service Order |
| SBR | Subscriber Section of a Service Order |
| SCA | Selective Call Acceptance ® |
| SCC | Service Switching Center |
| SCE | Service Creation Environment |
| SCP | Service Control Point |
| SDT | Software Development Toolkit |
| SMDR | Station Message Detail Recording |

| | |
|---|---|
| SMS | Service Management System |
| SOAC | Service Order Assignment Control |
| SOP | Service Order Processor |
| SOPP | Service Order Pre-Processing (also called Reformat) |
| SORD | Service Order Retrieval and Distribution System |
| SPACE | Bellcore Service Provisioning and Creation Environment Network Element |
| SQL | Structured Query Language |
| SQL | Structure Query Language Which is Used to Manipulate Relational Database Records and Data |
| SRU | Step Recovery Utility |
| SS7 | Signaling System 7 |
| SSP | Service Switching Point |
| STP | Signaling Transfer Point |
| T | To Service Order Type |
| TAR | Track Activation Request |
| TCAP | Transaction Capabilities Applications Part |
| TCP/IP | Transmission Control Protocol/Internet Protocol |
| TIL | TOP Interface Library |
| TIP | Transaction Interface Program Service |
| TN | Telephone Number |
| TOP | Transaction Oriented Protocol |
| TOPCOM | TOP Communications |
| TRN | Transaction Number |
| TSYS | Transmitting System |
| TUXEDO | Vendor Supplied Transaction Monitor and Message Handler |
| USERLOG | A Flat File Containing Various Messages such as Events or Errors |
| USOC | Uniform Service Order Code |
| VAD | Voice Activated Dialing System |
| WC | Wire Center |
| WTN | Working Telephone Numbers |

3. Background and Material Information

Traditionally, telephone companies have relied on switch vendors to create new services on central office (CO) switches. Once a switch vendor designed a new service, the telephone companies would market the service to a target audience. A disadvantage of this approach is the length of time required to bring a new service to the market. Typically 3 to 5 years is required to bring a new service to market. In addition, new services need to be re-created for a variety of vendor-specific switches, which may limit the availability of a particular service. Another limitation in the switch-based approach is that the services cannot be customized to a specific customer's needs. In the traditional environment, provisioning of services was performed by Operations Support Systems (OSS). The OSS systems were responsible for mechanizing the flow from ordering to provisioning in switch-based telephony services.

In recent years, a number of new telephone service features have been provided by an Advanced Intelligent Network (AIN). The AIN evolved out of a need to increase the capabilities of the telephone network architecture to meet the growing needs of telephone customers. The AIN provides a mechanism by which new services may be created outside of a particular vendor's switch. Each CO in the AIN system is equipped as a Service Switching Point (SSP) which is capable of suspending normal call processing when encountering a "trigger." The trigger invokes AIN service logic associated with a subscriber. Once a call is triggered, the SSP launches a query through a Signal Transfer Point (STP) in a Common Channel Signaling Network (CCS) to a Service Control Point (SCP). The SCP contains the AIN service logic for the particular subscriber and determines how to handle and route the call. Once the SCP processes the call, the SCP sends the appropriate routing instructions through the STP to the SSP, which then routes the call. Intelligent Peripherals (IP) may be provided to process multi-media services such as announcements, voice activated dialing, etc.

An illustration of the basic components of an AIN architecture is shown in FIG. 1. As shown in FIG. 1, Service Switching Points (SSPs) 36 are provided for sending and receiving data messages from a Service Control Point (SCP) or Integrated Service Control Point (ISCP) 30 via Signaling Transfer Points (STPs) 34. The data messages are communicated to and from the SSPs 36 and the SCP 30 along a Common Channel Signaling (CCS) network 44. Each SSP 36 routes telephone calls between a calling station (e.g., station 50A) and a called station (e.g., station 50G) through the trunked communications network 46 and telephone lines 48. Multi-media applications may be processed at the Intelligent Peripheral 28 attached to the SSP. For more information regarding AIN, see Berman, Roger K., and Brewster, John H., "Perspectives on the AIN Architecture," IEEE Communications Magazine, February 1992, pp. 27-32, the disclosure of which is expressly incorporated herein by reference in its entirety.

In the AIN environment, service orders typically flow through a Service Order Assignment Control (SOAC) system which is produced by Bellcore. SOAC is the primary source of provisioning updates for mass market AIN services that are initiated through the normal service order process. SOAC sends AIN trigger information to the MARCH™ system for automatic switch updates. After the switch is updated, the service order flows to the appropriate billing systems for completion. However, SOAC is limited to provisioning AIN services only, and cannot provision services for non-AIN services.

An example of a prior art service management system includes the PACE SMS, manufactured by Digital Switch Corporation. The PACE SMS is described in more detail in the document entitled "MegaHub® PACE™ SMS—Service Management System—Advanced Intelligent Network Systems," DSC Communications Corporation, Issue 0.4, Jul. 17, 1994. The DSC PACE system provided network tools to manage and provision intelligent network services. The PACE™ system provides a mechanism for managing service order updates, subscriber version management, provisioning across the AIN network, and service activation. The PACE™ system also includes database management capabilities such as update distribution, roll back and roll forward, audits, login security, and data partitioning. The PACE™ SMS is limited to the AIN environment only, and does not support an interface to SPACE, an interface to SOAC or existing OSS environments, enhanced security for protection of customer data, and tools for service creation.

Also known is a generic service management system deployed by AT&T. The AT&T SMS provides a platform having a set of functions which are re-usable across multiple AIN services and AIN releases, and provides for mass market and complex service management. The AT&T SMS provides a set of configurable, general purpose engines driven by the per-service configurations either by a service package from a Service Creation Environment (SCE) or by customization of the database schema to match a service running in the network element. Like the PACE™ SMS, the AT&T SMS is limited to the AIN environment only, does not fully support existing OSS environments, an interface to SOAC, an interface to SPACE, enhanced security for protection of customer data, and tools for service creation.

While prior service management systems have provided various service provisioning features to subscribers and users, such past attempts have not provided a flexible system which may utilize the advantages of AIN functionality and existing non-AIN systems. In particular, prior attempts have not provided a mechanism for synchronizing service orders originating on multiple, incompatible systems. Past attempts have also failed to match customer specific data with service orders arriving through the traditional service order flow. Further prior systems have not addressed provisioning of mass market, i.e., templated, services and complex services which are not templated. Prior systems also do not provide a single point of access for customer service and repair.

Such features would be highly desirable to developers and provisioners of telephony services, such as regional telephone companies, that desire a flexible system of service creation, provisioning and support.

OBJECTS OF THE PRESENT INVENTION

In view of the above, the present invention, through one or more of its various aspects and/or embodiments is thus presented to accomplish one or more objects and advantages, such as those noted below.

A general objective of the present invention is to provide a flexible service management system for use in an Advance Intelligent Network (AIN).

Another objective of the present invention is to provide a method for synchronizing service orders originating in one system with orders originating in another system.

Yet another objective of the present invention is to provide a mechanism for "holding" an order after partial provisioning so as to synchronize external provisioning requirements.

A further objective of the present invention is to accent input from traditional service order flow to add/change/delete customers in the ISCP in sync with additions/changes/deletions at the network element.

Another objective of the present invention is to accept customer-specific data and match the data with the service orders arriving through the traditional service order flow and sent to the ISCP.

Yet another objective of the present invention is to provide a single point of access/update for customer-specific data for use in customer service and repair.

A further objective of the present invention is to provide a mechanism which may be quickly adapted to support automated service order flow-through processing for new AIN services.

Another objective of the present invention is to provide a software development toolkit (SDT) to quickly build logic within the SMS to process new services.

Yet Another objective of the present invention is to provided for greater access to customer data and security measures to protect customer data.

A further objective of the present invention is to provide for greater flexibility in billing of services.

Another objective of the present invention is to provide a greater ability to query downstream network elements including ISCP and IPs and provide a provisioning interface for these elements.

SUMMARY OF THE PRESENT INVENTION

According to an aspect of the present invention, there is provided a system for facilitating service order management within a communications network. The communications network comprises network elements which provide communications services. The system receives a request representative of a service order for at least one communications service associated with a subscriber number from at least one service order source. The system comprises an order management system adapted to input the request, the order management system comprising processes which determine service implementing information that is output to the network elements to implement the at least one communications service. Also provided is an interface system adapted to interface the service order management system with the at least one service order source and the network elements, and a database system adapted to store and access data related to the requests in a hierarchical format. Each service order source has a dissimilar input/output format, and the managing system coverts each dissimilar input/output service order format into a single internal format. In addition, the processes communicate via messages containing the requests where the messages are monitored at predetermined times.

According to another aspect, the processes of the order management system comprise an input process, a verification process, a messaging process, and an output process.

According to a further aspect, the messaging process formats messages created by the order management system for distribution within the order management system, and for distribution to the database system, the at least one service order source and the network elements via the interface system.

According to yet another aspect, the interface system comprises a transaction monitoring and system control system.

According to yet a further aspect, the transaction monitoring and system control system provides a mechanism for concurrently processing a plurality of requests within the order management system.

According to another aspect, the system further comprises a querying system which is adapted to query the database system and the network elements.

According to a further aspect, the messages comprise queries, acknowledgments, transaction types, function types, broadcasts, informational messages, and error notices.

According to yet another aspect, the input process accepts input data from the at least one service order source and verifies that the inputted data contains a predetermined minimum content requirement.

According to a further aspect, the input process populates the database system with raw data associated with the request, and an internal sequence number is generated which is associated with the request.

According to another aspect, the input process determines if the request contains errors, and if so, the input process corrects the errors and populates the database system with the raw data based on the request.

According to a further aspect, the input process identifies duplicative requests, such that a first of the duplicative requests is processed and others of the duplicative requests are not processed by the order management system.

According to yet another aspect, the input process is adapted to receive and update requests received in a raw format from operations support systems, where the input process further identify manual update requests.

According to yet another aspect, the input process reformats the raw data into the hierarchical format of the database system, the hierarchical format comprising tables having fields. The tables are associated by the internal sequence number.

According to another aspect, the verification process determines if the fields contain valid data in accordance with predetermined constraints.

According to a further aspect, the verification process selectively updates a lock table to prevent concurrent processing of two requests associated with the subscriber number.

According to yet another aspect, the verification process performs exception processing, order matching, correction order processing, order cancellation, local service provider order matching, and number change processing. The verification process also creates a first saved table in the database system which contains activity information and service order code information in accordance with the request.

According to a further aspect, the exception processing comprises From (F) and To (T) processing.

According to another aspect, the verification process processes FID and supplemental data.

According to a further aspect, the verification process determines if the request contains an allowable combination of the communications services at a user selectable date in accordance with information contained in the first saved table, and the verification process determines which of the network elements support the communications services at the user selectable date.

According to yet another aspect, the verification process creates a second saved table which contains information related to a difference of communications services between a subscriber's current services and the at least one communications service being added, removed or modified by the request such that the difference of services is implemented by the network elements.

According to yet another aspect, the verification process verifies that the communications services represented by the request will be able to be provided by the network elements at a schedule date for implementation.

According to another aspect, the output process determines the service implementing information to be implemented by the network elements for the subscriber number. The output process routes the service implementing information to queues associated with the network elements.

According to a further aspect, the output process further comprises a network element implementing system, the network element implementing system interfacing with the network elements to output the service implementing information in a format appropriate for each of the network elements. The network element implementing system determines a proper sequence of the service implementing information to be outputted to the network elements and outputs the service implementing information to one or more queues associated with one or more network elements.

According to yet another aspect, the one or more queues have different dequeue times.

According to yet another aspect, the network element implementing system routes a portion of the service logic implementing information to a local update queue in accordance with a predetermined time, such that the portion of the service logic implementing information is not routed to the one or more queues associated with the network elements.

According to another aspect, the network element implementing system implements the at least one communications service in accordance with at least the internal sequence number associated with the request.

According to a further aspect, the network element implementing system updates the database system to indicate that the at least one communications service has been implemented by the network elements.

According to yet another aspect, the network element implementing system requeues portions of the service implementing information to the network elements when an error is encountered.

According to yet another aspect, the network implementing process requeues dependent portions of the portions of the service implementing information without manual intervention.

According to another aspect, the network implementing process requeues the portion of the service implementing information after manual intervention.

According to a further aspect, the network implementing process requeues the service implementing information in accordance with a copy of the service implementing information stored by the database system.

According to yet another aspect, the verification process determines a schedule date and a schedule time to activate the at least one communications service at the network elements.

According to another aspect, the order management system further comprises a composite view system to provide a list of all existing services for the subscriber number, and to provide a list of services for the subscriber number in accordance with a user selectable date and time.

According to yet another aspect, the system further comprises a correction system, the correction system returns the network elements to a state prior to the network element implementing system implementing the service implementation information at the network elements. The correction system operates when the request has been corrected, canceled or encounters an error.

According to yet another aspect, the correction system resubmits the request without intervention from the at least one service order source.

According to another aspect, the correction system cancels the request without querying the network elements.

According to a further aspect, the database system appends communications network specific information to the request.

According to yet another aspect, the database system executes transactions related to the requests at the predetermined times, the transactions updating at least one predetermined table.

According to yet another aspect, the database system comprises an historical order log which is updated by the transactions which are executed at the predetermined times.

According to another aspect, the historical order log stores information related to the single internal format, error information related to the transactions indicative of a cause of an error, and portions of the service implementing information at the predetermined times. The order management system issues an acknowledgment to the at least one service order source when the historical order log stores a last portion of the service implementing information.

According to a further aspect, the historical order log stores information related to the single internal format, error information related to the transactions indicative of a cause of an error, and portions of the service implementing information at the predetermined times. The order management system issues an acknowledgment to the at least one service order source prior to when the historical order log stores a last portion of the service implementing information when removing the at least one communications service.

According to yet another aspect, the database system is adapted to skip storing one of the portions of the service implementing information, and the order management system continues to determine subsequent portions of the service implementing information.

According to yet another aspect, the database system provides the order management system with a table-driven service logic to facilitate the addition of new services.

According to another aspect, the database system provides the order management system with a table-driven service logic to facilitate the addition of new features to existing services, the new features conforming to existing feature constraints.

According to a further aspect, the database system provides an estimated response time in accordance with a network element response time and a length of a queue associated with each of the network elements.

According to yet another aspect, each of the network elements is provided with a plurality of queues having different prioritizations and the database system provides the estimated response time in accordance with the different prioritizations.

According to yet another aspect, the plurality of queues having the different prioritization comprise an online queue and a batch queue.

According to another aspect, the database system utilizes an internal sequence number associated with the request to store and access the service implementing information.

According to a further aspect, the database system stores manual intervention information related to the service implementing information at the predetermined times when the order management system encounters an error.

According to yet another aspect, the database system updates the at least one table such that the transactions are propagated through the order management system.

According to yet another aspect, the database system is adapted to modify the request after the order management system has begun determining the service implementing information for the request.

According to another aspect, the database system stores copies of the service implementing information and the messages.

According to a further aspect, the database system stores the request until a future date, future time, or future event, after which the database system submits the request to the order management system.

According to yet another aspect, the database system stores non-implementing information related to the request which is not used in the service implementing information, the non-implementing information being associated with the subscriber number upon the order management system outputting the service implementing information.

According to yet another aspect, the system further comprises a user interface, the user interface interfacing with the managing system via the interface system.

According to another aspect, the user interface is adapted to correct the service orders and generate the requests representative of the service orders.

According to a further aspect, the user interface is adapted to query the network elements and the database system. The network elements receive and process the query via the order management system.

According to yet another aspect, the interface system provides a communications link to the at least one service order source and the network elements.

According to yet another aspect, the interface system routes communications to the appropriate one of the at least one service order source and the network elements.

According to another aspect, the communications links comprise TOPCOM, DATAGATE, MQSeries, ASN.1, TCP/IP and TUXEDO /WS.

According to a further aspect, the interface system further comprises a transaction monitoring and system control component which monitors the messages and updates the database system in accordance with the messages. The database system is updated in accordance with an internal reference number associated with the request.

According to yet another aspect, the transaction monitoring and system control component comprises TUXEDO /Q or TUXEDO /T.

According to yet another aspect, the order management system is provided with a system to implement services on template-based network elements and non-template based network elements.

According to another aspect, the request submitted by the at least one service order source initiates the messaging process to send a message to another of the service order source.

According to a further aspect, the system notifies an administrative personnel of an error in accordance with the severity of the error.

According to yet another aspect, synchronous network element and asynchronous network element responses are processed by the order management system in a standardized manner.

According to yet another aspect, the processes and the interface system is adapted to be interrupted to read a configurable parameter file in order to modify the processes and the interface system.

According to another aspect, the communications network comprises an advanced intelligent network, and the at least one order source comprises EASE, ECRS, SOAC, and a PC server.

According to a further aspect, the user interface is provided with a suite of services to access the database system.

According to yet another aspect, the system is provided with a suite of services to access the database system.

According to another aspect of the present invention, there is provided a system for facilitating service order management within an advanced intelligent network. The system receives a request representative of a service order for at least one telephony service associated with a subscriber telephone number from at least one operations support system. The advanced intelligent network comprises network elements which provide telephony services. The system comprises an order management system adapted to input the request, the order management system comprising processes which determine service provisioning information that is output to the network elements to implement the at least one telephony service. The system also includes an interface system adapted to interface the service order management system with the at least one operations support system and the network elements, and a database system adapted to store and access data related to the requests in a hierarchical format. Each operations support system has a dissimilar input/output format and the managing system coverts from each dissimilar input/output service order format into a single internal format. The processes of the order management system communicate via messages containing the requests, and the messages are monitored at predetermined times.

According to another aspect, the processes of the order management system comprises an input process, a verification process, a messaging process, and an output process.

According to a further aspect, the messaging process formats messages created by the order management system for distribution within the order management system, and for distribution to the database system, the at least one operations support system and the network elements via the interface system.

According to yet another aspect, the interface system comprises a transaction monitoring and system control system.

According to yet another aspect, the transaction monitoring and system control system provides a mechanism for concurrently processing a plurality of requests within the order management system.

According to another aspect, the system further comprises a querying system which is adapted to query the database system and the network elements.

According to a further aspect, the messages comprise queries, acknowledgments, transaction types, function types, broadcasts, informational messages, and error notices.

According to yet another aspect, the input process accepts input data from the at least one operations support system and verifies that the inputted data contains a predetermined minimum content requirement.

According to yet another aspect, the input process populates the database system with raw data associated with the request, and an internal sequence number which is associated with the request.

According to another aspect, the input process determines if the request contains errors, and if so, the input process corrects the errors and populates the database system with the raw data based on the request.

According to a further aspect, the input process identifies duplicative requests, such that a first of the duplicative requests is processed and others of the duplicative requests are not processed by the order management system.

According to yet another aspect, the input process is adapted to receive and update requests received in a raw format from operations support systems, the input process further identifying manual update requests.

According to yet another aspect, the input process reformats the raw data into the hierarchical format of the database system, the hierarchical format comprising tables having fields. The tables are associated by the internal sequence number.

According to another aspect, the verification process determines if the fields contain valid data in accordance with predetermined constraints.

According to a further aspect, the verification process selectively updates a lock table to prevent concurrent processing of two requests associated with the subscriber telephone number.

According to yet another aspect, the verification process performs exception processing, order matching, correction order processing, order cancellation, local service provider order matching, and number change processing, creates a first saved table in the database system which contains activity information and service order code information in accordance with the request.

According to yet another aspect, the exception processing comprises From (F) and To (T) processing.

According to another aspect, the verification process processes FID and supplemental data.

According to a further aspect, the verification process determines if the request contains an allowable combination of the telephony services at a user selectable date in accordance with information contained in the first saved table. The verification process determines which of the network elements support the telephony services at the user selectable date.

According to yet another aspect, the verification process creates a second saved table which contains information related to a difference of telephony services between a subscriber's current telephony services and the at least one telephony service being added, removed or modified by the request such that the difference of telephony services is implemented by the network elements.

According to yet another aspect, the verification process verifies that the telephony services represented by the request will be able to be provided by the network elements at a schedule date for implementation.

According to another aspect, the output process determines the service provisioning information to be implemented by the network elements for the subscriber telephone number. The output process routes the service provisioning information to queues associated with the network elements.

According to a further aspect, the output process further comprises a network element provisioning system which interfaces with the network elements to output the service provisioning information in a format appropriate for each of the network elements. The network element provisioning system determines a proper sequence of the service implementing information to be outputted to the network elements. Additionally, the network element provisioning system outputs the service provisioning information to one or more queues associated with one or more network elements.

According to yet another aspect, the one or more queues have different dequeue times.

According to yet another aspect, the network element provisioning system routes a portion of the service logic implementing information to a local update queue in accordance with a predetermined time, such that the portion of the service logic implementing information is not routed to the one or more queues associated with the network elements.

According to another aspect, the network element provisioning system implements the at least one telephony service in accordance with at least the internal sequence number associated with the request.

According to a further aspect, the network element provisioning system updates the database system to indicate that the at least on telephony service has been implemented by the network elements.

According to yet another aspect, the network element provisioning system requeues portions of the service provisioning information to the network elements when an error is encountered.

According to yet another aspect, the network implementing process requeues dependent portions of the portions of the service provisioning information without manual intervention.

According to another aspect, the network implementing process requeues the portion of the service provisioning information after manual intervention.

According to a further aspect, the network implementing process requeues the service provisioning information in accordance with a copy of the service provisioning information stored by the database system.

According to yet another aspect, the verification process determines a schedule date and a schedule time to activate the at least one telephony service at each of the network elements.

According to yet another aspect, the order management system further comprises a composite view system to provide a list of all existing telephony services for the subscriber telephone number, and to provide a list of telephony services for the subscriber telephone number in accordance with a user selectable date and time.

According to another aspect, the system further comprises a correction system which returns the network elements to a state prior to the network element provisioning system implementing the service implementation information at the network elements. The correction system operates when the request has been corrected, canceled or encounters an error.

According to a further aspect, the correction system resubmits the request without intervention from the at least one operations support system.

According to yet another aspect, the correction system cancels the request without querying the network elements.

According to yet another aspect, the database system appends advance intelligent network specific information to the request.

According to another aspect, the database system executes transactions related to the requests at the predetermined times, the transactions updating at least one predetermined table.

According to a further aspect, the database system comprises an historical order log which is updated by the transactions which are executed at the predetermined times.

According to yet another aspect, the historical order log stores information related to the single internal format, error information related to the transactions indicative of a cause of an error, and portions of the service provisioning information at the predetermined times. The order management system issues an acknowledgment to the at least one operations support system when the historical order log stores a last portion of the service provisioning information.

According to yet another aspect, the historical order log stores information related to the single internal format, error information related to the transactions indicative of a cause of an error, and portions of the service provisioning information at the predetermined times. The order management system issues an acknowledgment to the at least one operations support system prior to when the historical order log stores a last portion of the service provisioning information when the at least one telephony service is removed.

According to another aspect, the database system is adapted to skip storing one of the portions of the service provisioning information, and the order management system continues to determine subsequent portions of the service provisioning information.

According to a further aspect, the database system provides the order management system with a table-driven service logic to facilitate the addition of new telephony services.

According to yet another aspect, the database system provides the order management system with a table-driven service logic to facilitate the addition of new features to existing telephony services, the new features conforming to existing feature constraints.

According to yet another aspect, the database system provides an estimated response time in accordance with a network element response time and a length of a queue associated with each of the network elements.

According to another aspect, each of the network elements is provided with a plurality of queues having different prioritizations and the database system provides the estimated response time in accordance with the different prioritizations.

According to a further aspect, the plurality of queues having the different prioritization comprise an online queue and a batch queue.

According to yet another aspect, the database system utilizes an internal sequence number associated with the request to store and access the service provisioning information.

According to yet another aspect, the database system stores manual intervention information related to the service provisioning information at the predetermined times when the order management system encounters an error.

According to another aspect, the database system updates the at least one table such that the transactions are propagated through the order management system.

According to a further aspect, the database system is adapted to modify the request after the order management system has begun determining the service provisioning information for the request.

According to yet another aspect, the database system stores copies of the service provisioning information and the messages.

According to yet another aspect, the database system stores the request until a future date, future time, or future event, after which the database system submits the request to the order management system.

According to another aspect, the database system stores non-implementing information related to the request which is not used in the service provisioning information, the non-implementing information being associated with the subscriber telephone number upon the order management system outputting the service provisioning information.

According to a further aspect, the system further comprises a user interface, the user interface interfacing with the managing system via the interface system.

According to yet another aspect, the user interface is adapted to correct the service orders and generate the requests representative of the service orders.

According to yet another aspect, the user interface is adapted to query the network elements and the database system, the network elements receiving and processing the query via the order management system.

According to another aspect, the interface system provides a communications link to the at least one operations support system and the network elements.

According to a further aspect, the interface system routes communications to the appropriate one of the at least one operations support system and the network elements.

According to yet another aspect, the communications links comprise TOPCOM, DATAGATE, MQSeries, ASN.1, TCP/IP and TUXEDO /WS.

According to yet another aspect, the interface system further comprises a transaction monitoring and system control component which monitors the messages and updates the database system in accordance with the messages. The database system is updated in accordance with an internal reference number associated with the request.

According to another aspect, the transaction monitoring and system control component comprises TUXEDO /Q or TUXEDO /T.

According to a further aspect, the order management system is provided with a system to implement telephony services on template-based network elements and non-template based network elements.

According to yet another aspect, the request submitted by the at least one operations support system initiates the messaging process to send a message to another of the operations support system.

According to yet another aspect, the system notifies an administrative personnel of an error in accordance with the severity of the error.

According to another aspect, synchronous network element and asynchronous network element responses are processed by the order management system in a standardized manner.

According to a further aspect, the processes and the interface system is adapted to be interrupted to read a configurable parameter file in order to modify the processes and the interface system.

According to yet another aspect, the user interface is provided with a suite of services to access the database system.

According to yet another aspect, the system is provided with a suite of services to access the database system.

According to another aspect, the operations support systems comprises EASE, ECRS, SOAC, and a PC server.

According to an yet another aspect of the present invention, there is provided a method for facilitating service order management within a communications network. The network receives a request representative of a service order for at least one communications service associated with a subscriber number. The request originates from at least one service order source having a dissimilar input/output format. The communications network comprises network elements which provide communications services to subscribers, the method comprises interfacing with the at least one service order source, inputting the request from the at least one service order source, converting the unique input/output order format into a single internal format, storing and accessing data related to the requests in a database in a hierarchical format, determining service implementing information to implement the at least one communications service, and outputting to the network elements the service implementing information.

According to another aspect, the method further includes distributing messages within the communications network, and to the at least one service order source and the network elements. The messages comprise queries, acknowledgments, transaction types, function types, broadcasts, informational messages, and error notices.

According to a further aspect, the method further includes monitoring transactions executed at predetermined times by the communications method, and controlling the communications network in accordance with the messages.

According to yet another aspect, the step of controlling the method further includes concurrently processing a plurality of requests within the communications network.

According to yet another aspect, the step of controlling the communications network further includes querying the database and the network elements.

According to another aspect, the step of inputting further includes accepting input data from the at least one service order source, and verifying that the inputted data contains a predetermined minimum content requirement.

According to a further aspect, the method further includes populating the database with raw data associated with the request, and generating an internal sequence number which is associated with the request.

According to yet another aspect, the step of verifying further includes determining if the request contains errors, and if so, correcting the errors and populating the database it method with the raw data based on the request.

According to yet another aspect, the method further includes identifying duplicative requests and processing a first of the duplicative requests such that others of the duplicative requests are not processed, and identifying manual update requests.

According to another aspect, the method further includes reformatting the raw data into the hierarchical format of the database, the hierarchical format comprising tables having fields, where the tables are associated by the internal sequence number. Also, the method includes determining if the fields contain valid data in accordance with predetermined constraints.

According to a further aspect, the method further includes selectively updating a lock table to prevent concurrent processing of two requests associated with the subscriber number, and performing exception processing, order matching, correction order processing, order cancellation, local service provider order matching, and number change processing. Also, the method includes creating a first saved table in the database which contains activity information and service order code information in accordance with the request.

According to yet another aspect, the above-mentioned step of performing includes processing From (P) and To (T) orders, an processing FID and supplemental data.

According to yet another aspect, the method further includes determining if the request contains an allowable combination of the communications services at a user selectable date in accordance with information contained in the first saved table, and determining which of the network elements support the communications services at the user selectable date.

According to another aspect, the method further includes creating a second saved table which contains information related to a difference of communications services between a subscriber's current services and the at least one communications service being added, removed or modified by the request such that the difference of services is implemented by the network elements. The method also includes verifying that the communications services represented by the request will be able to be provided by the network elements at a schedule date for implementation.

According to a further aspect, the step of determining service implementing information further includes routing the service implementing information to queues associated with the network elements.

According to yet another aspect, the method further includes outputting the service implementing information to the network elements in a format appropriate for each of the network elements. The service implementing information is output to one or more queues associated with one or more network elements.

According to yet another aspect, the one or more queues have different dequeue times.

According to another aspect, the step of routing the service implementing logic routes a portion of the service logic implementing information to a local update queue in accordance with a predetermined time, such that the portion of the service logic implementing information is not routed to the one or more queues associated with the network elements.

According to a further aspect, the method further includes implementing the at least one communications service in accordance with at least the internal sequence number associated with the request, and updating the database to indicate that the at least one communications service has been implemented by the network elements.

According to yet another aspect, the step of routing further includes requeuing portions of the service implementing information to the network elements when an error is encountered, and requeuing dependent portions of the portions of the service implementing information after manual intervention if the communications network is unable to resolve the error.

According to yet another aspect, the step of routing requeues the service implementing information in accordance with a copy of the service implementing information stored by the database.

According to another aspect, the method further includes determining a schedule date and a schedule time to activate the at least one communications service at the network elements.

According to a further aspect, the method further includes generating a composite view to provide a list of all existing services for the subscriber number, and providing a list of services for the subscriber number in accordance with a user selectable date and time.

According to yet another aspect, the method further includes correcting the service implementation information by returning the network elements to a state prior to the service implementation information being outputted to the network elements, where the step of correcting is performed when the request has been corrected, canceled or encounters an error.

According to yet another aspect, the method further includes resubmitting the request without intervention from the at least one service order source.

According to another aspect, the method further includes canceling the request without querying the network elements.

According to a further aspect, the method further includes appending communications network specific information to the request.

According to another aspect, the method further includes executing transactions related to the requests at the predetermined times, the transactions updating at least one predetermined table, and updating an historical order log when the transactions are executed which are executed at the predetermined times. The historical order log stores information related to the single internal format, error information related to the transactions indicative of a cause of an error, and portions of the service implementing information at the predetermined times. The method also includes issuing an acknowledgment to the at least one service order source prior to, or when, the historical order log stores a last portion of the service implementing information.

According to a further aspect, the method further includes skipping the step of storing one of the portions of the service implementing information and continuing to determine subsequent portions of the service implementing information.

According to another aspect, the step of determining includes providing an estimated response time in accordance with a network element response time, a queue prioritization and a length of the queue associated with each of the network elements.

According to a further aspect, the method further includes storing, in the database, manual intervention information related to the service implementing information at the predetermined times when the communications network encounters an error.

According to yet another aspect, the method further includes propagating, throughout the communications network, the transactions, and modifying the request after the communications network has begun determining the service implementing information for the request.

According to yet another aspect, the method further includes storing copies of the service implementing information and the messages, and storing the request until a future date, future time, or future event, after which the database submits the request to the communications network. The database stores non-implementing information related to the request which is not used in the service implementing information, the non-implementing information being associated with the subscriber number upon the service implementing information being outputted to the network elements.

According to another aspect, the communications network further includes a user interface, and the method further includes correcting the service orders, and generating the requests representative of the service orders.

According to a further aspect, the method further includes querying the network elements and the database, and receiving and processing the query at the network elements.

According to yet another aspect, the step of routing includes communicating with the network elements via one of TOPCOM, DATAGATE, MQSeries, ASN.1, TCP/IP and TUXEDO /WS.

According to yet another aspect, the method further includes updating the database in accordance with the messages and an internal reference number associated with the request. And the monitoring and controlling is performed by TUXEDO /Q or TUXEDO /T.

According to another aspect, the method further includes implementing services on template-based network elements and non-template based network elements.

According to a further aspect, the step of distributing messages initiates a message to be send to another of the service order sources.

According to yet another aspect, the method further includes notifying administrative personnel of an error in accordance with the severity of the error.

According to another aspect, the method further includes processing synchronous network element and asynchronous network element responses in a standardized manner.

According to a further aspect, the step of determining further includes interrupting the communications network to read a configurable parameter file, and modifying the communications network in accordance with information in the configurable parameter file.

According to a further aspect, the communications network includes an advanced intelligent network, and the at least one order source includes EASE, ECRS, SOAC, and a PC server.

According to yet another aspect, the user interface is provided with a suite of services to access the database.

According to yet another aspect, the communications network is provided with a suite of services to access the database.

The above-listed and other objects, features and advantages of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like references numerals represent similar parts throughout the several views of the drawings, and wherein:

FIG. 44 is an exemplary graphical user interface screen illustrating an interface status window;

FIG. 66 is an exemplary graphical user interface screen illustrating a USOC/FID errors window;

FIG. 67 is an exemplary graphical user interface screen illustrating a MI schedule window;

FIGS. 70-72 are exemplary graphical user interface screens illustrating orders found windows;

FIGS. 74-78 are exemplary graphical user interface screens illustrating a NE query windows;

FIGS. 79-81 are exemplary graphical user interface screens illustrating template query windows.

BRIEF DESCRIPTION OF THE APPENDICES

Figure 1:
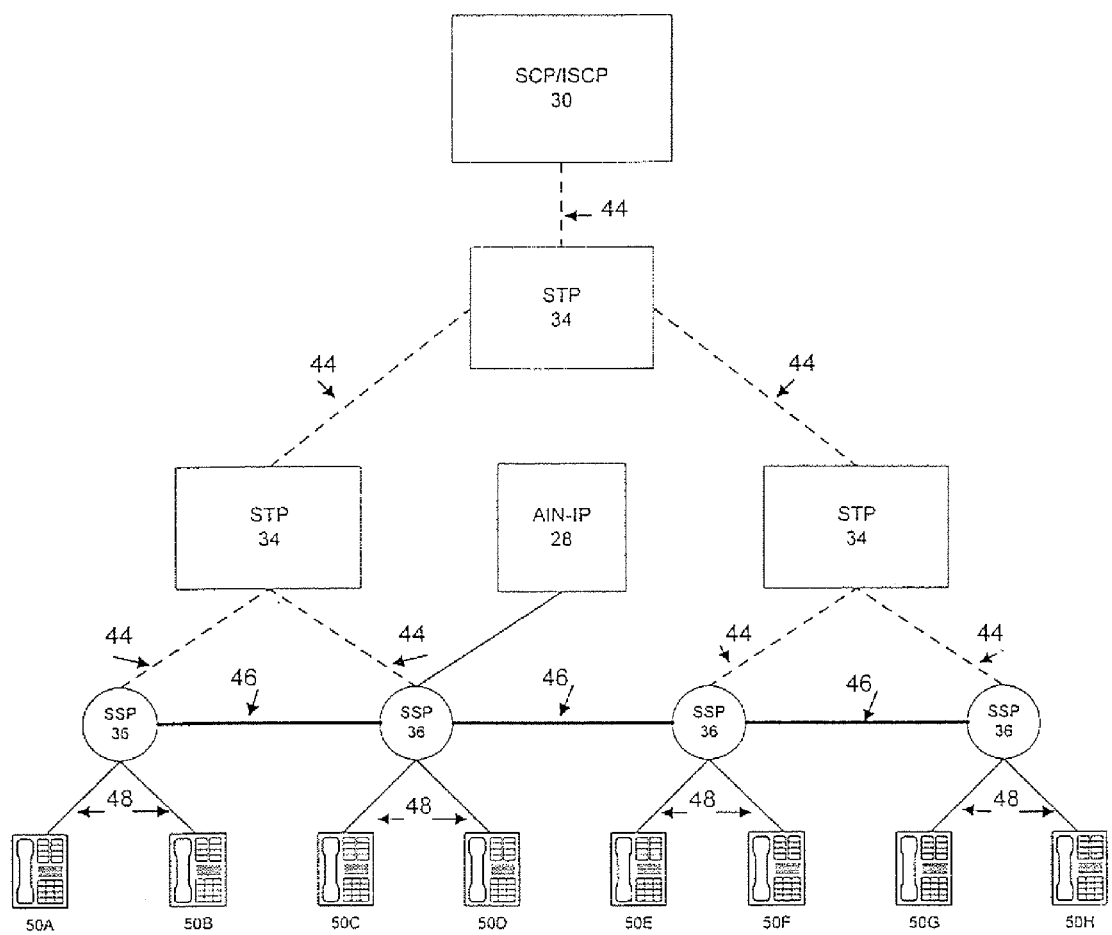
FIG. 1 illustrates, in a general block diagram form, a simplified representation of an Advanced Intelligent Network according to the prior art.

In order to further facilitate the detailed description of the present invention, reference is made to the noted plurality of appendices by way of non-limiting examples of preferred embodiments of the present invention, in which sample pseudo-code, database tables, database services, database field definitions, and comments are provided with respect to the various features, operations and functions of the invention, and wherein:

Appendix A is an exemplary listing of the database tables of the present invention;

Appendices B and C are exemplary database services of the present invention which are utilized to access and manipulate data within the database tables;

Appendix D is an exemplary pseudo-code for executing the MESSAGE_NOTIFICATION service of the present invention;

Appendix E is an exemplary list of error codes utilized to determine the cause of errors during the processing of the present invention;

Appendix F is an exemplary pseudo-code for executing the TIP service of the present invention;

Appendix G is an exemplary pseudo-code for executing the REFORMAT service of the present invention;

Appendix H is an exemplary pseudo-code for executing the SOPP service of the present invention;

Appendix I is an exemplary pseudo-code for executing the VERIFY service of the present invention;

Appendix J is an exemplary pseudo-code for executing the TRANSLATION service of the present invention;

Appendix K is an exemplary pseudo-code for executing the EDITS service of the present invention;

Appendix L is an exemplary pseudo-code for executing the BREAKOUT service of the present invention;

Appendix M is an exemplary pseudo-code for executing the ROUTER service of the present invention;

Appendix N is an exemplary set of tables utilized in generating the customer view within the present invention;

Appendix O is an exemplary pseudo-code for executing the PROV service of the present invention;

Appendix P is an exemplary listing of services available to users of a graphical user interface according to the present invention; and Appendix Q is an exemplary listing of reference tables utilized to support the various operations of the service management system of the present invention.

DETAILED DESCRIPTION OF THE PREFERRED EMBODIMENTS

I. Overview
  A. Introduction

The Service Management System (SMS) of the present invention is a modular, table driven computer-based Service Management System (SMS) used to automate the provisioning flow for Advanced Intelligent Network (AIN) telephony services. As shown in FIGS. 2-11, the SMS 10 includes a graphical user interface (GUI) 42 (FIG. 3) to interact with the system to appropriately handle failed or special provisioning requests. The GUI 42 also acts as a mechanism for storing and displaying provisioned service information. The system is a generic system which provides for shorter design and development periods when deploying new telephony services. The SMS 10 consists of a series of software implemented services which reside on a platform. The services have responsibilities within the provisioning flow and interact with external computing systems via specialized interfaces. The SMS Services 100 share a common database system and access methodology to coordinate data flow and transition of service requests and queries to provisioning or query requests and to receive their associated responses. All of the above-noted features will be described in greater detail hereinafter.

The SMS 10 supports subscriber services such as, for example, Intelligent Call Forwarding (U.S. Pat. No. 5,592,541, to Harold C. FLEISCHER, III et al., issued on Jan. 7, 1997), Selective Call Acceptance (U.S. application Ser. No. 08/455,699, in the names of Harold C. FLEISCHER III et al., entitled "Apparatus and Method for Selectively Accepting Incoming Calls", filed May 31, 1995), and Caller IntelliData (U.S. application Ser. No. 08/473,919, in the names of Harold C. FLEISCHER, III et al., entitled "Apparatus and Method for Recording Call Related Data", filed Jun. 7, 1995). The disclosures of the above-identified U.S. patents and U.S. Patent applications are expressly incorporated herein by reference in their entireties. As is evident to those of skill in the art, additional services may be supported by the SMS 10 as new services are added to the AIN network and existing services are enhanced.

Figure 2:
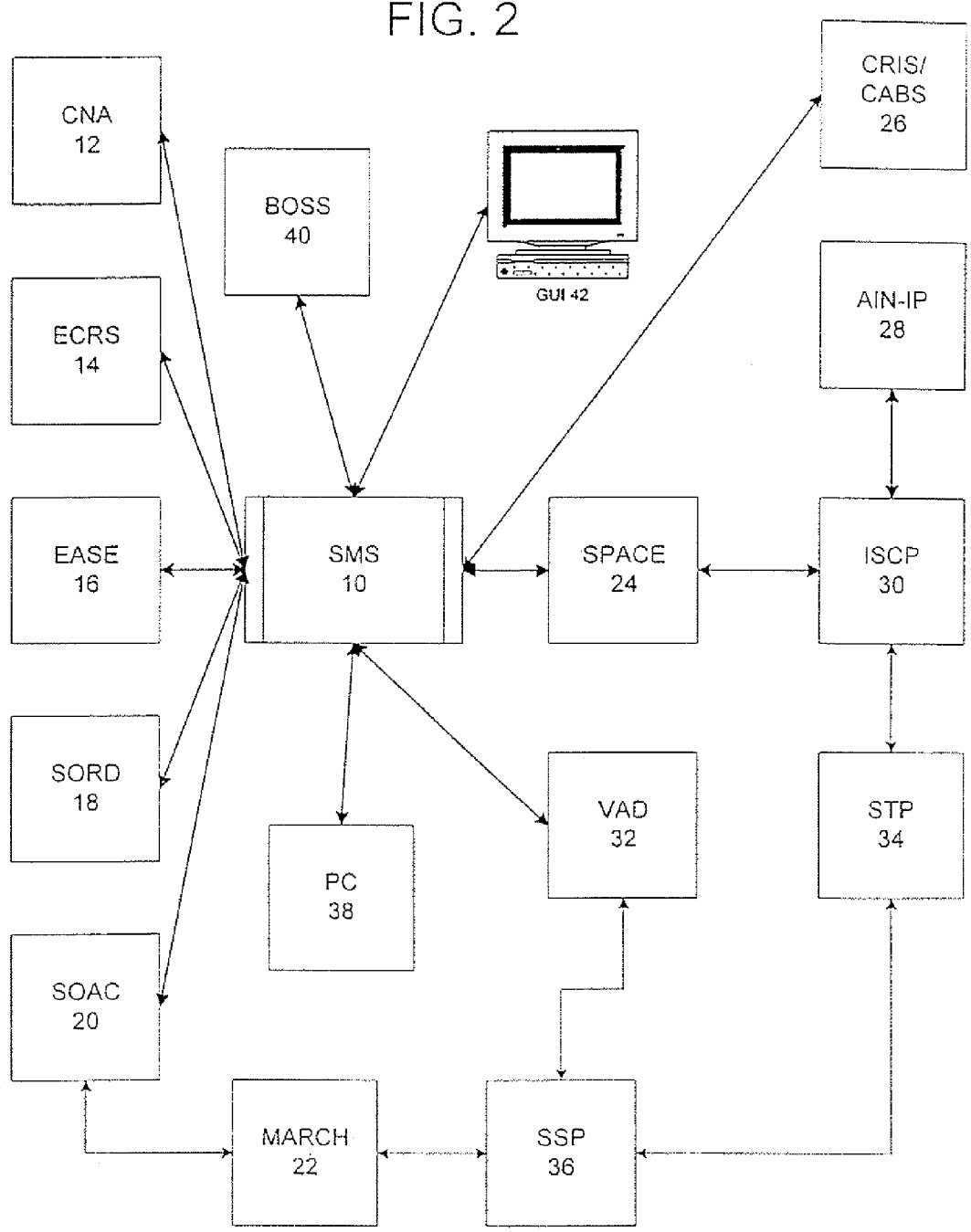
FIG. 2 illustrates, in a general block diagram form, a simplified representation of an aspect of the present invention.

As shown in FIG. 2, in order for the SMS 10 to perform service order provisioning, the SMS 10 may interface with, for example, Service Order Assignment Control (SOAC) 20. SOAC 20 is a Bellcore product and is a primary source of provisioning updates for mass market AIN services that are initiated through the normal service order process.

Once SOAC 20 receives a response from the SMS 10, it will send AIN trigger information to the MARCH™ system for automatic switch updates. MARCH™ is a trademark of Bell Communications Research, Inc. After the switch is updated, the service order flows to the appropriate billing systems for completion. Upon completion, SOAC 20 notifies the SMS 10 for confirmation purposes.

As illustrated in FIGS. 2-4 and 8, the SMS 10 may also interface with other OSSs 54 in order to support service negotiations and service assurance requests. The SMS 10 may use a generic OSS 54 data gateway as an alternative entry point for supplemental AIN subscription data. The supported OSSs 54 may include Easy Access Sales Environment (EASE) 16 which is used to generate sales orders by Residence and Business service representatives; Service Order and Retrieval and Distribution (SORD) 18 which is used to distribute service orders to affected departments and downstream OSSs 54; Enhanced Customer Reports System (ECRS) 14 which allows customers to report trouble on their circuits/networks by calling a designated repair number; Customer Network Administration (CNA) 12 which provides selected large business customers with online access to their account information; Billing and Order Support System (BOSS) 40 which allows customers to inquire about their bill or to make changes to their account; and PC services used to allow customers to add customer specific service information to specified services that are already provisioned. The OSSs 54 may also query the SMS 10 for access to AIN subscription data, located in, for example, an AIN database 64 An interface is provided for this function which is outside the normal SOAC 20 provisioning flow and is accessible through industry standard protocols such as RPC, CMISE, etc. Further, the SMS 10 may service multiple OSS systems 54A in a simultaneous mode, and may service 20 to 30 simultaneous OSS systems 54A.

Figure 10:
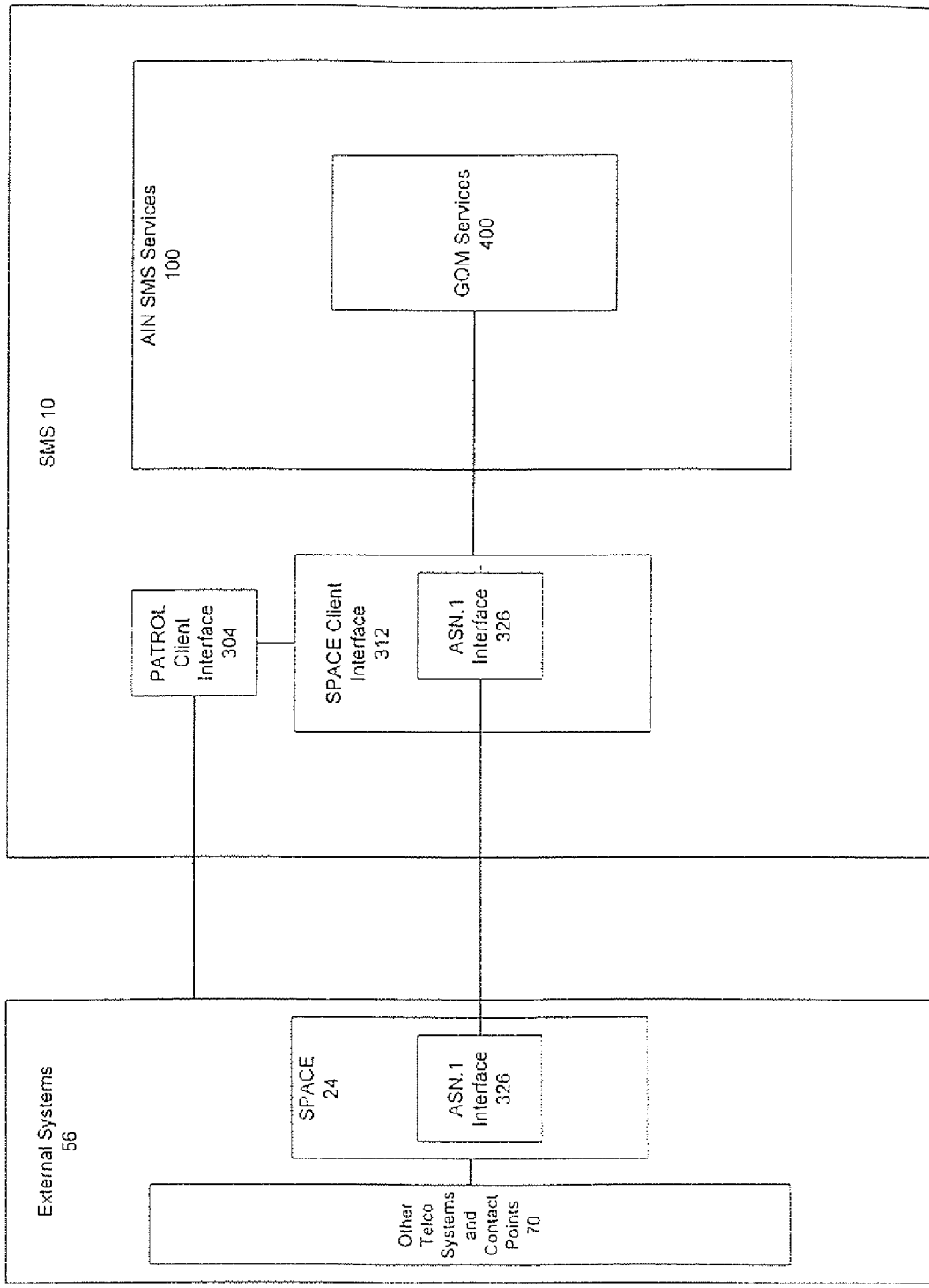
FIG. 10 illustrates, in a general block diagram form, a connection between the Service Management System and SPACE.

As illustrated in FIG. 10, the SMS 10 interfaces with SPACE 24 for mechanical service order provisioning and SPACE 24 query of templated CPRs. COMPLEX service orders (i.e., those service orders which are not templated) will flow to the SMS 10 as well. The SMS 10 will recognize COMPLEX orders and sends a work notice to the appropriate user group so the order can be worked on a manual basis. When the COMPLEX order is marked complete, the SMS database 200 is updated, and a POSACK (positive acknowledgment) is returned to the SOAC 20 system where the order originated.

SPACE query capabilities are controlled on a user group basis. The SMS 10 provides the capability to query a customer's CPR, and template mapping information. In addition, queries for stand-alone tables, and table specification information may be supported. The user is able to view active, pending, sending, suspended, disconnected, old, saved and failed views from SPACE 24.

All types of SPACE Provisioning CPRs are supported by the SMS 10. The SMS 10 processes responses from SPACE 24 including duplicates and errors, queries entire CPRs and handles return of all varieties of data and errors. THE SMS handles abort (logical replacement for flow control), queries for provisioning mapping information and all queries and provisioning requests are timed and resent as needed.

The SMS 10 stores the AIN subscription data for the mass market services identified above (e.g., Selective Call Acceptance, Caller IntelliData, Outgoing Call Restriction, Non-Pub Messaging, and Computer Access Restriction). The SMS 10 database supports multiple pending orders, a current view, and a historical view of all AIN services.

The SMS 10 provides an interface for the Customer Records Information System (CRIS)/Customer Access Billing System (CABS) 26 (FIG. 2). The CRIS billing system is responsible for calculating and rendering bills to approximately 10.5 million residence and business customers on a monthly basis. The CABS billing system is responsible for calculating and rendering bills to approximately 20,000 interexchange carriers and 16,000 end users.

An SMS 10 user interface terminal (shown as CUT 42 in FIG. 3) is provided for the RCMAC/GUIs, CNOC, NOCs and SCCs to administer the system. Input screens provide a capability to work system errors, and update and query the five mass market services identified above. A local-post option is provided to handle non-standard updates (in a manual mode) and to post COMPLEX orders which are provisioned on a manual basis. The SMS 10 provides a query mechanism to the SMS Customer Database 64 (FIG. 11) The user is able to view saved, erred, pending, COMPLEX and in-progress views. The SMS 10 graphical user interface provides a query interface into SPACE 24. An estimated response time calculation is supported for the SPACE 24 query.

The SMS 10 supports up to, for example, 150 concurrent users. A GUT Client Interface 308 supports queries of the PCS database 204 and order submission via PCS database 204 entries and an appropriate interface. The SMS 10 also supports a generic OSS Client Interface 310 which will be used to provide SMS query capabilities. The SMS 10 may comprise a query server and an OSS server, to which the OSS Client Interface 310 is connected to process queries and requests originating from the OSS systems 54.

A Batch audit process compares mass market subscription data that is stored in both SPACE 24 and the SMS 10. For auditing purposes, the SPACE 24 data is considered the master, and all audit discrepancies will automatically be updated within the SMS 10 to match the SPACE 24 data. In addition, an audit discrepancy report is written which lists all updated SMS 10 records. An initial load program will populate the SMS 10 with SPACE 24 subscription data that has been already provisioned.

Figure 11:
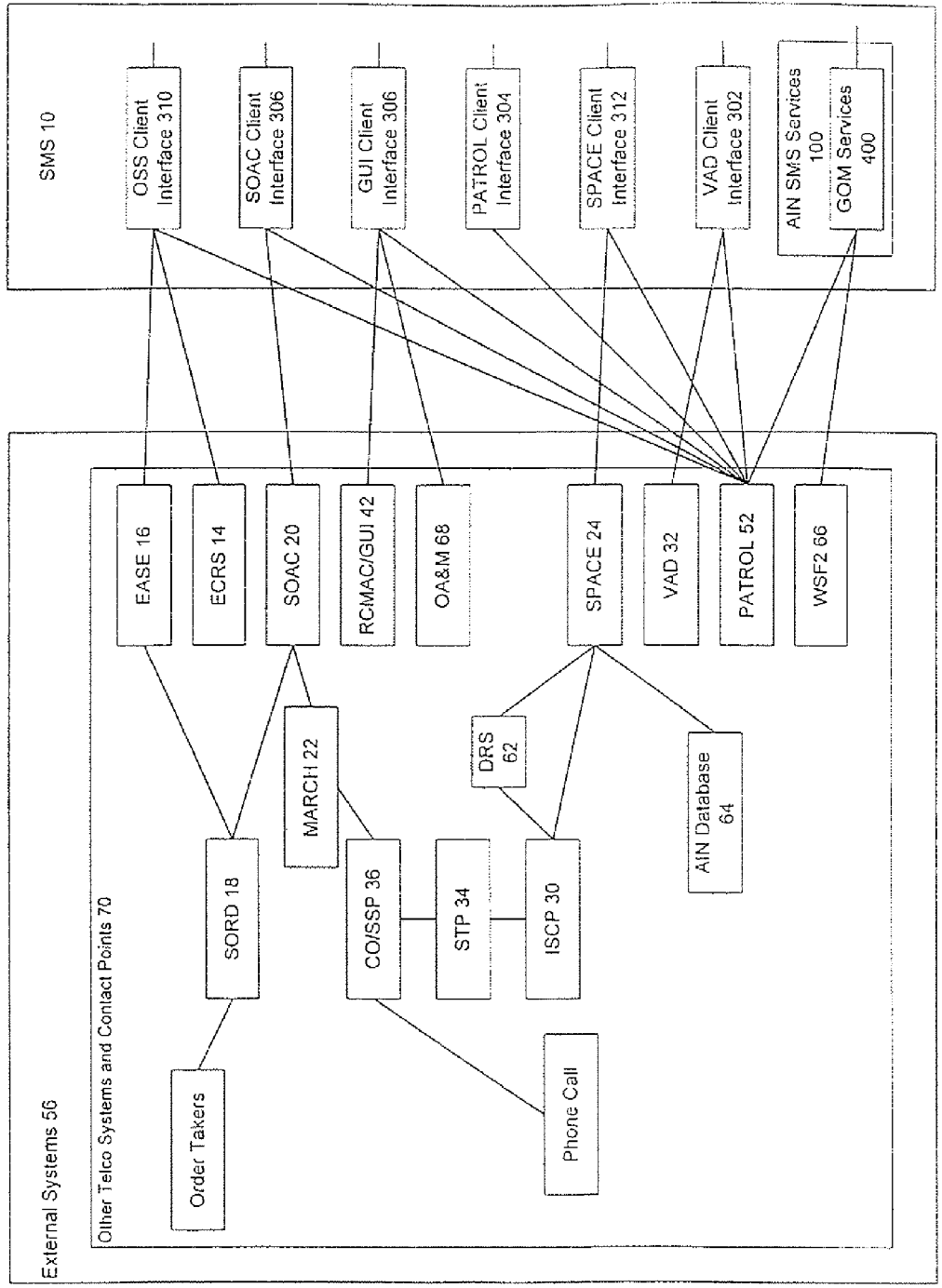
FIG. 11 illustrates, in a general block diagram form, a connection between the Service Management System and other telephone company elements.
Figure 12:
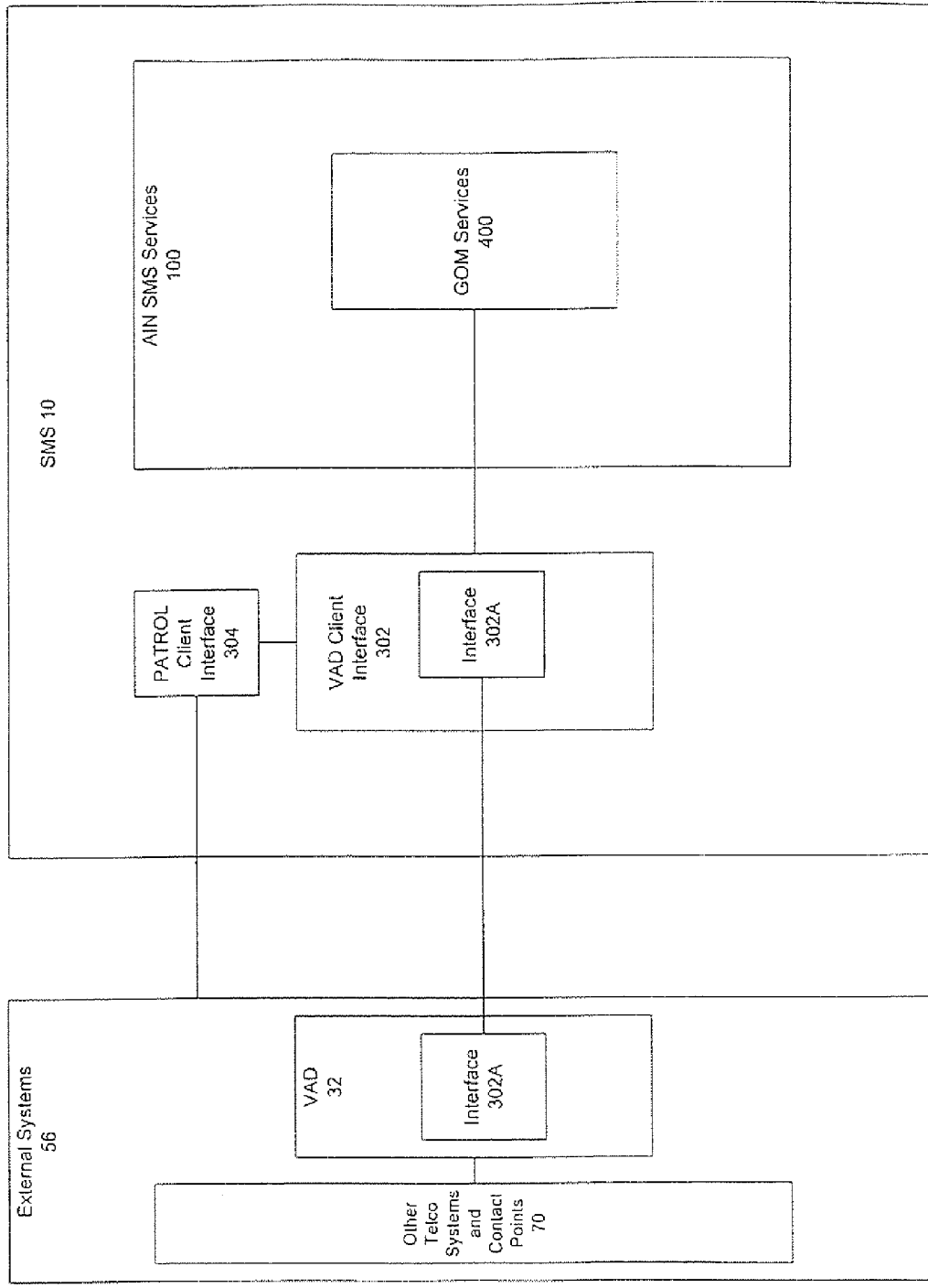
FIG. 12 illustrates, in a general block diagram form, a connection between the Service Management System and VAD.

As shown in FIG. 11, the SMS 10 will support Operations, Administration and Maintenance (OA&M) 68 functions. This includes the support of: system configuration parameters, reference tables (e.g., switch tables, USOC tables, service tables, etc.), view queues, manage queues, halt processing to a Network Element, and Database back-up and recovery.

B. SMS Component Areas

Figure 4:
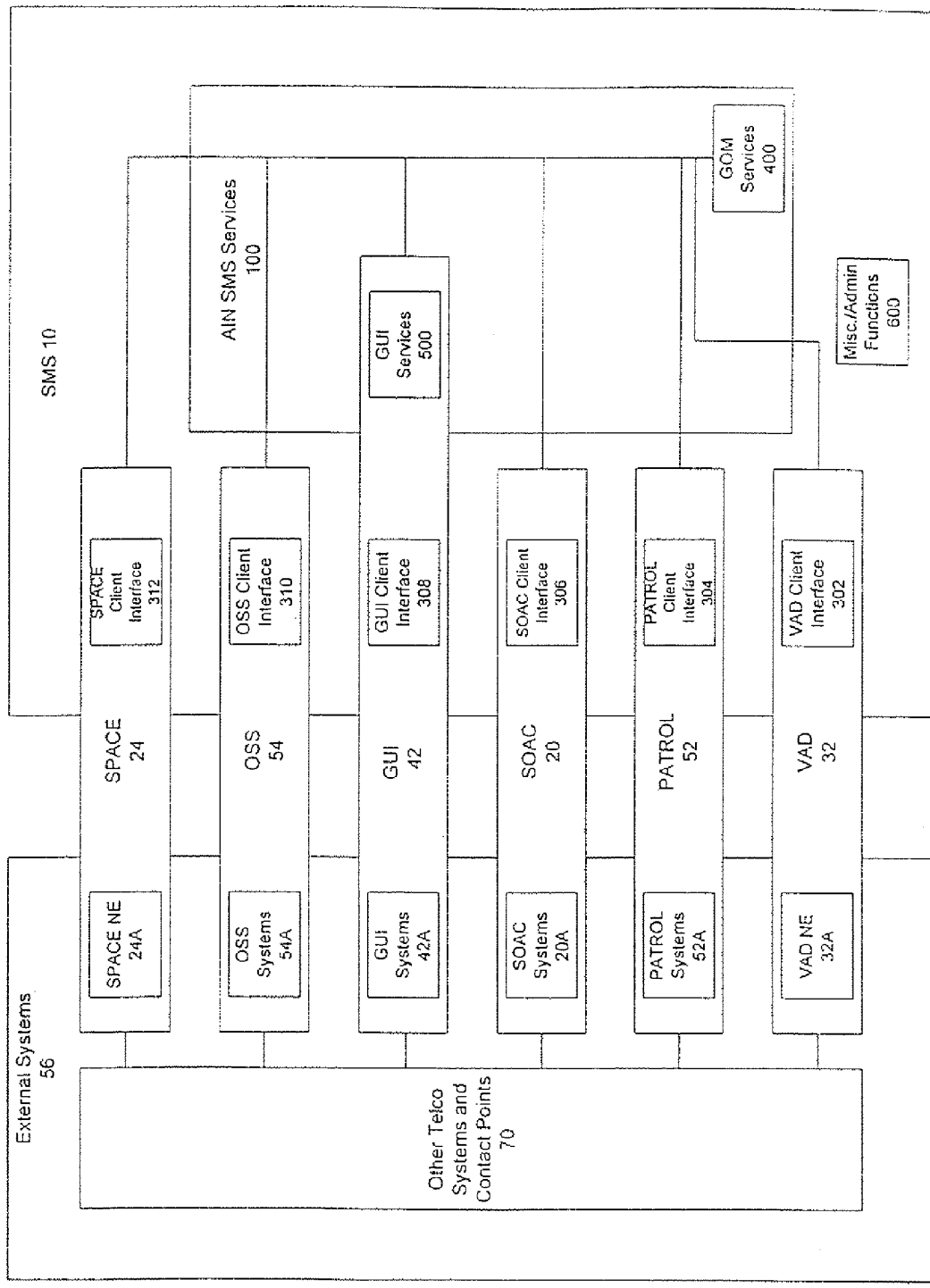
FIG. 4 illustrates, in a general block diagram form, an overview of the elements which are connected to the Service Management System of the present invention.
Figure 5:
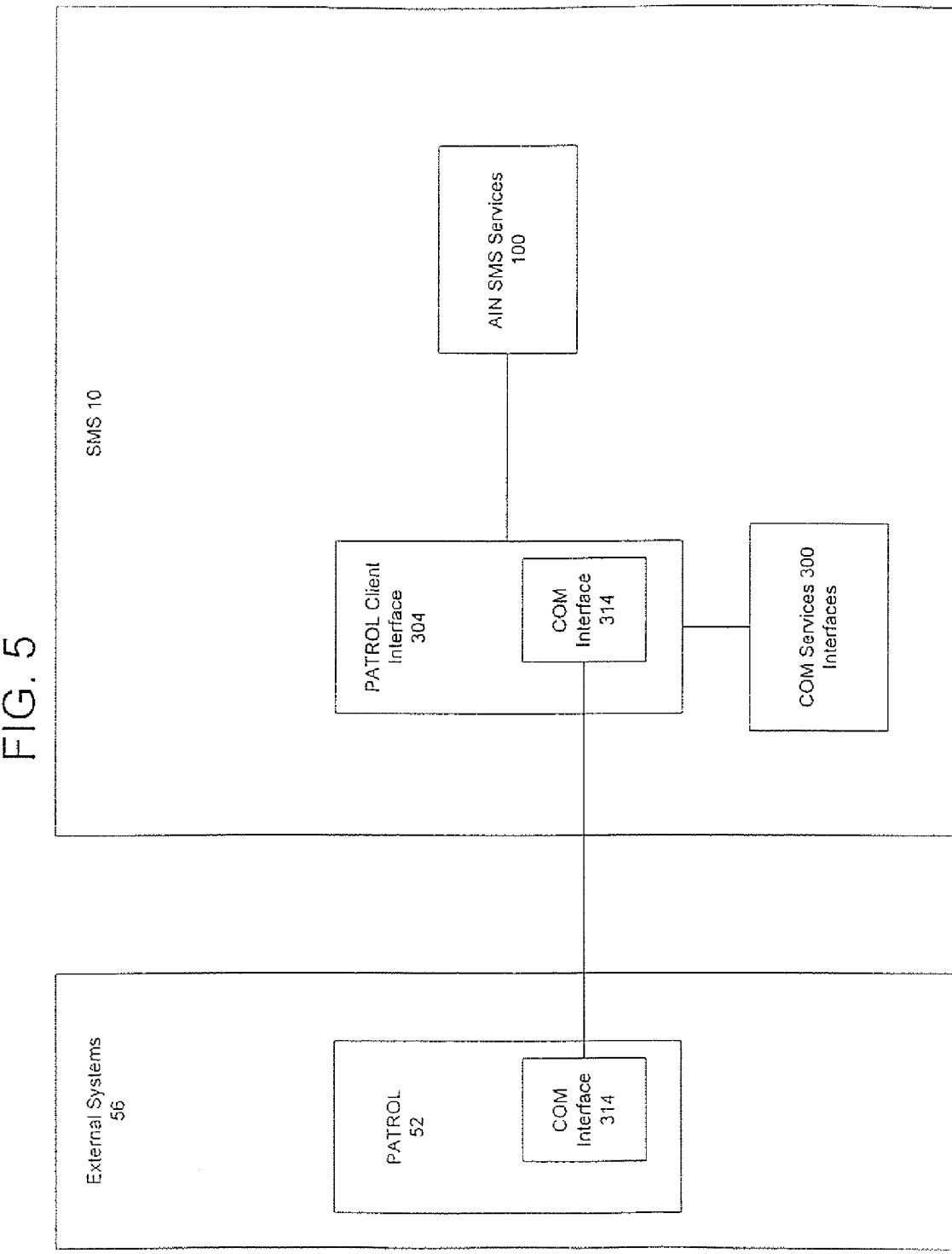
FIG. 5 illustrates, in a general block diagram form, a connection between the Service Management System and the alert system software.
Figure 13:
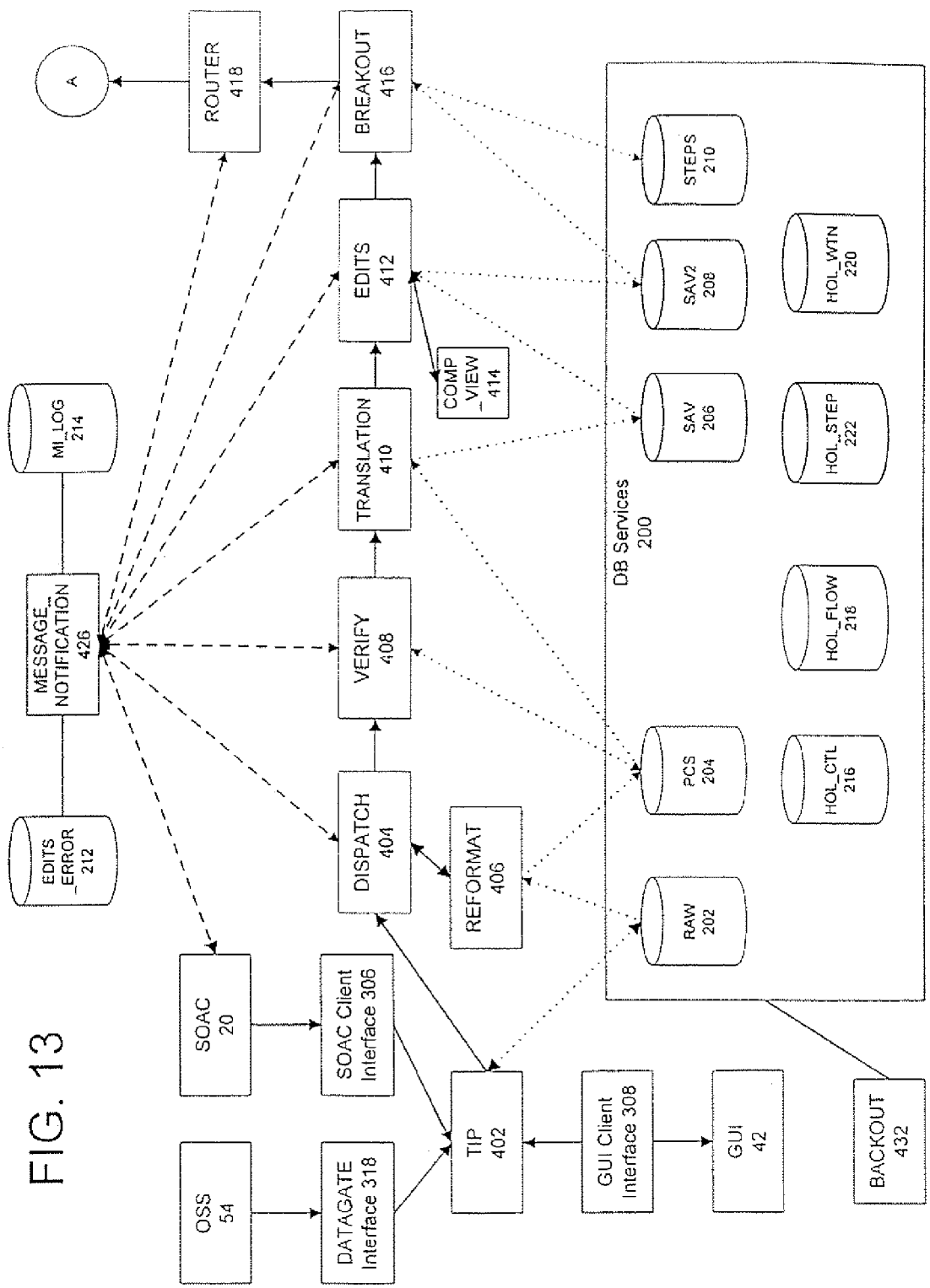
FIGS. 13 and 14 illustrate, in a general block diagram form, the Generic Order Management services and Database Services of the present invention.

The SMS 10 include several software component areas, each of which is described generally below for introductory purposes, and with greater detail hereinafter. As shown in FIGS. 4, 5 and 13, the SMS 10 generally includes a database component, a communications interface (COM), a generic order management system (COM), and a graphic user interface (GUI), which will be collectively referred to as SMS Services 100.

The Database Services component 200 (FIG. 13) includes the data repository associated with the present invention. The Database Services may be implemented using ORACLE database software and design tools to create the procedures and I/O routines to access the data. ORACLE database software and design tools are available from ORACLE, California.

The Communication (COM) Services 300 (FIGS. 4 and 5) provide communications capabilities between the various OSS systems, NEs, and GUE users who interface with the SMS 10. The COM Services component 300 provides a communications path to dialogue with SOAC 20 through TOPCOM (available from Bellcore, Murray Hill, N.J.), with SPACE 24 using DSG (available from DSET, Inc., Bridgewater, N.J.) via a DATAGATE process set (DATAGATE is available from Southwestern Bell Telephone, St. Louis, Mo. and facilitates communication between dissimilar hardware platforms), with VAD 32 through TOPCOM, AIN through MQSeries (available from IBM, Corp., Armonk, N.Y.), and with EASE and ECRS users through DATAGATE. The COM services 300 also include encoding and decoding to and from ASN.1 to SPACE via a ASN Compiler and Protocol Development Tools (available from DSET). The OSS 54 (e.g., EASE 16 and ECRS 14) interface component will allow users to perform queries of SMS 10 and NE data. The OSS 54 accessories interface with the SMS 10 via DATAGATE. Message handling and communications may be provided through the TUXEDO /WS software package (available from the Information Management Company (IMC), Edison, N.J.), which processes SMS 10 queries, NE queries, activation requests, error processing and OA&M functions.

The GOM Services 400 (FIGS. 6 and 13-14) component is the Generic Order Management subsystem for processing service orders. Throughout the subsystem, customer views are maintained to allow GOM to resolve errors, synchronize events, provide responses, allow data insertion via the GUI users, and to provide information to those handling errors and manual processes. The GOM services 400 component is divided into a front and a back end system. The front end of the subsystem provides parsing via Service Order pre-processing (SOPP) stringing data into a repository, data verification, order translation through DIFFERENCING and multiple pass activities, edits, breaking the order into activation request entities, and routing requests to correct queues for later activation processing. The Sack End System is referred to as the NE Interface System which passes requests to network elements and handles network element response traffic, it is utilized to accomplish NE access. The GOM services 400 includes provisioning services which pace the delivery of requests to the NEs as required.

The GUT client 42 and GUI Services 500 (FIG. 7) are provided to query the SMS data as well as query the attached network elements. The GUT client may provided updates to the SMS data and will trigger the GOM services 400 to act upon those updates. The GUT 42 software may be developed using PowerBuilder (available from Powersoft, Inc., Concord, Mass.), and will run on Intel-based workstations (e.g., 80486, Pentium® or larger) running Windows® 3.x or Windows95® (available from Microsoft Corp., Redmond, Wash.), or alternatively, X-terminals connected to Sun servers running the Solaris operating system. The GUT User Access and OA&M Interface system component use the PowerBuilder products to provide a consistent data presentation mechanism for RCMAC/GUI 42 and other GUI 42 Users and OA&M access.

The service management system also includes a Transaction and System Control component. This component may be provided by the TUXEDO /T and /Q products (available from IMC), which are used to oversee the scheduling of processing services and to handle queuing and dequeuing of the messages used to provide interfacing between software components in the system. Further, the service management system may be provided with an alert system to issued messages to pagers to notify the appropriate personnel of system errors and failures. As shown in FIG. 5, such alert system software may comprise PATROL, which is available from BMC Software, Houston, Tex. In the description of the present invention below, reference is made to TUXEDO and PATROL calls and processes. Applicants note that other messaging, transaction control, and system alert software applications may be utilized to implement the present invention, and thus, the TUXEDO and PATROL calls noted below may be changed to accommodate such an implementation.

C. Hardware and Platform

Figure 3:
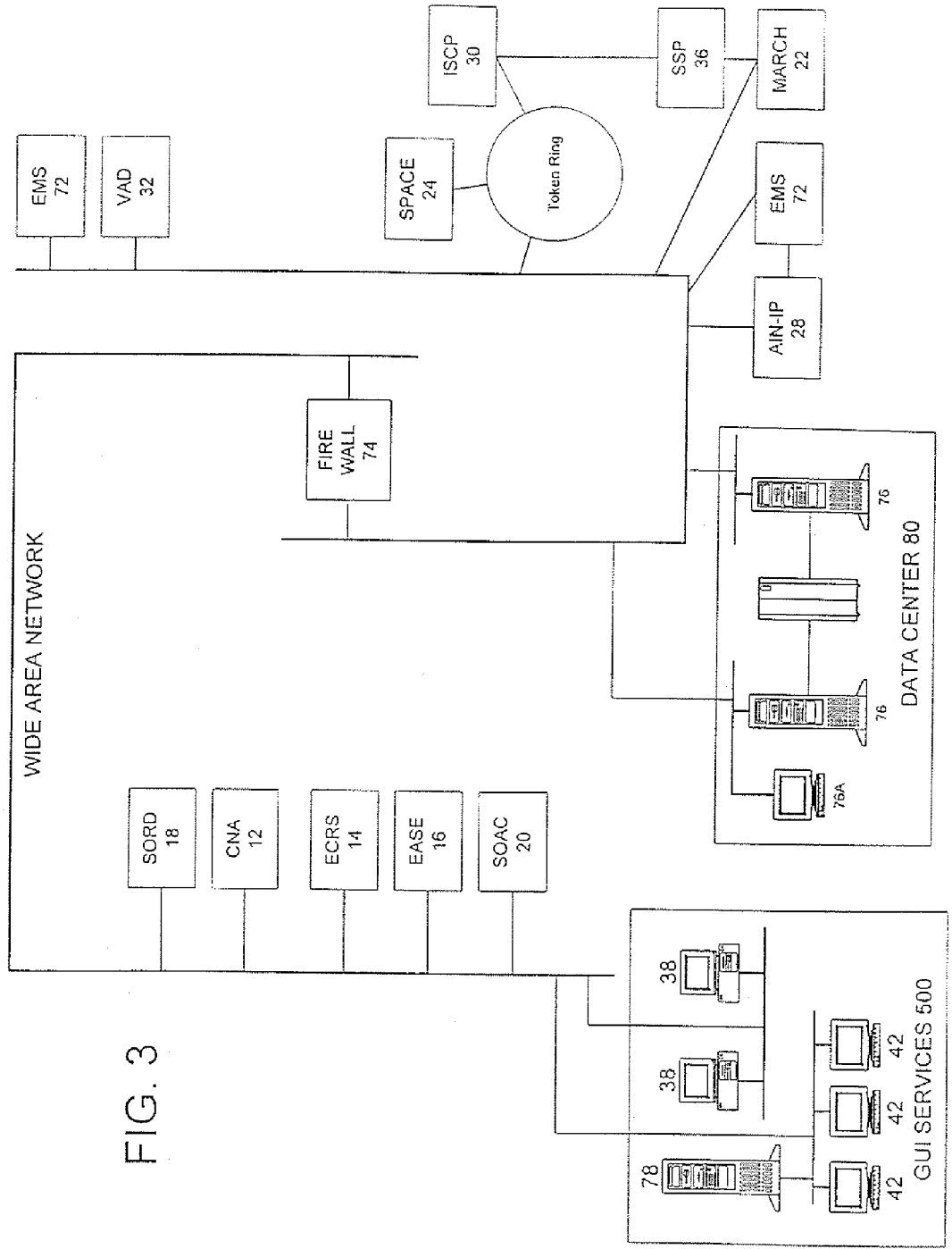
FIG. 3 illustrates, in a general block diagram form, a wide area network according an aspect of the present invention.

Referring to FIG. 3, the SMS 10 server hardware preferably consists of two SMS servers 76 at a data center 80 comprising Sun SPARCcenter 2000 systems running the Solaris 2.4 operating system. There also may be several GUI servers 78 in remote locations which may comprise Sun SPARC 20 systems also running Solaris 2.4. The Sun SPARCcenter 2000, SPARC 20 and Solaris operating system are available from Sun Microsystems, Mountain View, Calif. In a preferred embodiment, the SMS 10 will comprise two Sun SPARCcenter 2000, each having 8 processors, 1 GB of main memory, 52.2 GB of disk storage, and 2 S/BUS quad Ethernet cards. In an alternative embodiment, each SPARCcenter 2000 may comprise 20 processors, 5.12 GB of main memory, 40 S/BUS slots, and 52.5 GB of disk storage. The SMS 10 hardware configuration may also include a 8 mm Tape Drive, CD-ROM drive, and mirrored disks (i.e., RAID).

The external systems, such as OSSs 54, VAD 32, and AIN-IP 28 may be connected to the SMS 10 by a token ring network connected to an area wide network (through firewall 74 where applicable) supporting, for example, TCP/IP and X.25 protocols.

C programming language developer products may be utilized for software development and generation, and version control. C programming language tools are available from Sun Microsystems, Mountain View, Calif. Other configurations of hardware and software than the exemplary configuration above may be used to implement the present invention.

II. Database

A collection of database routines are used by all SMS 10 processes to access database objects (e.g., tables) which belong to SMS 10. The routines are the exclusive method for accessing the SMS databases. Such a strategy ensures that data being stored in the database is processed in a consistent manner. In addition, it offers the advantage of isolating other portions of the application software from the physical characteristics of the database. This latter point greatly simplifies the process of migrating the database from one DBMS and/or hardware platform to another.

All database routines incorporate the following design goals: Ease of use such that the service is easy to call and use, a consistent interface as a regular function pattern makes access easier to learn and use, transparency such that callers do not need to know where or how the data is stored, completeness such that the Database Services 200 interface allows access to all features of the DBMS, and extensibility as it should be easy to add new services as the application grows or requirements change.

A. Database System Constraints

Various system design constraints will now be discussed. The constraints are provided to insure uniformity across the database system. As noted above, the SMS 10 is table-driven and includes several tables (illustratively shown in FIG. 13) to perform management services. The tables and their associate fields will now be generally introduced. The tables, field names and associated values will be referenced throughout the instant specification to described the function of each of the services within the SMS 10. This section references Appendix A, which includes an exemplary group of SMS database tables.

1. Raw Request Tables (Built by TIP)

RRAW_REQ—contains the 'raw' SOAC order types.

REQUEST_IMAGE—contains the base copy of the incoming sources orders.

2. Misc. Request/Order Data

EXP_ORDER—contains 'expected' SOAC order associated with a GUI 42 order.

ORDER_LOCK—contains a 'lock' for synchronizing multiple order passes.

3. PIECES TABLES (Built by REFORMAT or GUI Services

PCS_C3—contains service order's C3 section.

PCS_ODR—contains service order's ODR section.

PCS_RSCFID—contains service order's Resource Record's FID data.

GUI_RSCFID—contains service order's Resource Record's FID data.

PCS_RSCREC—contains service order's Resource Record's section.

GUI_RSCREC—contains service order's Resource Record's section.

PCS_RSCUSOC—contains service order's Resource Record's USOC data.

GUI_RSCUSOC—contains service order's Resource Record's USOC data.

PCS_SER—contains service order's SBR section.

4. SAVED VIEW (Built by TRANSLATION)

SAV_ACTION—action (add, delete, or change) for given USOCs.

SAV_FID—contains the FID and its data for a given USOC.

SAV_ODR—contains service order's ODR section.

SAV_USOC—contains the USOC for a given WTN.

SAV_WTN—contains WTN related information.

5. SAVED VIEW2 (Built by EDITS)

SAV2_ACTION—contains the NE and Template ID information.

SAV2_CALL_VAR—contains SPACE CALL VARIABLE(s) and data.

SAV2_FID—contains the FID and its data for a given USOC.

SAV2_ODR—contains service order's ODR section.

SAV2_USOC—contains the USOC for the given WTN.

SAV2_WTN—contains WTN related information.

6. Provisioning Step Tables (Built by BREAKOUT)

STEP_CALL_VAR—contains SPACE CALL VARIABLE(s) and data.

STEP_FID—contains the FID and its data for a given USOC.

STEP_USOC—contains the USOC for the given WTN.

STEP_WTN—contains WTN related information per NE.

7. LOG TABLES (BY ISN)

EDITS_ERROR—contains error code/text information for a given order.

HOL_CTL—control section, one per order.

HOL_FLOW—each program's audit per order.

HOL_STEP—entry corresponding to each provisionable step on the order.

HOL_WTN—entry for each WTN on order.

INPUT_COUNT—contains count of all messages received by TIP.

OUTPUT_COUNT—contains count of all messages processed by PROV.

MI_LOG—contains error information per order.

ACTVY_LOG—contains 'ACK' messages (e.g., POSACK, NEGACK, etc.)

QUERY_RESP—contains responses to queries.

8. Safe Store Tuxedo Queue Tables

CUSTPC_Q—PCIF queue Backup Table.

DISPATCH_Q—DISPATCH queue Backup Table.

FNTMON_Q—F and T queue Backup Table.

PROV_Q—PROV queue Backup Table.

SOAC_Q—SOAC Reply queue Backup Table.

TIP_Q—TIP queue Backup Table.

VERIFY_Q—VERIFY queue Backup Table.

9. Customer Account Tables

WTN—contains WTN account information.

WTN_LOCK—contains 'LOCK' used to sequentially process a WTN.

SVC_USOC—contains USOC (service) information.

SVC_CV_DATA—contains the CALL VARIABLE information.

SVC_FID—contains the FID.

SVC_DETAIL—contains USOC and NE ID.

10. SMS Reference Tables

NE_INTRFC—contains all valid NEs.

TEMPLATE_NE_XREF—contains all valid Templates per NE.

SWITCH_NE_XREF—contains all valid NE per switch.

SWITCH_CONTROL—contains all valid switches.

SWITCH_USOC_XREF—contains all valid USOCs per switch.

USOC_REF—contains entry for each valid USOC.

USOC_PROV_REF—contains NE types per USOC.

USOC_TEMPLATE_XREF—contains all valid USOCs per Template.

TEMPLATE—contains logical templates.

CALL_VARIABLE_REF—contains entry for each CALL VARIABLE per USOC/FID.

QUEUE_STATS—contains queue length and wait time statistics.

TSYS_REF—contains TSYS/system cross reference information.

CLASS_OF_SVC_REF—valid CS values, Business/Residence Categories.

TEMPLATE_DETL—contains all valid templates.

FID_REF—contains entry for each valid FID per USOC.

INTERFACE—contains attached systems and their respective status.

REQR_USOC_REF—contains list of required USOCs for a given USOC.

STATUS_REF—contains all valid statuses and their definitions.

ACTIVITY_TYPE_REF—contains types for message routing.

ERROR_CODE—contains valid error codes and text.

ERR_CLEANUP—contains list of tables to purge.

11. GUI TABLES

USER_PREF—contains user information.

USER_PASSWORD—contains encrypted user password information.

USER_CMNTY_XREF—contains user community/responsibility information.

USER_COMMUNITY—contains list of legal communities.

PRMSN_GROUP—contains permission group information.

PRMSN_ACCESS—identifies permissible function per user group.

USER_OFC_XREF—identifies office location of user.

OFFICE_LOCT—contains valid office locations.

WC_ALIAS—contains wire center alias per user.

USER_WC_ALIAS_XREF—contains wire center alias per user.

PRMSN_ID—defines screen Ids.

USER_PWD_CHG_LOG—contains last user password update data.

12. Configurable Parameters Table

CONFIG_PARM_VALUE—contains parameters controlling program logic.

13. Space NE Tables

SPACE_XREF—correlates SPACE transaction Id with INT_SEQ_NUM.

SPACE_RESPONSE—correlates status information for each SPACE transaction.

SPACE_QRY_RESP—contains detailed information returned from SPACE.

SPACE_MAP—contains detailed information relative to a SPACE template.

SPACE_CALLVAR—contains detailed information returned from SPACE.

SPACE_COLUMNS—contains detailed information returned from SPACE.

SPACE_EMS_TEL_DATA—contains detailed information returned from SPACE.

14. VAD NE Tables

VAD_XREF—correlates VAD transaction Id with INT_SEQ_NUM.

VAD_REQUEST—contains information on messages sent to VAD (e.g., status).

VAD_RESPONSE—contains status information for each VAD message.

VAD_TAG—contains detailed information from VAD query of customer data.

15. Logs (not by ISN)

JOB_LOG—contains results from "end-of-day processing".

EVENT_SMRY—contains entry controlling optional SCRUB_EDITS execution.

EVENT_LOG—contains detailed information of EVENT_SMRY entries.

Within the above-noted tables, various reference tables include effective and expiration dates (e.g. template and FID_REF) to indicate the time frame during which the referenced item can be used in the provisioning process. These columns are not used to denote the date on which a characteristic of an item changes (e.g., FID_REQUIRED_IND changes from 'N' to 'Y'). In the event that an attribute of an item does change but the name of the item remains the same, it is necessary to update that characteristic in the table without populating the expiration date. Note that in such a situation, all future queries will pick up the new attribute whether processing a past, present, or future request.

Subscription data (e.g. USOCs, FIDs, etc.) is retained on an ongoing basis based on WTN. However, since subscriber data (e.g., BTN, customer name, etc.) is stored for the life of a service order, it is not possible over time to differentiate between two customers who happen to have the same WTN.

B. Database Service Description

Applications access Database Services 200 through the suite of functions. The suite is provided for the purpose of maintaining consistency and transparency, and is extensible to access all features of the database without requiring the application developer to know or understand SQL or the physical database organization. An exemplary suite is included in Appendix B.

Further, the present invention contemplates many Database Services 200 which operate to implement the SMS 10. The Database Services 200 relate and implement the elements (e.g., tables, views, etc.) that comprise the SMS 10. The database services 200 are provided to update/delete/add fields within a table, read/write information from each of the tables, return information to a calling program from the database, insert/delete rows/columns from tables, write records to tables, write table views, retrieve a list of users and permissions, sort data within specified tables, retrieve orders and order-related information, retrieve manual intervention information for manually-provisioned services (i.e., COMPLEX), and retrieve error messages, etc. The before-listed functions are merely exemplary and are not intended to be all inclusive. As is evident to those of skill in the art, additional services may be added to provide functionalities as needed An exemplary list of the Database Services 200 is attached as Appendix C.

C. GOM Tables

As shown in FIG. 13, the Generic Order Management (GOM) system utilizes the following database tables to process SOAC 20, etc., service requests. RAW_REQUEST 202, PIECES (PCS 204), SAV 206, SAV2 208, and PROV_STEPS 210. It should be noted that the above tables are actually just schemas or groups of tables within a single database, and they are not necessarily distinct databases. For simplicity they are referred to herein as "databases".

The RAW_REQUEST database 202 consists of one table, the Raw Request table. Entries to the table are made by the TIP service 402 when the service order enters the SMS 10 system via a SOAC 20 application. Upon this event, a unique sequence number (INT_SEQ_NUM) is generated which is used to identify the service order as it migrates through the SMS 10.

The PIECES database (PCS) tables 204 are created by SOPP (REFORMAT 406) and come directly from the service order or are created directly by a GUI 42 service. Each table has the unique INT_SEQ_NUM which is generated when the SOAC 20 image is received and stored in the RAW_REQUEST table 202. Each table may have additional indexes based on C3 header fields such as "ORDNO+TRN+OT+TSYS+INT_SEQ_NUM". Some tables require that ACT and WTN be added to the index. Note that the response to SOAC 20 is based on information in the PIECES database which originates in the C3 header.

The SAV database 206 contains the activity which needs to be provisioned based on the incoming request at the NE. The Saved view (SAV 206) is created containing only the changes being provisioned as opposed to the entire New View which is stored in the PCS database 204.

Nearly all fields in the SAV2 database 208 come directly from the SAV database 206. However, the content of the SAV2 table represents a delta (i.e., difference) between what a customer account currently has and the services that the customer wants to add, such that the delta can be provisioned in the Network Element(s). The reason for a second view (i.e., SAV2) is that EDITS 412 will determine the exact Network Elements (NE) requiring provisioning, whereas, TRANSLATION 410 used a default NE when generating SAV. EDITS 412 populates default fields and Triggers to SAV2.

The PROV_STEP database contains pending updates. Each of the provisioning steps contains only the data needed for that particular step, and has a unique number called STEP_NO so that no step at a NE, nor WTN, nor the entire order will have the same step number.

D. Historical Order Log

The Historical Order Log (HOL) is comprised of the following set of tables: the HOL_CTL 126, the HOL_WTN table 220, the HOL_FLOW table 218, and the HOL_STEP table 222, shown in FIG. 13. The HOL_CTL table 216 is built when a service order is received and updated once the order has been parsed, thus allowing key fields such as ORDNO, TSYS, TRN, et al. to be filled in. The overall order status is contained in this table. The HOL_WTN table 220 contains the status for a particular WTN relative to the order keyed on the "INT_SEQ_NUM" and the "WTN". The HOL_FLOW table 218 contains status information relative to the location of the service request within GOM, for example, the transaction names which have processed the request and the status associated with each. The HOL_STEP table 222 is used to audit each step created by the BREAKOUT service 416. Each "ROUTER Message" built by the BREAKOUT service 416 is "logged" here to allow for recovery should a catastrophic failure in the "ROUTER queue" occur.

As noted above, each table contains a key called "INT_SEQ_NUM" which is generated when the SOAC 20 image is received and stored in the RAW_REQUEST table 202. This allows a user to track the processing of a specific request using the INT_SEQ_NUM. Also included are fields such as WTN, ORDNO, TRN, OT, TSYS, etc. which can be used to query the HOL tables. Status fields may be provided which include the following valid statuses: S(aved), P(ending), E(rror), C(omplete), I(nprogress), H(old), B(ackout), R(ecovery) and F(alse Step).

E. Database Support for SMS Validation of USOC Combinations

One of the features of the SMS application is the ability to determine which combinations of services are valid together based on the local service provider who developed the FIM that is being used to provide the customer's service. This capability is table-driven and is performed in accordance with data contained in the USOC_REF and USOC_COMBO_REF tables which are described below.

1. USOC_REF Table

This table contains with information on every USOC that is processed within the SMS 10 application. The columns related to USOC_COMBO_REF processing are:

USOC_ID_NUM—Defines a number which uniquely identifies a USOC_ID (used as the primary key). This number is used in accessing the USOC_COMBO_REF table. Exemplary valid values are integers in the range of 1 to 333. This higher value effectively establishes the maximum number of USOCs that are valid within SMS.

VALID_ALL_COMBO_IND—An indicator which identifies USOCs that are valid with ALL combinations of USOCs in the USOC_COMBO_REF table. Exemplary valid values are "N" (No) which indicates that this USOC is not valid with all combinations of USOCs, and "Y" (Yes), which indicates that this USOC is valid with all combinations in the USOC_COMBO_REF table. A listing of the valid combinations which include this USOC can be found in USOC_COMBO_REF.DESCRIPTION_TEXT. Note, because "Y" is valid with all combinations, this USOC does not need to be listed in USOC_COMBO_REF.DESCRIPTION_TEXT. An exemplary USOC_REF table structure is provided in Appendix A.

2. USOC_COMBO_REF Table

This table documents all valid combinations of USOC_IDs for each Local Service Provider, identified by LSP_ID, that has developed a feature interaction manager (FIM). An exemplary USOC_COMBO_REF tables is defined in Appendix A. The definition of columns are as follows.

CUSTOMER_TYPE_IND—An indicator which specifies the type of accounts for which this combination of USOCs is valid. Exemplary valid values are "A" (All accounts), "B" (Business accounts only), and "R" (Residence accounts only).

DESCRIPTION_TEXT—A list of USOC_IDs which are valid together on a FIM developed by the Local Service Provider identified by LSP_ID. USOC_IDs can be listed in any sequence but must be delimited and terminated by semicolons. Imbedded spaces are not allowed.

HANDOVER_CPR_VALUE—A value for the HANDOVER_CPR call variable which identifies the FIM that is used by this LSP to process this combination of services.

LAST_UPDT_TSTAMP—The date and time at which a column in this row was last updated.

LAST_UPDT_USER_ID—The user ID of the last person who updated any column in this row.

LSP_ID—The ID of the Local Service Provider (LSP) who developed the FIM identified by the call variable value in HANDOVER_CPR_VALUE.

USOC_COMBO_EFF_DATE—The date and time on which this combination of services will first be valid using the indicated handover CPR value. This is the first second in time when this combination of services can be provisioned using the indicated handover CPR value, i.e., one second earlier it was not valid.

USOC_COMBO_EXPR_DATE—The date and time at which this combination of services will last be valid using the indicated handover CPR value. This is the last second in time when this combination of services can be provisioned using the indicated handover CPR value, i.e., one second later it will not be valid.

USOC_COMBO_ID—A derived key value which uniquely identifies the combination of USOC IDs that are present in DESCRIPTION_TEXT. This key is determined by calling the PROV_UTIL.GET_USOC_COMBO_ID function and is always the same on a given instance for a given combination of USOC IDs regardless of the sequence in which those USOCs appear in DESCRIPTION_TEXT.

The primary key of USOC_COMBO_REF may be DESCRIPTION_TEXT and LSP_ID since each row is unique based on the combination of services being identified and the LSP. Note, having a VARCHAR2(2000) column in the primary key would been an inefficient means of providing access to this table and would be inefficient if foreign keys are needed in the future. In addition, USOCs within DESCRIPTION_TEXT will need to be sorted if the USOCs are used as part of the primary key and queries against the table would have to sort the USOC_IDs in their where clause in order to accurately match against the table.

3. Valid Combination Processing

The USOC_COMBO_ID concept was developed to address the inefficiencies and inconveniences which would have resulted from having DESCRIPTION_TEXT in the primary key. The value in USOC_COMBO_ID uniquely identifies the combination of USOCs which are listed in DESCRIPTION_TEXT yet has a maximum length of just 56 bytes.

The logic for deriving the USOC_COMBO_ID is encapsulated in a user-written Oracle stored function named PROV_UTIL.GET_USOC_COMBO_ID. This function is used by a "before insert or update" trigger on the USOC_COMBO_REF table to populate the USOC_COMBO_ID column whenever DESCRIPTION_TEXT is added or changed. In addition, the function should be used by queries which need to read from the table in order to avoid redundant logic and to ensure consistent interpretation of the data.

A string of USOC_IDs up to 2000 bytes in length is the only argument passed to PROV_UTIL.GET_USOC_COMBO_ID and the value returned by the function is a USOC Combo ID. Note that the USOC_COMBO_ID returned by the function may or may not exist in the USOC_COMBO_REF table since the table only contains VALID combinations.

a. Function PROV_UTIL.GET_USOC_COMBO_ID

PROV_UTIL.GET_USOC_COMBO_ID works as follows to determine a USOC Combo ID from a list of USOCs. PL/SQL coding techniques are used to minimize actual processing outlined in the following high-level overview.

An array of 336 switches is initialized to an "OFF" value. The number of switches corresponds to the maximum number of distinct USOC IDs raised to the next multiple of 6. The list of USOCs is parsed and each individual USOC is identified. For each USOC_ID found, the USOC_REF table is queried to obtain the USOC_ID_NUM and VALID_ALL_COMBO_IND. If VALID_ALL_COMBO_IND='Y', no further action is required for this USOC since it is valid with all possible combinations of USOCs. If VALID_ALL_COMBO_IND='N', the value in USOC_ID_NUM is used as a pointer into the array of switches noted above, and the corresponding switch is set to an "ON" value.

Once all USOC IDs in the list have been processed, the switches are taken in groups of 6 (1-6, 7-12, 13-18, etc.) as the binary representation of a "Base64" number. The 336 switches form 56 groups with each group mapping to the corresponding position in the 56-byte USOC Combo ID. Trailing spaces are trimmed from the derived USOC Combo ID to minimize the length of the key but imbedded spaces must be retained. The Base64 conversion table (Table 1) is as follows:

TABLE 1

| Binary | Decimal number | Base64 number |
|---|---|---|
| 000 | 000 | 0 (space) |
| 000 | 001-001 001 | 1-9 1-9 (numbers) |
| 001 | 010-100 011 | 10-35 A-Z (upper case letters) |
| 100 | 100 36 | [ (left square bracket) |
| 100 | 101 37 | ] (right square bracket) |
| 100 | 110-111 111 | 38-63 a-z (lower case letters) |

The Base64 "number" must be a printable character in order to allow for storage of the USOC Combo ID in an Oracle VARCHAR2 column. Note, Base128 could not be used because the number of distinct printable characters which can be stored in a VARCHAR2 column is less than 128.

If an error is encountered at any point because of invalid data within the list of USOCs, an ORA-06502 exception ("numeric or value error") is raised.

III. COM

The communication (COM) Services 300 shown in FIG. 4, provide communications capabilities between the various OSS systems, NEs and GUI users who interface with the SMS 10. The COM interfaces are described below with reference to several GOM Services 400, which will be described hereinafter in greater detail with reference to the COM Services 400.

A. SOAC Client Interface

Figure 6:
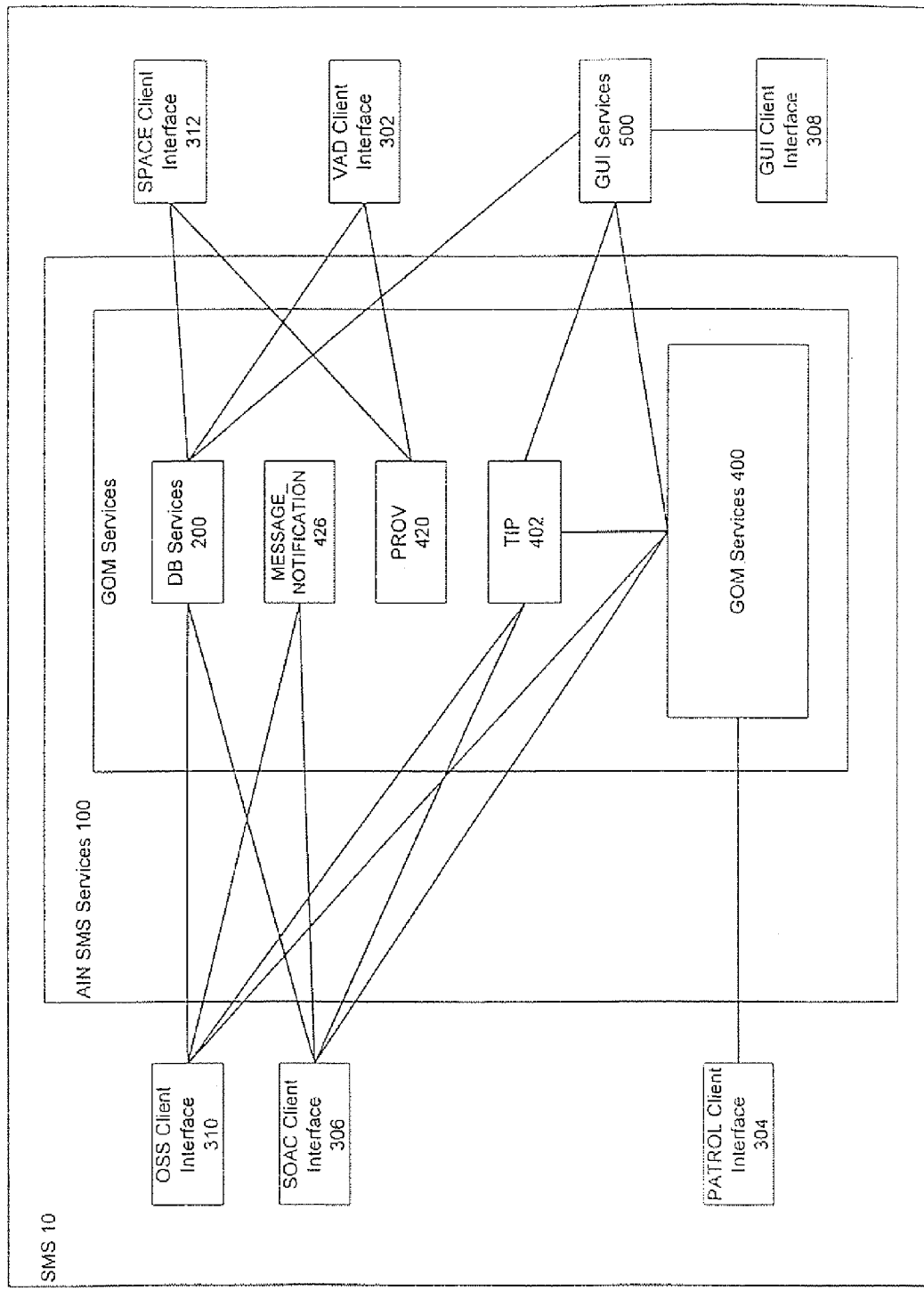
FIG. 6 illustrates, in a general block diagram form, the connections between the Service Management System and the elements external to the system.
Figure 9:
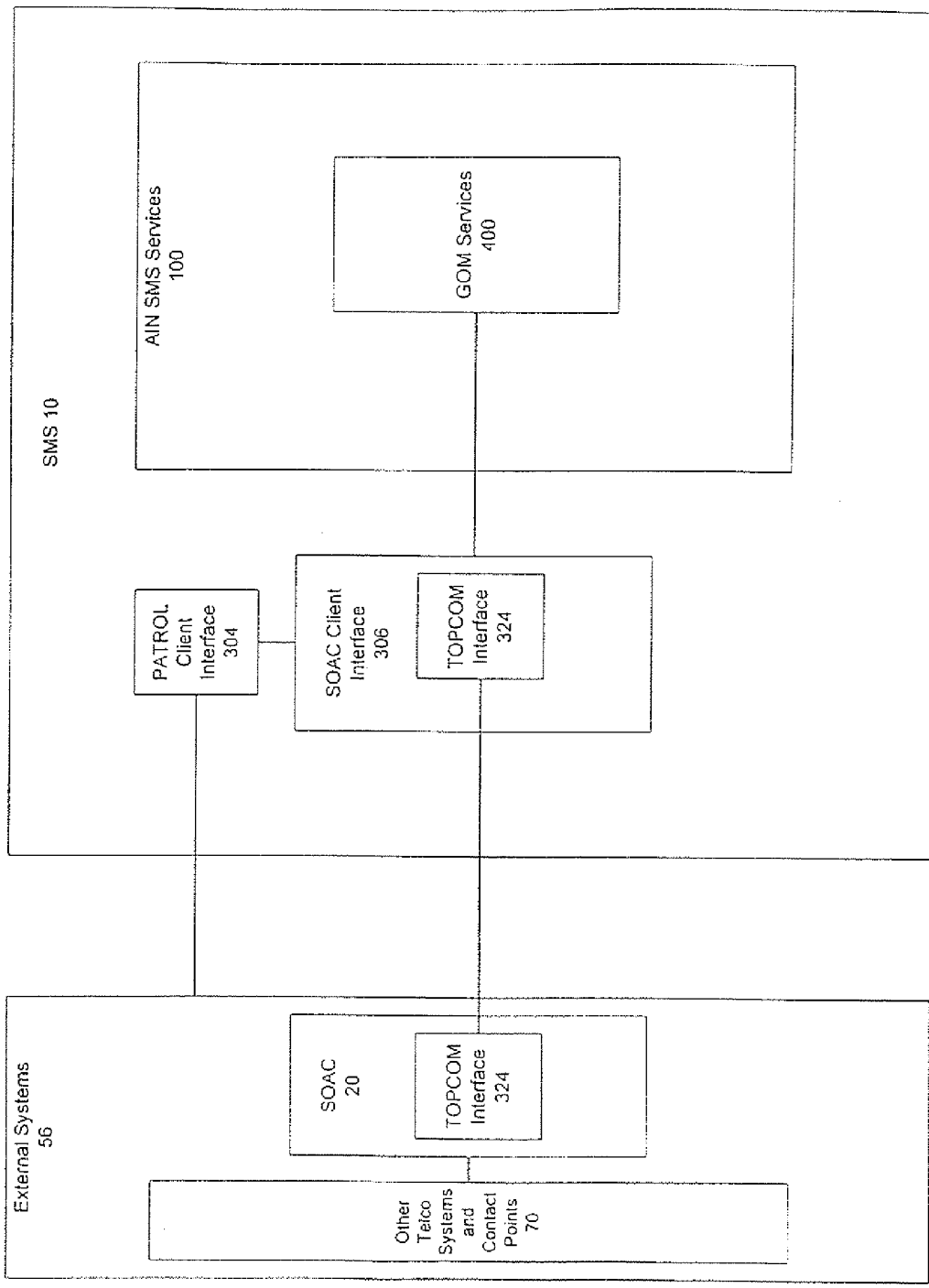
FIG. 9 illustrates, in a general block diagram form, a connection between the Service Management System and SOAC.

Referring to FIGS. 4, 6 and 9, the SOAC Client Interface 306 is responsible for establishing and maintaining the integrity of the SMS 10-SOAC 20 connection and managing the flow of messages between SMS 10 and SOAC 20. There is an instance of the SOAC Client Interface 306 for each SOAC 20 controller.

Service orders for AIN and VAD 32 services are passed from EASE 16 and SORD 18 to SOAC 20 (shown in FIG. 2). SOAC 20 will recognize AIN/VAD 32 service orders and route them to SMS 10 for provisioning. SOAC 20 sends, and the SMS 10 will support, both flow-through, and manual service requests. All Service Order types (e.g., New (N), Disconnect (D), Change (C), Record (R), From (F), and To (T)) are supported. In addition, the SMS 10 is configurable to support any new service order types should new types be added to SOAC 20. A New connect is an order to establish a new customer account and request new services. A Disconnect is an order to remove an existing customer account and discontinue services. A Change is an order to change services for an existing customer account. A From order reflects old services for a customer who is relocating within a service area. This order is issued with a corresponding To order designating where the customer is relocating. Both the From and To orders have the same order number (ORDNO). The Record order is to update an existing customer account.

The SMS 10 generic order management subsystem supports all SOAC 20 message function types (e.g., Pre-completion (PRE), Correction (COR), Cancellation (CAN), Post Completion Notice (PCN), and Correction Post Completion (CPC)), and it will support Multiple-Lines (Working Telephone Numbers), Template Changes, Trigger Changes within a CPR, Hard COR/CPC passes.

The PRE function defines an activation request that is the first activation request to the SMS 10 for an order, or is immediately preceded by an activation request with a function type of CAN, i.e., the customer is requesting one or more AIN services subsequent to cancellation of all the AIN services the customer previously requested.

The COR function defines an activation request that is a correction to the preceding activation request that has the function type of PRE or COR.

The CAN function is an activation request that is a cancellation of the preceding activation request, i.e., the customer is canceling all the AIN service that had been requested in the preceding activation request. The immediately preceding activation request will have a function type of PRE or COR. Any immediately following function type is PRE.

The PCN activation request is a post completion activation request to the preceding activation request to notify the SMS 10 that the order status is being changed from a pending state to a completed state in the SOAC 20 et al. system. The preceding activation request is either PRE or COR.

The CPC function is a post completion notice with corrections to the preceding activation request. The associate activation request is an indication to the SMS 10 that the order has been completed with some modification to the preceding activation request. The nature of the modification to the preceding activation request will vary in accordance with the usage of CPC order passes. The preceding function type is either a PRE or COR.

If multiple orders are detected involving the same working telephone number (WTN), the overlapping provisioning activity is flagged as an error for manual resolution. In addition, for AIN services, SOAC 20 will manage the timing and provisioning of most AIN triggers with MARCH 22. For example, there may be three physical SOAC 20 controllers communicating with the SMS 10.

The communication between SOAC 20 and SMS 10 shown in FIG. 9 is TCP/IP using Transaction Oriented Protocol (TOP). The SOAC Client Interface 306 will encode/decode messages from/to TOP via the Bellcore TOPCOM product. There is single TOPCOM configuration file on SMS 10 which contains the information for each of the SOAC 20s used by TOPCOM 324 to establish a session with each SOAC 20 controller. The TOPCOM configuration file may include, for example, a SOAC 20 Identifier or name used by the SOAC Client Interface 306's application interface to specify the SOAC controller 20A and a remote SOAC controller which is the Domain Name Server (DNS) resolvable name or IP address of the SOAC controller 20A, and alternatively, the IP addresses of each SOAC controller 20A. Also included in the TOPCOM configuration file may be the remote SOAC 20 controller's IP port numbers of the SOAC 20 controller's TOPCOM software (e.g., port 102), the remote SOAC 20 controller service, the remote "T_SELECTOR" for each SOAC 20 (e.g., service identifier), and the CISE for test SOAC 20 T_SELECTOR (e.g., SMSe103 for the local SMS T_SELECTOR (VAD 32 access)).

Other parameters defining the SOAC 20 interaction with TOPCOM 324 may be specified. For example, the following parameters may be configured: a TOP Window Size parameter (which is a protocol level parameter that should be set to one to force synchronous message communication between SMS 10 TOPCOM 324 and the remote SOAC 20), Handler Timing Parameters (e.g., SndDelay, RcvDelay, and DackDelay (where SndDelay greater than RcvDelay+DackDelay)) which establish the amount of time a partner has to acknowledge a message, TOPCOM Transaction Volumes to set the maximum transaction volume forecasted for TOPCOM.

In general, during startup the SOAC Client Interface 306 will not be under TUXEDO /Q and /T control. Thus, a SOAC Client Interface 306 Manager will need to be started from within the master SMS 10 startup script where TUXEDO is started. Preferably, the transaction monitoring application will start up before the SOAC Client Interface 306 Manager is started. The SOAC Client Interface 306 Manager will initialize TOPCOM 324 with the "config" and "sap" information from the Database Services 200 I/O routine(s).

The "config" information specifies the number and type of handlers (e.g., TCP/IP or x.25) for TOP encoding/decoding and listeners/senders (e.g., lower level TCP/IP port communication). The "sap" information specifies the TOPCOM 324 application interface that is available to the SOAC Client Interface 306. The SOAC Client Interface 306 Manager will then start each SOAC Client Interface 306.

At shutdown of the SOAC Client Interface 306 Manager, the SOAC Client Interface 306 will not be under TUXEDO control. Thus, a SOAC Client Interface 306 Manager will need to be started from within the master SMS 10 shutdown script where TUXEDO is shutdown. The SOAC Client Interface 306 Manager is run before TUXEDO/the Database Services 200 application is shutdown. SOAC Client Interface 306 Manager will gracefully shutdown each instance of SOAC Client Interface 306. SOAC Client Interface 306 is allowed to complete any outstanding communication acknowledgments (e.g., "T_ACKS") with SOAC 20 and/or TUXEDO transactions (e.g., with TIP 402 or MESSAGE_NOTIFICATION 426 queues, shown in FIG. 13 and to be discussed in greater detail below with regard to GOM services 400) before issuing a disconnect with SOAC 20.

1. SOAC Client Interface—Processing Overview

As noted above, in the preferred embodiment, and as shown in FIG. 9, there is an instance of the SOAC Client Interface 306 process for each physical SOAC 20 controller. The SOAC Client Interface 306 is a C application that obtains its configuration via the Database Services 200 I/O routine(s) or local files and handles both incoming and outgoing FCIF traffic via API calls to TOPCOM 324 and TUXEDO.

The SOAC Client Interface 306 will use the TIL (TOP Interface Library) TOPCOM API. The TIL is connection-oriented API. All functions provided by TIL are non-blocking.

The functions provided by the SOAC Client Interface 306 will now be described.

The SOAC Client Interface 306 provides for establishing a connection with SOAC 20 controllers via "T_CONNECT" TIL API call. The SOAC Client Interface 306 receives SOAC 20 stream FCIF service order/completion notice messages and sends messages to the TIP queue (see SOAC Client Interface 306—Processing Incoming Messages, described below). The SOAC Client Interface 306 also receives stream FCIF response message (e.g., POSACK) from MESSAGE_NOTIFICATION queue and sends messages to SOAC 20. (see SOAC Client Interface—Processing Outgoing Messages, described below).

The SOAC Client Interface 306 detects SOAC 20 alarm conditions and informs the appropriate staff through the MESSAGE_NOTIFICATION queues or PATROL 52 via the PATROL Client Interface 304. For example, the SOAC Client Interface 306 may log expected and unexpected SOAC 20 up/down events to the MESSAGE_NOTIFICATION queues. The MESSAGE_NOTIFICATION queues are described hereinafter with regard to the GOM software component. This logging function may be preferable as SOAC 20 may not be available 24 hours-a-day, 7 days-a-week. As is described, the data needed by MESSAGE_NOTIFICATION 426 includes type and message string text, and all other fields send to MESSAGE_NOTIFICATION 426 will need to be zero-filled in FML String. The FML String is a text based message format used to communication between the various TUXEDO services. The messages may include type "E" which is an SMS 10 alarm in GUI 42/Pager processing indicating that the SOAC 20 aborted during published availability +/− range; type "I" which is informational and includes expected SOAC 20 connects and disconnects during SOAC 20 published downtime +/− range. Alarm text should preferably include the SOAC Client Interface key which identifies the specific SOAC Client Interface 306, and should report problems with TUXEDO (e.g., TUXEDO /Q and /T), the Database Services 200, and unexpected SOAC 20 downtime.

The SOAC Client Interface 306 provides for configurable timing of updates to the NE_INTRFC table, maintains a status flag of SOAC 20 connection in the NE_INTRFC table, NE_STATUS column (for use by GUI/RCMAC 42) and OA&M console. The status flag should indicate a connected or disconnected state. Also, a time stamp may be passed and displayed to identify a "hung" interface process to the RCMAC/GUI 42/OA&M staff.

The SOAC Client Interface 306 also may provide a configurable ratio for priority processing of incoming (receiving SOAC 20 service order) and outgoing (receiving SOAC 20 response) messages when both incoming/outgoing processing queues are full (e.g., 3:1 inbound vs outbound since inbound takes longer to process). If either incoming/outgoing queues are empty, FIFO processing may take priority.

The SOAC Client Interface 306 may provide for configurable connection timing. This is the period of time the SOAC Client Interface 306 should wait between attempts to connect to the remote SOAC 20 (e.g., every 5 minutes) when SOAC 20 disconnects or aborts.

The SOAC Client Interface 306 may also perform graceful handling of SOAC 20 downtime since SOAC 20 may not always be available. For example, SOAC 20 may not be available on weekends, week nights, and holidays. The SOAC Client Interface 306 will periodically poll (via connection timing) for the SOAC 20 to become active. If the SOAC 20 becomes active outside of a regularly scheduled availability time, the SOAC Client Interface 306 should resume incoming/outgoing message processing with SOAC 20. Since all communication with TUXEDO/SMS 10 application is through safe stored transactions (see SOAC Client Interface 306—Processing Incoming Messages and SOAC Client Interface 306—Processing Outgoing Messages below), the integrity of SOAC 20-SMS 10 messages should be preserved—even if SOAC 20 issues a "T_ABORT" instead of a "T_DISCONNECTS" TIL API call.

The SOAC Client Interface 306 provides for dynamic configuration for SOAC Client Interface 306 variables that can change without a restart. This may be performed via either global variable change or a UNIX signal to indicate re-initialization from configuration files. The dynamic variables include, but are not limited to, manual connect/disconnect from SOAC 20, connection timing, and ratio of incoming/outgoing processing priority.

2. SOAC Client Interface—Processing Incoming Messages

When the SOAC Client Interface 306 of FIG. 9 receives a message from SOAC 20, it can be either a service order/completion notice message or an acknowledgment (e.g., "T_ACK") from a previously sent response message (e.g., a POSACK). Message transfer between SOAC 20 and the SOAC Client Interface 306 requires a unique Message Id to associate the return acknowledgment message. SOAC 20 supplies a MESSAGE_ID for service order/completion notice messages incoming to the SOAC Client Interface 306. The SOAC Client Interface 306 is responsible for generating a MESSAGE_ID for response messages.

For incoming service order/completion notice messages, the SOAC Client Interface 306 receives the message from SOAC 20 and send the message to the TIP queue. Service order/completion notice data is in a stream FCIF format (i.e., no CRs or LFs). The SOAC Client Interface 306 does not parse, interpret, or edit check the contents of the FCIF messages. The SOAC Client Interface 306 assumes GOM will recognize FCIF errors (e.g., FCIF content errors or duplicate FCIF messages) and will send them to MESSAGE_NOTIFICATION 426 for distribution to RCMAC/GUI 42 for investigation or will generate an immediate NEGACK back to an appropriate MESSAGE_NOTIFICATION queue for that particular SOAC Client Interface 306/SOAC 20. By configuring TOPCOM 324 with TOP Window Size=1, a synchronous message communication is created with the remote SOAC 20 (i.e., the remote SOAC 20 will wait on an acknowledgment ("T_ACK") before sending another service order message).

The SOAC Client Interface 306 receives a SOAC 20 service order/completion notice message (via "T_GETDATA" TIL API) and send the message to a generic TIP queue (via "TPCALL") in FML String format. Along with the service order message, a FML header will also be populated with a key to the individual instance of the SOAC Client Interface 306 (e.g., a unique name such as "SOACDALB"), so that outgoing response messages can be placed in the appropriate MESSAGE_NOTIFICATION queue for return to SOAC 20. The FML header also contains additional processing information (e.g., "SOAC" for ORIG_TYPE, "N" for REQ_TYPE, and the IP address of the remote SOAC 20).

Referring to FIG. 13, TIP 402 will safe store, via a Database Services 200 I/O routine (i.e., Database Services 200), the service order/completion notice. The Database Services 200 I/O routine will place the service order/completion notice message in the RAW table 202 and store the key to the sending SOAC Client Interface 306 instance in the column ORIGINATING_SYSTEM. TIP 402 will then respond to the SOAC Client Interface 306 (via a successful return from the "TPCALL"). The SOAC Client Interface 306 acknowledges ("T_ACK" TIL API) to SOAC 20 the receipt of the service order/completion notice message. The RAW_IMAGE table is described hereinafter in the description of the Database. This process will be discussed in greater detail hereinbelow.

The entire process of receiving a SOAC 20 service order/completion notice message and sending it to TIP 402 is performed in the scope of a TUXEDO transaction, so that if a problem occurs with either SOAC 20 or the SOAC Client Interface 306, the TIP 402 transaction can be rolled back. If the SOAC Client Interface 306 dies, then TUXEDO transaction will not be committed. Also, if the SOAC Client Interface 306 dies or the SOAC-SOAC Client Interface 306 communication link is lost, SOAC 20 will not receive the acknowledgment ("T_ACK") and will re-send the service order/completion notice message (if "T_ACK" not received by SOAC 20 within 30 seconds, SOAC 20 will re-queue/re-send message).

For incoming acknowledgments (e.g., "T_ACK'S") from a previously sent response message (i.e., POSACK), the SOAC Client Interface 306 may send another response message to SOAC 20 as is discussed in SOAC Client Interface—Processing Outgoing Messages, below.

3. SOAC Client Interface—Processing Outgoing Messages

Referring again to FIG. 9, when the SOAC Client Interface 306 sends a message to SOAC 20, it can be either a response message (e.g., POSACK, NEGACK, or CAR) or an acknowledgment ("T_ACK") from a previously sent service order/completion notice from SOAC 20, as noted above. Message transfer between SOAC 20 and the SOAC Client Interface 306 requires a unique Message Id to associate the return acknowledgment message. SOAC 20 will supply a MESSAGE_ID for service order/completion notice messages incoming to the SOAC Client Interface 306. The SOAC Client Interface 306 is responsible for generating a MESSAGE_ID for response messages.

For outgoing response messages, the SOAC Client Interface 306 sends messages from a MESSAGE_NOTIFICATION queue to SOAC 20. Response message data is in a FCIF stream format (i.e., no carriage returns (CRs) or line feeds (LFs)). The SOAC Client Interface 306 does not parse, interpret, or edit check the contents of the FCIF messages.

The SOAC Client Interface 306 will receive a SOAC 20 response message (via "TPDEQUEUE" with a non-blocking option) in FML String format from a MESSAGE_NOTIFICATION queue that is unique to that instance of the SOAC Client Interface 306, and send the message to SOAC 20 (via the "T_SEND" TIL API). The SOAC Client Interface 306 will then wait for an acknowledgment from SOAC 20 ("T_ACK") before committing to the MESSAGE_NOTIFICATION queue.

The entire process of receiving a SOAC 20 response message and sending it to SOAC 20 is done in the scope of a TUXEDO transaction, so that if problems occur with either SOAC 20 or the SOAC Client Interface 306, the MESSAGE_NOTIFICATION queue transaction can be rolled back. MESSAGE_NOTIFICATION queue will safe store the response message. If the SOAC Client Interface 306 or SOAC 20 dies, then TUXEDO transaction will not be committed and the response message is rolled back onto the MESSAGE_NOTIFICATION queue. If the SOAC Client Interface 306 dies after sending the response message to SOAC 20, but before committing TUXEDO transaction, then a duplicate response message is sent to SOAC 20 when SOAC Client Interface 306 resumes.

For outgoing acknowledgments ("T_ACK'S") from a previously received service order/completion notice from SOAC 20, the SOAC Client Interface 306 may receive another service order/completion notice from SOAC 20 (see SOAC Client Interface—Processing Incoming Messages above).

4. SOAC Client Interface Configuration

Each instance of the SOAC-SMS interface shown in FIG. 9 will require the following information from its environment: a SOAC 20 Identifier which is the TOPCOM SOAC 20 identifier (name) for the remote SOAC 20 service to act as this interface (see TOPCOM 324 Configuration); a TIP queue TUXEDO service, which is TUXEDO service identifier for the TIP queue on which incoming service order messages are placed which are received by this Client Interface; a MESSAGE_NOTIFICATION queue TUXEDO service, which is TUXEDO service identifier for the response queue (e.g., POSACK) from which we are to read outgoing messages for this Client Interface; a SOAC Client Interface key used for the FML header string and error text, a unique name (e.g., "SOAC DALB") to map to a specific instance of the SOAC Client Interface 306 to a particular outgoing MESSAGE_NOTIFICATION queue; and an Incoming/Outgoing Message Processing Priority to define the relative priority of incoming (e.g., service order) and outgoing response (e.g., POSACK) message processing. This will take the form of an integer ratio of incoming/outgoing messages processed per cycle.

The SOAC-SMS interface also requires the following information from its environment: a SOAC Expected Uptime and Range used for alarm classification, a NE Status table Timing which is the period of time the Client Interface should wait between status updates to the NETWORK_ELEMENT table, a connection Timing which is the period of time the Client Interface should wait between attempts to connect to the remote SOAC 20 (e.g., every 5 minutes) when SOAC 20 disconnects or aborts, and a Debugging/Logging level to define the level of debugging and logging information which should be generated.

5. SOAC Operational Coordination

To establish SOAC-SMS connectivity for the production SOACs 20, the following coordination is necessary. A SOAC PID (Position Identifier) for the specific SOAC 20 outgoing queue that is read by the SOAC Client Interface 306/TOPCOM 324 must be established. SOACs 20 use of the Domain Name Server (DNS) to find the IP address of the SMS 10 (when SOAC 20 is validating SMS 10 connection attempts) must be established. This avoids SOAC 20 system generations (i.e., sysgens or recompiles) when the SMS IP address changes.

6. Multiple SOAC Systems

In a preferred embodiment, there is three physical SOAC controllers 20A communicating with the SMS 10. These three SOAC controllers 20A are responsible for sending service orders from multiple entities within the market areas.

7. SOAC Communication Considerations

Actions to both TOPCOM 324 (then to SOAC 20) and TUXEDO (TIP 402/MESSAGE_NOTIFICATION 426) are full-duplex and synchronous. Full-duplex connections are required since for each order retrieved from SOAC 20, a POSACK will eventually flow back through from MESSAGE_NOTIFICATION 426. Synchronous processing is desirable to eliminate the need for store and forward logic inside the interface.

SOAC 20 processes send one order, and then wait for an acknowledgment that the order has been processed. Subsequent orders are queued within SOAC 20 until the acknowledgment is received. The SOAC Client Interface 306 will not acknowledge SOAC 20 until the order has been successfully "safe-stored" in TIP 402.

A POSACK coming back from MESSAGE_NOTIFICATION 426 is queued within TUXEDO. The SOAC Client Interface 306 will dequeue one message, and pass it to SOAC 20. The SOAC Client Interface 306 does not attempt to dequeue another message until it receives an acknowledgment from SOAC 20. Once this acknowledgment is received, the transaction (dequeue) is committed within TUXEDO.

It is possible that a new order might be received from SOAC 20 while waiting for the TOPCOM 324 ACK for a recently sent POSACK. If this happens, the order is placed in a temporary buffer, and a flag set indicating that such a message exists. The flag is checked during each call to the SOAC 20 read function. If the flag is set, the read function will retrieve the buffered message, rather than attempting to read from SOAC 20. There can never be more than one such message buffered, since SOAC 20 will not send another message until it receives an ACK from the interface.

B. SPACE Interface

Figure 14:
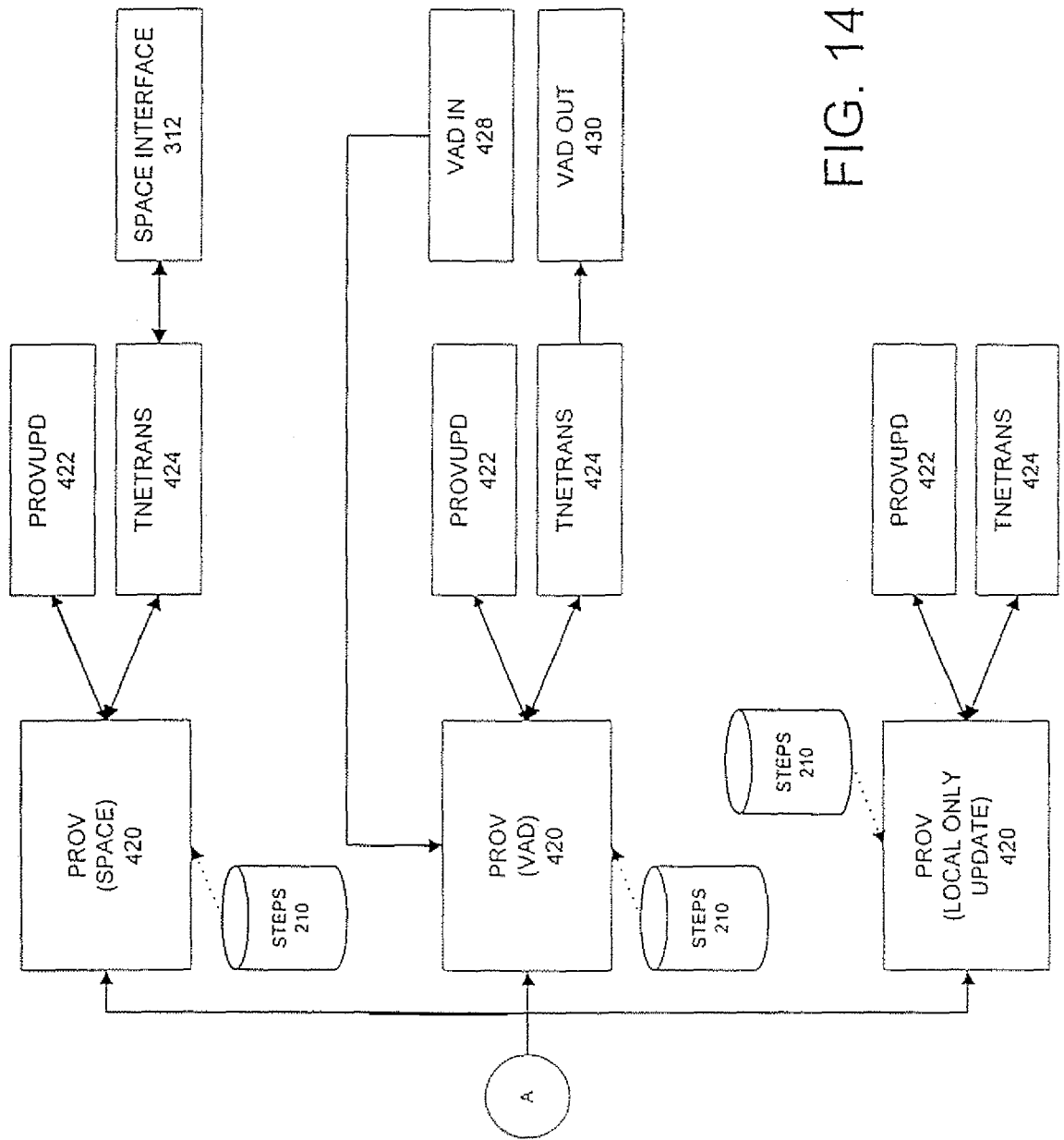

Referring to FIGS. 4, 6 and 10, the SPACE interface 312 receives messages from the GOM Services 400 (e.g., PROV 420, shown in FIG. 14). The messages will contain either a query request, or one or more keys to a database to retrieve activation request information. If the message is for an activation request, the SPACE interface 312 will then, using the key(s) provided, retrieve the data from the database (using an I/O routine). If the message is for a query, all the necessary data (except SPACE 24 transaction id) is provided in the message. When the SPACE Client interface 312 has obtained all the required data, it will then encode it in the ASN.1 format and send it to SPACE 24. When a response is received from SPACE 24, the interface (ASN.1 Interface 326) will decode it from ASN.1 and store the results (e.g., good or errors) in the QUERY_RESP table. When the data has been successfully stored, a response is sent to the PROV service 420 that sent the message. PROV 420 waits for this response.

There are two or more copies of PROV 420 running for each SPACE 24 in order to limit the number of requests SPACE 24 has at any given time. SPACE 24 can only process one request at a time; any others sent are queued and are processed according to a predetermined priority. The queue is not safe-stored on SPACE 24, thus if there is a problem on SPACE 24, the requests are lost. Therefore, the requests are (safe-stored) queued on the SMS 10 instead.

PROV 420 (FIG. 14) will wait a configurable amount of time for a response from the SPACE Client Interface 312. If a response is not received and the request is an activation request, PROV 420 will resend the original message to the SPACE Client Interface 312, which will then try again to send it to SPACE 24. This looping will repeat a configurable number of times. If a response is not received, and the request is a query, PROV 420 will record the error and continue with the next request.

As shown in FIG. 10, the SPACE Client Interface 312 is also responsible for establishing the connection to SPACE 24. At configurable intervals, the SPACE Client Interface 312 will send 'Keep Alive' messages to SPACE 24, and track if a response is received from SPACE 24. If a response is not received in a configurable amount of time, the SPACE Client Interface 312 will try again for a configurable number of times If the "no response" condition remains, the SPACE Client Interface 312 will update the NE_INTRFC table with a status indicating SPACE 24 is down, and SPACE Client Interface 312 will end.

Incoming data to the SPACE Client Interface 312 comes from PROV 420 (FIG. 14), which will send one of two types of messages, one for activation requests, and another for queries, as noted above. Activation requests will contain key information used by the SPACE Client Interface 312 to read the STEPS tables 210. All information needed to process a query request will, however, be passed in the message, except for a SPACE 24 transaction id.

The activation request message will contain a key represented by INT_SEQ_NUM, WTN, and STEP_NO. The DATAGATE CommHandle will also be passed from PROV 420 to the SPACE Client Interface 312 so that SPACE 24 can return a message to the requester. If the SPACE Client Interface 312 is to message block more than one activation request for example, a Remove and a Build request to be sent to SPACE 24 within the same message block, then the activation request message will contain multiple keys; i.e. a sequence of keys represented by INT_SEQ_NUM, WTN and STEP_NO.

The query CPR or template request message will contain: INT_SEQ_NUM, WTN, template id, view, and priority. The DATAGATE CommHandle will also be passed from PROV 420 to SPACE Client Interface 312 so that SPACE 24 can return a message to the requester. The query message is identical for CPR and template queries except that for a CPR query, the WTN is populated and the template id is not; for a template query, the template id is populated and the WTN is not.

As shown in FIG. 4, there is one SPACE Client Interface 312 service for each physical SPACE NE 24A. The SPACE Client Interface 312 is not a TUXEDO interface or service. The SPACE Client Interface 312 must be started up and shut down separately. When the SPACE Client Interface 312 is started up, the service is passed a command line option that indicates the file from which to retrieve configurable information. There may be one file for each SPACE Client Interface 312 occurrence. The SPACE Client Interface 312 will retrieve this configurable information, and will to connect to SPACE 24. Once a connection is made, the NE_INTRFC table (i.e., the row for this SPACE 24) must be updated with a status that denotes SPACE 24 is up. The SPACE Client Interface 312 must update this status and associated date/time every configurable minutes (e.g., start every 5 minutes). Users who view the status are informed with a current status.

A stop/restart command must occur for new configurable values to take effect. Additionally, 'Keep Alive' messages are sent at configurable intervals, and the SPACE Client Interface 312 will track whether SPACE 24 responds to the 'Keep Alive' or not. If an acknowledgment or processing response to an activation request or query message is received from SPACE 24 within the 'Keep Alive' interval, this will count as a message, and the 'Keep Alive' interval is reset. However, even if an activation request or query is sent to SPACE 24 within the Keep Alive interval, the Keep Alive is sent anyway. If a response to a 'Keep Alive' is not received, it is resent after a configurable interval. After a maximum number of attempts has occurred without response, it is assumed the connection to SPACE 24 has been lost, or that SPACE 24 is down. The NE_INTRFC table (i.e., the row for this SPACE 24) must be updated with a status that denotes SPACE 24 is down. The date/time of the status must be set with the current date/time. The SPACE Client Interface 312 will then end. A call to TellPATROL via the PATROL Client Interface 304 is issued when Keep Alive responses are not received.

Once the SPACE Client Interface 312 is active, it receives messages from PROV 420, as shown in FIG. 6. Each time a message is received, the SPACE Client Interface 312 will check the SPACE_XREF table. If a record already exists for this INT_SEQ_NUM, WTN, STEP_NO, then it will pick up the transaction id and "reuse" it. If no record exists, the SPACE Client Interface 312 will insert a record to the SPACE_XREF table to obtain a unique SPACE 24 transaction id. The Database Services 200 will generate the unique number which is used as the key to the SPACE_XREF database. However, if PROV 420 sets the ignorePrvTrx flag to 1, then the SPACE Client Interface 312 will not check SPACE_XREF first, but rather will just insert a record and get a new transaction id.

Then the SPACE Client Interface 312 will check if the message is a query or activation request. If it is a query, no additional data is needed to be retrieved from the database, it will map it to the appropriate ASN.1 structures required by SPACE 24. However, if it is an activation request, the SPACE Client Interface 312 will need to retrieve additional data, using the key(s) provided on the input message. After the SPACE Client Interface 312 retrieves the activation request data, it will map it to the appropriate ASN.1 structures required by SPACE 24.

1. Configurable Information

The SPACE Client Interface 312 will need to stop and restart to retrieve and use any revised values from the SPACE Configuration file. The SPACE 24 configuration file includes DATAGATE service information, which consists of service name, service id, application data, and version. The file also includes, Communications stack (values: ISODE or TCP), SAC object id, SPACE object id, user (SAC site id) (tsys), "password" for SPACE 24 (host id of SAC), USER_ID (UNIX id on SPACE server with SPACE permissions), SPACE host name (rsys), SAC's ISODE address information (NSAP, SacTcpAddress, SacTcpPort, SacTSEL, SacSSEL, SacPSEL), SPACE's ISODE address information (SPACETcpAddress, SPACETcpPort, SPACETSEL, SPACESSEL, SPACEPSEL), acknowledgment timeout, pending response timeout, and process response timeout value. The SPACE configuration file does not include TUXEDO information. The amount of time that PROV 420 (FIG. 14) waits must be longer than (the amount of time that SPACE Client Interface 312 waits for a processing response) multiplied by (the number of times it will resend to SPACE 24). Further, the file may contain information indicating the Database Services 200 timeout value, number of times to attempt to resend to SPACE 24 per message (values; 0-9), 'Keep Alive' interval, 'Keep Alive' maximum timeouts, 'Keep Alive' maximum retries, bind (connect) retry interval, bind (connect) timeout, SPACE 24 version number, interval to update NE status, source of the SpiAdMsg (example, swb-SMS 102), Destination of the SpiAdmsg (example, sw98sp01), and Id of MsgId of SpiAdMsg (example, ainfs1).

Additional SPACE 24 Configuration data includes length of time to retain SPACE 24 tables data (e.g., query results may be stored 7 days, activation requests results 60 days). There are additional configurable items that are set on the SPACE 24 system, not on the SMS 10; for example, the length of time to retain the SPACE Client Interface 312 log. Since these are not set on the SMS 10, they are not listed here.

2. Dependencies/Coordination

A Feature Interaction Manager (not shown) and service logic must be manually provisioned on each SPACE 24 server prior to initiating the SPACE Client Interface 312. The FIM is the general service logic that handles feature interaction conflicts between different services for different trigger types.

3. Multiple SPACE Systems

In a preferred embodiment, the SMS 10 may support up to ten (10) SPACE Client Interfaces 312. In addition, the SMS 10 may support multiple concurrent versions of these SPACE Client Interfaces 312, as individual production SPACE 24s are typically upgraded sequentially. To fulfill this, one SPACE Client Interface 312 service is running on SMS 10 for each SPACE NE 24A server. Whenever a new version of SPACE 24 is installed, The SPACE Client Interface 312 is stopped and restarted after coding changes, file changes, etc. are completed.

C. VAD Client Interface

Referring to FIGS. 4, 6, 12 and 14, the VAD Client Interface 302 is provided that retrieves FCIF formatted responses from an inbound queue (e.g., from VAD IN 428). It will parse the response based upon its type (ACK/PROV response/Query response) and populate the appropriate database tables. It will then construct an "Asynchronous Response" message, which it enqueues to the PROV 420 VAD queue.

VAD 32 processes send one response, and wait for an acknowledgment (T_ACK) that the response has been processed. Subsequent responses are queued within VAD 32 until the T_ACK is received. The VAD Client Interface 302 (VAD 32) will not T_ACK VAD until the order has been successfully "safe-stored" in the VAD inbound queue.

PROV 420 (FIG. 14) supports "asynchronous response" messages. Order messages are processed similarly as SPACE 24 orders, but unlike SPACE 24, PROV 420 will not assume that VAD 32 processing is complete upon successful return from the call to the VAD outbound service (e.g., VAD OUT 43). Instead, completion processing (TAR and MESSAGE_NOTIFICATION 426) will take place upon receipt of an asynchronous response messages on the PROV VAD queue.

D. OSS Interface

Figure 8:
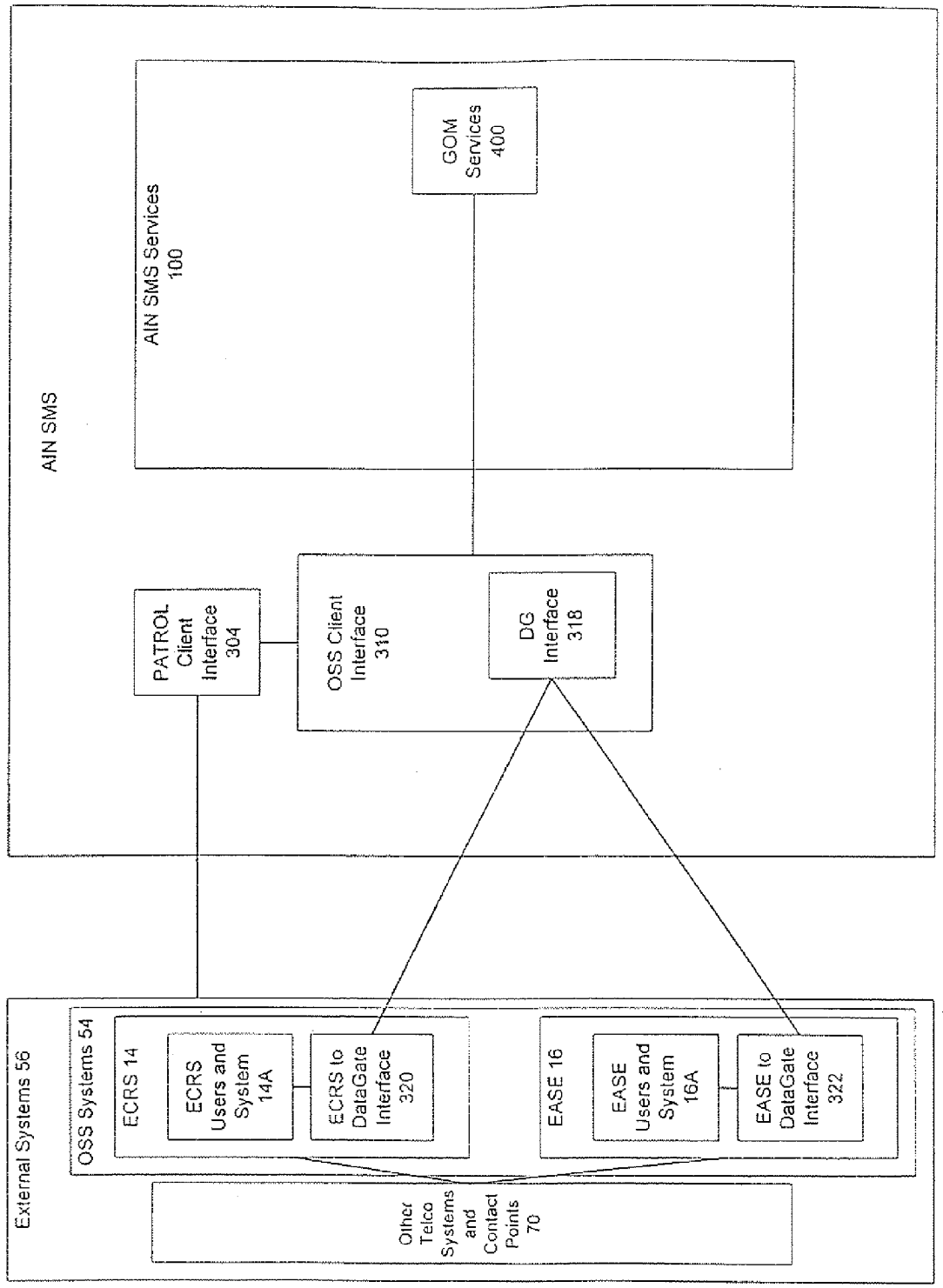
FIG. 8 illustrates, in a general block diagram form, a connection between the Service Management System and OSS systems such as EASE and ECRS.

Referring to FIGS. 4, 6 and 8, the OSS Client Interface 310 consists of an interface from DATAGATE to the OSS 54 System. This is accomplished in the OSS 54 interface, which runs on the SMS 10 as a TUXEDO interface. EASE 16 and ECRS 14 (OSS systems) are provided to access the SMS 10. EASE 16 and ECRS 14 have the ability to query the SMS 10 and to query SPACE 24 (via the SMS 10) and to submit updates and/or supplemental data (from EASE 16), and to query NEs other than SPACE 24 (via the SMS 10). The user submitting the request will need to specify whether SMS 10 or SPACE 24 is queried. If SPACE 24 is to be queried, the request will flow to the SMS 10 where an estimated response time is calculated and immediately returned to the user. If the SMS 10 is to be queried, the request will flow to the SMS 10, the data is retrieved, and returned immediately to the user.

Because EASE 16 is Tandem-based, ECRS 14 is based on an NCR platform, Star Servers, and Pyramid, and the SMS 10 is a Sun UNIX system, DATAGATE is used to connect EASE 16 and ECRS 14 to the SMS 10. The front-end communication of EASE 16, ECRS 14, and the SMS 10 all utilize the DATAGATE package. One common interface may be used, although more than one interface is illustratively shown in the Figs. Thus, a standard communication format is used, whether from EASE 16 or ECRS 14. The format of the data sent from the SMS 10, whether going to EASE 16 or ECRS 14, is also standard. This allows the SMS 10 to develop a message set that is used by both of these systems, as well as any future OSSs 54 which should need to query the SMS 10 or the NEs via the SMS 10. Note, however, that the format of the screen(s) to request the data, and format of the screen(s) to display the results, can be different for EASE 16 than on ECRS 14.

All messages received from or sent to EASE 16 and ECRS 14 are processed via the OSS Client Interface 310. These include SMS 10 query requests, SPACE 24 query requests, SMS 10 query responses, estimated response time for a SPACE 24 queries, and SPACE 24 query CPR responses.

As shown in FIG. 8, when a request to query a CPR on SPACE 24 is submitted from an OSS 54, via DATAGATE, the OSS Client Interface 310 will receive it, via DATAGATE, and place it on a TUXEDO queue for the next GOM service (e.g., TIP 402). When a request to query SMS 10 is submitted from an OSS 54, via DATAGATE, the OSS Client Interface 310 will receive it, via DATAGATE, then access Database Services 200 (SMS query server) to retrieve the data.

The OSS Client Interface 310 will also wait for query results or estimated response time messages. When it receives a SPACE 24 query result, it will retrieve the data from the appropriate SPACE 24 query results table(s). The OSS Client Interface 310 will add a description for each USOC and FID, and send the information back to the requester. The EASE 16 and ECRS 14 systems can then extract the information desired by the user.

As shown in FIG. 6, the OSS Interface 310 will receive data from an OSS 54 (e.g., EASE 16 or ECRS 14) user, and a GOM Service 400. The inputs are generated when the OSS 54 user requests a query from the SMS 10 or SPACE 24. The SPACE 24 query is a request to query a CPR (e.g., WTN). The OSS 54 user query request message will contain the type of query (e.g., SMS 10 or SPACE 24 indicated by event type); the WTN to query; the view of WTN to query (current, pending, sending, history, old, failed); and the date (for SMS 10 query for pending and history views). Note that the USER_ID of the original requester is not provided.

The GOM process output (i.e., input to DG interface 318) is an estimated response time for SPACE 24 queries, and a notice that the SPACE 24 query results are available. SMS 10 query requests are processed by calling Database Services 200 with the DG interface. The results are obtained immediately and forwarded to the requester. The estimated response time message will contain the estimated response time, and the DG interface 318 "transaction id".

The notice of SPACE 24 query results message will contain: a key to Query Results database (e.g., SPACE 24 transaction id), and a DG interface 318 "transaction id" (to match to request). The DG interface 318 receives messages from OSS 54 and sends messages to OSS 54 via DATAGATE. The DG interface 318 must be must be multi-threaded because DATAGATE processes a multitude of requests simultaneously, and performs TUXEDO API calls. The DG interface 318 may perform these functions by multi-processing and/or forking. There is one occurrence of the DG interface process 318.

The DG interface service 318 does not establish or maintain the integrity of the SMS 10-EASE/ECRS 14 connection, and is brought up and available for OSS 54 messages. The DG interface 318 manages the flow of messages between SMS 10 and EASE/ECRS 14. Note, this service is a TUXEDO interface, but not a TUXEDO service. The DG interface 318 must be started up and shut down separately and outside of TUXEDO services.

When the DG interface 318 is started up, it will read configurable information from a header file. DG interface Configuration information includes DATAGATE service information, which consists of: the service name, the service id, the application data, and the version. In addition, this service is recompiled if any of the configurable information is changed, which requires a stop/restart for new configurable values to take effect.

There are a number of physical ECRS systems 14A, and physical EASE systems 16A that may send requests to the DG interface. The DG interface 318 does not know what OSS system sends it information, but maintains an open socket so that it can return the requested data to the location from which the request came. The DG interface is not aware that EASE 16 and ECRS 14 are not 24×7 systems (i.e., twenty-four hours a day, seven days a week), and will always be waiting for input from an OSS 54. Query results obtained but unsuccessfully transmitted to the requesting system are retained in the SMS 10 database(s); however, the forwarding of the results will not be re-attempted. The user in these situations will need to resubmit the query request.

The DG interface 318 will detect alarm conditions and inform the appropriate staff through MESSAGE_NOTIFICATION 426 or through PATROL 52 (via system logging and the PATROL Client Interface 304, as shown in FIG. 8) for severe problems when a message to MESSAGE_NOTIFICATION 426 is not possible. Alarms include inability to reply to EASE 16/ECRS 14, and errors with TUXEDO processing, etc.

TUXEDO processing errors are sent to PATROL 52. If TIP 402 is in error, but the MESSAGE_NOTIFICATION queue is functioning, then response messages will continue to be processed. If both TIP 402 and MESSAGE_NOTIFICATION queue processing are unavailable, the error is logged to PATROL 52.

Receiving query requests from OSS 54 is handled as follows: Upon receiving a request from OSS 54, the message is checked for a valid message type. Valid values are 1000 (i.e., SMS 10 query) and 2000 (i.e., SPACE 24 CPR query). If the event type is 1000, the following additional edits are made: WTN is 10 numerics, VIEW_TYPE is non-blank, and DATE is 8 numerics (which is not required for current and sending view types; required for all others).

If the request for SMS 10 data does not pass the checks, an error message (event type 100, error text to be determined) is returned to the requester. If it does pass the checks, this service will then call an I/O routine via Database Services 200 to retrieve the requested data from SMS 10 table(s). Once the data is obtained, it is forwarded to the requester.

If the event type is 2000 (i.e., a request for SPACE 24 CPR data), then the following additional edits are made: WTN is 10 numerics, and VIEW_TYPE is non-blank.

If the request for SPACE 24 CPR data does not pass the edits, an error message is returned to the requester. If it does pass the edits, then this service will do a 'TPCALL' to TIP 402, and wait for TIP 402 to reply. The reply from TIP 402 is instantaneous.

Data is received by the DG interface 318 from GOM Services 400 via a 'TPDEQUEUE', which is issued to receive messages from the OSS 54 queue. The message can be an estimated response time or a query results response. As noted above, MESSAGE_NOTIFICATION 426 issues a 'TPENQUEUE' to place a message with the estimated response time on the OSS 54 queue; and issues a TPENQUEUE to place a message with the query results key on the OSS 54 queue. These messages are FML buffer entries on the queue. The DG interface 318 will match this message to the originating request by using the DG interface 318 "transaction id". If there is no matching request, an USERLOG entry is made (by sending a message to MESSAGE_NOTIFICATION 426) and the message is purged. If a match is found and the message is an estimated response time, it is sent to the requester. If a match is found and the message is a query results response, DG interface 318 will call an I/O routine to retrieve the query results from the QUERY_RESP table and other cross-reference tables. It will then forward the results to the requester. If DG interface 318 receives a query response prior to an estimated time, it will retrieve the results and forward them, and discard the estimated time message when it is received. This is logged in a message via MESSAGE_NOTIFICATION 426.

The DG interface 318 must ensure that it can return data to the requester. The OSS 54 requester may wait for SMS 10 query results, and for estimated response time for SPACE 24 queries. The requester will not wait for the SPACE 24 results. The DG interface 318 will receive a message on it's queue from MESSAGE_NOTIFICATION 426 when the results are available from SPACE 24. It will then retrieve the SPACE 24 results (via SQL) and send them to the requester.

In the preferred embodiment, the maximum number of sockets to be utilized for passing data between ECRS 14 or EASE 16 and the DG interface is 1024, an alternate number of sockets may be utilized. Each socket remains open until results are obtained, however, as noted above, the user will not be hung. Also, the number of query requests received is limited to the number of sockets available. The ECRS 14/EASE 16 DG interface 318 can send a message to SMS 10 DG interface to close the socket, if so, the service will comply. It is also possible that when the SMS 10 DG interface attempts to return data to ECRS 14/EASE 16, the socket is no longer open. In this case, the DG interface 318 will write an error notice via MESSAGE_NOTIFICATION 426 (FIG. 13).

When MESSAGE_NOTIFICATION 426 puts an entry on an OSS queue for SPACE query results, the entry will contain the key to SPACE Results tables (which is the SPACE transaction id). It will also contain the DG interface transaction id. Using the SPACE transaction id, the DG interface will use an I/O routine to retrieve the row(s) of matching data from each applicable SPACE 24 Results table. If an error return code is returned on any call (e.g., anything other then 0's, or conditions specifically listed below each call), it is logged by sending a message to MESSAGE_NOTIFICATION 426, and an error message is sent back to the requester.

The DG interface service 318 has two types of outputs: an entry on the TIP 402 TUXEDO queue for SPACE queries, and data that is sent back to an OSS 54. The data sent back to an OSS 54 can be an estimated response time for a SPACE query, or SMS or SPACE query results. The entry on the TIP 402 TUXEDO queue contains the following information: the WTN to query, a view of WTN to query (current, pending, sending, history, old, failed), and a date (for SMS 10 query for pending and history views).

Note that TIP 402 (FIG. 13) will receive the above information fielded in an FML buffer. TIP 402 will log this information in the raw image table. The estimated response time (event type 400) will specify the estimated amount of time (in minutes) to wait for the requested SPACE 24 query.

The query results will contain the following data: an event type (100 error, 200 data, 300 view requested does not equal view returned), a number of rows of data per packet, a type of record indicator ('U' USOC, 'F' FID, 'C' CALL VARIABLE, 'T' table types, 'D' table data); if U, the USOC; if F, the FID; if C, the CALL VARIABLE; if T, the table name; and if D, the table data (one column per record) Further, the DG interface 318 will not change any data on the SMS 10 (no inserts, updates, or deletes). Data is only retrieved and forwarded.

The SMS 10 supports all EASE 16 and ECRS 14 locations. It is possible that EASE 16 and ECRS 14, or different locations of EASE 16 or ECRS 14 will not be using the same version of DATAGATE at any given time. Should this be the case, the SMS 10 will support multiple concurrent versions of the DATAGATE within the interface.

E. PATROL Interface

Referring to FIGS. 4-6, PATROL 52 operates to monitor the SMS 10 platform for messages it is to take action on. PATROL 52 monitors the master console 76A, which requires that the master console 76A is configured as an ASCII terminal, or can be connected via RS-232 or RLOGIN. Ultimately, with the console interface, user programs access this interface by issuing messages to the SYSLOG. From there, a daemon (i.e., background) process on the system posts the messages from the SYSLOG to the master console, from which PATROL 52 will monitor them. In the present invention, this is accomplished via a provided routine which allows PATROL 52 connection to be modified without modifying a large amount of scattered code within the software. Further, MESSAGE_NOTIFICATION 426 (FIG. 13) sends messages to PATROL 52. Any message that PATROL 52 must act upon must be registered with PATROL 52, along with the action to take.

Upon receipt of a message matching a monitored message, PATROL 52 will perform action. Action may be notifying someone at the Data Center that an event occurred, or possibly paging a number and providing a message with further information, running a script on the SMS 10 server, etc.

An alert system software 52 subroutine is provided which will forward calls to MESSAGE_NOTIFICATION 426. Instead of TUXEDO calls to access MESSAGE_NOTIFICATION 426, a subroutine call may be made to a routine which will accept and pass all TUXEDO related parameters along with TUXEDO call type (e.g., TPCALL, TPACALL, etc.). The calling routine will perform TUXEDO call to MESSAGE_NOTIFICATION 426. If the MESSAGE_NOTIFICATION 426 call from that routine fails, that routine will call "tellPATROL" with a message indicating that MESSAGE_NOTIFICATION 426 is down. It will also return an error to the caller indicating the failure so that a TPABORT or other appropriate action can be taken knowing that the Notification did not take place. A successful transmission to MESSAGE_NOTIFICATION 426 results in a return code of success and availability of all return values from TUXEDO call.

Clients that are unable to utilize TUXEDO Services, utilize "tellPATROL" to make PATROL 52 message calls. The sent string and action must be registered with PATROL 52. The PATROL Client Interface 304 is, by design, available to all UNIX programs on the SMS 10. There is no PATROL TUXEDO Service, per se, but rather, by having PATROL 52 connected to the SMS 10, physically, the system is monitored.

F. GUI Client Interface

Figure 7:
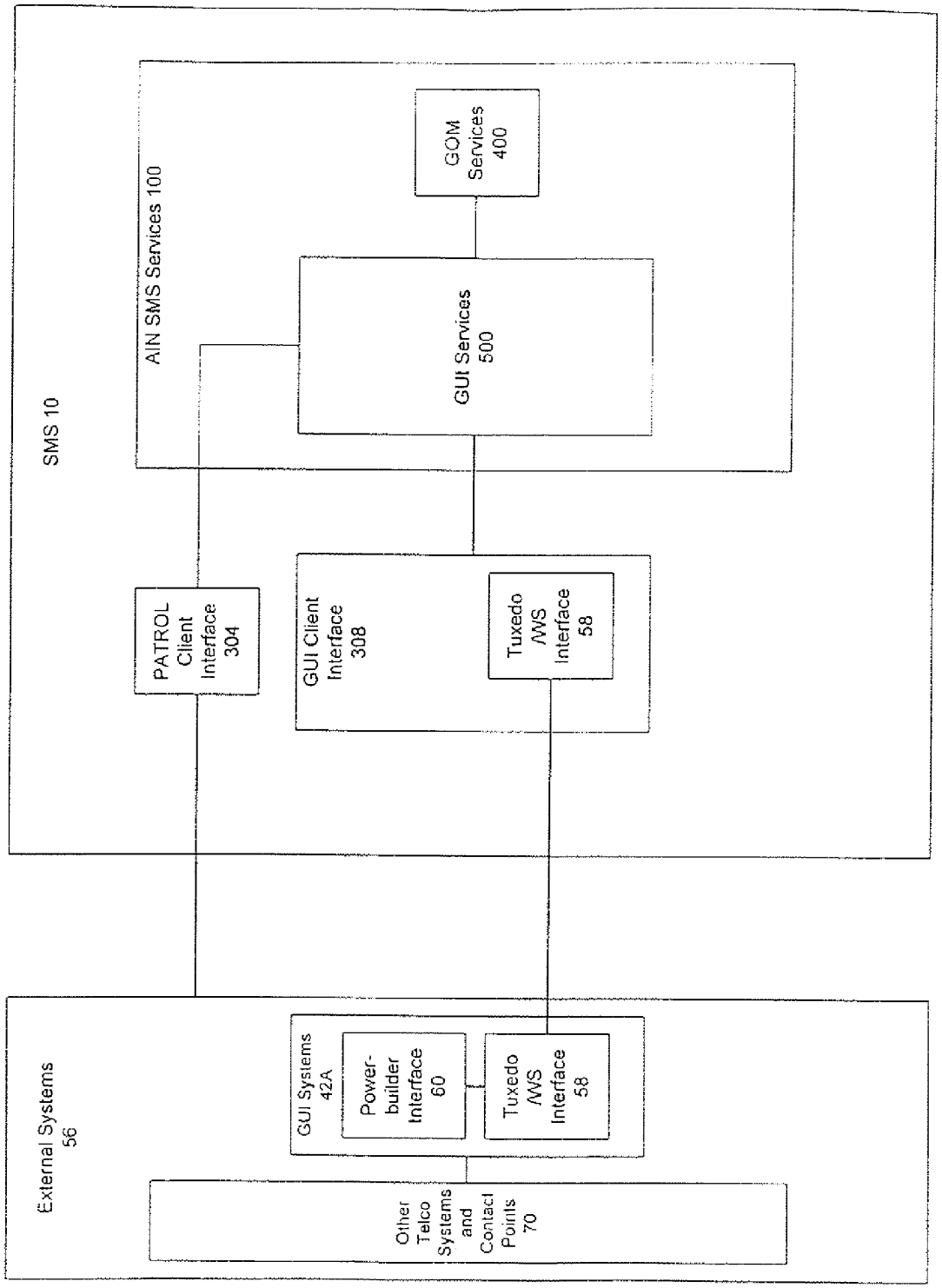
FIG. 7 illustrates, in a general block diagram form, a connection between the Service Management System and a graphical user interface.

Referring to FIGS. 4, 6 and 7, the Graphical User Interface (GUI 42) is a multi-purpose link between the SMS 10 and non-SOAC/non-DATAGATE applications, which provides icon-driven access to support manual service provisioning, error correction, and system queries. The GUI 42 will primarily be used by such work groups as the RCMAC/GUI 42, CNOC, NOC, Software Center (SC), and OA&M to resolve MANUAL and COMPLEX orders, correct errors, launch both SMS 10 and NE queries, and to access SMS 10-related statistics/informational messages. GUI 42 screens (shown in FIGS. 35-85) will also support overall administration of the GUI 42, including User Access and updating processing tables.

The GUI-to-SMS connectivity is provided by the message handling application (e.g., TUXEDO /WS) over TCP/IP links, as shown in FIG. 7. The GUI-to-message handling application interfacing may be provided using the Distributed Computing Integrator (DCI) available from Tangent International, New York, N.Y.

The /WS Client Interface 58 retrieves query results, error logs, COMPLEX logs, manual logs, and table information from the Database Services 200 routines. Upon correcting an error, the /WS Client Interface 58 initiates the CLEANUP routine, which is a routine designed to purge residual data from various database tables. The /WS Client Interface 58 informs a CLEANUP routine (discussed below) what to purge, e.g., provisioning steps, SAV2 and SAV tables 206 (see FIG. 13). If an error is resolved by modifying PCS, then PCS would remain and all other views would be purged.

1. Inputs from the SMS to the GUI Client Interface

The GUI Client Interface 308 retrieves any activation request related provisioning or error information needed by the interface, from the MI_LOG table 214 (FIG. 13). The GUI Client Interface 308 software will reformat the log information and display it online. When the MI_LOG 214 is read, the GUI 42 further provides the user with access to any SMS 10 tables required to perform the needed work. Query Response messages, along with data retrieved from the SMS 10 tables or NE, are formatted and displayed online for the user by the GUI Client Interface 308. (See Processing, below.)

2. Inputs from the GUI Client Interface to SMS

GUT 42 input screens allow the user to correct errors, provision services, and launch queries to both the SMS 10 and NEs, and perform OA&M functions. Feedback to the user from the SMS 10 will include query status messages and any data retrieved in response to the query.

The GUT Client Interface 308 does not interrupt any online session in progress to receive unsolicited messages. Instead, the user will periodically perform an online check for any pending messages on the SMS 10 Log or the Query Results Log. Once messages are retrieved, online access to supplemental information needed to perform the required work is available. Access to messages may be restricted based on the Work Group/User/Type of Message.

Error messages will provide sufficient information to interpret the error, by displaying any variable data associated with the error and by accessing an error code table documenting resolution steps. Once corrective action is identified, the GUI 42 provides the user with a mechanized means of formatting and entering the correction back into the GENERIC ORDER MANAGEMENT services 400 (GOM).

COMPLEX order notices are extracted from the SMS 10 MI_LOG table 214 and displayed online. The actual provisioning steps created by BREAKOUT 416 (FIG. 13) are extracted from the STEP database 210, as requested, and displayed. This information will then be used to manually provision the impacted NE (e.g. SPACE 24 or VAD 32). Once this provisioning is done, a GUI 42 screen is available to input Local-Only updates to the SMS 10 and to notify GOM that these are local only updates.

MANUAL order notices are extracted from the MI_LOG table 214 and displayed online. The online display will provide functionality to retrieve an image of the manual order from the RAW_REQUEST database 202 and display it online. The GUI 42 will provide an interface to mechanically build the required records and pass them to the appropriate GOM process.

Statistical and status information is retrieved by the OA&M personnel, based on predetermined OA&M requirements. Query notices are retrieved from the SMS 10 Query Results Log by the GUI 42 and will provide parallel mechanized access to the QUERY_RESP table where the data retrieved by the Query is stored.

3. PC Interface

In an alternate configuration, the GUI 42 may also comprise a personal computer (PC) 38, as shown in FIGS. 2 and 3, and the GUS Client Interface 308 may comprise a PC Client Interface. In this configuration, The PC Client Interface is divided into two main applications: pci_serv, which services the input side, and pci_trans, which services the outgoing side of the PC Client Interface.

The pci_serv application handles incoming requests from a PC Server application, and performs an sms_enqueue to put it on the queue for TIP 402 (FIG. 13). In addition, the Tuxedo header fields are set so that the TIP service 402 is informed that this is a CUSTPC message. The incoming message to pci_serv is in FCIF format. The pci_serv does not parse the message, but may log a copy of the message in accordance with a user configuration parameter. An ACK is sent back to the PC Server application for each message that the pci_serv successfully receives. Note, the pci_serv is a DATAGATE service, using DATAGATE to receive and send messages. The messages sent to pci_serv are update-type messages similar to GUI messages (described below). Queries from the PC Server should be sent to OSSCOMM instead of pci_serv.

After the TIP service 402 receives the message, it is processed by GOM Services 400, and a response-type message is eventually created by or sent to MESSAGE_NOTIFICATION 426. MESSAGE_NOTIFICATION performs an sms_enqueue of the response type message to the CUSTPC queue. The pci_trans application performs an sms_dequeue to retrieve the message(s) from the CUSTPC queue.

The pci_trans application will determine the PC Client Interface message type by using the field HDRTRANCODE (i.e., without parsing the FCIF formatted message), and set the DATAGATE event accordingly. DATAGATE events are definitions of how the DATAGATE client and DATAGATE service determine what type of request is being sent/received.

Exemplary values for the PC Client Interface message types are: Error, SOAC message, SOAC POSACK, SOAC NEGACK, Estimated response time, PC interface update POSACK, PC interface update NEGACK, PC interface cancel POSACK, and PC interface cancel NEGACK.

The psi_trans application will send a response type message back to the PC Server, using DATAGATE. The PC Server will ACK back for each response type message that it successfully receives from pci_trans.

IV. Generic Order Management

The Generic Order Management (GOM) Services 400 accept inputs from OSS systems and SOAC and process the request to derive the appropriate provision provisioning steps for affected NEs based a particular combination of added/deleted/updates services for a WTN. The GOM Services 400 will be described below with reference to FIGS. 13-14.

A. MESSAGE_NOTIFICATION

MESSAGE_NOTIFICATION 426 formats messages created by the various SMS 10 services, and GOM Services 400 (described below) and enqueues them to the various TUXEDO queues for ultimate distribution to recipients outside of the SMS 10. Exemplary pseudo-code of an implementation of MESSAGE_NOTIFICATION service is attached as Appendix D.

The external recipients and their associated messages include: SOAC 20 (Activation Requests, POSACKs, NEGACKs, and CARs), Network Operations (NOC, CNOC, RCMAC/GUI 42, SC, Manual Orders, COMPLEX Orders, Errors, Query Responses), ECRS 14 (Errors and Query responses), Operations Administration & Maintenance (OA&M), and other attached service order initiating systems.

SMS 10 system errors and application processing error routing of the output messages are performed based on one or more internal tables. These Message Routing tables are designed for ease of modification so as to flexibly support the user's changing distribution needs and areas of responsibility.

MESSAGE_NOTIFICATION 426 issues POSACKs, NEGACKs and CARs to SOAC 20 originated orders when the HOL_ORIGINATING_SYSTEM='SOAC'. POSACK, CAR and NEGACK are the only valid functions on SOAC 20 originated orders.

The transaction types are repeated along with the specific tasks necessary to perform the transaction. For error-notice, NEGACK, CAR and POSACK transactions, it is necessary for MESSAGE_NOTIFICATION 426 to clear the order lock and WTN lock associated with the queue order and each WTN on the order.

There is a MN_TRANSACTION_CODE field in the structure sent to this function which is filled in with "defined values" corresponding to the transaction types listed below. This MN_TRANSACTION_CODE is moved to the ACTIVITY_TYPE field in the MI_LOG table 214 if a manual record is written as a result of the request. It is used as a sorting field by the GUI 42 users when grouping requests.

The sending process or service will fill-in the field with the transaction type it wants MESSAGE_NOTIFICATION 426 to perform. However, there are times when MESSAGE_NOTIFICATION 426 needs to perform two transactions, for example when a transaction comes in as an ERROR_NOTICE, MESSAGE_NOTIFICATION 426 logs the error to the AUDIT_ERROR_LOG, and MESSAGE_NOTIFICATION 426 may also send a NEGACK or create a manual work entry for this error as well. This second transaction is needed based on the ERROR_CODE table in the transaction field. If this field is filled in it must be a defined value and MESSAGE_NOTIFICATION 426 will perform that transaction type as well. In the example described above, the ERROR_CODE entry in the ERROR_CODE table will have a NEGACK transaction type in the TRANSACTION_CODE field, and when the program reads the ERROR_CODE when performing the ERROR_NOTICE function it will also determine if it should perform the NEGACK function.

Figure 32:
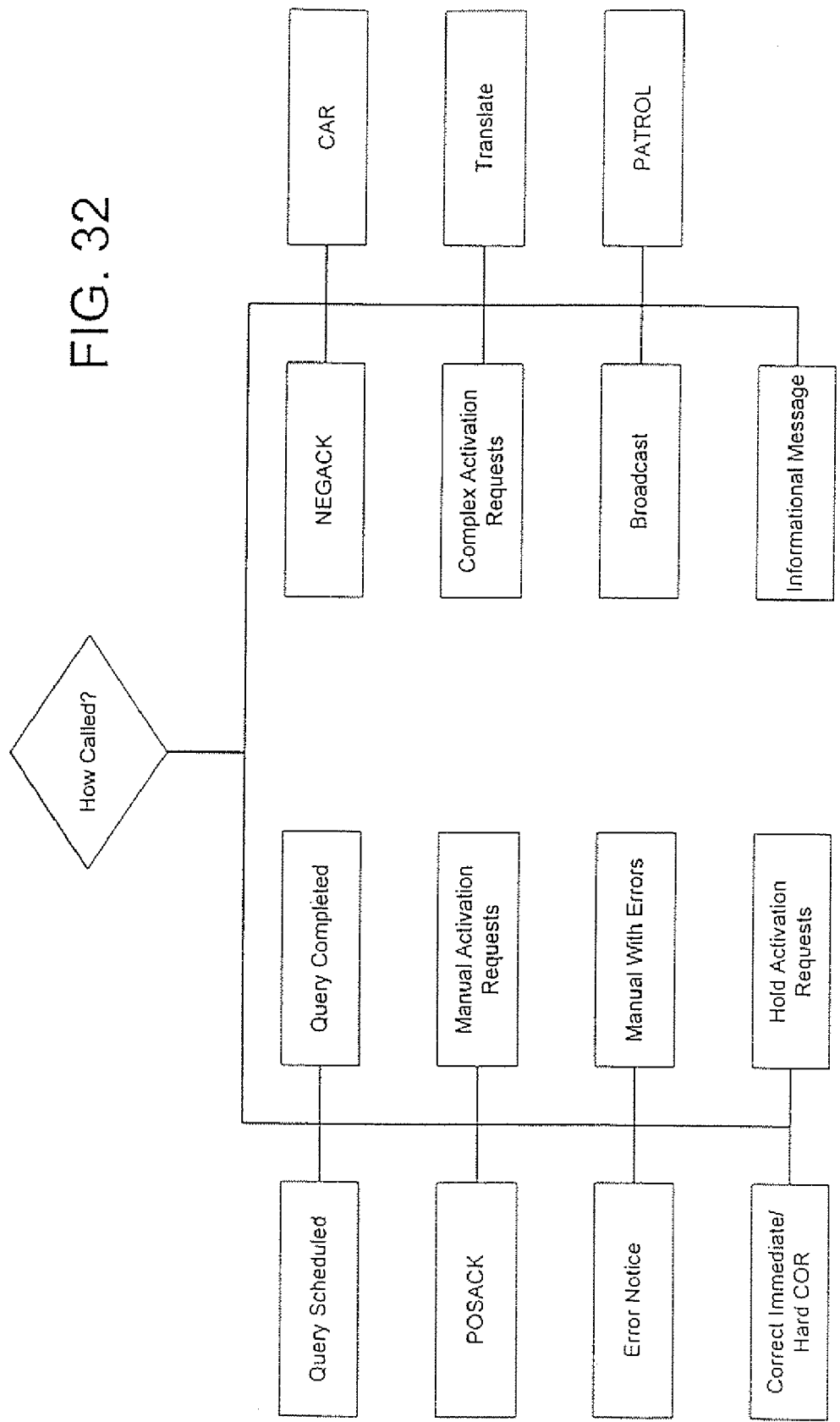
FIG. 32 is a flow chart of the logic flow of the processes and operations that may be performed by the MESSAGE_NOTIFICATION service of the present invention.

As shown in FIG. 32, MESSAGE_NOTIFICATION 426 needs to determine how it was called in terms of a TRAN or NOTRAN type call. TRAN implies that everything performed by MESSAGE_NOTIFICATION 426 is under a global transaction and can be rolled back. The NOTRAN implies that whatever operations MESSAGE_NOTIFICATION 426 performs in terms of I/O is committed, regardless of if the calling program later COMMITS or aborts. It is also necessary for the program to determine if the calling program expects a reply. The transaction types shown in FIG. 32 are as follows;

QUERY SCHEDULED—This transaction will cause a message to be sent to the query originator. It states that the SMS 10 has received and scheduled the NE Query and gives an estimated response time. The HDRTSYS is used for the location to enqueue the message, and contains the location of the user. The MN_EST_WAIT_TIME field contains the estimated time. MESSAGE_NOTIFICATION 426 writes an entry to the AUDIT_ERROR_LOG and PATROL 52 if the enqueue of the message fails.

QUERY COMPLETED—This transaction will cause a message to be sent to the query originator. It states that the SMS 10 has received the results from the NE Query. Only OSS 54 TSYS's receive this type of message. The HDRTSYS is used for the location to enqueue the message. The MN_SPACE_KEY is the database key to the SPACE_QRY_RESP. MESSAGE_NOTIFICATION 426 writes an entry to the AUDIT_ERROR_LOG and PATROL 52 if the enqueue of the message fails.

POSACK—This transaction will cause a message to be sent to SOAC 20 to indicate a service order has successfully passed the SMS 10 processing and is either scheduled to update or has already updated the applicable NE's. The POSACK must be sent to the original originator (SOAC 20) of the order. The HOL_ORIGINATING_SYSTEM or the HDRORIGTSYS will both contain the originator of the order. If it is a SOAC 20, then a POSACK may be enqueued to the queue servicing that SOAC 20, however, the TRN field from the most recent/current HOL_CTL entry must be used. If the order is not a SOAC 20 order, then an entry must be placed in the MI_LOG table 214 for the MN_TSYS, HDRUSER_ID, HDRGROUP_ID and/or MN_WIRE_CENTER responsible for resolving the error. Also an entry to the AUDIT_ERROR log must be written in either case. If a POSACK is sent, then it must be recorded in the most recent/current HOL_CTL entry. This function must fill in the C0 structure for the POSACK.

CAR—The Cancel Activation Request functions are similar to the POSACK with the exception that CARs are responses back to the SOAC 20 that a cancellation (CAN) pass has been successful. The CAR must be sent to the originator (SOAC) of the order. The HOL_ORIGINATING_SYSTEM or the HDRORIGTSYS will both have the originator of the order. If the order is a SOAC 20 order, then a CAR may be enqueued to the queue servicing that SOAC 20, however, the TRN field from the most recent/current HOL_CTL entry must be used. If it is not a SOAC 20 order, then an entry must be placed in the MI_LOG for the MN_TSYS, HDRUSER_ID, HDRGROUP_ID and/or MN_WIRE_CENTER responsible for resolving the error. Also an entry to the audit error log must be written in either case. If a CAR is sent, then it must be recorded in the most recent/current HOL log entry. This function must fill in the C0 structure for the CAR.

NEGACK—This transaction will cause a message to be sent to SOAC 20 to indicate a service order failed at some point within the SMS 10. The NEGACK will contain information identifying the error and its cause. The NEGACK must be sent to the originator (SOAC) of the order. The HOL_ORIGINATING_SYSTEM or the HDRORIGTSYS will both have the originator of the order. Also, the HDRTSYS will contain the originator as well. If it is a SOAC 20 order, then a NEGACK is enqueued to the queue servicing that SOAC 20, however, the TRN field from the most recent/current HOL_CTL entry must be used. If it is not a SOAC 20 order, then an entry must be placed in the MI_LOG for the MN_TSYS, HDRUSER_ID, HDRGROUP_ID and/or MN_WIRE_CENTER responsible for resolving the error. Also an entry to the AUDIT_ERROR_LOG must be written in either case. If a NEGACK is sent, then it must be recorded in the most recent/current HOL_CTL entry. This function must fill in the C0 structure for the NEGACK, with ERCODE and ERTEXT populated in the MSG section. The REC section may have multiple occurrences, one for each ERCODE that has to go back to SOAC 20. This function must fill in the REC ERCODE and TEXT fields for each error in the EDITS_ERROR table 212. MESSAGE_NOTIFICATION 426 reads the EDITS_ERROR table 212 with the MN_INT_SEQ_NUM as the key and populates the REC section with ERROR_CODE and ERROR_TEXT information. If there is no EDITS_ERROR entry, then use the ERROR_CODE_ERROR_TEXT that matches the MN_ERROR_CODE. After enqueuing the NEGACK successfully, it marks any MI_LOG entry for this order as completed and deletes all EDITS_ERROR table 212 entries.

ERROR NOTICE—This transaction writes the AUDIT_ERROR_LOG entry when the subsystem is equal to SQL and it is an SQL error. The transaction also writes the ERR_VAR_TEXT and all other appropriate information to the AUDIT_ERROR_LOG. The calling programs should have stored errors into the EDITS_ERROR table 212, to be discussed below, if none exist, then the MN_ERROR_CODE is written to the EDITS_ERROR table 212. A list of error codes describing the various error conditions may be found in Appendix E.

If any entries are found in the EDITS_ERROR table 212 then MESSAGE_NOTIFICATION 426 may have to merge the EDITS_ERROR_ERROR_VAR_TEXT and ERROR_CODE_ERROR_TEXT into the EDITS_ERROR_ERROR_TEXT field (if ERR_VAR_TEXT is not equal to spaces and if EDITS_ERROR_ERROR_TEXT is equal to spaces). MESSAGE_NOTIFICATION 426 loops through the EDITS_ERROR table 212 for the ERROR_CODE value and read the ERROR_CODE table using the ERROR_CODE as the key. It then merges ERROR_CODE_ERROR_TEXT with any EDITS_ERROR ERROR_VAR_TEXT:

EDITS_ERROR_ERROR_VAR_TEXT
@xxxxxxxxxxx@xxxxxxxx
ERROR_CODE_ERROR_TEXT
xxxxxxxxxxx@xxxxxxxxxx@

MESSAGE_NOTIFICATION 426 uses the data in ERROR_VAR_TEXT after the first @ until the next @ or end-of-line to replace the first @ found in the ERROR_TEXT message. It continues the "replacement" process until all text has been inserted into the variable text. This buffer is moved to the EDITS_ERROR_ERROR_TEXT field and update. This same text must be logged to the AUDIT_ERROR table.

MESSAGE_NOTIFICATION 426 may need to process another transaction, based upon if the ERROR_CODE_TRANSACTION_CODE or DESTINATION_FIELD had been set and noted earlier. If any of the TRANSACTION_CODE field(s) was a NEGACK or if any of the DESTINATION_FIELD(S) was set to 'SOAC', and if the originator of the order was SOAC 20, then MESSAGE_NOTIFICATION 426 will loop through the NEGACK logic. In this case the MI_LOG entry is marked as completed and all its associated EDITS_ERROR entries are deleted.

An exception occurs if the GUIOSS_REQ_TYPE='S' for a resubmit. Then even if the originator is SOAC 20, this request is a correction by a GUI 42 user and the errors should routed to the GUI 42 user, so a NEGACK is not issued and the errors in the EDITS_ERROR table 212 and the MI_LOG table 214 entry are not deleted.

If the originator of the order is not SOAC 20, MESSAGE_NOTIFICATION 426 determines where to route the manual intervention message by setting the fields in the MI_LOG based upon HDRUSER, HDRGROUPID and MN_WIRE_CENTER and the ERROR_CODE_DESTINATION field. The order status in HOL_CTL table 216 is marked as an error. If MN_WTN is not spaces, then the HOL_WTN entry for that WTN is set to an error status. Also, if MN_STEPNUMBER not spaces, then MESSAGE_NOTIFICATION 426 updates the HOL_STEP_STEP_STATUS as well. If the MN_STEP_NUMBER is set then the ACTIVITY_TYPE field in the MI_LOG is set to 305. This indicates to the end Users that provisioning step(s) are the error. If the MN_DO_CLEANUP indicator is set to 'Y', then the CLEANUP routine is called to delete entries associated with the ERROR_CODE_ERROR_CODE. If the ERROR_CODE_ALARM_IND is set for any of the error codes that apply to this event, then the error text is sent to the alarm port.

MANUAL ACTIVATION REQUESTS—This request will cause an entry to be written to the MI_LOG table 214 to notify users to manually provision the order. All appropriate fields from MN and HDR structures are moved to the MI_LOG table 214 entry. An entry is written to the AUDIT_ERROR_LOG indicating the success or failure of this request.

MANUAL WITH ERRORS—This request will cause an entry to be written in the MI_LOG table 214 to notify users to manually provision the order. In addition, there are entries written to the EDITS_ERROR table 212 associated with this manual work entry. All appropriate fields from MN and HDR structures are moved to the MANUAL INTERVENTION entry. An ERROR_NOTICE transaction is executed for the errors portion of this transaction. An entry is written to the AUDIT_ERROR_LOG indicating the success or failure of this request.

COMPLEX ACTIVATION REQUESTS—This is essentially the same as the manual order. It results in an entry being written to the MI_LOG table 214 to notify users to manually provision the order. All appropriate fields from MN and HDR structures are moved to the MANUAL INTERVENTION entry. An entry is written to the AUDIT_ERROR_LOG indicating the success or failure of this request.

CORRECT IMMEDIATE/HARD COR—This is essentially the same as the manual order. It results in an entry being written to the MI_LOG table 214 to notify users to manually provision the order. All appropriate fields from MN and HDR structures are moved to the MANUAL INTERVENTION entry. An entry is written to the AUDIT_ERROR_LOG indicating the success or failure of this request.

HOLD Activation Requests—This request will cause an entry to be written to the manual work log with an ACTIVITY_TYPE indicating 'HOLD'. All appropriate fields from MN and HDR structures are moved to the MANUAL entry. An entry is written to the AUDIT_ERROR_LOG indicating the success or failure of this request.

BROADCAST—This is a request to send an unsolicited message to a interface TUX process.

TRANSLATE—This is a request to take an error code and optional variable text and to read the text from the ERROR_CODE table, merge in the variable text, and pass the result back to the calling routine.

INFORMATIONAL Message—This request is to simply write the message to the AUDIT_ERROR log and to send an alarm based upon the ERROR_CODE_ALARM_IND.

PATROL—This request is to take the ERROR_CODE or ERROR_TEXT provided and send it to PATROL 52 port. The message is also written to the AUDIT_ERROR log.

The output of MESSAGE_NOTIFICATION 426 is an entry written to the AUDIT_ERROR log and/or MI_LOG table 214 and optional messages enqueued for other systems. In general, there is an output written to the MANUAL INTERVENTION table. If a transaction is not performed successfully, an event is generated to PATROL 52 process.

1. Interfacing with TUXEDO

MESSAGE_NOTIFICATION 426 initializes itself with TUXEDO system environment via standard TUXEDO methods (i.e., TPOPEN( )). MESSAGE_NOTIFICATION 426 reads as input from TUXEDO an FML buffer which contains information used for processing. MESSAGE_NOTIFICATION 426 issues warnings to the USERLOG for each unsuccessful result that is returned from a TUXEDO system call. MESSAGE_NOTIFICATION 426 determines if it was called inside or outside of a TUXEDO Transaction. If called outside of a transaction, MESSAGE_NOTIFICATION 426 starts its own transaction (i.e., TPBEGIN( ) is called). The TIMEOUT value for the transaction is optionally specified on the CLOPT line in TUXEDO configuration file. MESSAGE_NOTIFICATION 426 returns the incoming FML buffer upon completion except when called with TRN_TRANSLATE. MESSAGE_NOTIFICATION 426 commits TUXEDO transaction (i.e., TPCOMMIT( )) if MESSAGE_NOTIFICATION 426 started the transaction. MESSAGE_NOTIFICATION 426 returns a code to the calling service with information regarding the successful or unsuccessful completion of processing; if unsuccessful, the return code describes the cause of the problem. MESSAGE_NOTIFICATION 426 returns a value of TPSUCCESS in all cases regardless of successful or unsuccessful completion. If MESSAGE_NOTIFICATION 426 is called with TRN_TRANSLATE MESSAGE_NOTIFICATION 426 obtains an error code from the incoming FML buffer and return its associated error text in the outgoing FML buffer.

2. Interfacing with the Database Service Routines

MESSAGE_NOTIFICATION 426 sets a global variable (I_AM_IN_TUXEDO) which will notify the Database Services 200 it is running in TUXEDO environment. MESSAGE_NOTIFICATION 426 sets the debug level for Database Services 200 to the one specified in the incoming FML buffer if and only if the debug level for MESSAGE_NOTIFICATION 426 is set to a value other than zero. A USERLOG message is written upon any unsuccessful return code from a database service function call. MESSAGE_NOTIFICATION 426 handles its own initialization/connection and disconnection to the database via database service calls. MESSAGE_NOTIFICATION 426 writes an entry in the HOL_FLOW table 218 each time that it is called.

3. Error Handling

MESSAGE_NOTIFICATION 426 executes an error handling transaction upon receiving a transaction code of TRN_ERR_STEP, TRN_ERR_PARSE, or TRN_ERR_NOTICE from the calling service. MESSAGE_NOTIFICATION 426 attempts to remove the WTN_LOCK table before attempting any other error processing. MESSAGE_NOTIFICATION 426 attempts to read error handling information from the EDITS_ERROR table 212. If unsuccessful, MESSAGE_NOTIFICATION 426 obtains error processing information from the incoming TUXEDO FML buffer. MESSAGE_NOTIFICATION 426 is capable of reading multiple entries from the EDITS_ERROR table 212 or multiple instances of the MESSAGE_NOTIFICATION buffer in the FML buffer. MESSAGE_NOTIFICATION 426 obtains an error code from either an EDITS_ERROR table 212 entry or an occurrence of the "MESSAGE_NOTIFICATION 426" structure in the FML buffer and extracts the error text associated with that error code. If the error text contains variable replacements, MESSAGE_NOTIFICATION 426 obtains the dynamic text replacements from the input provided and merge the dynamic text with the error text. MESSAGE_NOTIFICATION 426 updates the EDITS_ERROR entry with the merged error text if the input was received from the EDITS_ERROR table 212. MESSAGE_NOTIFICATION 426 writes an entry in the error log using the data provided in the EDITS_ERROR table 212 or the FML buffer and the ERROR_CODE table. If this is the first error being processed in the transaction, MESSAGE_NOTIFICATION 426 also writes an entry in the MI_LOG table 214. If a transaction code of TRN_POSACK, TRN_CAR or TRN_NEGACK is present in the ERROR_CODE table for the error code being processed, this transaction be executed. MESSAGE_NOTIFICATION 426 updates the HOL_CTL table 216 for the INT_SEQ_NUM being processed so that the ORDER_STATUS field contains an 'E'. If a WTN is provided as input to MESSAGE_NOTIFICATION 426, MESSAGE_NOTIFICATION 426 updates the WTN_STATUS field in the HOL_WTN table 220 to contain an 'E'. If a step number was provided as input to MESSAGE_NOTIFICATION 426, MESSAGE_NOTIFICATION 426 updates the STEP_STATUS field of the HOL_STEP table 222 to contain an 'E'. If the 'CLEANUP' flag is set in the MESSAGE_NOTIFICATION 426 structure in the incoming FML buffer, then the database CLEANUP service is executed for the given internal sequence key. If the alarm indication field is set in the ERROR_CODE table for the associated error code, then error text associated with the error code is sent to PATROL 52 system.

4. Query Processing

MESSAGE_NOTIFICATION 426 performs query processing upon receiving a transaction request of TRN_QUERY_SCHED, TRN_QUERY_COMP, or TRN_QUERY_ERROR. MESSAGE_NOTIFICATION 426 reads the routing structure from the incoming FML buffer. MESSAGE_NOTIFICATION 426 fills in the fields of the "OSSGUI_REPLY" structure from the SMS header and the ROUTER data structures that were read in from the FML buffer. MESSAGE_NOTIFICATION 426 ensures that the originating type is "OCC" on transaction types of TRN_QUERY_COMP and logs an error to the USERLOG if it is not. If the transaction type is TRN_QUERY_COMP then the RPLY_SPACE 24_KEY is obtained from the MN_SPACE 24_KEY field of the "MESSAGE_NOTIFICATION" structure in the FML buffer. If the transaction type is TRN_QUERY_SCHED, MESSAGE_NOTIFICATION 426 fills in the RPLY_EST_TIM- E_REPLY field of the "OSSGUI_REPLY" structure from the MN_EST_WAIT_TIME field of the "MESSAGE_NOTIFICATION 426" structure in the FML buffer. If the transaction type is TRN_QUERY_ERROR, MESSAGE_NOTIFICATION 426 writes an entry to the USERLOG stating that this transaction type is not defined. MESSAGE_NOTIFICATION 426 places the "OSSGUI_REPLY" structure and the routing structure into an FML buffer to be later placed on a queue. MESSAGE_NOTIFICATION 426 obtains the name of the queue from the HDRTSYS field in the SMS header extracted from the incoming FML buffer. MESSAGE_NOTIFICATION 426 enqueues the FML buffer that contains the routing and "OSSGUI_REPLY" structures to the named queue. If the enqueue fails, MESSAGE_NOTIFICATION 426 writes an error to the error log and sends a message to PATROL 52 system.

5. Generating ACKS

MESSAGE_NOTIFICATION 426 performs acknowledges processing upon receipt of a transaction type of TRN_POSACK, TRN_CAR, or TRN_NEGACK. MESSAGE_NOTIFICATION 426 ensures that the originating system is of type "SOAC". If the originating system is not of type "SOAC", then an entry is written in the MI_LOG table 214. If the transaction type is TRN_POSACK, MESSAGE_NOTIFICATION 426 checks the HOL_CTL table 216 to ensure that the POSACK has not already been sent. If the POSACK has already been sent, MESSAGE_NOTIFICATION 426 will abort POSACK processing. MESSAGE_NOTIFICATION 426 will then attempt to remove the WTN LOCK. MESSAGE_NOTIFICATION 426 will build the POSACK text from the C3 header, reversing the RSYS and TSYS fields and obtaining a new TRN from the HOL_CTL table 216. If a NEGACK is being generated (transaction type of TRN_NEGACK), then error text is appended to the NEGACK text. MESSAGE_NOTIFICATION 426 extracts the name of the queue upon which to enqueue the message from the RSYS field in the ACK. MESSAGE_NOTIFICATION 426 will then enqueue the message. After successfully enqueuing the message, MESSAGE_NOTIFICATION 426 then updates the HOL_CTL table 216 to reflect that the message (POSACK, NEGACK, or CAR) has been sent. Finally an entry is written to the error log indicating the ACK has been successfully enqueued.

6. Activation Requests

MESSAGE_NOTIFICATION 426 performs activation request processing upon receipt of a transaction type of TRN_MANUAL, TRN_MANUAL_ERR, TRN_COMPLEX, TRN_HOLD, or TRN_CORRECT. If the transaction type is TRN_MANUAL, TRN_COMPLEX, TRN_HOLD, TRN_CORRECT, or TRN_MANUAL_ERR, MESSAGE_NOTIFICATION 426 writes an entry to the MI_LOG table 214 containing data obtained from the ERROR_CODE table and the "MESSAGE_NOTIFICATION 426" structure in the FML buffer. If the transaction type is TRN_MANUAL_ERR then MESSAGE_NOTIFICATION 426 will perform error handling as well (as if MESSAGE_NOTIFICATION 426 was called with TRN_ERROR_NOTICE). Note, there is no difference in processing between transaction types of TRN_MANUAL, TRN_COMPLEX, TRN_HOLD, and TRN_CORRECT.

7. Broadcasts

MESSAGE_NOTIFICATION 426 will perform broadcast processing upon receipt of a transaction type of TRN_BROADCAST. MESSAGE_NOTIFICATION 426 broadcasts a message to TUXEDO interfaces via the TPBROADCAST system call. The message to be broadcast be obtained from the MN_TRANS_TEXT field of the "MESSAGE_NOTIFICATION" structure contained in the incoming FML buffer. The user name and interface name needed for the call to TPBROADCAST is obtained from the SMS header structure in the incoming FML buffer.

8. TRANSLATION Requests

MESSAGE_NOTIFICATION 426 performs TRANSLATION 410 transactions upon receiving a transaction code of TRN_TRANSLATE. MESSAGE_NOTIFICATION 426 obtains the error text associated from the error number that was specified on the "MESSAGE_NOTIFICATION 426" structure in the incoming FML buffer. MESSAGE_NOTIFICATION 426 returns this buffer to the calling TUXEDO process.

9. Informational Messages

MESSAGE_NOTIFICATION 426 performs informational message processing upon receipt of a transaction type of TRN_INFO. MESSAGE_NOTIFICATION 426 will obtain an error code from the "MESSAGE_NOTIFICATION" structure in the incoming FML buffer and use this to read in the data associated with this error code. MESSAGE_NOTIFICATION 426 then merges the ERROR_TEXT from the ERROR_CODE table with any variable text provided in the "MESSAGE_NOTIFICATION" structure in the incoming FML buffer. MESSAGE_NOTIFICATION 426 then write an entry to the EDITS_ERROR table 212 using data obtained from the ERROR_CODE table and the "MESSAGE_NOTIFICATION" structure contained in the incoming FML buffer. If the alarm indicator field is set in the error code table, MESSAGE_NOTIFICATION 426 sends the error text associated with the given error code to PATROL 52 system.

10. PATROL Messages

MESSAGE_NOTIFICATION 426 performs PATROL message processing upon receipt of a transaction type of TRN_PATROL. MESSAGE_NOTIFICATION 426 obtains an error number from the "MESSAGE_NOTIFICATION 426" structure in the incoming FML buffer and use this error code to query data corresponding to this error code from the ERROR_CODE table. MESSAGE_NOTIFICATION 426 then merges the ERROR_TEXT from the ERROR_CODE table with any variable text provided in the "MESSAGE_NOTIFICATION" structure in the incoming FML buffer. The merged error text is then sent to PATROL 52 system and an entry is written to the error log using data from the ERROR_CODE table and the "MESSAGE_NOTIFICATION" structure in the incoming FML buffer.

B. TIP

TIP 402 accept input into the generic Order Management System, verifies that the data meets the minimum format and content requirements for processing, and to creates initial database table entries (in RAW_REQUEST tables 202) required for processing and control flow maintenance of the order. There are two types of input data: an order or a query. The order is queued to the DISPATCH service 404, whereas the query is sent via a TPCALL to the ROUTER service 418.

TIP 402 may be invoked by SOAC 20, GUI 42, SORD 18, or any other OSS system that processes an order through the generic Order Management system. The input to TIP 402 is a TUXEDO Header which may be in various formats, for example, FCIF from SOAC 20 (TAG data) and FML buffer views from the DG interface 318 and /WS interface 308. TIP 402 outputs include a TUXEDO Message and updates to the HOL_CTL 216 and HOL_FLOW tables 218. TIP 402 invokes TPCALL to ROUTER 418, TPENQUEUE to DISPATCH 404. In case of the occurrence of an error, TIP 402 calls MESSAGE_NOTIFICATION 426.

1. TIP Processing

Figure 15:
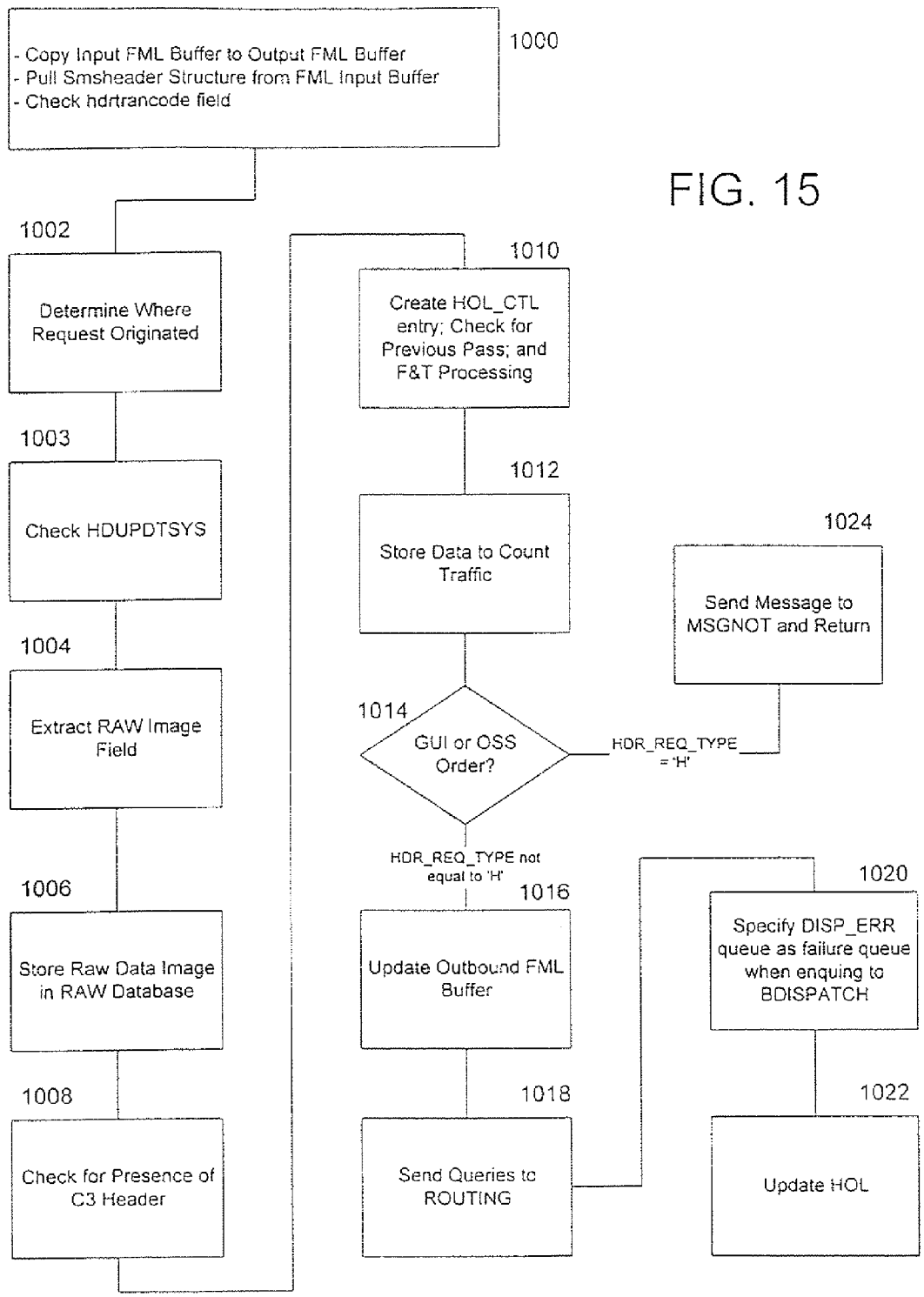
FIG. 15 is a flow chart of the logic flow of the processes and operations that may be performed by the TIP service of the present invention.

The processing performed by the TIP service 402 will now be described with reference to FIG. 15. Exemplary pseudo-code of the TIP service 402 is included as Appendix F. As noted above, the TIP service 402 performs processing operations by accessing the various databases using the database services 200 of the SMS 10 system.

Initially, at step 1000, TIP 402 copies the input FML buffer to the output FML buffer. Thereafter all changes are made to the FML output buffer. Next, the SMSHEADER structure is extracted from the FML input buffer. TIP 402 next checks the HDRTRANCODE field, and if it is equal to TRN_ROUTER, then the ROUTER structure is extracted from the buffer as well, or, alternatively, whatever buffers the HDRTRANCODE field indicates. Note that there may be a TEST type code which implies the HDRCORRID and HDRSEQKEY fields contain the values that should be used with the raw data to be inserted into the RAW_REQUEST table 202 (with the INT_SEQ_NUM provided). When enqueuing to DISPATCH 404 the CORRID field value is used.

At step 1002, TIP 402 determines where the request originates, and determines if the request is an update of a previous request or if GUI 42 or OSS 54 originated the request. TIP 402 also determines if the message is a query request or order entry. If ROUTER_FML is present and HDR_REQ_TYPE is equal to 'Q', then the request is a query. If this is a query request and the HDR_ORIG_TYPE is equal to 'OSS' 54, this request should be a NO TPRETURN request. For any query request, TIP 402 performs a TPFORWARD to the ROUTER service 418, rather than an enqueue to DISPATCH, 404. If ROUTER_FML is not present and HDR_REQ_TYPE is not equal to 'Q' then the request is an order.

Next, at step 1003, it is determined if the request is an update by checking the HDRUPDTSYS field. If the HDRUPDTSYS equals null/spaces, then the request contains values, and therefore is an update. The value of HDRUPDTSYS should be GUI, a valid SOAC system name, or a valid OSS system name. The HDR_REQ_TYPE may have other values which indicate the following:

HDR_REQ_TYPE="R" indicates that raw request data already exits in the database and has been updated and the data is being resent through the system with the same INT_SEQ_NUM (i.e., do not create HOL entries again; however, call CLEANUP routine to purge PCS, SAV, SAV2, and STEP data for that INT_SEQ_NUM).

HDR_REQ_TYPE="O" and HDRUPDTSYS is not equal to spaces indicates that PCS data is being resent with the same INT_SEQ_NUM (i.e., do not create HOL entries again, and call CLEANUP routine to purge SAV, SAV2, and STEP data for that INT_SEQ_NUM).

HDR_REQ_TYPE="O" and HDRUPDTSYS is equal to spaces indicates that the request is an original order. If HDR_ORIG_TYPE is equal to 'SOAC', then create raw entry (i.e., write to RAW_REQUEST), obtain INT_SEQ_NUN and create HOL_CTL. If HDR_ORIG_TYPE is equal to GUI or OSS, then RAW_REQUEST 202, INT_SEQ_NUM and PCS 204 data have already been created, but not an HOL_CTL, therefore, the incoming HDRSEQKEY is used to create the HOL_CTL entry.

HDR_REQ_TYPE="H" and HDRUPDTSYS equal to space indicates that the user wants to create an HOL_CTL record in hold status (i.e., ORDER_STATUS='H') using the incoming HDRSEQKEY.

HDR_REQ_TYPE="L" and HDRUPDTSYS is equal to space indicates this is an original order is a local only request. This is valid when HDR_ORIG_TYPE is equal to 'GUI' or 'OSS'. Therefore, RAW_REQUEST, INT_SEQ_NUM and PCS data have already been created, but not an HOL_CTL, therefore, the HDRSEQKEY is used to create an HOL entry.

At step 1004, TIP 402 performs a function to extract the RAW_IMAGE field. If present, the FML field is SOACMSG.

At step 1006, TIP 402 stores the raw data and other fields into the RAW_REQUEST database 202. As a result of this I/O operation, a unique internal sequence number called INT_SEQ_NUM is generated. This unique number is a key that is sent onto the next service (e.g., DISPATCH 404). It is also the value used as the CORRID when doing the enqueue request. Later, this CORRID value is passed back in the TPRETURN to the calling program.

TIP 402 then checks the raw data image for the presence of the C3 header section at step 1008, and if found, TIP 402 will extract the data fields. These fields are used for counting traffic. Also, TIP 402 will populate the SMSHDR with the values found in the C3 section if the input SMSHDR values are blank. If the C3_WC is blank, TIP 402 will use the HDR_ORIG_TSYS field to read the TSYS_REF table to find a default wire center (WC), which is placed into HDRWC.

TIP 402 creates an HOL_CTL entry at step 1010 for this request and fills in all fields for which it has information. It is possible that this request is subsequent pass for a previous request, and if so, the HOL entrees are chained together using INT_SEQ_NUM values. This is performed only for order requests, not queries. Chaining requires TIP 402 to find the previous pass and update its associated HOL_CTL next SEQ_NUM entry to the present pass's HOL_CTL, and to update this pass' prior SEQ_NUM to the previous request.

If the request is a SOAC 20 order, TIP 402 checks the FT and TRN fields in the parsed raw C3 section. If the fields are anything other than C3_FT=PRE and C3_TRN=1, then there may be a previous pass, and the HOL_CTL table 216 is checked with a select statement where HOL_TSYS is equal to RAW_C3_TSYS and HOL_CTL_ORDNO is equal to RAW_C3_ORDNO. If there are multiple rows retrieved, then the appropriate row contains the highest value of HOL_TRN which is less than C3_TRN.

If this request is an order and HDRUPDTSYS is not blank, then this request is an update to a previous request. Therefore, it is necessary to chain the previous pass. To perform this task, TIP 402 reads the HOL_CTL where HOL_CTL.TSYS is equal to PCS_C3_TSYS and HOL_CTL_ORDNO is equal to PCS_C3_ORDNO. If there are multiple rows retrieved, the appropriate row has the most recent timestamp and highest TRN number less then the current TRN pass.

It is also possible that a GUT 42 or OSS 54 request might be an update to a previous SOAC 20 originated message. In this case, the new HOL_CTL created for this pass of the order must contain the original SOAC_ID in the HDRORIGTSYS and HOL_CTL_ORIGINATING_SYSTEM, because a reply must eventually be sent to SOAC 20 when the POSACK is created. Thus, TIP 402 will populate the HOL_CTL_ORIGINATING_SYSTEM field and the HDRORIGTSYS with the originator of the order.

TIP 402 then stores data into the INPUT_COUNT table for both updates and queries at step 1012. If the present request is a GUI or OSS order request and the HDR_REQ_TYPE is equal to H at step 1014, then after creating the HOL_CTL entry the request does not proceed within the SMS 10 system, and a message is sent to MESSAGE_NOTIFICATION 426 noting the fact that a HOLD update came into the SMS 10. TIP 402 then returns to the top of the loop.

Otherwise, at step 1016, TIP 402 will update the appropriate data in the outbound FML buffer and send all queries to the ROUTER service 418 via a TPFORWARD. Requests having a HDRPRI field greater than or equal to two are placed into the Online queue destined for the DISPATCH service 404. All others are placed on the Batch queue. When enqueuing to DISPATCH 404 at step 1018, the DISP_ERR queue is specified as the failure queue. Activation requests are considered either Flow Through Activation Requests (FT AR) or Manual Assistance Activation Requests (MA AR). MA ARs will contain a C3 section and an IMG section. Message verification of the order content, other than the content of the C3 section, will not be performed.

TIP 402 updates the HOL_CTL at step 1022 for manual or flow through. There is a need in the case of a manual order to store the IMG section and its data into a separate table. Some data fields that need to be initialized are set to values depending upon input. For SOAC 20 updates, default HDRUSER_ID may be defaulted to the originating Bell Operating Company (BOC). Note that for all OSS 54 and GUI 42 requests the HDRUSER_ID field should be already filled in. For queries, TIP 402 derives RTMSGTYPE='QT' if RTTEMPLATE is not equal to spaces, else RTMSGTYPE is set equal to 'QC' if the value of RTWTN is not blank. This implies that RTWTN and RTTEMPLATE should not both be filled in on the same request. TIP 402 determines the RTNE for queries by looking up the WTN in the SWITCH_NE_XREF table for 'QC' type queries. For 'QT' types, TIP 402 will look up the template in the TEMPLATE_NE_XREF table. TIP 402 will set the HDR and HOL_ENTITY_TYPE field to a default value of, for example, 0000000000, and the current date and time is stored in RTSDATE.

2. Error Processing

If TIP 402 attempts to parse the RAW_REQUEST data and is not able to do so, TIP 402 sends a message to MESSAGE_NOTIFICATION 426 with a special MN_TRAN_CODE of 350. If an error occurs then an EDITS 412_ERROR entry is created and a TPCALL NOTRAN is performed to MESSAGE_NOTIFICATION 426. Alternatively, TIP 402 could do a return such that the transaction is considered in error and rejected. If the error is such that it is logged and processing continues, then a rejection of the message is not performed. In the error message text an attempt is made to indicate which part of the raw data caused the problem. In addition, TIP 402 marks HOL table with appropriate error information.

C. DISPATCH

The DISPATCH service 404 takes an incoming request (from TIP 402) from its message queue and processes that request. As shown, a separate DISPATCH service 404 exists for the Online queue and the Batch queue. In general, DISPATCH 404 investigates and forwards a request to the appropriate service (e.g., VERIFY 408).

The incoming data, which comprises the request to DISPATCH 404, has already been parsed by TIP 402. TIP 402 also has created a header structure for the message that will identify the type of request (e.g., query or update) and the originator (e.g., EASE, ECRS 14, SOAC 20, /WS). The structure of the requests that originate from SOAC 20 is in the Flexible Computer Interface Form (FCIF), and include, for example, SMSHEADER.

1. DISPATCH Processing

Figure 16:
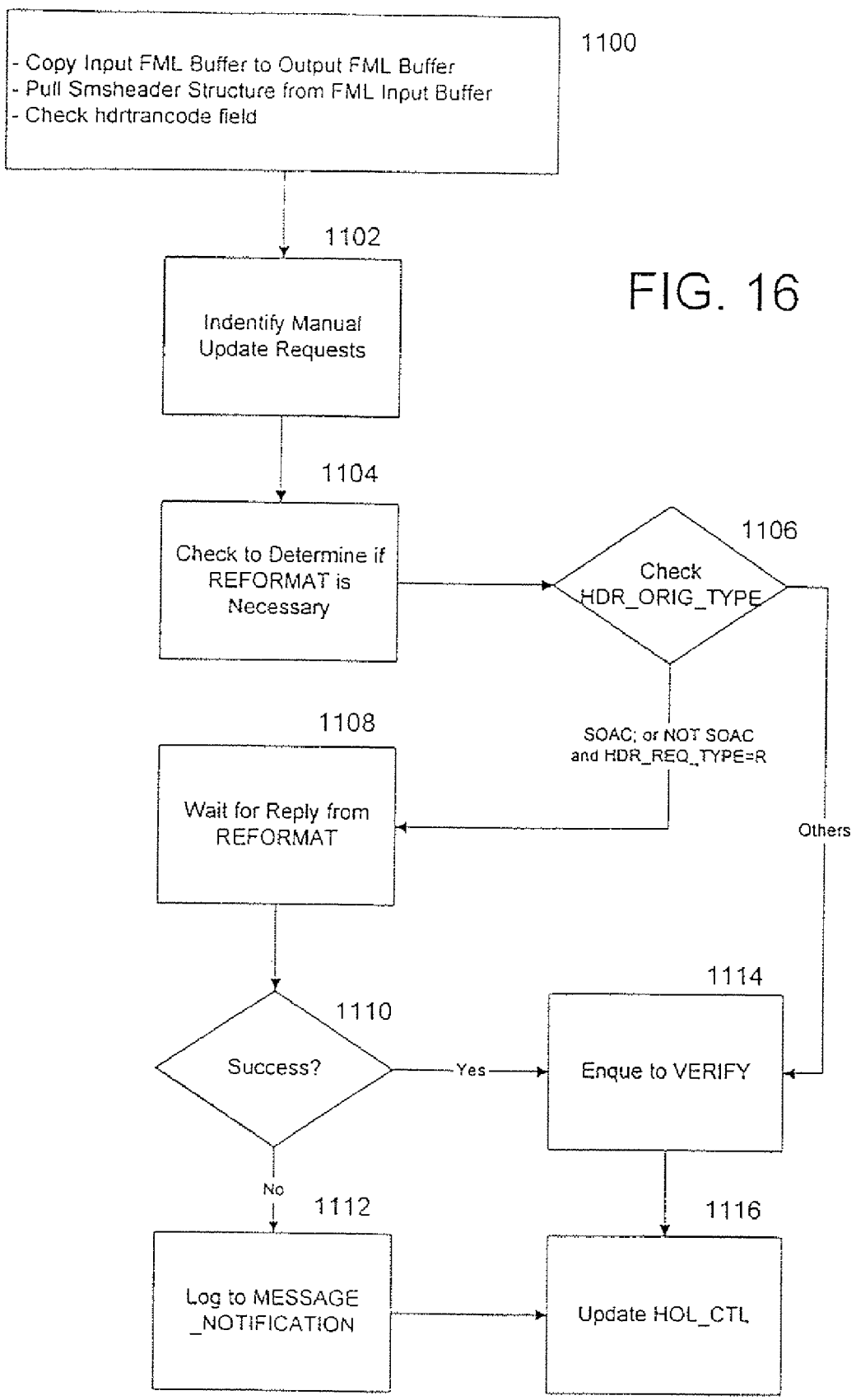
FIG. 16 is a flow chart of the logic flow of the processes and operations that may be performed by the DISPATCH service of the present invention.

The incoming data is processed as described below with reference to FIG. 16.

At step 1100, the DISPATCH service 404 first copies the input FML buffer to the output FML buffer. Thereafter all changes are made to the FML output buffer. DISPATCH 404 then extracts the SMSHEADER structure out of the FML input buffer and to check the HDRTRANCODE field. If the HDRTRANCODE is valid, then another structure might need to be extracted from the buffer as well.

This service will further identify any manual update requests at step 1102 by checking if HDRMT='M'. Manual updates are forwarded to MESSAGE_NOTIFICATION 426.

At step 1104 DISPATCH 404 checks if data-reformatting is necessary. For example, the service checks the HDR_ORIG_TYPE, and if the value is equal to 'SOAC', then a call to REFORMAT 406 is necessary. If the HDR_ORIG_TYPE is not 'SOAC', but HDR_REQ_TYPE='R', then the raw image is user updated and a call to REFORMAT 406 is also necessary.

If necessary, an update request is sent to REFORMAT 406 and DISPATCH 404 waits for reply at step 1108. Upon a successful reply (e.g., a 0 rcode value in TPCALL) at step 1110, the FML buffer returned from REFORMAT 406 is placed on a Verification queue at step 1114 (where other requests not needing reformatting are enqueued). If the priority (PRI) greater than or equal to two, then the reply is placed on the Online queue, otherwise the reply is placed on the Batch queue. If the reply from the REFORMAT service 406 is unsuccessful (e.g., a non 0 value in rcode) then DISPATCH 404 logs a message to the MESSAGE_NOTIFICATION service 426 at step 1112 and TPRETURN success.

Also, when DISPATCH 404 is enqueuing to the VERIFY service 408 at step 1114, it must specify the VER_ERR queue as the failure queue.

DISPATCH 404 updates the HOL_CTL log at step 1116 for all actions taken in this service and outputs an HOL_CTL update and a message to next service (forward type message) and/or event sent to MESSAGE_NOTIFICATION 426 and/or a queue entry, for example, via MESSAGE_NOTIFICATION 426.

2. Error Processing

If an error occurs then a error code is created and a TPCALL NOTRAN is made to the MESSAGE_NOTIFICATION service 426. At this point DISPATCH 404 will perform a TPRETURN with RVAL of TPSUCCESS or TPFAIL such that the transaction is aborted or committed. If the error is such that the program should retry in a few minutes, then a reply which causes a TPABORT is appropriate. If the error is such that processing should halt, then a reply which causes a COMMIT should be performed. If the error is such that its just logged and processing continues, then no reply is performed. In addition, DISPATCH 404 will set the ORDER_STATUS in the HOL_CTL table 216 to 'E'.

D. Data Reformat (REFORMAT)

The REFORMAT service 406 takes an incoming request from its message queue and processes that request. Exemplary pseudo-code of an implementation of the REFORMAT service 406 is included as Appendix G. In general, REFORMAT 406 takes the request, investigates it, and calls the appropriate sub-procedure based on the result of the investigation of the request. The sub-procedures are: SOAC Service Order Preprocessing (SOPP), GUI SOPP and OSS SOPP. A separate instance of REFORMAT 406 operates for the Online queue and Batch queue. As noted before, the structure of the incoming requests that originate from SOAC 20 is in the Flexible Computer Interface Form (FCIF).

The purpose of REFORMAT 406 is to convert the SOAC 20 FCIF service order image into a set of relational table rows stored in a hierarchy. The FCIF image is comprised of several sections denoted C3, ODR, SBR, and RSC. Because of the difficulty in manipulating hierarchical data stored as single string of text, REFORMAT 406 parses the FCIF image, and builds the Pieces (PCS) table entries. This function allows subsequent programs to process each telephone number (TN) on the order by individually processing the WTNs USOCs (services stored in the AINID field) and then processing each USOC's FID (Feature Identifier).

Figure 17:
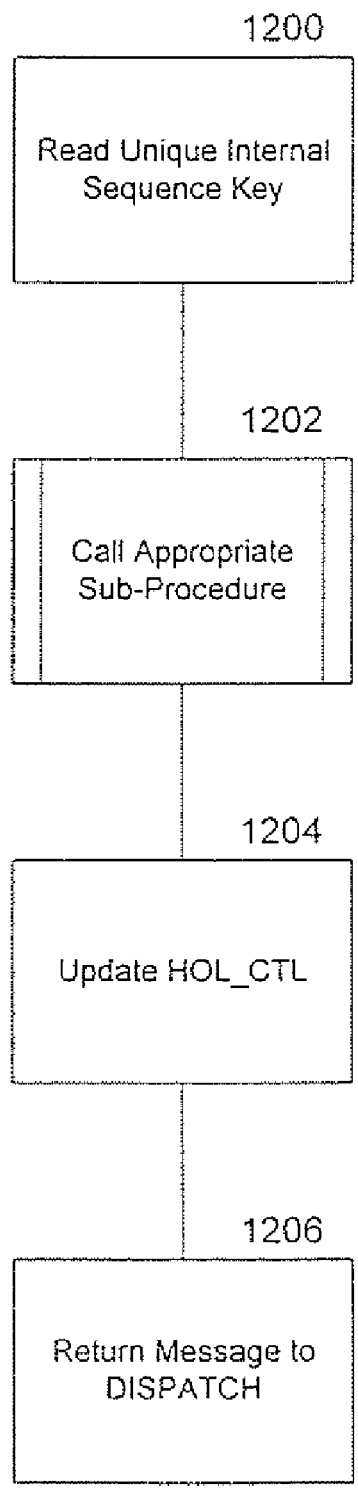
FIG. 17 is a flow chart of the logic flow of the processes and operations that may be performed by the REFORMAT service of the present invention.

Referring to FIG. 17, during the processing function performed by the REFORMAT service 406 at step 1200, the unique internal sequence key INT_SEQ_NUM is read in from the message queue. The key is used to read the RAW_REQUEST table 202. REFORMAT 406 calls the appropriate sub-procedure as noted above at step 1202, updates the HOL_CTL for all actions taken in this process at step 1204, and returns a message to DISPATCH 404 indicating if REFORMAT 406 was successful at step 1206.

Output from the REFORMAT service 406 is written to the PCS database 204 tables, an HOL update, and a return message to DISPATCH 404.

If an error occurs a error code is created and a event sent to MESSAGE_NOTIFICATION 426 for routing. The error message text indicates which part of the raw data caused the problem, and the HOL_CTL table 216 ORDER_STATUS is set to 'E'.

1. SOAC Portion Processing

SOPP is a subroutine initiated when a SOAC Service Order is sent to SMS 10. SOPP retrieves the Service Order text from the RAW_REQUEST database 202 using the INT_SEQ_NUM number associated with the entry which was passed in the message to SOPP via TUXEDO.

SOPP breaks the FCIF RAW REQUEST into logical service order sections and writes each to the PCS database 204. Each row uses INT_SEQ_NUM as its primary key, which is then passed to the next server. SOPP does not verify the content of the RAW_REQUEST; however, if SOPP cannot parse the RAW_REQUEST, an error is issued to RCMAC/GUI 42 which must be resolved by correcting the RAW_REQUEST or by regenerating the request through SOAC 20.

When SOPP has completed processing the Raw Request, it enqueues a message containing the INT_SEQ_NUM number for the GOM message verification server called VERIFY 408.

Figure 18:
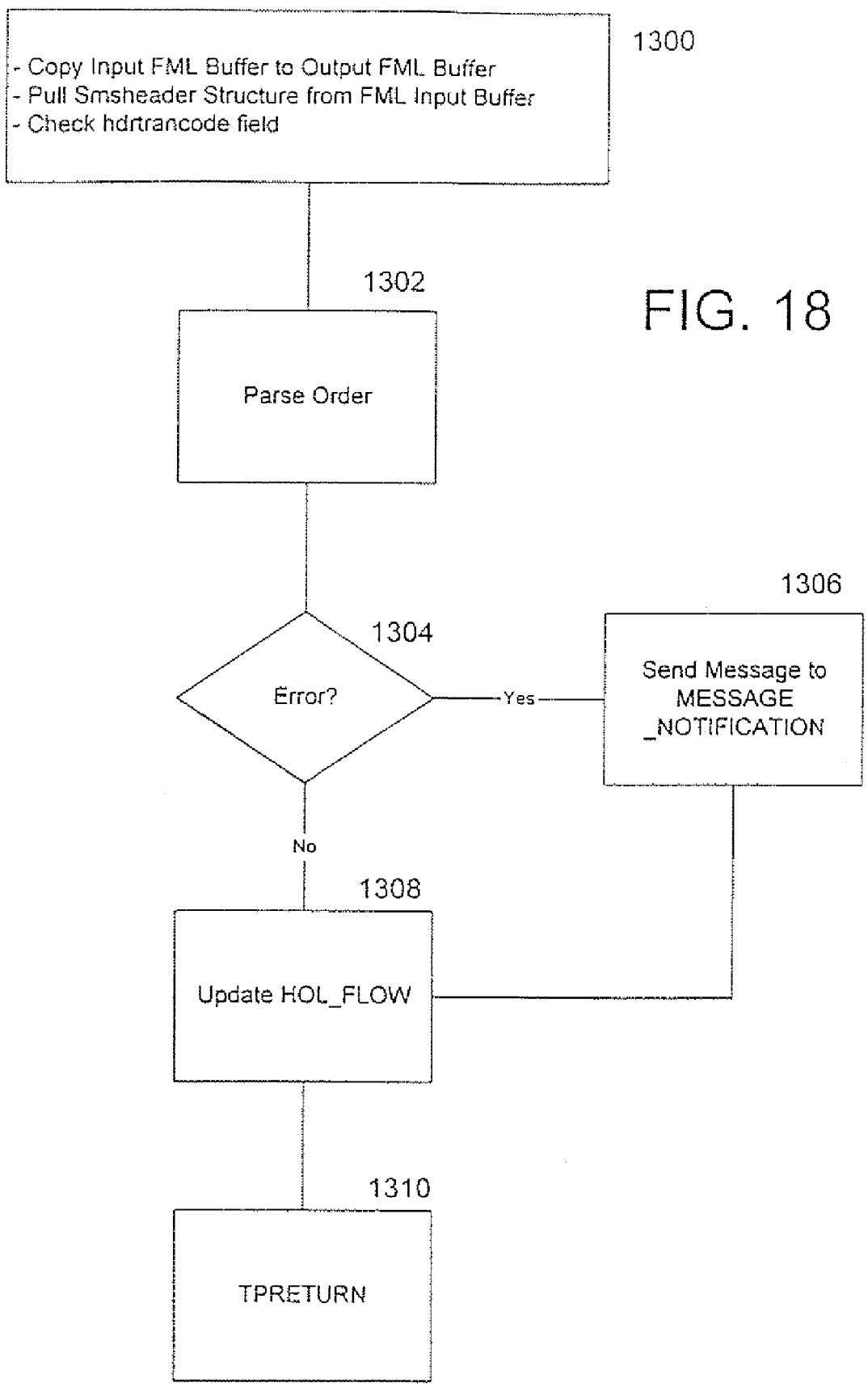
FIG. 18 is a flow chart of the logic flow of the processes and operations that may be performed by the SOPP sub-routine of the present invention called by REFORMAT.

Referring to FIG. 18, at step 1300, the SOAC Portion service first copies the input FML buffer to the output FML buffer. Thereafter all changes are made to the FML output buffer. The SOAC Portion then extracts the SMSHEADER structure out of the FML input buffer and to check the HDRTRANCODE field. If the HDRTRANCODE is valid, then another structure might need to be extracted from the buffer as well.

The unique INT_SEQ_NUM is read from this function's message queue, and used to read the raw image table. The order is parsed at step 1302 and the REFORMAT service 406 looks for delimiters, required sections and data element presence, and checks for unrecognizable data items. These data elements are parsed and put into field level data in database tables. Sections which may appear on an activation request are C3 (Control Header Section), ODR (Order Section), SBR (Subscriber Section), RSC (Resource Section), IMG (Image Section), and GP (Group Section). The function will check the incoming TSYS in the C3 section of the order against the valid SOAC 20 table. REFORMAT 406 will also check the RSYS in C3 section of the order against a parameter that this program reads in at startup time to ensure the message is being sent to the correct SMS 10.

If at step 1304 REFORMAT 406 is unable to parse the data, REFORMAT 406 sends an error to MESSAGE_NOTIFICATION 426 at step 1306 with a special MN_TRAN_CODE value of, for example, 350. At step 1308, the REFORMAT service 406 updates the HOL_FLOW entry for this service order.

Note, if COR='W' in this RES/REC, it is not written to the PCS database 204. There may be a need to send a special message structure to the server to indicate system administration issues. One would be a message that means to dump all memory tables and reload them if allowed. Another is to prevent processing orders for a specific SOAC system until further notice. Another would be to start processing the SOAC system again. Any fields that are not yet populated in the SMSHDR structure must be populated prior to copying the incoming FML buffer onto the outbound FML buffer. At step 1310, under normal processing a TPRETURN is done to exit the program.

Outputs from the SOAC portion of REFORMAT 406 are written to the PCS database 204 tables, an HOL entry is made, and TPRETURN and/or event sent to MESSAGE_NOTIFICATION 426.

2. Error Processing

If an error occurs then a error code is created and a TPCALL NOTRAN is made to the MESSAGE_NOTIFICATION service 426. At this point the SOAC 20 portion will perform a TPRETURN with RVAL of TPSUCCESS or TPFAIL such that the transaction is aborted or committed. If the error is such that the program should retry in a few minutes, then a reply which causes a TPABORT is appropriate. If the error is such that processing should halt, then a reply which causes a COMMIT should be performed. If the error is such that its just logged and processing continues, then no reply is performed. In addition, DISPATCH 404 will set the ORDER_STATUS in the HOL_CTL table 216 to 'E'.

E. VERIFY

This service takes the request and performs certain content tests against the data. This service receives a message from the queue, verifies the accuracy of the data received, and then forwards it on to the TRANSLATION service 410. Exemplary pseudo-code of an implementation of the VERIFY service 408 is included in Appendix I.

The input data to VERIFY 408 is read from the PCS database 204. The data read may have been placed into the PCS database 204 from multiple sources, which include, SOAC 20, OSS 54, RCMAC/GUI 42, etc. However, the source of the data is not relevant to the processing performed by the VERIFY service 408. VERIFY 408 editing is table driven to provide flexibility in introducing new fields/edits.

1. VERIFY Processing

Figure 19:
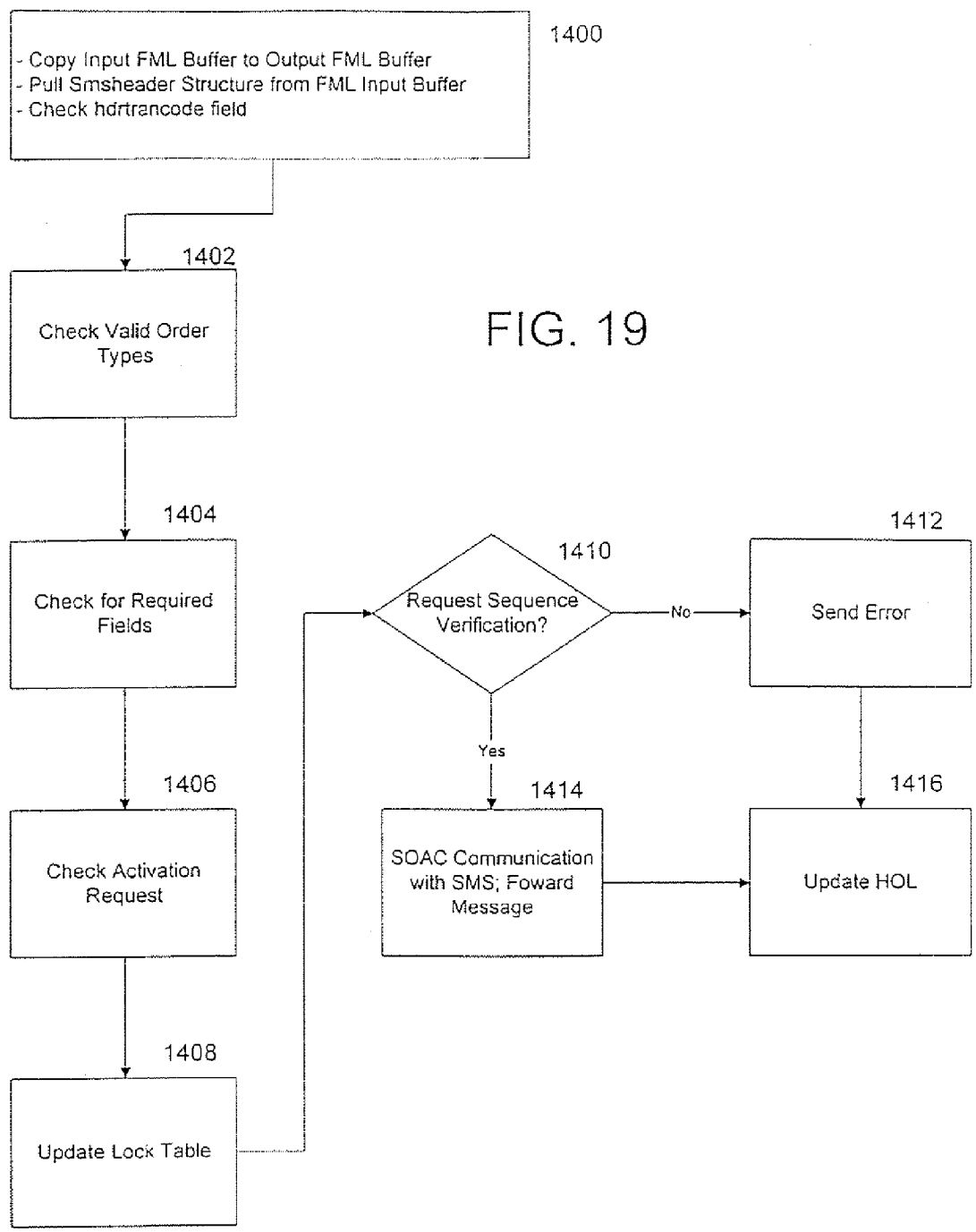
FIG. 19 is a flow chart of the logic flow of the processes and operations that may be performed by the VERIFY service of the present invention.

Referring to FIG. 19, at step 1400, the VERIFY service 408 first copies the input FML buffer to the output FML buffer. Thereafter all changes are made to the FML output buffer. VERIFY 408 then extracts the SMSHEADER structure out of the FML input buffer and to check the HDRTRANCODE field. If the HDRTRANCODE is valid, then another structure might need to be extracted from the buffer as well.

The only GUI_OSS_MSG structure this function should get is where GUI_REQ_TYPE is equal to 'R', 'O', 'S' and 'L'. Other values result in an error message and TPCOMMIT. The valid values for the field are: 'O' (order), 'Q' (query), 'H' (hold update), 'L' (local only update), 'S' (resubmit PCS), and 'R' (raw image update).

At step 1402, valid order types are checked. These are 'N' (Newconnect), 'D' (Disconnect), 'F' (From), 'T' (To), 'C' (Change), and 'R' (Record). Next, at step 1404, the HOL_CTL table 216 is marked with the order type and the required fields are checked within the sections as well as their allowable values.

VERIFY 408 then updates the WTN_LOCK table at step 1408 with WTNs on the order. This is performed to prevent concurrent processing of a WTN by two requests. If an entry for the same WTN is found in the WTN_LOCK table for a different order, the transaction is aborted to be retried at a later time.

SOAC 20 will communicate with the SMS 10 by using a set of activation requests over the lifetime of a service order. Each activation request is assigned a function type which will identify the general function of the order: PRE (Pre-Completion), COR (Correction), CAN (Cancellation), PCN (Post-Completion Notice), or CPC (Correction Post Completion). In most cases, at least two activation requests are sent to the SMS 10 from SOAC 20 for a service order. The first activation request to the SMS 10 will contain a function type of PRE. SOAC 20 will expect an activation response from the SMS 10 which will notify SOAC 20 to provision the trigger(s) in MARCH 22. SOAC 20 will then send an activation request with a function type of PCN to the SMS 10. There are variations to this, i.e., SOAC 20 could send a PRE, followed by one or more CORs, followed by a CAN. In addition, SOAC 20 will only send one pass of the order to the SMS 10 for 'R' orders. 'R' orders will contain a function type of PRE.

Request sequence verification is performed at step 1410, and will determine that the order of activation requests received from SOAC 20 is correct and that the SMS 10 did not somehow miss an activation request at step 1414. This can be done by examining the function type along with the TRN (Transaction Number) which is available in the C3 section. The TRN is sent to the SMS 10 with a value of 1 for the first activation request. The TRN value is incremented by one for each subsequent activation request sent at step 1412 to the SMS 10 for the same order. When out-of-sequence conditions are encountered, error messages are sent to the alarm log. Further processing of the activation request in error is halted and the RCMAC/GUI 42 should resolve the problem.

VERIFY 408 updates the HOL table when appropriate at step 1416, and outputs field level data in database tables for OLD view (PCS database 204). VERIFY 408 sends a message to next service (forward type message) and/or event sent to MESSAGE_NOTIFICATION 426.

2. Error Processing

If an error occurs then a error code is created and a TPCALL NOTRAN is made to the MESSAGE_NOTIFICATION service 426. At this point the service will perform a TPRETURN with RVAL of TPSUCCESS or TPFAIL such that the transaction is aborted or committed. If the error is such that the program should retry in a few minutes, then a reply which causes a TPABORT is appropriate. If the error is such that processing should halt, then a reply which causes a COMMIT should be performed. If the error is such that its just logged and processing continues, then no reply is performed. In addition, DISPATCH 404 will set the ORDER_STATUS in the HOL_CTL table 216 to 'E'.

F. TRANSLATION

TRANSLATION 410 reads the PCS database 204 for an activation request and translates the data into the Saved View (SAV 206) tables. Exemplary pseudo-code of an implementation of the TRANSLATION service 410 is appended as Appendix J.

An activation request may contain multiple WTN updates. All WTN updates associated with an activation request is translated by TRANSLATION 410 to the Saved View (SAV 206) database prior to notifying the EDITS service 412 to begin. The primary processing performed by TRANSLATION 410 is DIFFERENCING (i.e., determining net changes), parsing of FID data, merging supplemental data, Soft COR/CAN processing, and the creation of the Saved View (SAV 206).

The purpose of TRANSLATION 410 is twofold. First, TRANSLATION 410 parses and validates FID data, and second, TRANSLATION 410 performs exception processing such as F and T order matching (to be described in further detail below), correction order processing, order cancellation, LSP order matching, and number change processing. Depending upon the specific scenario TRANSLATION 410 forwards a message to EDITS 412 or terminates processing via a message to MESSAGE_NOTIFICATION 426.

As discussed hereinbefore, TRANSLATION 410 is invoked by TPFORWARD from VERIFY 408 or TPFORWARD from FNTMON, and invokes EDITS 412 via TPFORWARD, calls ValidateUSOC, and calls ValidateFIDData. To perform error handling, TRANSLATION 410 calls MESSAGE_NOTIFICATION 426. Inputs to TRANSLATION 410 include TUXEDO Header and PCS tables 204. Outputs from TRANSLATION 410 include SAV tables 206 (e.g., SAV_ODR, SAV_WTN, SAV_ACTION, SAV_USOC, SAV_FID), HOL_FLOW, EDITS 412_ERROR. In addition, TRANSLATION 410 updates HOL_CTL.

The SOAC 20 activation request contains both an Old view and a New view of customer service/subscription information. SOAC SOPP, OSS SOPP or GUI SOPP (discussed above) retrieves the Old View and populates the PCS database 204 Old View. TRANSLATION 410 compares the Old View to the New View and determines the net changes. Along with determining the net changes, TRANSLATION 410 derives the Action, for example, Add, Delete, or Modify. Determining the net changes are referred to as DIFFERENCING. A Saved view (SAV 206) is created containing only the changes being provisioned as opposed to the entire New View stored in the PCS database 204.

In most cases, the SOAC 20 SOPP, GUI 42 SOPP, or OSS 54 SOPP performs the parsing of the data to create "fielded" data in the PCS database 204. However, the SOPPs do not parse FID data. A FID is received with a FID value. The SOPP will store the entire FID value in the FID data table. The FID value could include, for example, an embedded table such as the screening list for Selective Call Acceptance (SCA). The FID value is specific to the service, thus it may not have a standard format or utilize standard delimiters. TRANSLATION 410 contains service specific logic to parse the FID values based on table-driven parameters which the SOPP did not parse such that SOPP processes remain generic and do not contain service specific logic.

Supplemental data may be received via a separate interface such as the User Interface (OSS) or the GUI Client Interface 308 (RCMAC/GUI 42, NOC, CNOC, or Software Centers). Supplemental data is subscription data relating to a SOAC 20 activation request. The two inputs, SOAC 20 activation request and the GUI 42/UI supplemental activation request, are merged into one Saved view. It is possible to receive either the SOAC 20 activation request first or the GUI 42/UI supplemental activation request first. If both inputs have not been received, TRANSLATION 410 is performed and further processing is halted until the other input is received.

Special processing is required for COR or CAN passes via the BACKOUT service 432 (to be described hereinafter). If a Soft COR or CAN pass is received from SOAC 20, TRANSLATION 410 will remove the SAV, SAV2 and STEP database records from the previous pass via the BACKOUT service 432. A Soft COR or CAN occurs when provisioning of the previous pass of the activation request has not begun. A COR pass is a complete new pass and does not build upon the previous pass. Thus, if provisioning has not begun, the COR pass is used to provision from and the previous pass can be removed. For a Soft COR, the previous pass's HOL_CTL will need to be marked as complete ('C'). If a Soft CAN is received, the activation request is marked as complete in the HOL and no further processing is performed. Hard COR and CAN passes occur when some or all provisioning has been performed. Complicated Hard COR passes are sent to MESSAGE_NOTIFICATION 426 for manual handling by the RCMAC/GUI 42. Complicated refers to orders containing a mix of activities, i.e., inward, outward, trigger changes, template changes, or a combination of different Network Element sources such as SPACE 24 or VAD 32, etc.

The input data is read in from the PCS database 204. All errors on an order are identified unless the error is so significant that continued processing should not be attempted. TRANSLATION 410 stores the errors in a table called EDITS 412_ERROR. This table is read by MESSAGE_NOTIFICATION 426 when the ERROR_NOTICE transaction is sent at the end of this program, or when it encounters an error so significant that the program should stop.

1. TRANSLATION Processing

Figure 20:
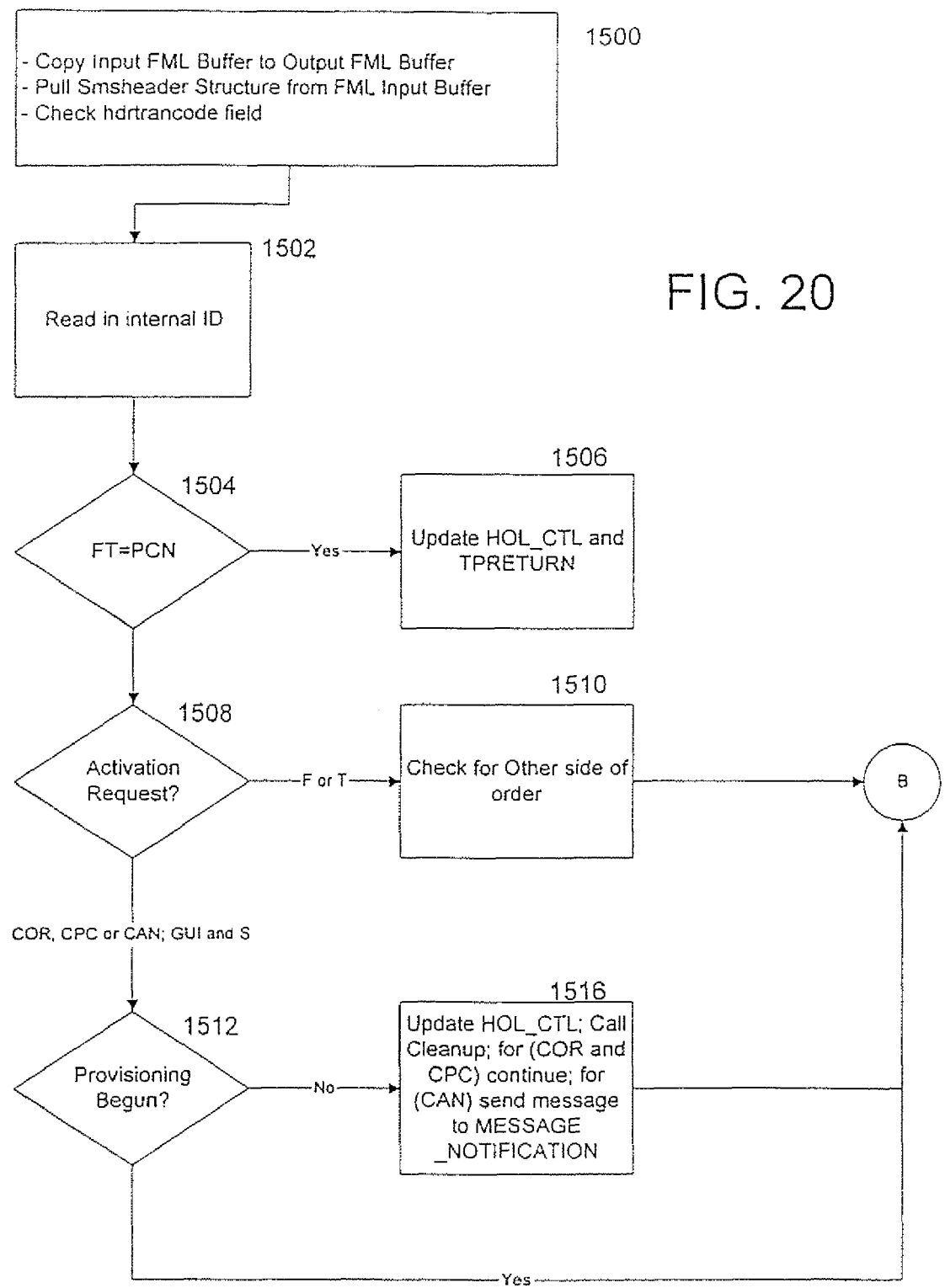
FIGS. 20 and 21 are a flow charts of the logic flow of the processes and operations that may be performed by the TRANSLATION service of the present invention.
Figure 21:
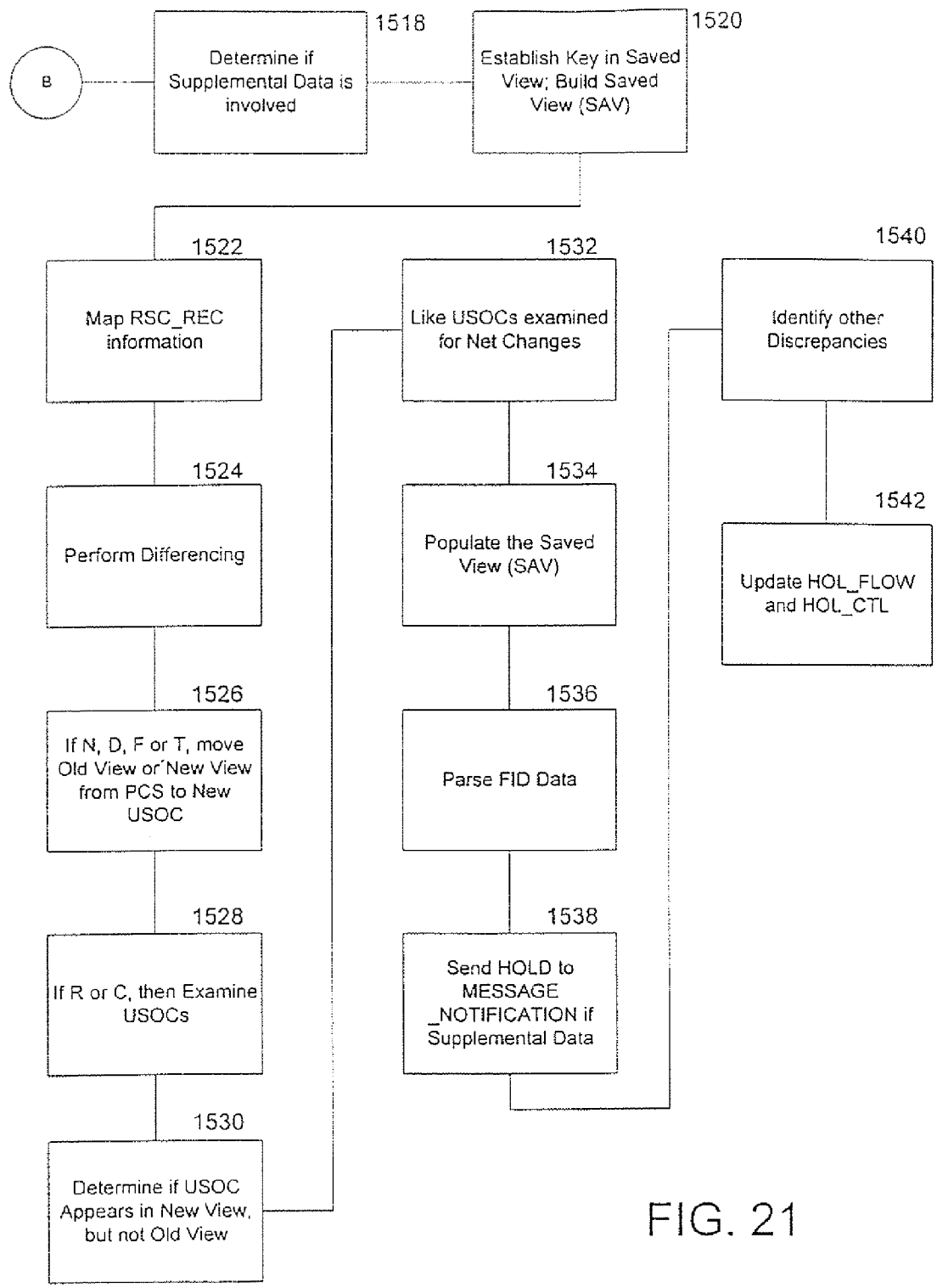

Referring to FIGS. 20 and 21, at step 1500, the TRANSLATION service 410 first copies the input FML buffer to the output FML buffer. Thereafter all changes are made to the FML output buffer. TRANSLATION 410 then extracts the SMSHEADER structure out of the FML input buffer and to check the HDRTRANCODE field. If the HDRTRANCODE is valid, then another structure might need to be extracted from the buffer as well.

The unique 10 digit INT_SEQ_NUM is read in from HDRSEQKEY at step 1502. That key is used to read the PCS database 204 and the HOL. If FT='PCN' at step 1504, then TRANSLATION 410 will update the PCN date on the HOL_CTL log, at step 1506 where TRANSLATION 410 then performs a TPRETURN TPSUCCESS as no further processing is required. If HDR_REQ_TYPE is not equal to 'SOAC 20', then TRANSLATION 410 reads the current active view for each WTN on the order and store in OLD side of USOC, FID, and FID-data tables at step 1508.

If the activation request is (FT=COR, CPC, or CAN, and HDRORIGTSYS is equal to SOAC 20) or (HDRTSYS=GUI 42 and GUI 42OSS_REQ_TYPE is equal to S), then TRANSLATION 410 queries the HOL_CTL_PROVISIONING_STARTED using the OT, ORDNO, TSYS at step 1512 to determine if provisioning has already begun on the previous pass of the order.

If provisioning has not started it is considered a soft request at step 1516. TRANSLATION 410 updates the HOL_CTL for the previous pass with a completion date and changes the order level status to completed, and then calls the CLEANUP routine to delete the previous pass's SAV, SAV2, STEP entries, manual work entries (called MI_LOG) marked as completed, EDITS 412_ERROR entries and to delete any queue entries. For COR and CPC requests, TRANSLATION 410 continues the normal processing on the current pass. For CAN, TRANSLATION 410 sends a message to MESSAGE_NOTIFICATION 426 INDICATING that the order has been canceled and return to get next request.

If the OT is equal to F or T (i.e., indicating F and T processing), TRANSLATION 410 must check if the corresponding order exists. If the corresponding order does not exist and the order is due after the current day, then this order is enqueued to the FNT queue to wait for the corresponding order until the due date arrives. When the corresponding order arrives, or when the entry on the FNT queue reaches its due date/time, the order(s) is processed by TRANSLATION 410. TRANSLATION 410 will need to difference between the Old side of the F order and the New side of the T order. TRANSLATION 410 will determine the net changes between the two orders. If it is determined there are no net changes, then TRANSLATION 410 will call TAR to initiate a POSACK on both orders.

At step 1518, TRANSLATION 410 will determine whether Supplemental Data is involved in the order. There is Supplemental Data if the SF_FID is present with a value of Y. This is true regardless of where the request came from, e.g., SOAC 20, GUI 42, or another user interface (UI). Supplemental Data is associated with a Service Order by the Order Type, Order Number, and Billing Telephone Number (BTN) which is identical on both inputs. If supplemental data is involved, TRANSLATION 410 determines if the other input has already been received. If so, the data on the activation request being worked is mapped to the Saved View (SAV 206) of the previous request received. The data on each input is merged at the WTN level. The database Key of the first request received is used rather than deleting the first request and reinserting the request with a new key. If supplemental data is involved, and the other data input has not been received yet, a Saved View is created using the database key of the request being worked.

At step 1320, the Key is established in the Saved View if the initial entry is being built. The Key will contain the database Key, OT, ORDNO, TRN, TSYS. In addition, populate a create date and create time. TRANSLATION 410 will build or modify a Saved View by first mapping selected information from the PCS C3 Section table, and the ODR Section table. Information which is retained permanently, necessary for provisioning, or which is necessary to create an acknowledgment is retained in the Saved View. This includes, for example, INT_SEQ_NUM, TRN, CORS, ORDNO, OT, PRI, RSYS, TSYS, COR, DD, DIFF, FDT, ITN, OTN, SF, CS, ISUS, OSUS, IDNP, and ODNP. This is information which is common to all WTNs on an order and only needs to be stored once.

In accordance with the WTN within an Order from the PCS database 204 TRANSLATION 410 maps RSC REC information from the PCS RSC REC Aggregate table to the WTN in the Saved View at step 1522. The WTN will always be the CTID with an ACT of N (New) in the PCS database 204. TRANSLATION 410 populates the Saved View WTN table with the CTC, COR (if present), and Typist ID (if UI or GUI 42 update). Also, the WTN_OLD table should be populated if the PCS database 204 contains both an ACT='O' and an ACT='N', and the CTID differed between the two. Populate the WTN State with an S for Saved.

At step 1524, TRANSLATION 410 performs DIFFERENCING between the Old USOC/FID/FID Data and the New USOC/FID/FID Data to determine the net changes. DIFFERENCING will not be necessary on SOAC 20 order types of N, D, F, or T. These types of orders will contain only an Old View or a New View. In this case, TRANSLATION 410 either moves the Old View or New view from the PCS database 204 to the New USOC view in the Saved View.

At step 1526, an 'N' or 'T' order will contain a CTC code of B (build), and thus should be stored in the Saved view (SAV 206) with an Activity code of A (Add). A 'D' or 'F' order will contain a CTC of R (removal), and is stored in the Saved view with an Activity code of D (Delete). At step 1528, for 'R' or 'C' order types, TRANSLATION 410 examines USOCs between the Old view and the New view in the PCS database 204. If a USOC appears under the Old view and does not appear under the New view, TRANSLATION 410 places the USOC in the Saved View with an Activity code of D. At step 1530, if a USOC appears under the New view, but does not appear under the Old view, TRANSLATION 410 places the USOC (and associated FID/FID data) under the Saved View with an Activity code of A. Like (i.e., same) USOCs identified in the Old and New views are further examined at step 1532 to determine if there are FID changes. If there are no changes, TRANSLATION 410 does not place the recapped USOC in the Saved view. If there are changes to the associated FID/FID data, TRANSLATION 410 at step 1534 places the USOC/FID/FID data from the ACT='N' on the Saved View with an Activity code of C (Change). If there are no net changes for the USOC(s) and FID(s) when comparing the Old view and New view, then TRANSLATION 410 does not store any data for this WTN to the SAV database 206 and deletes the entry in HOL_WTN for this WTN. If this was the only WTN on the order, TRANSLATION 410 initiates a POSACK.

In most cases, USOC/FID/FID data with the Activity Code of C in the Saved View will contain only a New view. An exception to this is the Voice Activated Dialing (VAD 32) service. For VAD 32 service changes, TRANSLATION 410 places the Old View under the Old USOC/FID/FID data and the New View under the New USOC/FID/FID data. On the Provisioning Activation Request, both the Old and New View are sent to the NE for VAD 32 only.

Information which is populated in the Saved View Action table at step 1534 includes the Activity (e.g., A, D, C). Information which is mapped to the Saved View USOC table includes the TIID, and AINID. For each AINID added to the Saved USOC table, TRANSLATION 410 will generate a USOC ID. Information retained in the Saved View FID table (SAV_FID) is the FID. For each FID added to the Saved FIDS table, TRANSLATION 410 will generate a FID ID. Each FID entry is populated with the appropriate USOC ID. Information stored in SAV_FID data table is USOC ID, FID ID, FID Action, and FID data. If there are multiple FIDs for a USOC, each FID in the SAV_FID table will contain the same USOC ID, but unique FID IDs.

TRANSLATION 410 will parse FID data when necessary at step 1536. The various SOPP processes will parse FID/FID data to a certain extent. The SOPP process will parse single element FID data items such as Pin Number. For example, the Override Pin Number for SCA is sent as PIDO=9999. The SOPP process will place the PIDO FID and the 9999 FID data in the PCS_RSCFID table. The SOPP process will not parse multiple element FID data such as the SCNL embedded table. Changes to the screening list may be sent as, for example, SCNL='Add' 314 235-4444, 314 235-5555, 314 235-6666. SOPP would store 'SCNL' and 'Add' 314 235-4444, 314 235-5555, 314 235-6666 in the PCS_RSCFID table. TRANSLATION 410 will parse the remaining FID data. Each entry in the embedded table will retain the action (Add or Rem). TRANSLATION 410 repeats the Add action on each element as appropriate. In this case, there can be a mixture of actions within one SCNL FID.

If Supplemental data is included on the Service Activation Request being worked, and the request in progress is the second input, TRANSLATION 410 merges the second input into the previously Saved View. If Supplemental data is included, but only the first input has been received, an initial Saved View is created and the merge processing is not necessary at this time TRANSLATION 410 then sends a HOLD transaction to MESSAGE_NOTIFICATION 426 at step 1538. Typically, if the supplemental data feed is being utilized, the service order will contain the service USOCs and the supplemental data feed will contain the subscription information. Of course, the supplemental data feed will identify the USOC, WTN, and Service Order Number with which to associate the update. The potential does exist for subscription data changes to be placed both on the service order and on the supplemental data. In this case, if the subscription data changes and the service order changes are to different data fields, TRANSLATION 410 will continue to process the request. If, however, the changes are for the same data fields and contain different data, TRANSLATION 410 will assume that one of the changes was generated in error, and TRANSLATION 410 will generate an error for the entire request. If in error, a message is sent to MESSAGE_NOTIFICATION 426. If the request was from SOAC 20, MESSAGE_NOTIFICATION 426 will generate a NEGACK to SOAC 20. Otherwise, an error message is sent to the appropriate user, i.e., OSS 54 or GUI 42.

Other discrepancies may be identified at step 1540 between information received from SOAC 20 and data received via the supplemental data flow. Not all billable USOCs or involved WTNs are accounted for on the order. The supplemental subscription data may contain information to add a new service, while the service order does not specify a USOC to add. Also, the supplemental subscription data can specify services to add or delete for a particular WTN, while the service order may not include the WTN. Errors is sent to the user who sent the most recent update.

If both inputs for a request involving supplemental data have been received and a Soft COR pass is received from SOAC 20, TRANSLATION 410 will delete the previously created Saved View. The current activation request, whether it is a SOAC 20 activation request or a OSS 54/GUI 42 update, is processed. In addition, the other input which did not receive a COR pass is retrieved from PCS and merged into the new Saved view.

On a soft CAN and a PCN, TRANSLATION 410 marks the HOL_CTL as complete. For a soft CAN, TRANSLATION 410 issues a Cancellation Activation Response (CAR) message to SOAC 20 via MESSAGE_NOTIFICATION 426 and no further processing would be performed. For a PCN, TRANSLATION 410 will mark the HOL as complete and no further processing would be performed.

If the due date (DD) in the PCS_ODR table is X or W, then TRANSLATION 410 will halt further processing. However, TRANSLATION 410 will not issue an error message at this time, but rather just wait for a COR pass by setting the HOL_CTL_ORDERSTATUS='H'. If SF in the PCS_ODR table is equal to Y, and both inputs have not been received by the SMS 10, TRANSLATION 410 should halt further processing setting the HOL_CTL_ORDERSTATUS='H'. Note, that the end of day processing, described hereinafter, will identify those Saved activation requests pending due dates or supplemental data, and place the appropriate information on a report. Provisioning will always wait until the SMS 10 receives a DD or a CAN, or Supplemental Data when pending for supplemental data.

In most cases, a Saved view is created as an output. The Saved view contains the activity which needs to be provisioned.

If errors are identified, either a NEGACK transaction is sent to MESSAGE_NOTIFICATION 426 or an manual work entry transaction is sent to MESSAGE_NOTIFICATION 426.

If Supplemental data is involved and both data inputs have not been received, or if an order contains a Due Date of X or W, further processing will wait by setting the HOL_CTL_ORDERSTATUS='H'.

At step 1542, TRANSLATION 410 updates HOL_FLOW and HOL_CTL with the completed or erred processing information, as appropriate. If TRANSLATION 410 completes successfully, TRANSLATION 410 performs a TPFORWARD of the transaction to EDITS 412. However, if a Hard CAN was received, TRANSLATION 410 calls BACKOUT 432 rather than TPFORWARDING EDITS 412.

2. F&T Processing

Figure 22:
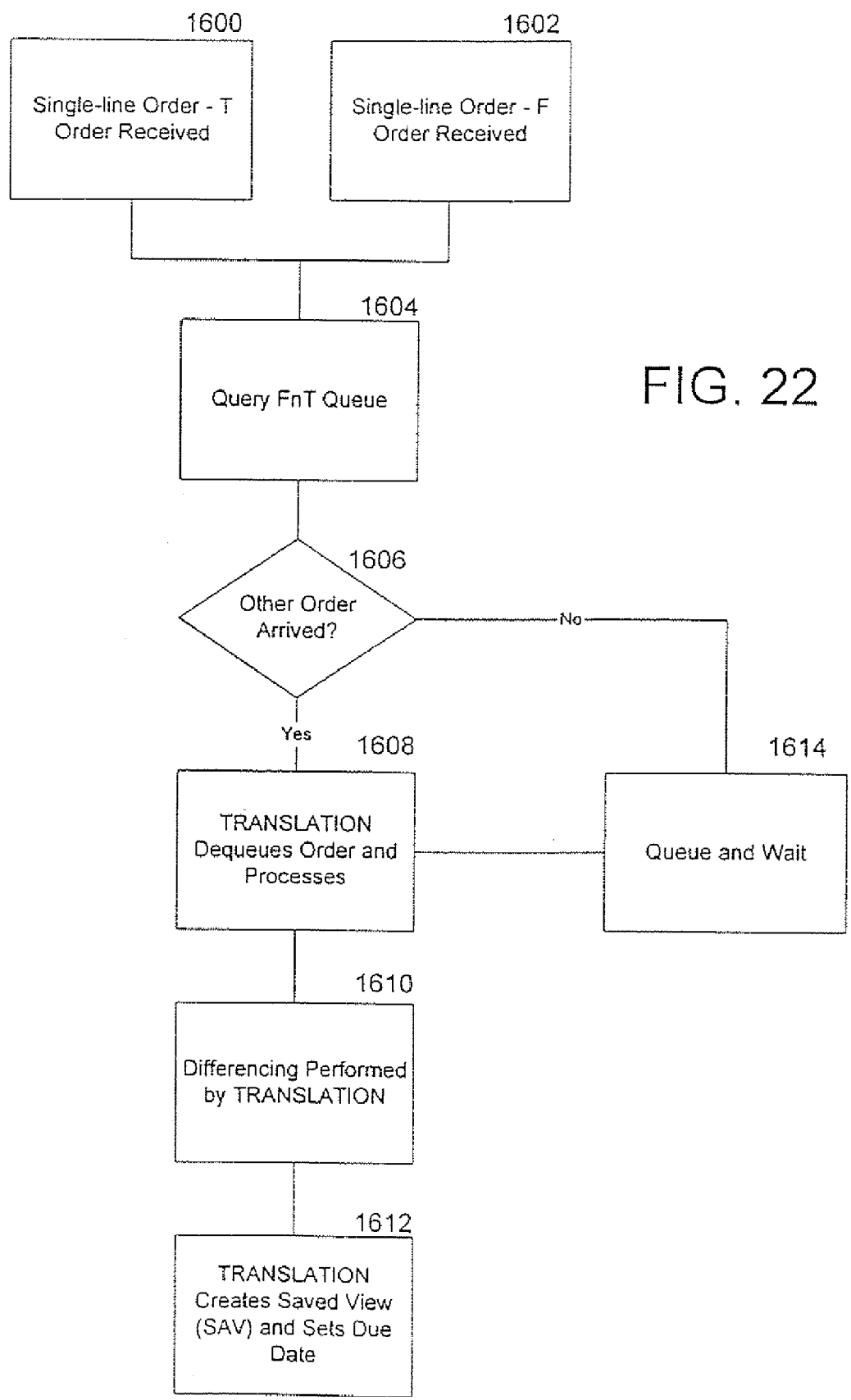
FIG. 22 is a flow chart illustrating the F&T processing of the present invention.

F&T processing refers to a pair of matching orders where one order has an OT='F', and the other order has an OT='T'. These orders must be combined to produce a single set of SAV database 206 entries that are subsequently processed as a single order by EDITS 412. Referring to FIG. 22, at steps 1600 and 1602, TRANSLATION 410 detects an F or T order and determines if the corresponding T or F order is in the SMS 10 system by querying the FnT queue at step 1604. The FnT queue is a TUXEDO queue that is used to hold the first of the two orders. If the corresponding order exists on the FnT queue at step 1606, it is dequeued at step 1608. TRANSLATION 410 builds a single set of SAV entries by calling DIFFERENCING at step 1610 using the ACT='O' set of USOC data from the F order and the ACT='N' set of USOC data from the T order. The result is a single set of SAV table entries at step 1612. TRANSLATION 410 also updates the FANDT_SEQ_NUM in each of the order's HOL_CTL table 216 entries to effectively join the two orders. Later, when a POSACK is issued for one order, a second is issued for the other order. If the corresponding order does not exist in the SMS 10 at step 1606, then the current order is placed on the FnT queue (enqueued) until the second order arrives. At that time the first order dequeued from the FnT queue at step 1604 and the two are merged as described above.

Exceptions to the above processing include F or T orders that contain multiple WTNs, F order processing when no corresponding T order exists, and T order processing when no corresponding F order exists. Any F or T order containing multiple WTNs result in TRANSLATION 410 generating an error message via MESSAGE_NOTIFICATION 426.

Entries on the FnT queue are timed entries, i.e., they can be explicitly dequeued as described above based on the existence of a second order. They are also dequeued when their scheduled time arrives. If an entry from the FnT queue is dequeued as a result of time expiration, then there is no corresponding order to merge. When this occurs, TRANSLATION 410 processes the single F or T order as a disconnect or new connect order, respectively. In other words, TRANSLATION 410 builds SAV entries for the F order that represent the removal of all services for the given WTN. Also, TRANSLATION 410 builds SAV entries for the T order that represent the addition of new services for the given WTN.

After building the SAV entries for the F&T orders or SAV entries representing disconnects or new connects, TRANSLATION 410 TPFORWARDS control to EDITS 412.

3. Error Processing

If an error occurs then a error code is created and a TPCALL NOTRAN is made to the MESSAGE_NOTIFICATION service 426, At this point the service will perform a TPRETURN with RVAL of TPSUCCESS or TPFAIL such that the transaction is aborted or committed. If the error is such that the program should retry in a few minutes, then a reply which causes a TPABORT is appropriate. If the error is such that processing should halt, then a reply which causes a COMMIT is performed. If the error is such that its just logged and processing continues, then no reply is performed. In addition, DISPATCH 404 will set the ORDER_STATUS in the HOL_CTL table 216 to 'E'.

G. EDITS

The EDITS service 412 is responsible for editing an activation request from SOAC 20, the User Interface, or the GUI Client Interface 308. An activation request can contain multiple WTNs. An entire activation request is edited, one WTN at a time, prior to sending a message to the BREAKOUT service 416 which creates the provisioning steps. If an error occurs within EDITS 412, the entire activation request is erred, even if some WTNs passed EDITS 412 successfully. In most cases, erred activation requests is sent back to the originator. If the update originated from SORD 18, an error is sent back to SOAC 20 in the form of a NEGACK. If the originator was a user of the User or GUI Client Interface 308, an error are sent back to that user. GUI 42 originated requests will not be erred to SOAC 20. However, some SOAC 20 Edit errors are erred to the GUI 42 user. Edit errors which point to possible SMS 10 table problems is sent to the RCMAC/GUI 42 user to investigate. Exemplary pseudo-code of an implementation of the EDITS 412 service and its related processes is attached as Appendix K.

The purpose of EDITS 412 is twofold. First, EDITS 412 determines if the order requests legitimate (i.e., allowable) service combinations. Second, EDITS 412 determines the appropriate network elements and template associated with the services. TRANSLATION 410 reads the Pieces (PCS) tables and writes the Save (SAV 206) tables. It then, depending upon the specific scenario, forwards a message to EDITS 412 or terminates processing via a message to MESSAGE_NOTIFICATION 426. Inputs to EDITS 412 include TUXEDO Header and SAV tables 206. Outputs by EDITS 412 include SAV2 tables 208 (SAV2_ODR, SAV2_WTN, SAV2_ACTION, SAV2_USOC, SAV2_FID, SAV2_USOC_CALL_VAR, SAV2_FID_CALL_VAR), and processing monitoring tables (HOL_FLOW, HOL_CTL, HOL_STEP, EDITS 412_ERROR).

EDITS 412 will receive all PRE, Soft COR, Soft CPC and Hard CAN passes of an activation request. Processing would already be halted by the TRANSLATION service 410 for Hard COR and Hard CPC passes and a message is sent to MESSAGE_NOTIFICATION 426 for manual handling by the RCMAC/GUI 42. EDITS 412 does not receive CAN and PCN passes.

EDITS 412 is invoked by a TPFORWARD from TRANSLATION 410, and invokes BREAKOUT 416 via a TPFORWARD. EDITS 412 performs error Handling by a call to MESSAGE_NOTIFICATION 426.

EDITS 412 reads the Saved View (SAV 206), performs edits, and builds the Saved2 View (SAV2). EDITS 412 will append various information to the Saved2 view which is used for provisioning by other downstream processed. For example, EDITS 412 determines the Network Element, old provisioning ID, new provisioning ID, and default data to provision.

For each WTN, EDITS 412 reads the Switch table to determine if services being added are available on the customer's switch. EDITS 412 captures the associated Switch AIN software release, SPACE 24 NE and, if necessary, the EMS 72.

EDITS 412 will determine a schedule date based on the activity on the activation request. The scheduled date is the actual provisioning date and is derived using the Due Date and Activity of the request. For example, if all activity on the activation request is for new service activation, the scheduled date can be one day less than the Due Date. If all activity on the activation request is service removal, the scheduled date can be two days after the Due Date of the request. The scheduled date is used to build an image of what the customer's account will look like on provisioning day. In addition, the scheduled date is used to determine the level of AIN software at the Switch and the NE on a given day, and then used to determine the correct template.

EDITS 412 reads the CUST active view and applies all pending updates with a schedule date and time less than the activation request being worked on. The merged active view and pending view is the view of the customer's services that the current activation request was built upon. EDITS 412 will then edit the current Saved View against the merged view. For services being added, EDITS 412 insures that the service does not already exist. For services being removed or changed, EDITS 412 insures the service exists.

EDITS 412 will then identify a template (called provisioning ID) to be used to provision the activation request. All services on the customer's account, pending steps, and Saved View are merged. Using the merged services, EDITS 412 determines if the existing customer's template will work. If merged services are available on the existing template and the template is not expired this template is selected.

Otherwise, EDITS 412 determines the appropriate template, using the merged services, by querying the Template table service element field. Identifying the appropriate Template involves using the customer-type (business/residence), State, Market-Area, SPACE 24 software release, AIN software release, and template effective date. If multiple templates are identified, the template with the most current effective date is used.

If a valid template is identified for the combination of services on the customer's account, EDITS 412 queries the USOC_REF table for each service being added or modified. The query would use the Service USOC, Service Provisioning ID, and the Service NE. The USOC_REF table provides a description of the service which can be used for some edits. All CALL VARIABLE information is contained in the CALL_VARIABLE_REF table such as valid FIDs, if the FIDs are required, TIID requirement, default data, and DTMF indication.

As editing is being performed, the Saved2 View is being built from the Saved View, the Merged Current/Pending View, the Template table, and the Service table. All elements from the SAV_ODR table are moved to the SAV2_ORD table. All information from the SAV_WTN table is moved to the SAV2_WTN table. In addition, EDITS 412 populates the WTN Schedule Date. If only one NE is involved, information may be moved from the SAV_ACTION table to the SAV2_ACTION table. If, however, it is identified that at least two NEs are involved on the activation request, EDITS 412 will need to move elements from the SAV_ACTION table to the SAV2_ACTION table based on the NE being provisioned. For example, if the Saved View contained an Add Action with USOC/FID/FID Data going to two different NEs, EDITS 412 would map those USOCs going to NE1 to the SAV2_ACTION table with an Add Action for NE1. Those elements going to NE2 would be mapped to the SAV2_ACTION with an Add Action for NE2. EDITS 412 populates the Old Provisioning ID and the New Provisioning ID identified in the Template table. This information is used by BREAKOUT 416 to determine whether a Change, a Remove or a Build is required in the NE. All elements in the SAV USOC table is copied to the SAV2 USOC table under the associated SAV2_ACTION table. Likewise, all data in the SAV FID table is copied to the SAV2 FID table. For services being added or removed, EDITS 412 creates the appropriate default data in the SAV2_USOC_CALL_VAR and SAV2_FID_CALL_VAR from the SAV2_FID table. The USOC/FID will not always be present on the Saved View so EDITS 412 will need to retrieve the USOC/FID CALL VARIABLES and the default value from the CALL_VARIABLE_REF table and populate the SAV2_USOC_CALL_VAR and SAV2_FID_CALL_VAR with this information.

If a service is found to be COMPLEX (by its corresponding USOC_REF_COMPLEX_IND='Y'), then the COMPLEX service and all other services for the same NE, are provisioned manually. EDITS 412 maps the existing information from the Saved View to the Saved2 View and, when all WTNs on the activation request are complete, TPFORWARD to BREAKOUT 416. A COMPLEX indicator for the appropriate Action/NE will need to be updated in the SAV2 Action table. For the COMPLEX Activation request, BREAKOUT 416 would just create a schedule date, create a pending step, route a message to the ROUTER service 418. ROUTER 418 will send a message to MESSAGE_NOTIFICATION 426 to notify the Software Center to provision manually. The COMPLEX request will not be queued to the Local Only Update queue until manually worked. When the manual work is complete, the Software Center will generate a POSACK and a 'Local Only' update is processed via a GUI 42 service.

It is possible to have a mix of COMPLEX/Mass Market services on one activation request. If both are present for the same NE, all activity for that NE is considered COMPLEX and provisioned manually. The SMS 10 will provision mass market services involving other NEs mechanically, and thereafter those services involved on the COMPLEX are provisioned manually.

If the Expected Order Indicator is ON for the WTN being processed, EDITS 412 checks to determine if the changes on the activation request have already been provisioned. If so, the Expected Order Indicator can be removed, a POSACK generated, and the HOL_CTL can be marked as complete. The Expected Order Indicator is turned ON when services are added or removed via GUI 42 without a corresponding SOAC 20 service order.

When all editing is completed successfully and the Saved2 View has been built, EDITS 412 will update the HOL and send a message to the BREAKOUT service 416. BREAKOUT 416 will create the individual provisioning steps.

As noted, the input data is read in from the Saved View (SAV 206). The Saved View (SAV 206) was created by the TRANSLATION service 410. The input data is service order received from SOAC 20, the User Interface, or the GUI Client Interface 308.

Any error found by EDITS 412 will terminate the processing of the given order. EDITS 412 will store the errors in the table called EDITS_ERROR. This table is read by MESSAGE_NOTIFICATION 426 when the ERROR_NOTICE transaction is sent at the end of this program.

1. EDITS Processing

Figure 23:
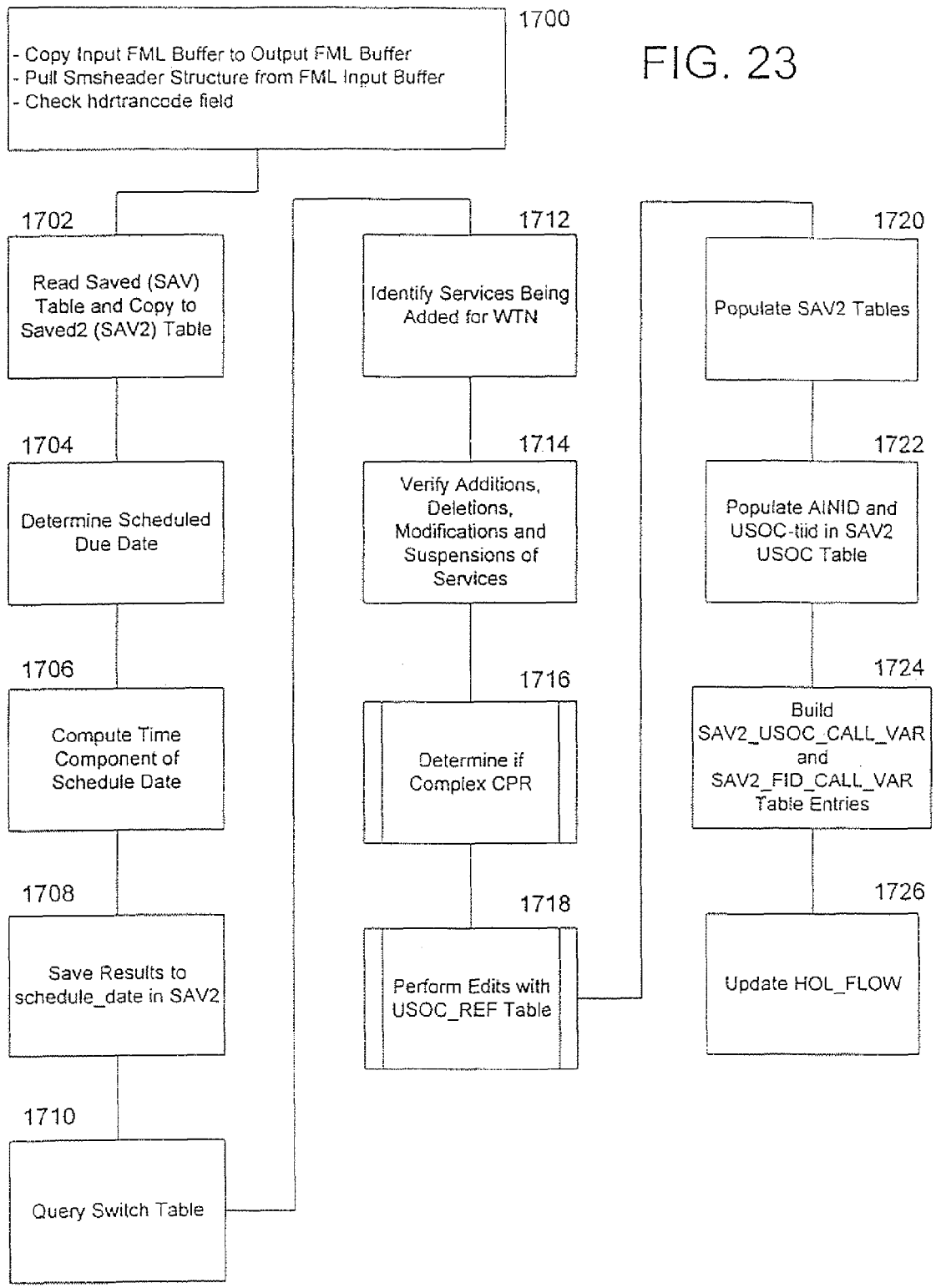
FIG. 23 is a flow chart of the logic flow of the processes and operations that may be performed by the EDITS service of the present invention.

Referring now to FIG. 23, at step 1700, the EDITS service 412 first copies the input FML buffer to the output FML buffer. Thereafter all changes are made to the FML output buffer. EDITS 412 then extracts the SMSHEADER structure out of the FML input buffer and to check the HDRTRANCODE field. If the HDRTRANCODE is valid, then another structure might need to be extracted from the buffer as well.

At step 1702, EDITS 412 next copies the contents of the SAV_ODR table to the SAV2_ODR table using HDRSEQKEY. Contents include: Create Date, Order State, TRN, CORS, ORDNO, OT, PRI, RSYS, TSYS, WC, COR, DD, DIFF, FDT, ITN, OTN, SF, CS, ISUS, OSUS, IDNP, and ODNP. The Order Status, at this point, is 'S' for Saved. EDITS 412 retrieves the first Saved WTN table row and loops through the remaining logic for each WTN on the order.

Next, at step 1704, EDITS 412 determines the Scheduled Due Date according to the following rules: (1) If the order is a new connect order (OT is equal to 'N') or change order (OT is equal to 'C') but the WTN has no active service in the SMS 10 (i.e., it is like a new connect), then compute a schedule date which is before the due date; (2) For all change (OT is equal to 'C') and record orders (OT is equal to 'R') where there is existing service on the WTN (i.e., a current record in the SMS 10 database) and the result of the order leaves the WTN with some services, use the due date (SAV_ODR_DD field) as the scheduled date; and (3) If the order is a disconnect (OT is equal to 'D') or if (OT is equal to 'C'), resulting in no services being left for that WTN, then compute a schedule date for one day after due date.

To determine the date for rule number (1), use table OFFICE_LOCT is used which contains one row per RCMAC/GUI, with a provisioning date column. Entries in this Cable specify the number of days prior to the due date to provision the addition of services.

After determining the schedule date the schedule time is determined at step 1706. For the SPACE 24 NE, when no pending steps exist, a random time is computed between 12:01:00 and 12:59:00. If pending steps exist, then six minutes are added to the latest schedule time associated with a pending step. EDITS 412 stores the result to SCHEDULE_DATE in SAV2_ACTION table at step 1708.

For the VAD 32 NE, the time is set as follows: For removing shared service the time is set to 01:00:00. For removing non-shared services the time is set to 02:00:00. For adding non-shared services the time is set to 03:00:00. For adding shared services the time is set to 04:00:00.

Hereafter, the scheduled date is the date used when identifying the appropriate Switch table, USOC_REF table, Template table entries, and when determining which pending updates to capture and apply to the active view. The Switch table is queried at step 1710 using the NPA_NXX equal to the NPA_NXX of the WTN being worked, LOW_LINE equal to or less than the line of the WTN, HIGH_LINE equal to or greater than the line of the WTN, a SWITCH_EFFECTIVE_DATE less than or equal to the scheduled due date of the order, and a SWITCH_EXPIRATION_DATE greater than the scheduled due date of the order or equal to zero. The row returned from the Switch Table will provide information needed for provisioning to any NE. For any given WTN, the Switch table will provide the SPACE NE, SPACE-AOS, VAD-EMS, AIN-EMS, along with other information.

EDITS 412 will identify those services being added for the WTN being worked on at step 1712. If the CTC is equal to 'B' or 'C' for the WTN being processed, EDITS 412 queries the Saved Action table for an Activity equal to 'A'. If the CTC is 'R' and the Order Type is not equal to 'D', then EDITS 412 queries the Saved Action table for an Activity equal to 'D'. If the CTC is equal to 'R', all services on the activation request are being removed.

If a row is returned by the query, EDITS 412 retrieves all USOCs from the Saved USOC table. For each USOC being added, the USOC_REF table is queried to determine if the particular USOC is valid for the particular NPA_NXX. EDITS 412 queries the USOC_REF table using the NPA_NXX equal to the NPA_NXX of the WTN being processed, a LOW_LINE equal to or less than the line of the WTN, a HIGH_LINE equal to or greater than the WTN and an effective date less than or equal to the scheduled date.

If all services being added are found to be valid, EDITS 412 builds a COMP_VIEW 44 of the customer account based upon the schedule date. The COMP_VIEW 44 contains all the services that the customer will have on the schedule date and will be described hereinafter.

EDITS 412 will also read through each Saved Action and associated Saved USOC table entry to perform the following entries:

For Activation requests removing or modifying subscription information at step 1714, EDITS 412 verifies that the service is active on the scheduled date if not an error message is issued via MESSAGE_NOTIFICATION 426. For activation requests adding a service, EDITS 412 verifies that the service will not be active on the scheduled date.

Figure 24:
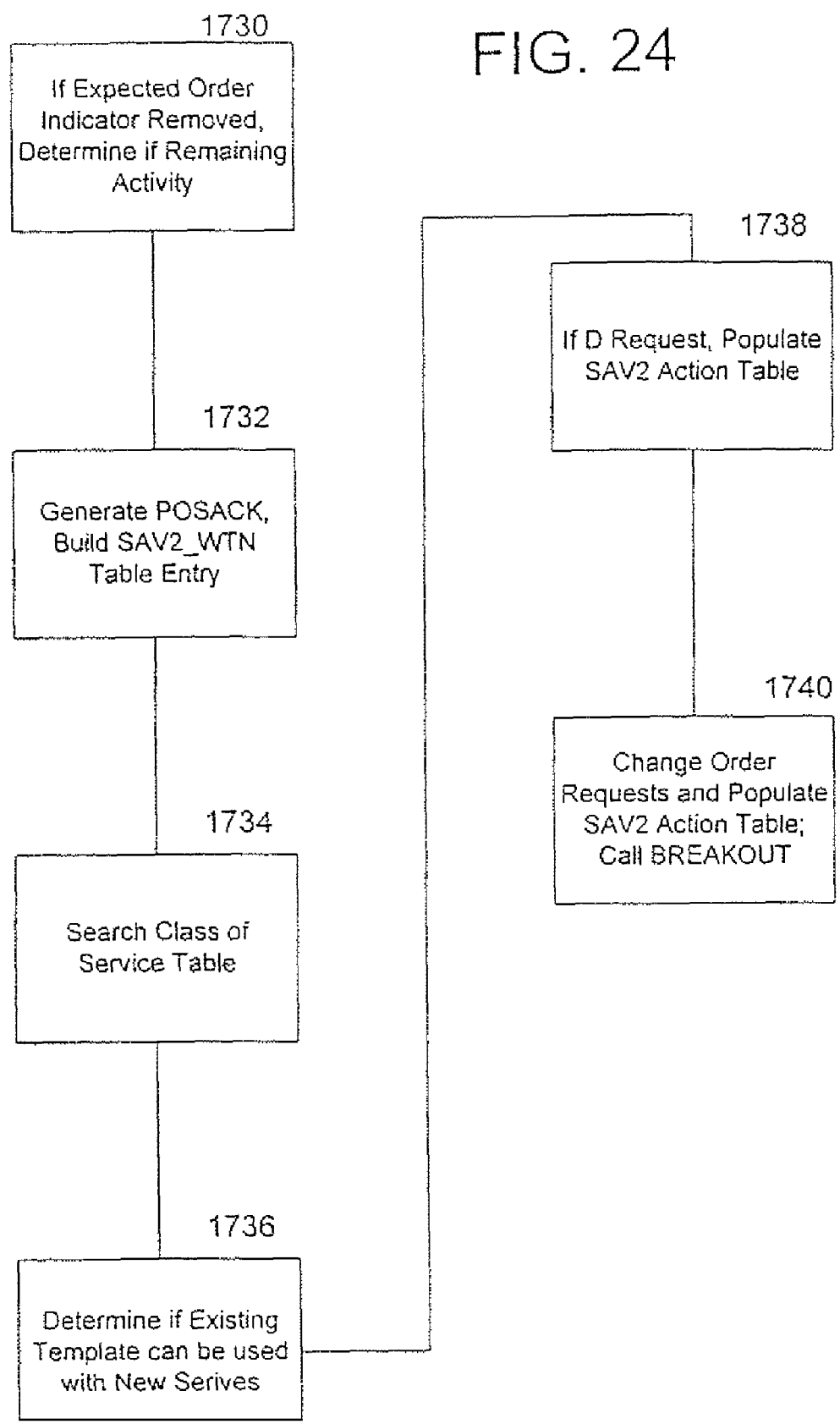
FIG. 24 is a flow chart of the logic flow of the processes and operations that may be performed by COMPLEX CPRs by the EDITS service of the present invention.

At step 1716, EDITS 412 determines if the customer currently has a COMPLEX CPR (i.e., the USOC_REF_COMPLEX_IND='Y'). Referring to FIG. 24, if the customer already has a COMPLEX service, the activation request being processed is treated as COMPLEX at step 1730. If the current activation request is associated with an expected order and all services have been provisioned, EDITS 412 generates a POSACK via MESSAGE_NOTIFICATION 426, builds the Saved2 WTN table entry (step 1732) from the Saved WTN table and populates the following fields in the Saved2 WTN table: WTN, CTC, COR, WTN Old, Typist ID, and WTN State. EDITS 412 moves the determined Scheduled Due Date to the WTN Scheduled Date. If all services associated with the expected order have not been Provisioned, an error is generated by MESSAGE_NOTIFICATION 426.

At step 1734, EDITS 412 searches the Class of Service table using CS from the Saved Order table to determine if a customer is B (Business) or R (Residence) and determines at step 1736 if the existing template in use by this customer can be used with the new combination of services. If multiple templates are identified, EDITS 412 defaults to the non-expired template with the most current effective date. If at step 1738 the activation request being worked is a D (Disconnect), a new template will not be identified. EDITS 412 populates the Saved2 Action table with the appropriate information and processing continues with the BREAKOUT service 416 at step 1740. A Saved2 Action table is also created with a C action.

Figure 25:
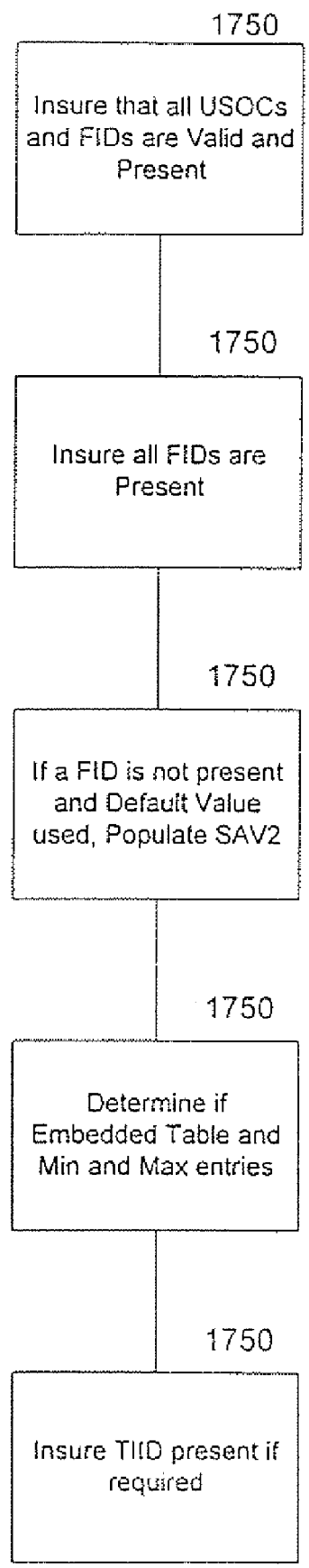
FIG. 25 is a flow chart of the logic flow of the processes and operations that may be performed by the EDITS service of the present invention where editing is performed with the USOC_REF table.

At step 1718, EDITS 412 branches to the logic shown in FIG. 25, where at step 1750 EDITS 412 uses the USOC_REF table, to insure that all USOCs and FIDs are valid and that all required FIDs are present. If the order adds a service, EDITS 412 insures that the FID is on the incoming activity. If the order is a change, and if the required FID is not on the incoming activity, EDITS 412 insures that it is present on the active view.

If at step 1752 an FID which is identified as required is not present on inward activity and a default value has been specified in the CALL_VARIABLE_REF table, EDITS 412 populates the saved2 view with the default value. If at step 1754 an embedded table is included with the order, EDITS 412 insures that the proper number of table entries have been met. If the TIID is specified as required in the USOC_REF table, EDITS 412 insures that the TIID is present at step 1752 on the activation request being processed. The TIID is located in the Saved USOC table. At step 1720, EDITS 412 populates the Saved2 tables for each action specified in the order within the WTN/NE being processed.

At step 1722, EDITS 412 populates AINID and the TIID in the SAV2 USOC table for the appropriate action (e.g., A, D or C) from the Saved USOC table. EDITS 412 uses the USOC and FID to query the CALL_VARIABLE_REF table. CALL VARIABLES represent USOCs and FID in NEs. At step 1724, for each USOC and FID, EDITS 412 builds corresponding SAV2_USOC_CALL_VARIABLE and SAV2_FID_CALL_VARIABLE table entries using default values where specified in the CALL_VARIABLE_REF table.

Once Editing is complete, an HOL_FLOW entry is created at step 1726.

If an error occurs, EDITS 412 will send a ERROR_NOTICE transaction to MESSAGE_NOTIFICATION 426 which will format and route the error to the user in the ERROR_TABLE.DESTINATION field for that error-code. Note, in the above implementation, for Local Only activation requests, EDITS 412 does not set the Expected Order Indicator for services being added or deleted because SOAC order is not received.

2. Error Processing

If an error occurs then a error code is created and a TPCALL NOTRAN is made to the MESSAGE_NOTIFICATION service 426. At this point the service will perform a TPRETURN with RVAL of TPSUCCESS or TPFAIL such that the transaction is aborted or committed. If the error is such that the program should retry in a few minutes, then a reply which causes a TPABORT is appropriate. If the error is such that processing should halt, then a reply which causes a COMMIT is performed. If the error is such that its just logged and processing continues, then no reply is performed. In addition, DISPATCH 404 will set the ORDER_STATUS in the HOL_CTL table 216 to 'E'. The HOL is updated with the Order Status and Error Code. The WTN Level Status and the WTN Error Code are also updated.

3. Expected Order Processing by EDITS

Services can be provisioned through GUI 42 initiated service orders where data is stored directly into the PCS tables 204 or through service orders generated by SOAC 20 and stored in the RAW_REQUEST table 202. In either case, the provisioning process requires synchronizing billing systems and triggering the switch.

When an order is initiated by SOAC 20 it is processed to completion which results in a POSACK being sent to SOAC 20 as noted above. That results in the synchronization of the services described above. In the case of a GUI 42 initiated order, a POSACK is not generated because the POSACK must be "associated" with a SOAC 20 order.

In order to synchronize the other systems (e.g., billing systems), SOAC 20 will send an order reflecting the services that already have been provisioned by GUI 42, this is called "expected order processing". This order is processed through EDITS 412, but will not create STEPS (for provisioning) for network elements because the network elements have already been provisioned. The POSACK generated as a result of processing through EDITS 412 results in the desired synchronization.

The HOL_CTL database table description, includes two fields, EON and EOT, collectively referred to as the "expected order numbers". These fields are stored in numerous tables (as shown in attached in Appendix A). When GUI 42 initiates an order, these two fields are populated in the PCS.C3 table and are propagated to the SAV, SAV2 and STEPS tables 210 via TRANSLATION 410, EDITS 412 and BREAKOUT 416. EDITS 412 expected order processing inputs are as follows:

GUI Input—If TSYS is non-SOAC and SAV_EXPECTED_ORDNO and SAV_EXPECTED_OT fields are non-NULL, a row is built for each given USOC in the SERVICE_USOC_EXP_ORDER table. The SERVICE_USOC_EXP_ORDER table contains an entry for each USOC on the given GUI order. These are compared to the corresponding SOAC order when it is processed. EDITS 410 processing would continue normally.

SOAC Input—For each USOC (using the ORDNO and OT fields from the C3 header) SERVICE_USOC_EXP_ORDER table is queried. If no entries are found (i.e., this is not an "expected order"). EDITS 410 continues normal processing as noted above.

If all entries noted above are found, then all entries found in the SERVICE_USOC_EXP_ORDER table are deleted. HOL_CTL entries reflecting 'C' (complete) status are updated, and MESSAGE_NOTIFICATION 426 issues a POSACK to SOAC 20. Under this circumstance, SAV2 entries are not built and no messages are sent to BREAKOUT 416.

If the number of SERVICE_USOC_EXP_ORDER Rows found is less than Number of SOAC services, then the HOL entries reflecting 'E' (error) status are updated and a message is sent to MESSAGE_NOTIFICATION 426 indicating "expected order" error. All entries from SAV and SAV2 are deleted, and no messages are sent to BREAKOUT 416.

IF a number of SERVICE_USOC_EXP_ORDER Rows found is greater than a number of SOAC services (i.e., the order contains less services than GUI provisioned), then HOL entries reflecting 'E' (error) status are updated and a message is issued to MESSAGE_NOTIFICATION 426 indicating "expected order" error. All entries from SAV and SAV2 are deleted, and do not send a message to BREAKOUT 416.

H. BREAKOUT

Upon receiving an update request, the BREAKOUT service 416 will loop through the request and build NE level steps for each WTN found. In addition, multiple NE-level steps may need to be created for a given WTN-level. Exemplary pseudo-code of an implementation of BREAKOUT 416 is attached as Appendix L.

Due to the need to update the NEs at different times in accordance with the requested activity, and the need to send separate messages to each NE, the ability to generate multiple service activation requests with GOM 400 is needed. Each service activation request contains the appropriate information to provision the NE. The relationship between each of the service activation requests created and the original activation request received is established and tracked. It is necessary for the SMS 10 to determine when all associated service activation requests have been processed (i.e., scheduled or provisioned) so that a POSACK can be issued to the originating system.

The following is a list of flow types/scenarios that BREAKOUT 416 will handle as it performs the aforementioned actions. The first type are Order type flows, which include, for example, New connect flow (PRE), Disconnect flow (PRE), C order flow (PRE) (including number change flow only and number change flow with changes in service), and Record order flow (PRE).

The input data to BREAKOUT 416 is read in from the SAV2 view of the data that EDITS 412 created. The HOL_WTN table 220 and/or database will contain information needed to determine what steps to create, such as, WTNs on the order, the NEs involved for each WTN, what services are involved under each WTN (which indicates if COMPLEX is involved), the templates involved for each NE (both old and new template), the order type (e.g., N, D, C, P, T or R), indication as to what action each piece information requires (e.g., add, delete or modify), and also, what scheduled date pertains to each WTN level.

1. BREAKOUT Processing

Figure 26:
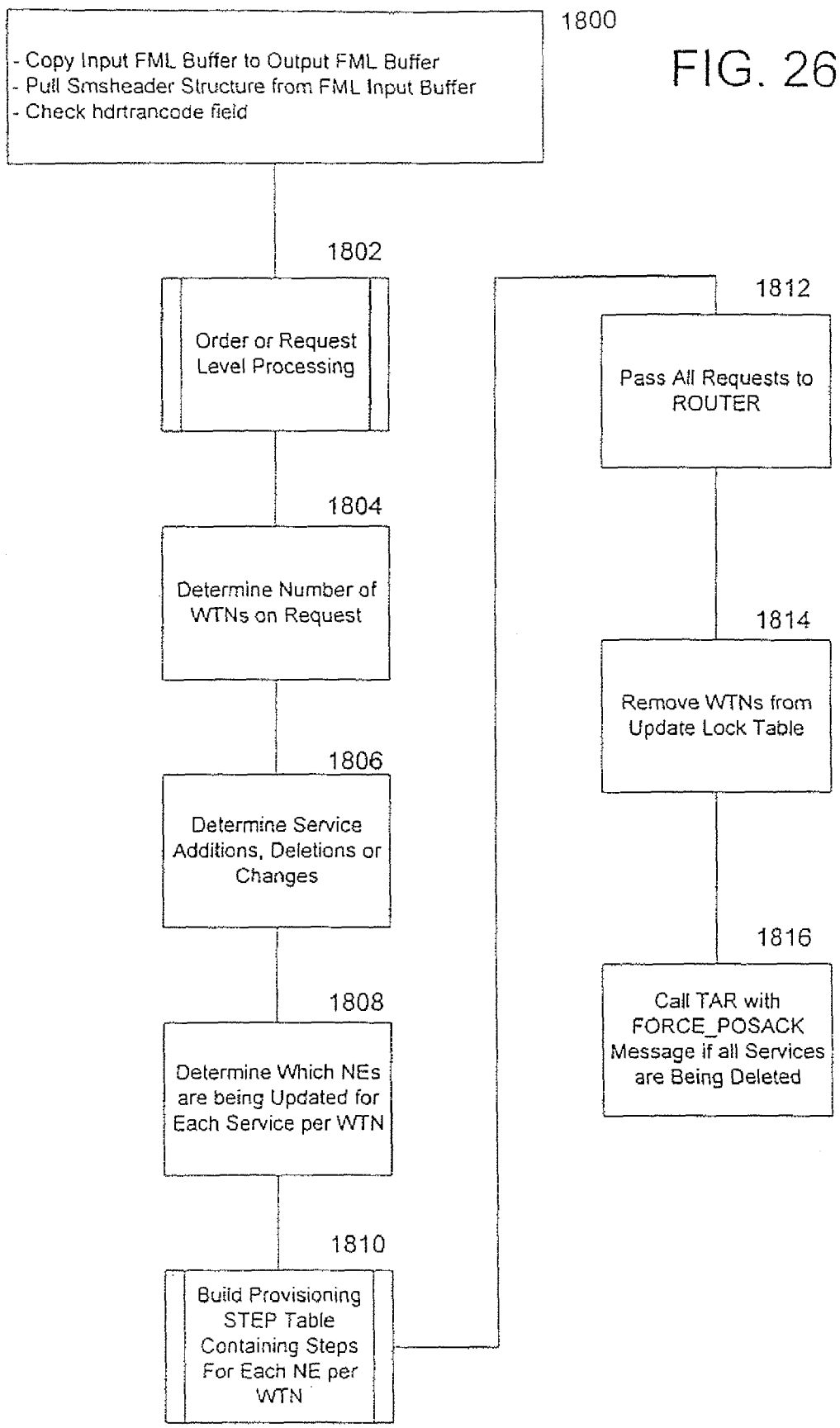
FIG. 26 is a flow chart of the logic flow of the processes and operations that may be performed by the BREAKOUT service of the present invention.
Figure 27:
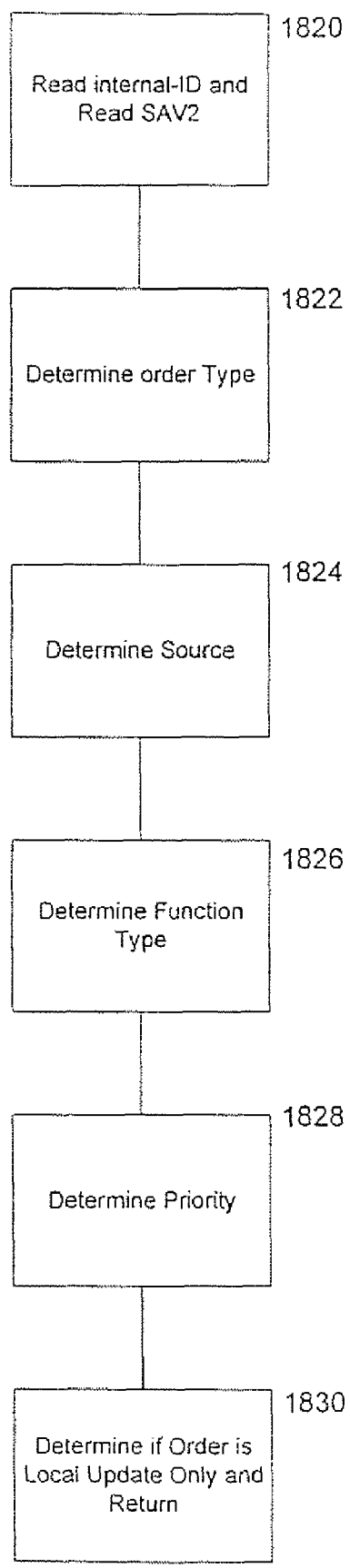
FIG. 27 is a flow chart of the logic flow of the processes and operations that may be performed by Order or Request-Level processing performed by the BREAKOUT service of the present invention.
Figure 28:
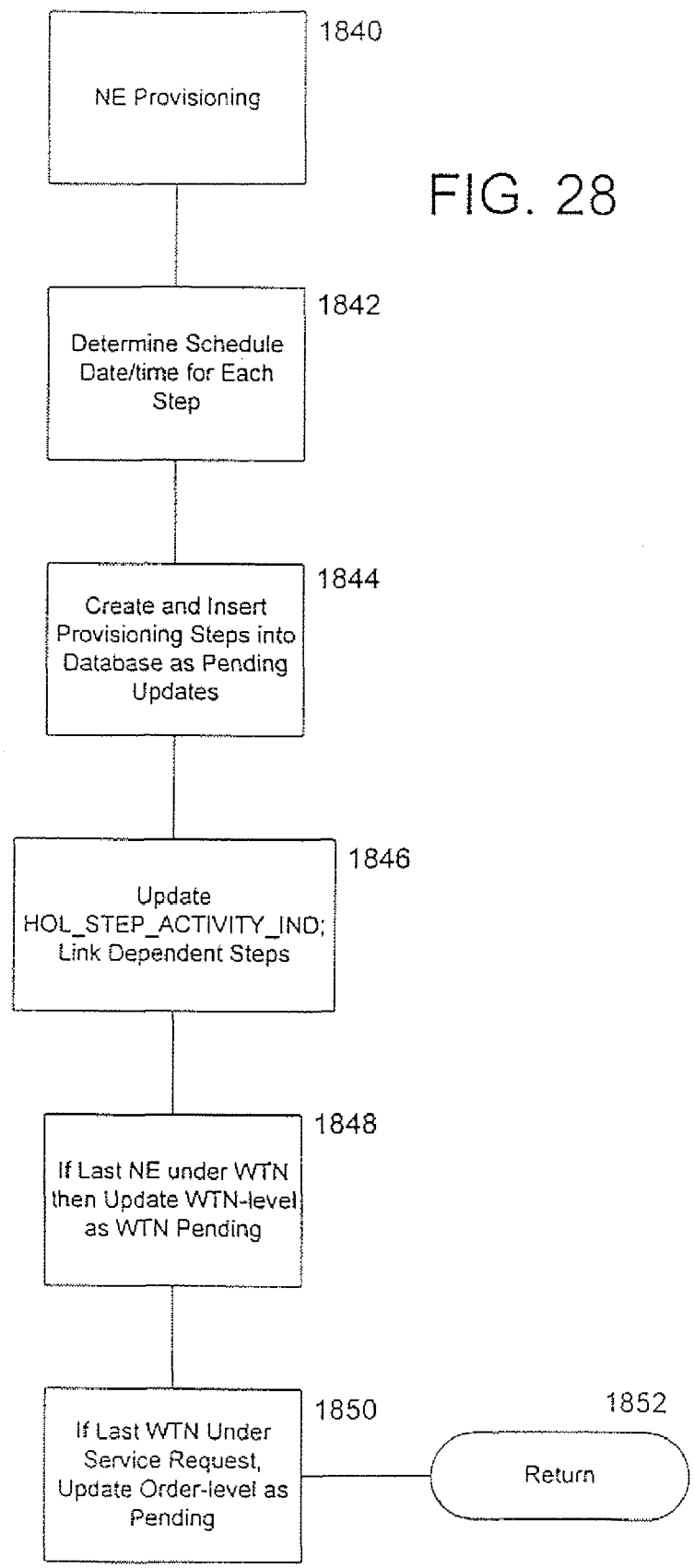
FIG. 28 is a flow chart of the logic flow of the processes and operations that may be performed by WTN-Level processing performed by the BREAKOUT service of the present invention.

The processing of BREAKOUT 416 will now be described with reference to FIGS. 26-28.

At step 1800, the BREAKOUT service 416 first copies the input FML buffer to the output FML buffer. Thereafter all changes are made to the FML output buffer. BREAKOUT 416 then extracts the SMSHEADER structure out of the FML input buffer and to check the HDRTRANCODE field. If the HDRTRANCODE is valid, then another structure might need to be extracted from the buffer as well.

At step 1802, the following steps are performed at the order or request level. The unique INT_SEQ_NUM is extracted from the message at step 1820 and is used to read the SAV2 database 208 and the HOL tables. BREAKOUT 416 determines the order type at step 1822, HDROT field values (e.g., N, C, D, F, T or R); the source (step 1824), HDR_ORIG_TYPE field SOAC, OSS, or GUI; the function type (step 1826), HDRFT field values (e.g., PRE, COR, CAN, CPC); and the priority (step 1828) using the HDRPRI field. Regarding the HDRPRI field, set the priority to two if the SAV2_ODR_DD is equal to today and the priority is currently is less than two. The priority field is used with the ROUTER message. However, there may be another priority field in the STEPS_WTN table called SPACE priority (This field is set to H). Also, BREAKOUT 416 determines if the entire order is a local only update at step 1830 by determining if there is a GUIOSS FML structure, and if the GUI_REQ_TYPE field equals 'L', and returns to step 1804 (FIG. 26).

After determining how many WTNs are on the request at step 1804, BREAKOUT 416 loops through a series of steps for each WTN (shown illustratively as step 1806), which include determining what services are being added, changed or deleted for the WTN; and which, if any, of the services are COMPLEX. The STEPS tables 210 are created. For the COMPLEX service, only the service/USOC data would be stored (there is no FID data). Also, BREAKOUT 416 sets the HOL_STEP_STEP_TYPE field set to C; determines which NEs are being updated for each service change under the WTN; and determines if there are any dependencies between the service updates on the order (like AIN is dependent upon SPACE 24 update) on this WTN.

After determining which services are being added (inward), deleted (outward), or changed, BREAKOUT 416 loops through the following steps (shown as step 1810) for each NE (SAV2_ACTION table entry) involved for the WTN.

```
If OT is equal to N
    Create 1 step with CTC=B.
If OT is equal to D
    Create 1 step with CTC=R.
If OLD_NE is not equal to spaces
    If OLD_NE is equal to NE
        If OLD_WTN is equal to WTN
            If NEW_PROVID is equal to spaces
                Create 1 step with CTC=R
            Else
                If OLD_PROVID is equal to NEW_PROVID
                    Create 1 step with CTC=C
                Else
                    Create 1 step with CTC=R
                    Create 1 step with CTC=B
        Else (NOTE: OLD_WTN is not equal to WTN)
            Create 1 step with CTC=M
            If SAV2.USOC contains rows
                If OLD_PROVID is equal to NEW_PROVID
                    Create 1 step with CTC=C
                Else (NOTE: OLD_PROVID is not equal
                    to NEW_PROVID)
                    Create 1 step with CTC=R
                    Create 1 step with CTC=B
            Else
                No more steps
    Else (NOTE: OLD_NE is not equal to NE)
        Create 1 step with CTC=C
        The STEP_TYPE in STEP_WTN and HOL_STEP is
        'G' for Geographical.   The step is not
        queued, but instead a message is sent to
        MESSAGE_NOTIFICATION 426 to provision
        manually (i.e., treat like COMPLEX
        service).
    Else (NOTE: OLD_NE is equal to spaces)
        If NE is not equal to spaces
            Create 1 step with CTC=B
        Else
            Generate Error.
```

After creating the steps, other items are considered at step 1842 and 1844, such as, determining the provisioning steps required to post to the NE, and determining the schedule date/time for each step.

The date has already been computed by the EDITS service 412, and is stored in SAV2_ACTION_SCHEDULE_DATE. However, in case a need arises to compute it again, the hereinbefore describe process may be utilized.

At step 1844, BREAKOUT 416 will create and insert the provisioning steps into the STEPS database 210 as pending updates. Each of the provisioning steps contains only the data needed for that particular step. Each step has a unique number called STEP_NO so that no step under a NE nor WTN nor the entire Order will have the same step number. When inserting the STEP_USOC table a USOC_ID number must be created. The number must be the same for all USOC entries for that WTN and NE element the step is created. Also, it must not be the same as other USOC_IDS that are created for WTN and NE steps on the same order.

At step 1846, BREAKOUT 416 will update the HOL_STEP_ACTIVITY_IND for inward, outward or change. If any request is dependent upon another request (i.e., the steps must be performed in a specific sequence), then the steps are linked via prior and next pointer fields in the provisioning steps record. These pointers are STEP_NO values. The first step in the sequence is passed in the queue structure to the ROUTER service 418. Unless there is a back to back DELETE and ADD action because of template change, these are Blocked together, such that two steps go in a single transaction to the ROUTER service 418. Provisioning steps for a particular WTN may not be inserted in-between (schedule date/time wise) other currently existing pending steps. Accordingly, BREAKOUT 416 checks for this condition, and if it is determined that other steps exist for the same scheduled date/time, then this order will have to be placed in error status for manual intervention by the RCMAC/GUI 42 clerk. BREAKOUT 416 creates a queue transaction to control the sequence of the provisioning steps for the NE-level.

At step 1846, BREAKOUT 416 will also update the HOL_STEP status entry for this step under the NE under the WTN-level such that the Step is pending. If at step 1844 the NE is the last NE under the WTN, the WTN-level status is updated on the HOL such that the WTN is pending. If the WTN is the last WTN under the service request, the Order status is updated on the HOL_CTL table 216 such that the order is ready. BREAKOUT 416 puts multiple occurrences of the ROUTER message into the FML buffer and executes a TPFORWARD to ROUTER 418. At this point in the processing, queue request(s) will have been made for all WTN(s) on the order. BREAKOUT returns at step 1852.

At step 1812, once all request(s) have been made successfully, these requests are passed on to the ROUTER service 418. After processing has completed on an order, regardless of whether it resulted in successfully sending a processing request to ROUTER 418, the WTNs on this order are removed from the WTN_LOCK table. Also, BREAKOUT 416 has an indicator that is set when steps are created with CTC=B or CTC=C. If the indicator is not set, then it indicates that all of the steps were steps with CTC=R. Therefore, if all services are being deleted and after everything has been successfully sent to ROUTER 418, if all steps contain CTC=R, BREAKOUT 416 calls the TAR subroutine with the FORCE_POSACK message at step 1816.

2. Error Processing

If an error occurs then a error code is created and a TPCALL NOTRAN is made to the MESSAGE_NOTIFICATION service 426. At this point the service will perform a TPRETURN with RVAL of TPSUCCESS or TPFAIL such that the transaction is aborted or committed. If the error is such that the program should retry in a few minutes, then a reply which causes a TPABORT is appropriate. If the error is such that processing should halt, then a reply which causes a COMMIT is performed. If the error is such that its just logged and processing continues, then no reply is performed. In addition, DISPATCH 404 will set the ORDER_STATUS in the HOL_CTL table 216 to 'E'.

I. ROUTER

ROUTER 418 takes requests from its message queue to be passed on to the appropriate destination queue (e.g., a destination NE). The request can be from multiple sources (e.g., Query Handler, BREAKOUT 416, etc), and can be a update or query request; however, there is little difference in the processing of any type of request by ROUTER 418. Additionally, there is a Online and a Batch instance of this service.

The incoming request is one or more queue header structures formatted for an outbound queue, and the destination NE and the scheduled date/time is in the structure. Each queue structure contains the first destination, all other destinations are stored in subsequent provisionable steps in the STEPS database 210 via prior and next INT_SEQ_NUM pointers.

1. ROUTER Processing

Exemplary pseudo-code of an implementation of the ROUTER service 418 is attached as Appendix M.

Figure 29:
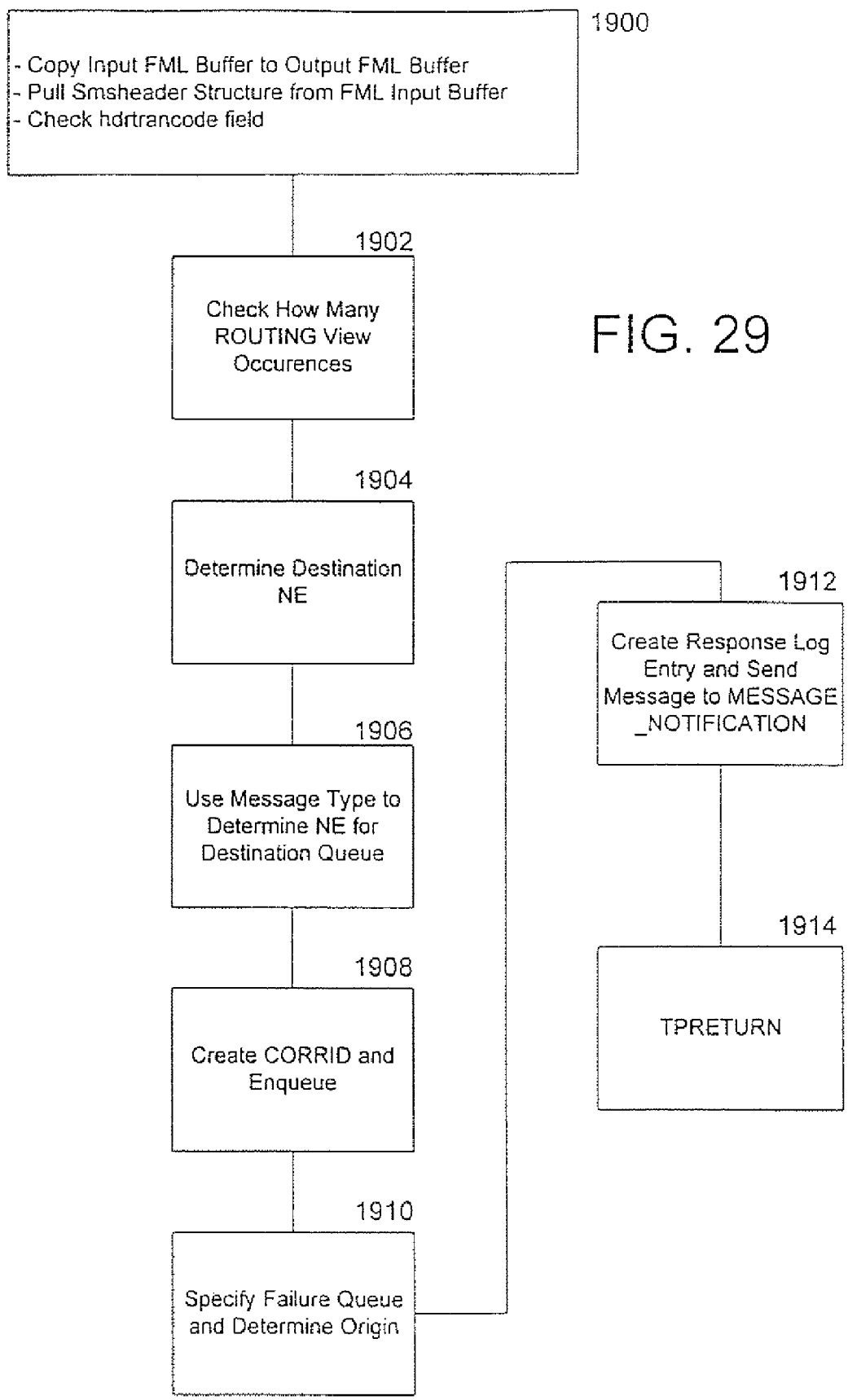
FIG. 29 is a flow chart of the logic flow of the processes and operations that may be performed by the ROUTER service of the present invention.

Referring to FIG. 29, at step 1900 the ROUTER service 418 first copies the input FML buffer to the output FML buffer. Thereafter all changes are made to the FML output buffer. ROUTER 418 then extracts the SMSHEADER structure out of the FML input buffer and to check the HDRTRANCODE field. If the HDRTRANCODE is valid, then another structure might need to be extracted from the buffer as well.

Next, at step 1902, ROUTER 418 checks to see how many ROUTER structure occurrences are included in the message. Each one is then FML processed. The destination queue names are: LOU (the local only queue), and NE (queues are Oxxxxx or Bxxxxx where O stands for Online and B stands for Batch and xxxxx is the actual Network Element name). When placing messages on queues, ROUTER 418 increments a counter by one for each specific queue upon which a message is enqueued.

When the MESSAGE_TYPE='L', the destination is the Local Only Update queue. This queue is used exclusively for updating SMS 10 customer account data, not for provisioning services in NEs. When MESSAGE_TYPE='C', a COMPLEX/manual request message is issued via MESSAGE_NOTIFICATION 426 to appropriate users for manual investigation.

ROUTER 418 determines the destination NE at step 1904, and places the message into the appropriate destination queue for that NE. When message type='QC' or 'QT', this service will place the request on the Online queue with the appropriate priority and a schedule date/time is equal to current. At step 1906, when message type='GOM', messages with a priority of less than two are sent to the Batch queue and all other messages are sent to the Online queue. When placing these messages on a queue, at step 1908, a CORRID is used. The CORRID is composed of the INT_SEQ_NUM, the WTN 10 and the STEP number. When enqueuing to PROV 420, ROUTER 418 specifies the PROV_ERR queue as the failure queue at step 1910. After having placed the request on the queue, ROUTER 418 will create a queue response log entry for the request at step 1912, setting RESP_STATUS equal to 'I'. If the query is HDR_ORIG_TYPE='OSS', then ROUTER 418 will execute a TPACALL NOTRAN NOREPLY to MESSAGE_NOTIFICATION 426 with an estimated wait time. If the query is HDR_ORIG_TYPE='GUI 42', then ROUTER 418 will create the RPLY_OSSGUI 42 FML buffer containing the estimated time, CORRID, and queue name fields. ROUTER 418 places queried data into the outbound FML buffer, and after all other processing has completed, it a executes a TPRETURN at step 1914 which will send the outbound buffer back to the interface. Output Messages are placed on TUXEDO timed queues.

2. Error Processing

If an error occurs then a error code is created and a TPCALL NOTRAN is made to the MESSAGE_NOTIFICATION service 426. At this point the service will perform a TPRETURN with RVAL of TPSUCCESS or TPFAIL such that the transaction is aborted or committed. If the error is such that the program should retry in a few minutes, then a reply which causes a TPABORT is appropriate. If the error is such that processing should halt, then a reply which causes a COMMIT is performed. If the error is such that its just logged and processing continues, then no reply is performed. In addition, DISPATCH 404 will set the ORDER_STATUS in the HOL_CTL table 216 to 'E'.

J. PROV

The PROV 420 server is the primary interface between the Generic Order Management (GOM) system 400 and the various network elements (e.g., SPACE 24 and VAD 32). A unique PROV service 420 is exists for each specific NE. The general function of PROV 420 is as follows: PROV dequeues a request, verifies that it is for the correct network element; makes necessary table entries; prepares the data to send to the network element; and either sends the request to the VAD 32_OUT service (for VAD 32 requests), or sends it to the appropriate WTNETRANS service 424 which will send the step to the SPACE 24 NE. Once a successful response is received from the NE, the customer view tables (WTN, SVC_USOC, SVC_DETAIL, SVC_FID, and SVC_CV_DATA tables) are written or updated appropriately. Other tables such as the HOL_CTL, HOL_STEP, HOL_WTN and STEP tables are also updated with an appropriate status. An exemplary set of customer view tables are appended hereto as Appendix N.

PROV 420 loops by checking the Online and Batch queues until something is found or until the maximum number of attempted dequeues are reached, at which point PROV 420 will place a TPACALL to itself and exits. Once something is dequeued, the PREPARE_DEQUEUE routine is called to extract data from the incoming FML buffer, then the PROCESS_DEQUEUE is called to process the request.

Once a step has been provisioned, the FINISH_DEQUEUE routine is called to make appropriate table entries, MESSAGE_NOTIFICATION 426 is called to issue a POSACK, if necessary, and all updates are committed. PROV 420 then dequeues and processes the next message.

The PROVISION_STEP routine will update the customer account tables. This function will determine if this is a special case where a change is made for an equivalent USOC. The customer account is searched for an equivalent USOC and updated appropriately. PROCESS_STEPS performs the main provisioning processing for a SOAC 20 order. Its primary responsibilities include calling SCRUB_EDITS 412, verifying the network element is correct and that the scheduled date is less than or equal to the current date, calling WTNETRANS 424, updating the HOL records and STEP records, and calling TAR and calling MESSAGE_NOTIFICATION 426 to do a POSACK if appropriate.

There are two instances of PROV 420 running for each NE. PROV 420 will receive messages from the NE Online queue or the NE Batch Timed. The NE Online queue will contain Queries and immediately due activation requests. The NE Batch Timed queue will contain low-priority activation requests. The NE Online queue will contain higher priority messages. Ten messages are dequeued from the NE Online queue, followed by one message from the NE Timed queue. This method prevents queue starvation. Exemplary pseudocode describing an implementation of PROV 420 and its associated functions is attached hereto as appendix O.

PROV 420 is waited process, which means that each copy of PROV 420 will dequeue a message from either the NE Online queue or the NE Timed queue, perform SCRUB_EDITS 412, and then forward the activation request key information to the WTNETRANS service 424.

The activation request/query will then be processed at the NE and a response is returned to the PROV 420 process. If the response is a query result, PROV 420 will forward a message to the MESSAGE_NOTIFICATION queue. If the response is for an activation request that was successful, PROV 420 will update the HOL, call the Track Activation Request (TAR) routine, possibly generate a POSACK, and update the customer's account residing on the SMS 10. If the response is for an activation request and failed at the NE, PROV 420 update the HOL, and send a message to MESSAGE_NOTIFICATION 426 to log an error for manual intervention by the user. A COMMIT is executed on the original dequeued message from the NE Online queue or the NE Batch Q, and the next message can then be dequeued and processed.

As stated previously, PROV 420 is a waited process. In the event that PROV 420 receives a response from the WTNETRANS service 424 (described below) which indicates that the NE is down, PROV 420 will wait a configurable amount of time and resend the message to the WTNETRANS service 424. While PROV 420 is waiting, no new messages are dequeued from the specific NE queue being processed by this particular copy of PROV 420.

When PROV 420 dequeues an activation request message, the service will read the PROV STEPS database 210. The request dequeued contains the INT_SEQ_NUM and WTN used to read the database. If the request is a Removal of the CPR (e.g., within SPACE 24), PROV 420 will need to check the Next Step information to determine if a Build is scheduled to be provisioned next. If so, both the Removal and Build activation requests is processed by PROV 420, and key information to both requests is forwarded to the WTNETRANS service 424 in a single message. These two requests are blocked into a single message for the NE in order to eliminate service outages.

For activation request messages PROV 420 will always check the next step information in the PROV STEPS database 210. If a next step exists for the same NE being processed and the next step is due, PROV 420 will service the next step without queuing the step to the NE Online queue or NE Batch queue. If the next step is scheduled for a future date and time or for a different NE, PROV 420 will send a message with the appropriate queue information to ROUTER 418. ROUTER 418 will enqueue the message to the appropriate NE queue with the appropriate date and time. It is possible a dependent next step exists with the same date and time as in the case of the Remove and Build request. For example, a Number change request can be scheduled followed by a Next Step Change request. However, these two requests are not to be Blocked. Each is processed separately by the PROV 420 process.

Once PROV 420 completes successfully, the state in the STEPS database 210 is changed to complete. The PROV Step database entries will not be deleted until the entire order with all steps completes successfully and a completion notice is received from the Service Order Processing System (e.g., SOAC 20). The Step information is used to determine what to Cleanup by the TRANSLATION service 410.

1. PROV Processing

Figure 30:
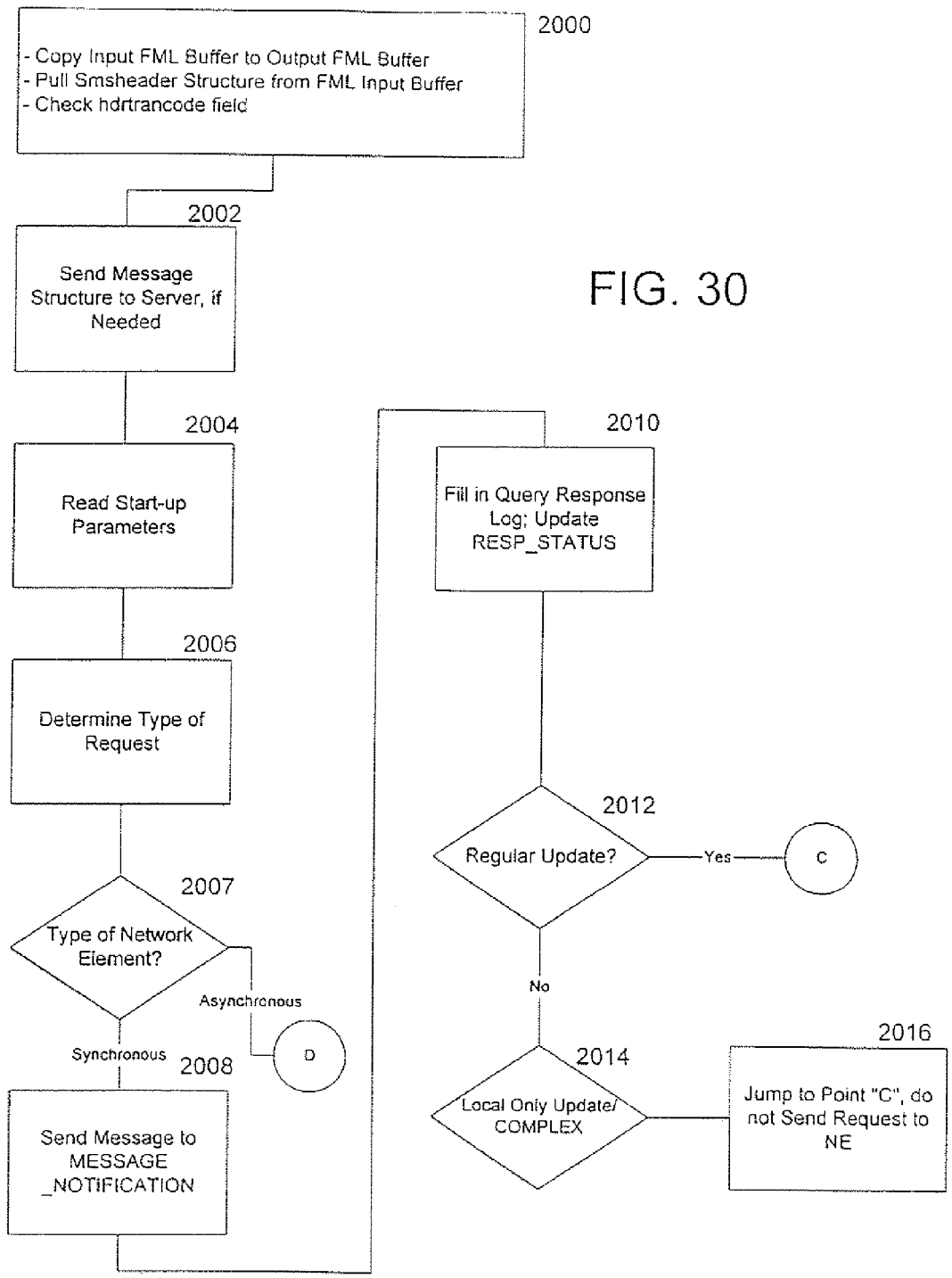
FIGS. 30 and 31 are flow charts of the logic flow of the processes and operations that may be performed by the PROV service of the present invention.

Processing performed by PROV 420 will now be described with reference to FIG. 30.

At step 2000, the PROV service 420 first copies the input FML buffer to the output FML buffer. Thereafter all changes are made to the FML output buffer. PROV 420 then extracts the SMSHEADER structure out of the FML input buffer and to check the HDRTRANCODE field. If the HDRTRANCODE is valid, then another structure might need to be extracted from the buffer as well. There is at least one additional ROUTER buffer.

There may be a need to send a special message structure to the server to indicate system administration specific processing at step 2002. Special messages include those that instruct PROV 420 to (1) dump of all memory tables and reloading process (if any tables are read at server startup time); (2) defer processing any orders for a specific template type until further notice; (3) start processing the template type again (indicated by the HDRSYSMS 10G is not equal to null).

There are at least four parameters that are read at startup time (step 2004): the NE element which this service will serve, a time (in seconds) that the function will wait before a retry is sent to the NE, the dequeue ratio between the Batch queue and the Online queue, and the time parameter specifying how long the service waits before trying the other input queue. PROV 420 determines the type of request at step 2006 by looking at the MESSAGE_TYPE field. If the field contains 'QC' or 'QT', then the message is a query; if the field is equal to 'GOM', the message is an update. If MESSAGE_TYPE contains 'QC' or 'QT' and the NE a SPACE 24 node, then PROV 420 will forward the message to the WTNETRANS service 424. Note, PROV 420 will not update an HOL.

At step 2007, PROV 420 determines what type of NE(s) are involved in the provisioning process. If the NE(s) are asynchronous, then processing continues at step 2046. If the NE(s) are synchronous, then processing continues at step 2008, where PROV 420 sends a message to MESSAGE_NOTIFICATION 426 regardless of whether the query result was successful or unsuccessful. PROV 420 will update the QUERY_RESP table with the queue-end-time at step 2010, which is the time PROV 420 receives a reply back from the WTNETRANS service 424. PROV 420 also updates the RESP_STATUS to (c)ompete or (e)rror depending upon the result.

Figure 31:
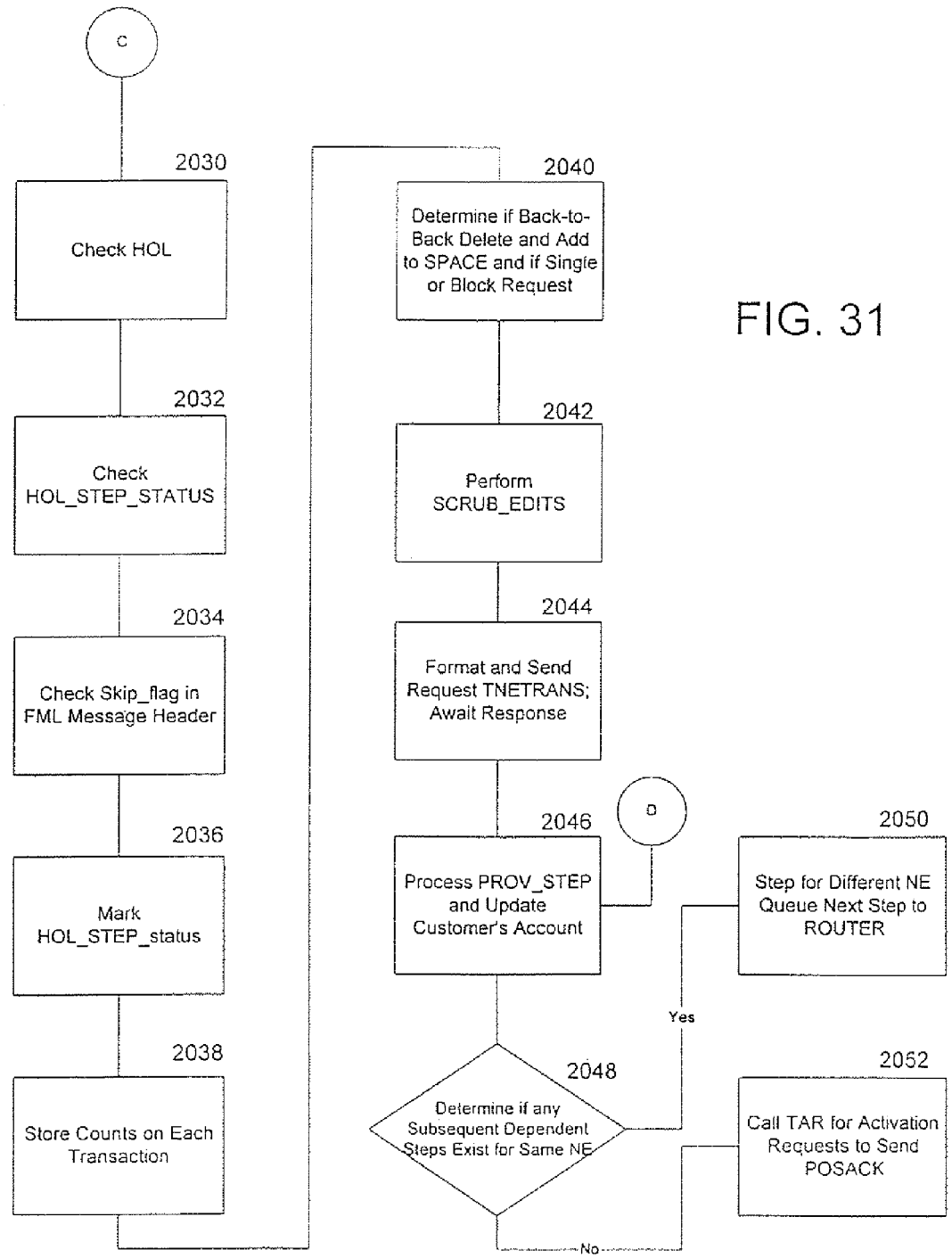

If the request is determined to be an update, then PROV 420 will determine at step 2012 if it is a regular update by MESSAGE_TYPE being equal to 'GOM' and NE being a SPACE 24 node. If yes, then as shown in FIG. 31, PROV 420 will then check the HOL log at step 2030 for ORDER_STATUS not equal to 'E' (error) or 'H' (hold) and WTN_STATUS not equal to 'E' or 'H', where if true then proceeds, otherwise PROV 420 sends a message to MESSAGE_NOTIFICATION 426 that step was performed, and exits. PROV 420 checks that the HOL_STEP_STATUS is equal to P, C or K at step 2032. PROV 420 checks SKIP_FLAG in the FML message and checks the STEP_STATUS indicator in the HOL entry at step 2034. If SKIP_FLAG is equal to 'YES' or STEP_STATUS is equal to 'C' or 'K' then this step is not processed and a message is sent to MESSAGE_NOTIFICATION 426 indicating that this step is being skipped. If the HOL_STEP_STATUS is equal to 'C', PROV 420 updates the customer account tables and processes the next chained step (if there is one), if no additional steps exists, PROV 420 calls the TAR routine which determines if a POSACK is needed and indicates such a necessity to PROV 420 which subsequently issues a POSACK via MESSAGE_NOTIFICATION 426. PROV 420 sets the HOL_STEP_STATUS equal to 'I' for in progress and sets HOL_PROV_STARTED equal to 'Y' at step 2036. At step 2038, PROV 420 also stores count data on each transaction going through the process in the QUEUE_STATS tables.

At step 2040, PROV 420 determines if request contains a back to back Delete and Add transaction to SPACE 24, which it then sends as a blocked request to the WTNETRANS service 424. This is determined by first checking the provision step record to determine if its a delete action. Then, using the next pointer field in this step, PROV 420 reads the next record (if there is a next record) to see if its a Add action for the same NE, and scheduled date/time. As noted before, the step sent via the queue is uniquely identified by (INT_SE-Q_NUM, WTN, NE, STEP number). If one exists, then both steps are formatted into a blocked request which is the sent to the WTNETRANS service 424. TAR determines if a POSACK is needed, and indicates such a necessity to PROV 420 which subsequently issues the POSACK via MESSAGE_NOTIFICATION 426. Requests that are not blocked are sent singularly.

After having determined if the request is a single or blocked request, the next step is to call the SCRUB_EDITS 412 routine at step 2042. A brief description is given here; however, a more detailed description follows below. Using the INT_SEQ_NUM, WTN, STEP_NO, and NETWORK_ELEMENT, PROV 420 reads the Step WTN table. PROV 420 updates the STEP_STATE to 'I' (In progress), then calls SCRUB_EDITS 412. It is possible that changes may have occurred since this order was submitted which may invalidate the STEPs built. SCRUB_EDITS 412 insures that all activity on the activation request being processed is valid. SCRUB_E-DITS 412 validates the activity on the request, validates the activity against the customer's account, and may populate DTMF information (DTMF may be needed in a back to back Delete and Add). Also, note that if the Delete worked and the Add failed PROV 420 would cause BACKOUT 432 to attempt a recover.

The request is now sent to WTNETRANS 424 via a TPCALL at step 2044. After sending the provisioning request to the WTNETRANS service 424, PROV 420 waits for a response. The WTNETRANS service 424 will wait for a reply from the SPACE Client Interface 312. This reply may indicate that SPACE 24 is down and PROV 420 should wait a configurable amount of time (startup parameter value) to resend the message to the SPACE Client Interface 312 Service. PROV 420 will sleep for the configurable time then resend the query or activation request to SPACE 24 (a message is sent to MESSAGE_NOTIFICATION 426 each time this request is retried). The SPACE 24 reply may indicate that there is a data problem with this request, at which point PROV 420 would send a message to MESSAGE_NOTIFICATION 426 for manual intervention and would then COMMIT the dequeue of this request from PROVs queue.

At step 2046, after a PROV STEP is processed successfully, PROV 420 will update the customer's account and set the STEP_STATUS to 'C' (completed). PROV 420 will also update the NE_STATUS table with an average response time each time a message is returned from a NE. The average response time is used by ROUTER 418 in computing an estimated response time.

The customer account tables are updated as follows: (1) for new services, service specific data (USOCs, FIDs, and CALL VARIABLES) are added; (2) for services being removed, their deactivation dates are set for (USOCs, FIDs, and CALL VARIABLES); and (3) for services being modified, deactivation dates for existing FIDs and CALL VARIABLES are set and the replacement FIDs and CALL VARIABLES are added.

At step 2048, PROV 420 determines if subsequent dependent steps exist that are destined for the same NE at a scheduled date/time less than or equal to the current date/time and process this next step as described above.

If a dependent step exists, but is for a different NE or a future date, PROV 420 will queue the next step back to ROUTER 418 at step 2050. Otherwise, PROV 420 calls TAR at step 2052 to issue a POSACK.

Returning again to step 2012, if it is determined that this is not a regular update, flow continues at step 2014, where if the request is local only (MESSAGE_TYPE is equal to 'L') or COMPLEX (MESSAGE_TYPE is equal to 'C'), then PROV 420 will execute the same logic at step 2016 described above, but will not send the request to the NE, i.e., PROV 420 will only update the customer account (as described above).

PROV 420 issues a message to the SPACE 24 or DATAGATE service. An exemplary format is as follows:

```
* ACT_REQUEST:
The content of a message sent to the SPACE 24 or DATAGATE
service.
struct ACT_REQ {
int nKeys;
ACT_KEY **actList;
} ACT_REQUEST;
/*
* QUERY_REQUEST: The content of an Query Request event sent to
the SPACE 24 DATAGATE service.
*/
struct QUERY_REQ {
int nKeys;
QUERY_KEY **actList;
} QUERY_REQUEST;
     The QUERY_RESP table is formatted as follows:
INT_SEQ_NUM char(6)
timestamp char(19)
RESP_STATUS char(1) (E)rror, (C)omplete, (I)nprogress.
TSYS char(8)
NE char(10)
view char(10)
template char(15)
EST_WAIT_TIME int long
WTN char(10)
CORRID char(31)
QUEUE_START_TIME char(19)
QUEUE_END_TIME char(19)
USER_ID char(6)
GROUP_ID char(6)
SPACE 24_KEY char(20)
     The BACKOUT request is as follows:
BK_TRANS_CODE values: 100 BACKOUT order
200 queue delete
300 Recover Deleted record.
The BACKOUT structure may be formatted as follows:
BK_TRANS_CODE int long
BK_INT_SEQ_NUM int long
BK_STEP_NBR int long
BK_OT char(1)
BK_ORDER_NBR char(6)
BK_CORS char(1)
BK_WTN char(10)
BK_CORRID char(31)
BK_QUEUE_NAME char(10)
```

2. Error Processing

If an error occurs then a error code is created and a TPCALL NOTRAN is made to the MESSAGE_NOTIFICATION service 426. At this point the service will perform a TPRETURN with RVAL of TPSUCCESS or TPFAIL such that the transaction is aborted or committed. If the error is such that the program should retry in a few minutes, then a reply which causes a TPABORT is appropriate. If the error is such that processing should halt, then a reply which causes a COMMIT is performed. If the error is such that its just logged and processing continues, then no reply is performed. In addition, DISPATCH 404 will set the ORDER_STATUS in the HOL_CTL table 216 to 'E'.

3. SCRUB_EDITS

The purpose of SCRUB_EDITS 412 is to verify that the TEMPLATE_ID and NE retrieved from step table is valid at the schedule date. SCRUB_EDITS 412 is invoked by the PROV service 420, performs many of same functions as EDITS, and invokes a set of database access routines. SCRUB_EDITS 412 performs error handling by reporting the error to PROV 420, the calling routine. Inputs to SCRUB_EDITS 412 include WTN, template id, network element and the schedule date. SCRUB_EDITS 412 returns a status indicating success or failure.

SCRUB_EDITS 412 reads all USOCs in pending steps and reads all supported USOCs for the given template. SCRUB_EDITS 412 determines if the requested service modifications are consistent (see EDITS 412) and returns an appropriate status. Consistency checking involves validating services relative to the switch (SWITCH_USOC_XREF table) and template (USOC_TEMPLATE_XREF table) and ensuring that services being modified or removed already exist, and those being added do not exist on the customer's account.

SCRUB_EDITS 412 generates a COMP_VIEW 44 of the given scheduled date for the given WTN by reading all USOCs which are available to the given WTN at the given schedule date. SCRUB_EDITS 412 reads the SWITCH_USOC_XREF table and generates SWITCH_USOC List, it then reads all USOCs which are available on the given template at the given schedule date using the USOC_TEMPLATE_XREF table and generates TEMPLATE_USOC list. SCRUB_EDITS 412 checks to confirm that all services are still available to the given WTN and checks if all services are still supported by the given template.

Using a WTN, a network element, and schedule date as query criteria, SCRUB_EDITS 412 queries the SWITCH_NE_REF table. SCRUB_EDITS 412 reports the error if the network element is not valid for the given WTN. SCRUB_EDITS 412 returns an error status if an error is encountered.

SCRUB_EDITS 412 is executed for activation rests. For specific order types and CTCs, the customer's active view is retrieved. Much of the EDITS 412 logic is repeated. In addition, for those changes involving DTMF, an NE query is submitted. The result is used to perform edits on the change activity for the DTMF variables or used to reprovision DTMF in the case of a R/B for a template change. In the later case, the DTMF CALL VARIABLES may not be changing, but DTMF data needs to be captured and re provisioned. DTMF changes include steps with a CTC='C' and USOC/FID changes which can be updated also via DTMF. In addition, if the CTC='R' and the OT='C', where existing customer services contain DTMF data, this DTMF is captured via a NE Query result. If the CTC='R' and the OT='C', and there is a dependent Build Step, then all activity on the request is outward so a query will not be necessary.

In the event that a remove and built transaction is being processed, SCRUB_EDITS 412 will populate the DTMF CALL VARIABLES in the PROV STEPS database 210.

SCRUB_EDITS 412 retrieves the current customer's account. If the order's OT='N' and CTC='B' and a customer account exists, then an error status is returned. If the order's OT='D' and CTC='R' and a customer account does not exists, then an error status is returned. If the order's CTC='M' and a customer account exists, then an error status is returned, else if a customer account does not exists for the 'old WTN', then an error status is returned. If the order's CTC='C' and a customer account does not exist, then an error status is returned. If the order's OT='C' and CTC='S' and a customer account does not exist, then an error status is returned. If the order's OT='C' and CTC='U' and a customer account does not exist, then an error status is returned.

4. PROVUPD

The PROVUPD 422 service commits updates the HOL_CTL table 216 and HOL_WTN table 220 outside of PROV 420 transaction to indicate that provisioning has started, and sets the order status to 'I' for in-progress. This is performed after first verifying that the current order status is not 'E' (error) or 'H' (hold) before doing the update. Input to PROVUPD 422 is a pointer to TUXEDO service information structure, there are no outputs.

5. Son of Track Activation Request (STAR)

STAR may be called by PROV 420 and provides four functions based upon input parameters. If the input parameter is 'SEARCH_HOL', STAR determines if all steps on the order are complete. If so, and a POSACK has not been generated, a POSACK is issued. If the input parameter is 'FORCE_POSACK' and a POSACK ha not been generated, a POSACK is issued. If the input parameter is 'FORCE_NEGACK' and one has not been generated, a NEGACK is issued. If the input parameter is 'FORCE_CAR' an a 'CAR' has not been generated, a 'CAR' is issued.

6. WTNETRANS

This service is called by the PROV service 420 and provides an interface to the DATAGATE server which communicates with the SPACE 24 NE. WTNETRANS 424 is called via any one of several services corresponding to a particular NE and PROV 420. TPSVRINIT is TUXEDO initialization function which is called when this server is booted. This function also extracts several parameters from the CLOPT line (from TUXEDO boot-up configuration file) to be used by WTNETRANS 424 when communicating with SPACE 24 via DATAGATE (parameters include timeout value, number of times to retry if SPACE 24 is down, number of seconds to wait before attempting a retry, etc.)

The input to WTNETRANS 424 is a pointer to TUXEDO information structure, and the output is a TPRETVAL, TUXEDO return value (e.g., TPSUCCESS|TPFAILURE), and RETVAL a TUXEDO return code (e.g., application status).

K. UTILITIES/OTHER SERVICES

The fundamental architecture of the SMS 10 is based upon messages (service orders, queries, replies, etc.). The messages pass from one program to another via queries controlled by, for example, TUXEDO Transaction Monitor. Other equivalent transaction monitors may be used to implement the present invention. Because it is possible for a TUXEDO queue to become corrupted, 'safe store' relational database tables are implemented. For each TUXEDO queue there is a corresponding table that contains a copy of the exact message that has been enqueued to its corresponding TUXEDO queue. For timed queues, a schedule date is also contained in the table.

1. SMS_ENQUEUE and SMS_DEQUEUE

Two routines control all enqueueing and dequeueing. That are called SMS_ENQUEUE and SMS_DEQUEUE. The SMS_ENQUEUE routine enqueues a given message to a specified TUXEDO queue and writes a copy of the message to the corresponding 'safe store' table. The table entry's enqueuing timestamp is set indicating the exact time when the message was enqueued. The SMS_DEQUEUE routine dequeues a message from the specified TUXEDO queue and updates its corresponding 'safe store' table entry's dequeue timestamp with the exact time of the dequeue. Should the transaction the performed the SMS_ENQUEUE or SMS_D-EQUEUE fail, both TUXEDO queue message action (either enqueue or dequeue) and the 'safe store' table write/update are 'rolled back' to their original state, thus ensuring consistency between TUXEDO queue content and the corresponding 'safe store' table's content.

2. QMAN

The QMAN interface program, and administrative utility, is used for TUXEDO queue restoration and message manipulation. Should TUXEDO queue become corrupted, QMAN will read all messages from the corresponding 'safe store' table where the dequeue timestamp is NULL (i.e., the message has never been dequeued and would still be on TUXEDO queue had it not become corrupted) and enqueue them to the corresponding TUXEDO queue. This ensures that no messages can be lost during catastrophic TUXEDO or system failure.

For TUXEDO 'timed queues', messages are scheduled for dequeue based upon a specified schedule date. That is, there is a schedule date associated with the message and that message does not become a candidate for dequeueing until that schedule date arrives. For example, a message with a schedule date of Feb. 10, 1998 12:00:00 that is enqueued on Jan. 2, 1997 will not become a candidate for processing until Feb. 10, 1998 12:00:00.

'Safe store' tables associated with 'timed queues' also contain a schedule date field that corresponds to the message schedule date. To recover a timed queue, QMAN reads the corresponding 'safe store' table and enqueues the message to the corresponding timed queue using the schedule date associated with the given message.

For message manipulation, QMAN provides a mechanism to move specific or all messages from one TUXEDO queue to another. QMAN reads user input denoting a specific message(s), source queue and target queue, moves the message(s) from the source queue to the target queue and updates the appropriate 'safe store' table entries via an interactive dialog.

3. BACKOUT

There are three services in the BACKOUT service 432, one is the backing out of steps that have been provisioned to NE(s), the second is QUEUE entry deletion, and the a third is the recovery of the deleted record in SPACE 24 when a back to back delete and build was sent and the delete completed, but the build did not complete.

To back out steps that have been provisioned to NEs, this service function will take an incoming request for a BACKOUT event and process that request. The INT_SEQ_NUM key will point to an HOL entry and provisioned/pending steps from a previously provisioned pass of an order. The process will mark the HOL log status such that any pending steps will no longer post. It will then create reverse steps of the already provisioned steps, set up prior/next pointers in the step(s) and send the first request to routing. There will have to be some indication in the header structure that this is a BACKOUT, because PROV 420 will have to re-submit the COR pass of the order to TIP 402 at the successful completion of the last BACKOUT step.

To perform queue entry deletion, this service will take an incoming CORRID and queue name and delete that entry from that queue.

To recover a deleted record from SPACE 24, this service will take an incoming WTN, order number and INT_SEQ_NUM, and create a CTC=B step to provision a WTN account back on a SPACE 24 NE. The reason for this is that a back-to-back delete and build was sent to SPACE 24 and the delete completed, but the build failed. There is a need to obtain the DTMF data that was used to create the previously mentioned build step and merge with the current CUST record for the new build attempt. When the back-to-back failed, since it was sent as one transaction to SPACE 24, nothing should have rolled over into current CUST record.

The incoming data structure to BACKOUT 432 will need to contain the internal database sequence key (INT_SEQ_NUM) for the current COR pass, the order number and perhaps the internal database sequence key for the previous pass. Using these keys this function is able to obtain the provisioned steps from the HARD COR or HARD CAN of the previous pass of the order.

a. Processing of Order BACKOUT Service

Figure 33:
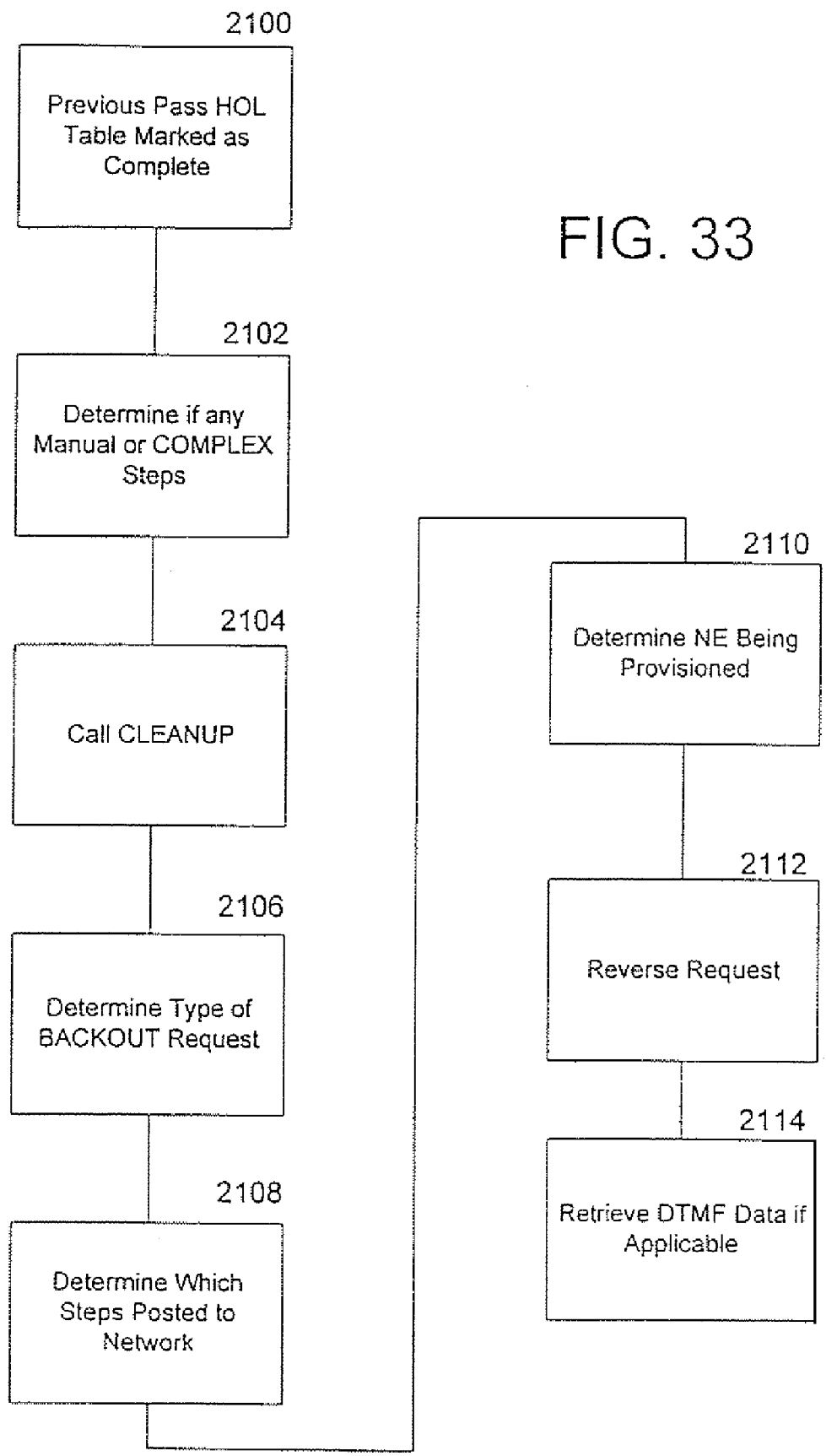
FIG. 33 is a flow chart of the logic flow of the processes and operations that may be performed by the BACKOUT service of the present invention.
Figure 34:
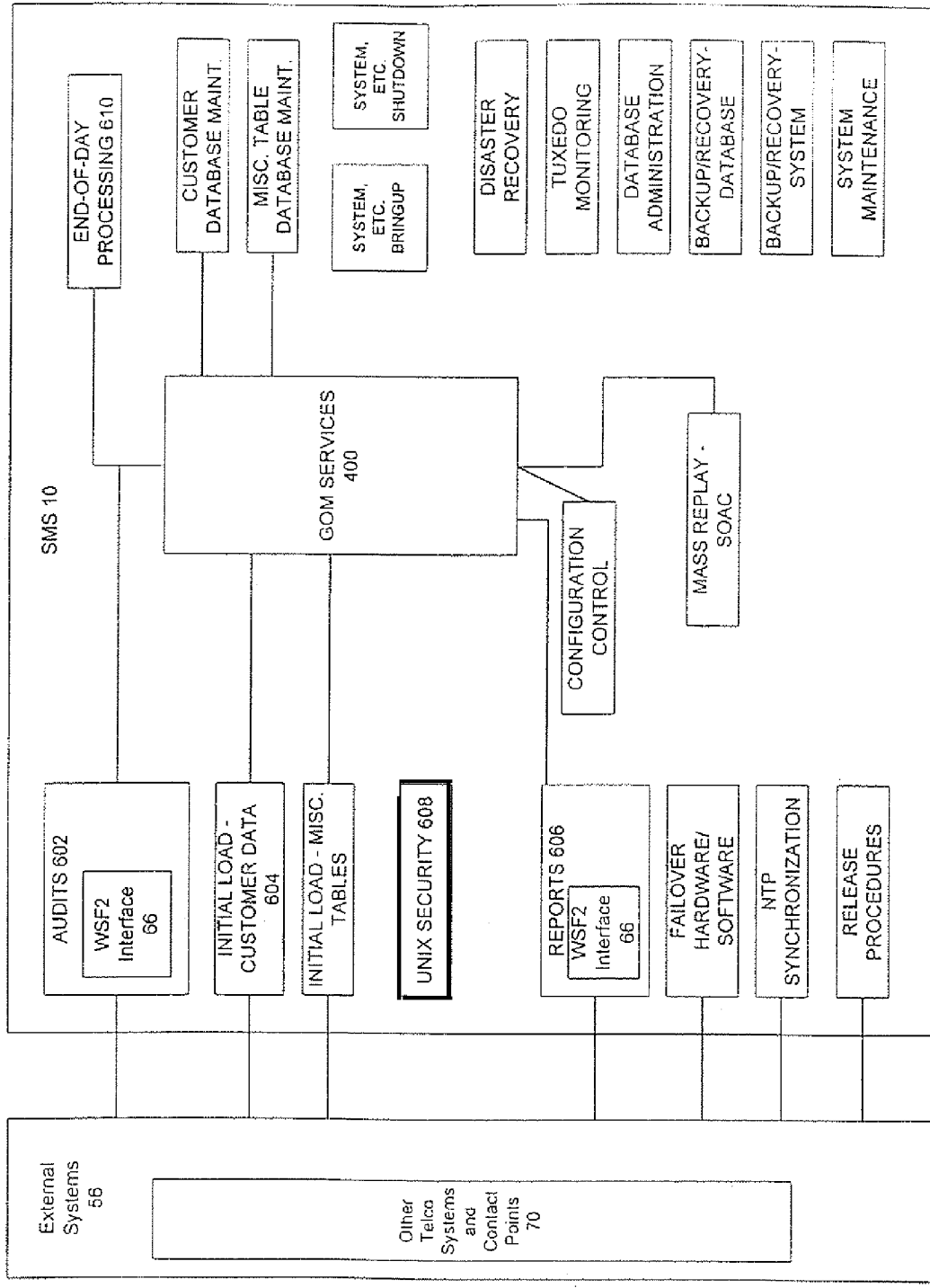
FIG. 34 illustrates, in a general block diagram form, the Maintenance and Administrative Services utilized in conjunction with the Service Management System of the present invention.

Referring to FIG. 33, at step 2100, the previous pass' HOL table is marked as complete at the order level. Its next pointer should point to the current pass's HOL and the current HOL should point to the prior HOL. Mark the current HOL pass order level status to HOLD.

At step 2102, this process determines if the previous pass had any manual or complex steps and if so send out a message to message notification informing the USER that a change is in progress.

A call to cleanup at step 2104 is performed to delete the entries out of SAV, SAV2 for the previous pass' INT_SEQ_NUM. A call must be made to BACKOUT 432 to remove any EDITS_ERROR and the manual intervention log for the previous pass should be marked as completed.

Next, at step 2106, it must be determined what type of BACKOUT request it is, it could be one which performs the reverse of completed pending steps, or it could be a recovery to a current active image in CUST database or CUST history database. If the order is due today, then send the entire order to message notification for manual intervention.

At step 2108 it is determined which steps of the previous pass of the order posted to the network (by looking at the HOL log for the previous pass and checking the status of each step).

At step 2110, it is determined if the service being provisioned was VAD, SPACE, AIN-IP or other.

For the reverse type of request, at step 2112, this process will create the reverse of each step that has posted to the network. For add and delete step(s), the process is merely reversing the deleted or added step(s). However, for change steps, the changed step will indicated what item changed and the new value, but the changed step will not indicate the old value of the field. Thus, BACKOUT 432 reads the history file (HOL) for this change to determine the value of the field(s) in question before the change. BACKOUT 432 takes that value(s) and makes a step or step to provision the original value back to the network. For the restore active or historical image of CUST database this function reads the record and restore the image for the NE involved (there should be some indication on the incoming request which NE(s) are involved). Also, at step 2114, there might be a need to utilize DTMF data that was brought back by SCRUB_EDITS 412 in attempting to recover current image (in the case where a blocked Delete and Add was sent and the Delete worked but the Add failed).

Step numbers created by BACKOUT 432 should start at 999 and descend, so as not to be the same numbers as the original step numbers which where provisioned. If multiple steps are involved, this function will determine the order of the steps (sequence—step number) and (timeline wise—schedule date/time) and will populate the prior/pointer fields in the records. The key to the first step is passed on to the Routing function. A field in the header structure will indicated this is a BACKOUT step. The BACKOUT attempt should be stored in a datalog and may look something like:

Date/timestamp
Tsys
OrderNBR
OrderType N,C,D,F,T,R
FT PRE,COR,CPC,PCN
WTN
INT_SEQ_NUM
NE
STEP NBR
USER_ID
GROUP_ID
PRI b. Processing of Queue BACKOUT Service BACKOUT 432 will take an incoming CORRID and queue name and delete that entry from that queue.

Output Messages sent to Routing may look something like:
Message type String QT, QC, GOM, C, L
NE String
Internal key Int database key
WTN Int
STEP_NBR Int
SCHEDULE_DATE_TIME Int
PRI String
RESUBMIT_INDICATOR or BACKOUT indicator R/B
Template ID
View C. Error Processing If an error occurs a error code is created and a event sent to message notification, in addition, the HOL table will be appropriately marked.

4. COMP_VIEW

The purpose of COMP_VIEW 44 is to generate a list of all existing services (USOCs) on a given customer's account (WTN) at a given time. The list also includes the options (FIDs) and parameters (CALL VARIABLES) for the USOC.

COMP_VIEW 44 is invoked by EDITS 412, GUI 42 and COMM processes COMP_VIEW 44 invokes a set of database access routines. COMP_VIEW 44 does not specifically perform error handling, but sets registers to indicate that an error in EDITS_ERROR table 212 has been set by COMP_VIEW 44. Subsequent error handling is up to the calling process. Inputs to the COMP_VIEW 44 service are the WTN and schedule date. The output is a list of USOCs which is available at the scheduled date for the given WTN.

COMP_VIEW 44 builds a list of all services (USOCs and FIDs) for a given WTN and schedule date by combining existing services that have already provisioned with pending services from the STEP tables and applying service changes from the given order. The COMP_VIEW 44 is a three dimensional list that includes USOCs, FIDs and CALL VARIABLES and their values.

5. Error Client

This service reads the error queue for VERIFY 408. After VERIFY 408 attempts a dequeue a configurable number of times, it is rejected into an error queue, which is then received by MESSAGE_NOTIFICATION 426.

The incoming data is a key to the PCS database 204 for this request. During processing, a unique INT_SEQ_NUM is read in from this functions message queue used to read the PCS database 204 (if needed). This function will re-submit the transaction back to VERIFY 408 with debug indicator turned ON. The transaction will error again, but with the debug turned ON, and once it errors, the transaction is sent to MESSAGE_NOTIFICATION 426 for routing. If the transaction does not error out again an informational message is sent to MESSAGE_NOTIFICATION 426.

Output from the Error interface includes Count data, an HOL entry, and an event sent to MESSAGE_NOTIFICATION 426.

If an error occurs a error code is created and an event is sent to MESSAGE_NOTIFICATION 426.

V. Graphical User Interface (GUI)

The graphical user interface and GUI Services 500 are provided to query the SMS data as well as query the attached network elements. The GUI may provided updates to the SMS data and will trigger the GOM services 400 to act upon those updates. Each of GUI screens, and associated services and features will now be described.

A. General Screens

1. About

Figure 35:
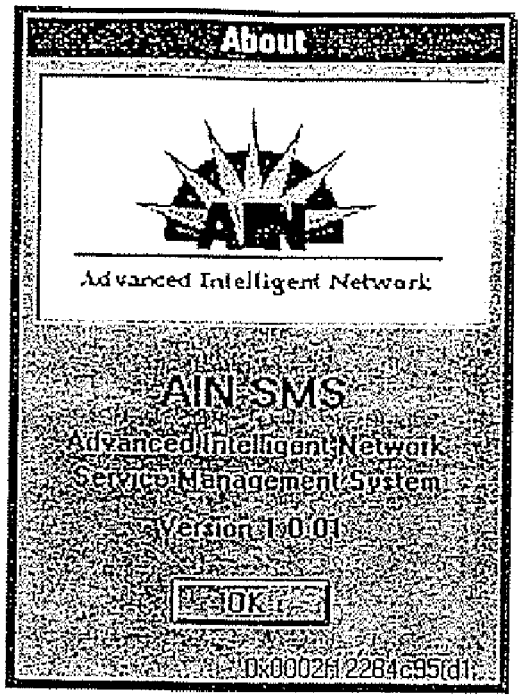
FIG. 35 is an exemplary graphical user interface screen illustrating an about window.

The About screen shown in FIG. 35 displays information about the current version of AIN SMS the IP Port Address. The version number is stored in variable GS_VERSION and the IP address (in Hex) is stored in the wsenv file located in a users c:\aq directory. Pressing the OK button will close the window. Other options include, for example, pressing CONTROL-A-S and double-clicking, which will display photographs of all users involved in the production of AIN SMS.

2. Available Locations

Figure 36:
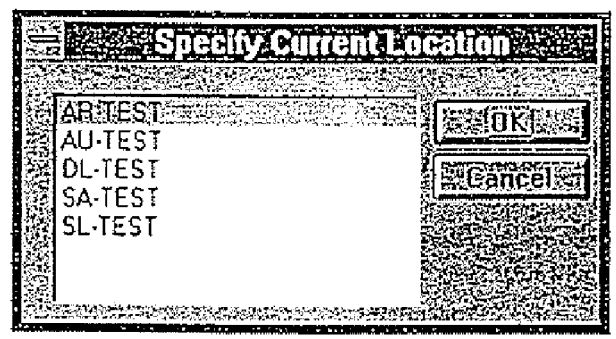
FIG. 36 is an exemplary graphical user interface screen illustrating an available locations window.

The available locations window shown in FIG. 36 displays all active locations for a User profile that is current in User Maintenance. A user can select one location and hit OK or double-click on the location to select it.

a. Events Called by this Window open—This script loops through W_USER_MAINT.D-W_LOCATION and populates the listbox with any locations with an access value of 'Y'. Then the first location is selected.

CB_CANCEL2—If no location is selected, then the first listed location will be returned.

CB_OK2—Returns the selected location.

LB_LOCATION.DOUBLECLICKED—Triggers the OK button clicked event.

LB_LOCATION.SELECTIONCANGED—Enable the OK button since a location was selected.

3. Change Password

Figure 37:
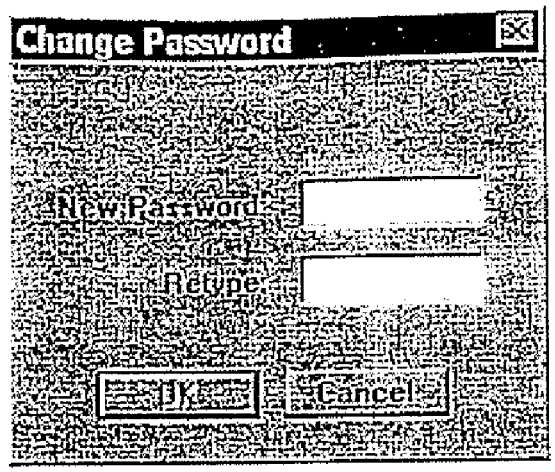
FIG. 37 is an exemplary graphical user interface screen illustrating a change password window.

The Change Password screen shown in FIG. 37 allows the currently logged on user to change his or her password at any time. To get to this screen, the user navigates using the menu option File . . . Change Password. If the user is forced to change an expired password upon logon, canceling will exit the application. Note, that the past six user passwords may be kept in an encrypted history file on the server which requires a user to use a different password than these past six passwords.

a. Events Called by this Window open—Checks to see if a password was passed in to this window. If so, then the user must have entered via W_LOGON. This method assigns a value to II_SECURITY_CODE=1 and the old password is entered invisibly into SLE_OLD_PASSWORD. Otherwise, II_SECURITY_ CODE=0 and the password is blank.

SLE_NEW, SLE_RETYPE, SLE_OLD.UE_KEYUP—If SLE_NEW.TEXT and SLE_RETYPE.TEXT and SLE_OLD.TEXT are greater 5 then CB_OK is enabled.

CB_OK.CLICKED—The service GUsrChgPsswd is called to submit the new and old password to the server. If the password is valid and has not been used in the past six passwords by that user, a success is returned.

4. Current Location

Figure 38:
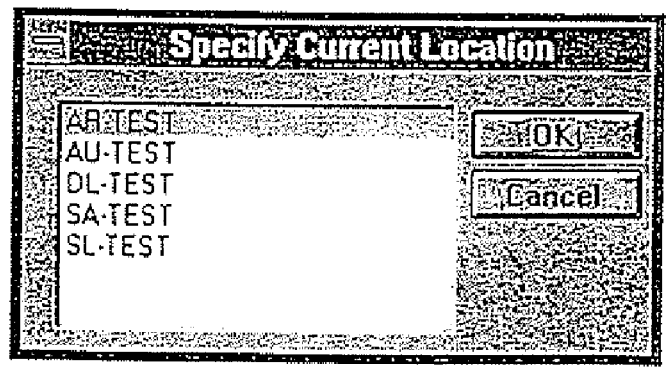
FIG. 38 is an exemplary graphical user interface screen illustrating a current location window.

The location response window shown in FIG. 38 displays all locations for signed-on User ID as stored in GS_OFFICE_

LOC. A user can select one location and hit OK or double-click on the location to select it.

a. Events Called by this Window open—The input arguments are checked for an action code. These may be 'A' (show all locations), or 'F' (show only those that are assigned to this User ID). This script loops through GS_OFFICE_LOC and populates the listbox with the appropriate locations. Then the first location is selected.

CB_CANCEL2—If no location is selected, then a normal close is performed returning a value of 'Y'.

CB_OK2—Returns the selected location. If none is selected, a warning message is displayed.

LB_LOCATION.DOUBLECLICKED—Triggers the OK button clicked event and assigns the selected location value to GS_OFFICE_LOC.

LB_LOCATION.SELECTIONCHANGED—Enables the OK button because a location was selected.

CB_REFERENCE.CLICKED—This button opens the NPA/NXX Summary Reference Table.

5. Current Wire Center Settings

Figure 39:
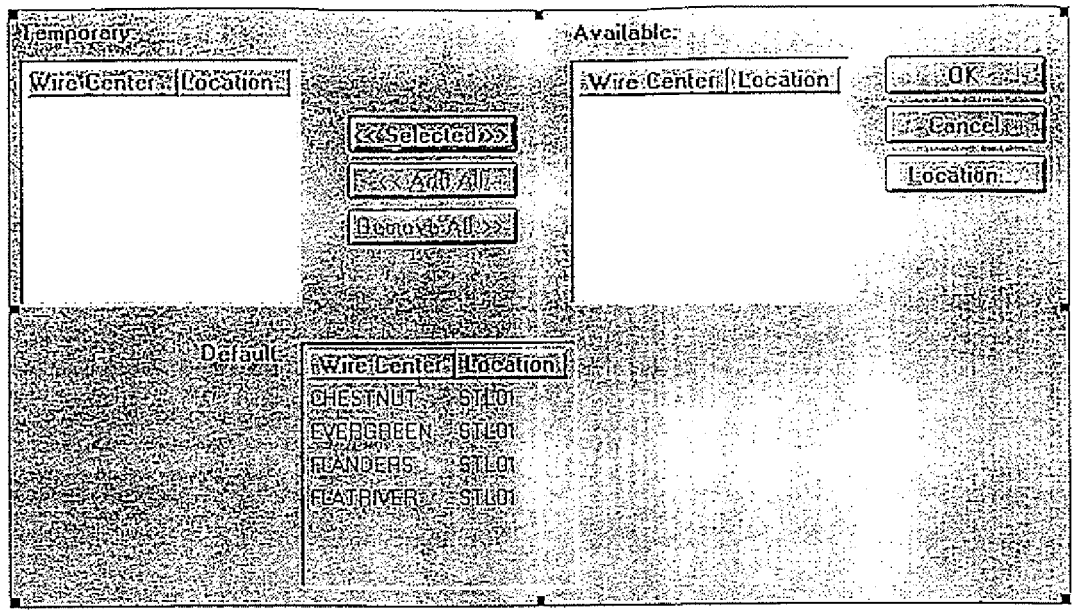
FIG. 39 is an exemplary graphical user interface screen illustrating a current wire center settings window.

The Current Wire Center Settings window shown in FIG. 39 allows the user to add wire centers to their default Wire Center list as a temporary addition. Only Wire Centers for Office Locations which that User has permission to access will be selectable. Any Wire Centers moved to the Temporary Default datawindow will be treated the same as regular Default Wire Centers by the TUXEDO server for filtering of AIN SMS data.

a. Events Called by this Window

Open event of W_CUR_SETTINGS—GUsrWcSel is called to load the hidden datawindow DW_GUSRWCSEL with all default, available, and temporary wire center aliases. These are then filtered to each of the three visible Wire Center datawindows depending on the value of the column "S_WC_USAGE_IND". (D=Default, A=Available, T=Temporary).

DW_TEMPORARY and DW_AVAILABLE—Wire Centers can be moved from one window to the other by double clicking, selecting rows and pressing "Selected", pressing "Add All", pressing "Remove All", and drag and dropping Wire Centers from one datawindow to the other.

CB_OK—Clicking OK will fill DW_GUSRWCSEL with the updated values for default and temporary Wire Centers. GUsrWcWrt is then called to save the Current Wire Center settings to the server for filtering. Any temporary Wire Centers will immediately go into effect and remain as temporary Wire Centers until GLogOut is called when the User is logged off.

6. Error Message Display

Figure 40:
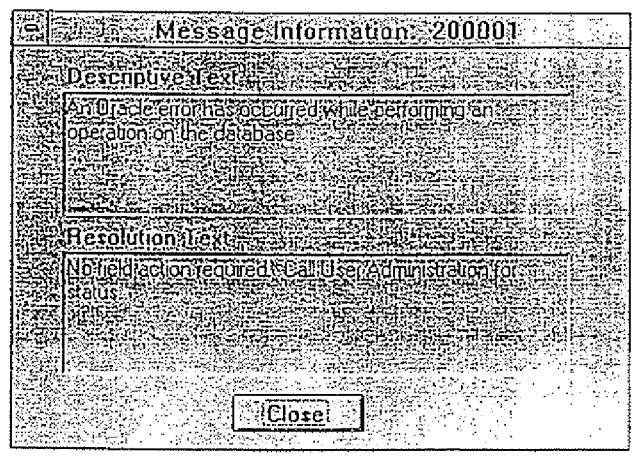
FIG. 40 is an exemplary graphical user interface screen illustrating an error message display window.

The Error Message Display window shown in FIG. 40 displays specific error information for a given error code. FIG. 40 indicates that the error code is 200001. A more specific error text was given in the screen before this one. The descriptive text is a general description of this error and the resolution text should give the user what actions need to be taken in order to correct this error.

a. Events Called by this Window

Open—Retrieves all the specific information for the error code that was passed in through the open function (WF_RETRIEVE, GErrorMsgSel).

Closequery—If this order has indicated that it may be marked as investigated, and the open of the window is not failing, then the user is prompted to mark it as investigated. If the user answers 'Yes' then the order is marked (GMIDatInvWrt).

CB_OK—Closes window.

DW_GERRORMSGSEL—Displays specific information for given error code. The two fields are Descriptive Text which should be a general description of the error and Resolution Text which should give the user hints on how to solve the order that erred out.

7. Group Maintenance

Figure 41:
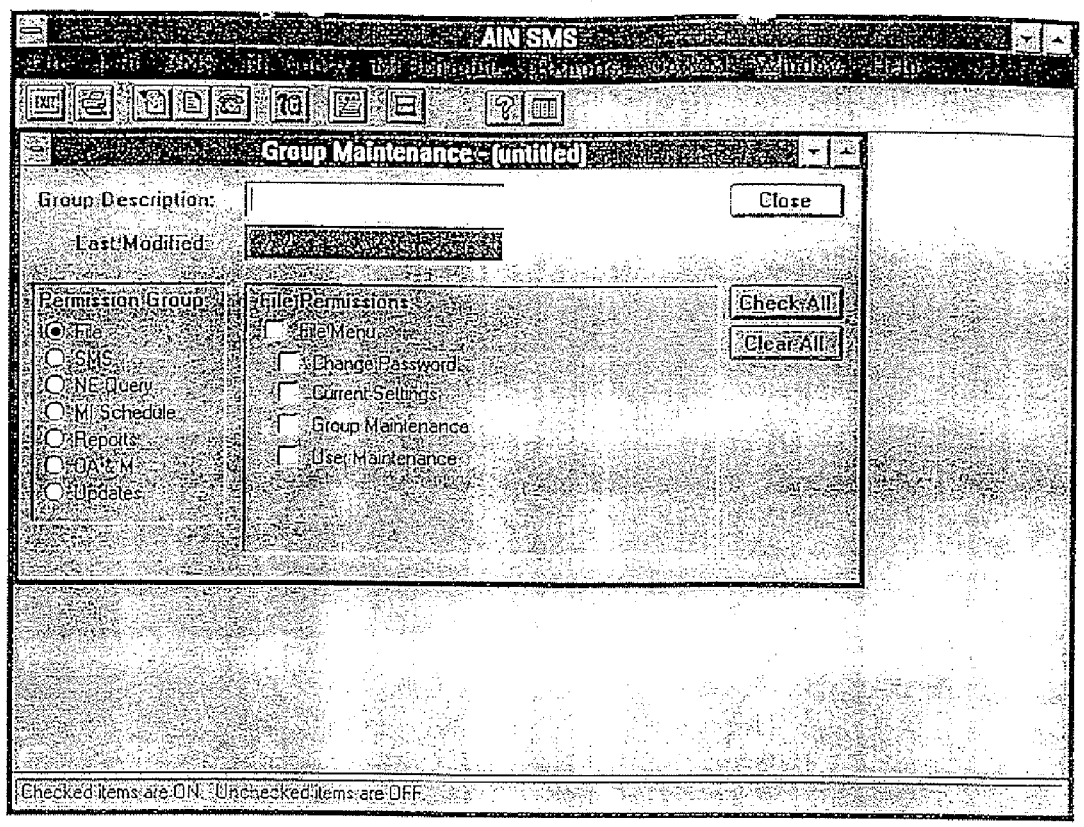
FIG. 41 is an exemplary graphical user interface screen illustrating a group maintenance window.

The Group Maintenance window shown in FIG. 41 is the mechanism used to create new Group profiles. These profiles are later assigned to one or more users of SMS 10 through User Maintenance. Checking off any boxes will give that group permission to use the related screens upon successful logon. Clicking on a heading will check or uncheck all boxes within its bounds. To save the profile, the user must have typed in at least 1 non-space character as a description and then the File . . . Save As option becomes available. The user may modify previously created Group ID profiles by first retrieving them with File . . . Open.

a. Events Called by this Window

Open event of W_CHG_GROUP_PREP—This screen makes DW_GENERAL visible upon opening. All text and radio button attributes are set up in the datawindow painter.

DW_SELECT—This datawindow contains a list of all available checkbox datawindows representing menu and update permissions. Selecting a particular radio button will make the selected datawindow visible and hide all others.

DW_GENERAL—The itemchanged event of this window contains code which selects/deselects subitems when a header is checked ON or OFF. All the checkbox datawindows each trigger this script in order to keep the code in one place, as opposed to seven different locations.

DW_GGRPPERMSEL—This hidden datawindow contains the code for loading the existing Group ID profile into the checkbox datawindows. The datawindow also stores the checkbox information for saving. Upon loading an existing group, the checkbox items are copied one-by-one to each of the checkbox datawindows. Using a return code value of '!' and GetItemString, the script can differentiate each datawindow's checkboxes dynamically.

CB_CLEAR, CB_ALL—These command buttons clear or check all items on the current visible checkbox datawindow.

8. Group Maintenance—Enter Group

Figure 42:
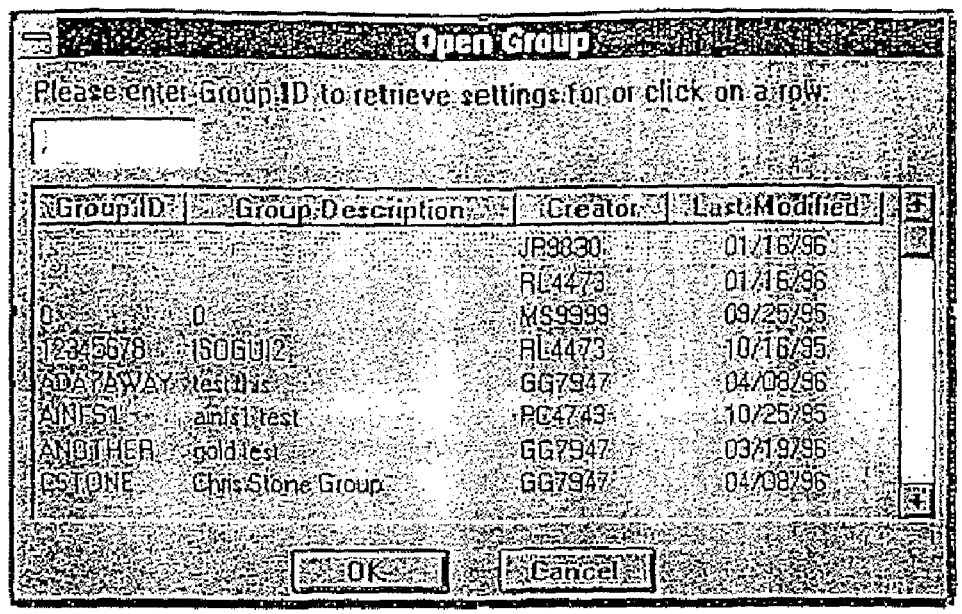
FIG. 42 is an exemplary graphical user interface screen illustrating a group maintenance—enter group window.

The Open Group ID windows shown in FIG. 42 displays all previously created group IDs available on the current TUXEDO environment. The user may highlight any row and hit OK to load the group profile into Group Maintenance. The user may also type an ID in the SLE and the datawindow will scroll to the closest matching ID for quick searches.

a. Events Called by this Window open—This script triggers event 'UE_GGRPLSTSEL' to load Ids. Next, the first row is highlighted and selected. The active row name is copied to the SLE.

CB_OK2.CLICKED—The creator ID is loaded into memory and then this script calls GGrpPermSel to load the datawindow DW_GGRPPERMSEL on W_USER_MAINT with the selected Group ID detail information. It also sets the title, group description transfer to W_USER_MAINT.SLE_DESC.

DW_GROUPS.CLICKED—Selects the current row or sorts if a header is clicked on.

DW_GROUPS.DOUBLECLICKED—Triggers the CB_OK2.CLICKED event (OK button)

UE_GGRPLSTSEL—This script loads the existing group ID information by calling GGrpLislSel for DW_GROUPS. The items are returned in Group ID sorted order by the server.

DW_GROUPS.UE_ROWFOCUS—If any valid row is selected, then enable the OK button and copy Group ID to the EM_GROUP line.

UE_KEY—If the user presses the up, down, left, or right arrow keys, then the UE_ROWFOCUS event is triggered.

b. Functions Performed by this Window

WF_SCROLL—This function, located in EM_GROUP_ID base object, accepts a datawindow and scrolls to the nearest matching row for Group ID. A value of 1 is returned if successful, otherwise, a value of −2 is returned.

9. Group ID Save

Figure 43:
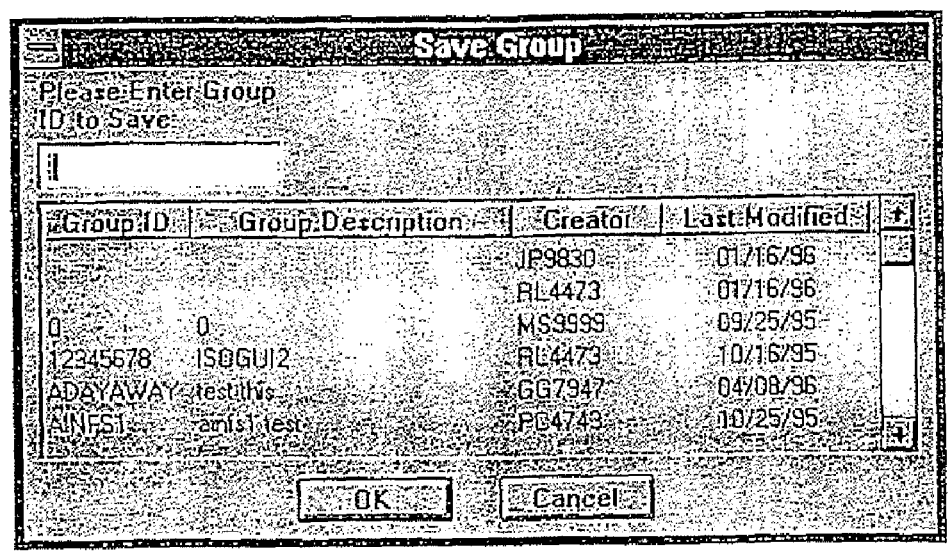
FIG. 43 is an exemplary graphical user interface screen illustrating a group ID save window.

The Group Save window shown in FIG. 43 provides a mechanism for the current user to save a new Group ID or update an existing Group ID. The user types in the name of the Group ID to save in EM_GROUPS and then hits OK. The user may also click on any row and the selected Group ID is copied to EM_GROUPS for possible saving. Note that the contents of EM_GROUPS is saved for Group ID, not the datawindow. This operation is the converse of opening an existing group, where the selected datawindow row holds the Group ID to retrieve.

a. Events Called by this Window open—This script calls service GGrpListSel to populate the datawindow with all existing Group Ids. If a current Group ID is assigned to IS_GROUP, then DW_GROUPS is scrolled to this item. If the record is new, the first Group ID is selected.

CB_OK2.CLICKED—The current User ID is compared to the Creator ID of an existing group. If they are equal, then processing is allowed to continue. If not, the user is notified that a new group must be saved. Next, the event 'UE_SAVE_PERMS' is called on W_CHG_GROUP. This event loads all existing data on the selected Group ID. The script then enables the appropriate menu items, save and save as, and sets the title of W_CHG_GROUP to the current Group ID. Finally, any reset flags are reset for data that may have changed before the latest retrieve command.

DW_SELECT.CLICKED—Triggers user event 'UE_ROWFOCUS'

UE_ROWFOCUS—This script sets EM_GROUP to display the selected row Group ID and enables the OK button.

UP_KEY—If the up, down, right, or left arrow key is pressed, then UE_ROWFOCUS is triggered.

UE_KEYUP—If any text is typed in EM_GROUP that has a length greater than zero, the OK button is enabled.

10. Interface Status

Figure 44:
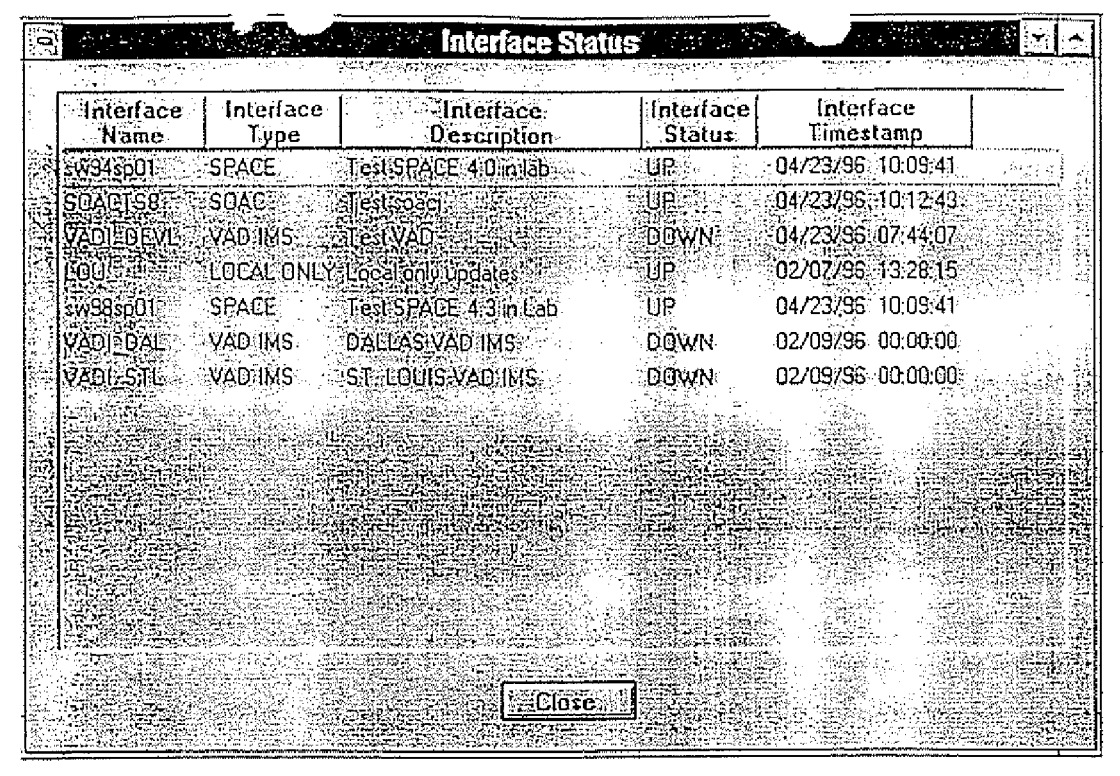

The Interface Status window shown in FIG. 44 displays information about the status of environments that interface with the SMS 10. This window is for display purposes only, as no edits or changes may be made from this screen.

a. Events Called by this Window

Open of window—Calls a service that retrieves information to populate datawindow (GIntrfcStat).

CB_1—Closes window.

DW_TABLE—Datawindow that displays status of environments that interface with the SMS 10.

11. Logon

Figure 45:
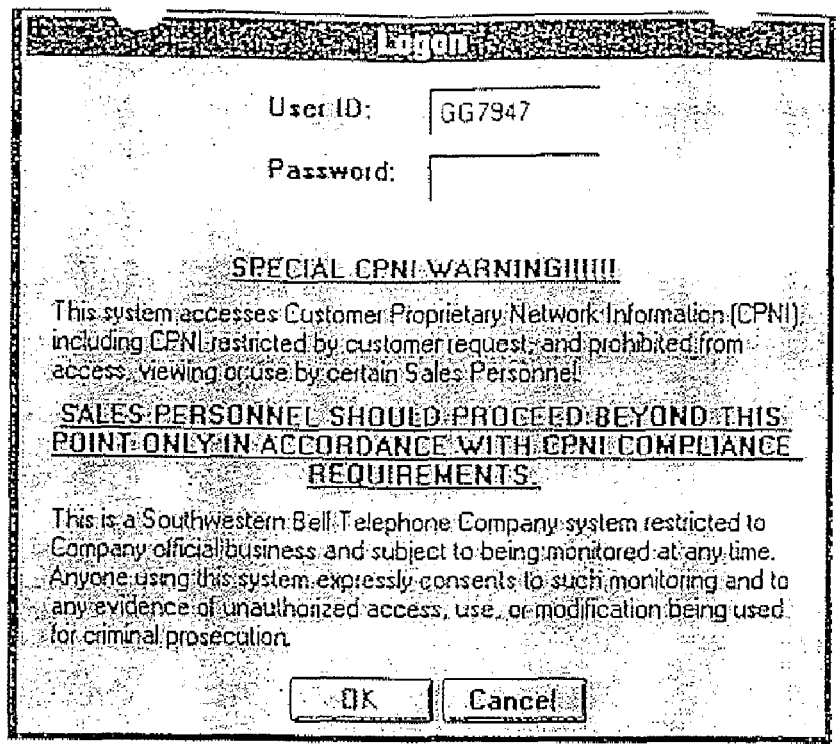
FIG. 45 is an exemplary graphical user interface screen illustrating a logon window.

The Logon windows shown in FIG. 45 accepts a User ID of 6 characters and Password of 6 to 8 characters. Upon entry of both fields, the OK button is enabled. The user clicks the OK button to start an initialization script. The initialization script's pseudo-code follows:

Clicked for CB_OK.

Get ID and Password from EM_ID and SLE_PASSWORD.

Call WF_INIT_VARIABLES:

Initialize Global Variables for the SMS application. The current version number (string GS_VERSION) is passed to the TUXEDO server for processing. The Development version should be higher than the Production version.

ulong LUL_BASE is set to the base bump up value for server return codes. This value is used in translation of error codes from the database and DCI return codes.

Call WF_LOGON—This service calls the DCIFX_INIT function to establish a valid server connection. It uses User ID and Password as well as a Transaction Manager (TM) name as parameters. The TM is, for example, "TUXEDO".

Call WF_INIT_ERROR_ARRAY—This function retrieves as DCI and GUI error codes from the server and stores them for SMS use in the global array GS_ERROR_MESSAGE.

Call WF_UNSOL_MESSAGE—Initialize the unsolicited message buffer through DCI_INIT_UNSOL_MSG. System messages will trigger a UE_UNSOL_MSG event on W_FRAME.

Call WF_GUSRPERMSEL—This function calls gusrpermsel with the User ID, Password, and version. The function returns −1 if service fails. If WF_GUSRPERMSEL fails, then error code is checked for the expired password code. If the password code is not expired, then this function checks for invalid version return code. If neither, then this function shows an error message.

Call WF_SEARCH_HEADER—Retrieves Group ID and stores it in GS_GROUP_ID from GUsrPermSel header field.

Call WF_MENU_SETTINGS—Reads Permissions from hidden datawindow and enables menu items with type "M". If type is "B", then a global command button permission variable is set. Uses a recursive procedure to properly enable subitems.

Call GusocGrpSel—If successful, call WF_SET_USOC_ARRAY. This function takes all usoc and fid information and stores it in GSA_USOC_FID.

Call WF_ASSIGN_LOC—Loads all available office locations into structure array GSA_OFFICE_LOC.US_OFFICE_LOC. This also loads information pertaining to whether the current user has that location as active into structure array GSA_OFFICE_LOC.UB_OFFICE_ACTIVE.

Call WF_COMMUNITY—This function loads all User Communities into structure array GSA_USER_COMMUNITY.US_USER_COMMUNITY, and loads information regarding whether communities are selected as active in GSA_USER_COMMUNITY.UB_ACCESS.

Call WF_INI—If user is running under a MS Windows environment, then the default toolbar position, last logged on user, and toolbar visible info is read from AINSMS.INI.

Close Title screen and make W_FRAME visible.

12. Message Box

Figure 46:
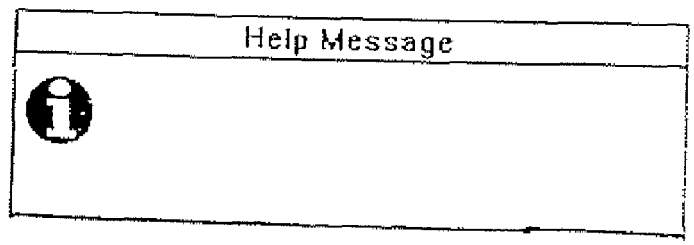
FIG. 46 is an exemplary graphical user interface screen illustrating a message box window.

The window W_MESSAGEBOX shown in FIG. 46 replaces the PowerBuilder default messagebox for displaying information to the user. This window was created to add functionality for a dual purpose help button. It may call application specific error help through a DCI service call, or it may display a windows help file. The open arguments determine what functionality, as well as attributes, this window will undertake.

a. Events Called by this Window open—Any input parameters are first stored in STR_MESSAGEBOX LSTR_BOX. The messagebox title is then set. Next, the error text parameter is checked for data, if any exists, then the box is a DCI messagebox. If no error text is passed, then the local error message methodology is used by looking up the code values with GF_GUI_ERROR_MESSAGE( ).

Any @ symbol placeholders are replaced with the text passed in though the S_SUBSTITUTE argument. Next, the messagebox is sized depending on the amount of text to be displayed. This entails multiplying each line of text by 65 PBU's plus placing the bitmap.

Several special error codes can be passed in to this window for processing. An example is 134 which are the Reverse default buttons. The proper command button sequence is then displayed. Options include OK!, OKCancel!, YesNo!, YesNocancel!, RetryCancel!, AbortRetryIgnore!.

If the user was never able to log on to the system and has no error code lookup table array, then any help buttons are overridden.

getfocus—Adjusts screen size when the error text child window is open.

CB_1, CB_2, CB_3, CB_HELP.CLICKED—These command buttons return the button value to the parent window. These values are later tested for processing in parent scripts. The values may be 1 (OK, Yes), 2 (No), 3 (Cancel) and 4 (Help).

CB_HELP.CLICKED—If no help file name is passed in, this script will use the number passed in error code to open IW_ERROR_WINDOW.

13. NPA/NXX (Wire Center)

Figure 47:
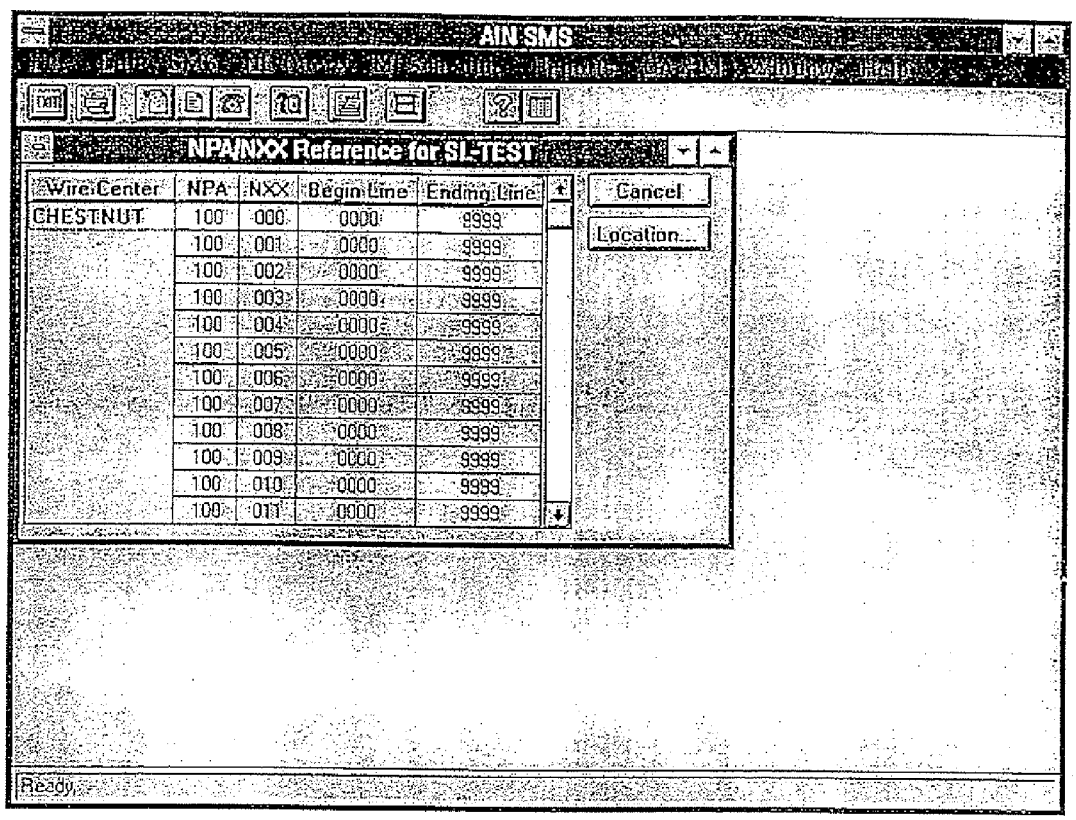
FIG. 47 is an exemplary graphical user interface screen illustrating a NPA/NXX window.

The NPA/NXX reference screen shown in FIG. 47 displays a summary list of all Wire Centers available to a particular location. The user selects a location which is stored in GS_OFFICE_LOC. This location is then used to filter the master list of NPA/NXX assignments.

a. Events Called by this Window open—This script first determines if the user has a current office location stored in GS_OFFICE_LOC. If so, then processing continues. If not, W_LOCATION_RESPONSE opens up to get input from the user for a location to make current. Once a location has been selected, the event 'UE_LOAD_WC' is triggered to populate DW_REF. Finally, if more than one location is available for the user, then the location command button is made visible.

resize—This script uses the workspace height and width to properly size that window. It also resizes the objects to fit in user modifiable sizing of the window.

UF_LOAD_WC—This script calls the service GWCXRefSel to populate DW_REF with wire center assignments for NPA/NXX lines. Next, this function loops through the same service passing in the last NPA, NXX, and begin line to GWCXRefSel until the more rows flag is no longer set. Finally, the first row is made active and highlighted.

CB_LOCATION.CLICKED—Opens the W_LOCATION_RESPONSE select window. If a new location is selected and returned, then 'UE_LOAD_WC' is triggered.

14. NPA/NXX (Summary)

The NPA/NXX Summary reference screen displays a summary list of all Wire Centers available for all locations and all Wire Centers.

a. Events Called by this Window open—This script triggers 'UE_LOAD_WC' resize—This script uses the workspace height and width to properly size that window. It also resizes the objects to fit in user modifiable sizing of the window.

UE_LOAD_WC—This script calls the service GWCXRefSel to populate DW_REF with wire center assignments for NPA/NXX lines. Using a parameter string that includes an empty string for location, all records for all locations are returned into DW_REF.

DW_REF.CONSTRUCTOR—The column grid highlighting is turned off.

15. Printer Options

Figure 48:
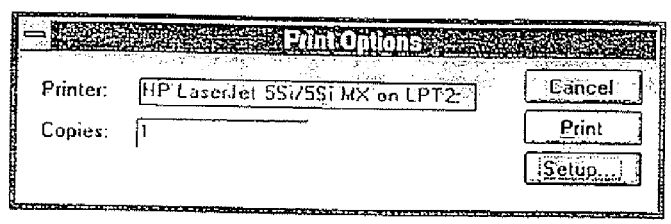
FIG. 48 is an exemplary graphical user interface screen illustrating a printer options window.

The Print Options window shown in FIG. 48 provides the user with the ability to select the number of copies they want printed as well as modify what printer the output will go to.

a. Events Called by this Window open—Sets the currently active printer into DW_PRINT printer edit line.

CB_CANCEL—Closes the print option screen and stops print processing.

CB_PRINT—Gets the number of copies desired and returns this value to the calling window.

CP_SETUP—Calls PowerBuilder function printsetup( ) to allow printer configuration.

16. Queue Viewer

Figures 49, 50:
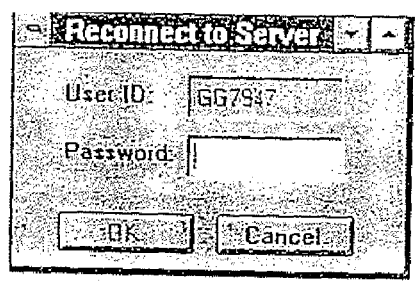
FIG. 49 is an exemplary graphical user interface screen illustrating a queue viewer window.
FIG. 50 is an exemplary graphical user interface screen illustrating a reconnect session window.

The Queue viewer window shown in FIG. 49 displays vital statistical information on each queue that applies to the this application.

a. Events Called by this Window

Open of window—Call a service to retrieve data to populate datawindow (GQueStatsSel).

CB_1—Closes the window.

DW_TABLE—Datawindow that displays statistics on each queue.

17. Reconnect Session

The Reconnect window shown in FIG. 50 provides the user with the capability to reestablish a server connection which may have been lost due to network problems, server bouncing, and PC errors, etc. A lost connection is often revealed by the user receiving "Tuxedo Server Errors" or "Invalid Parameter" messages for every service called. This is only a sample of the error messages that may occur.

Reconnecting often allows the user to preserve any current work that would be lost by logging off and logging back on. This feature optimally works if no sheets or no services were being held on the TUXEDO server. Reconnecting to the server is a two part process. First, the current/lost transaction connection is cleaned up. Second, a new service call to establish a new connection is made.

a. Events Called by this Window

Cs_OK2.CLICKED—The service DCIFX_EXIT( ) is called to clean up old TUXEDO buffer allocation. Next, DCIFX_INIT( ) initializes a new transaction manager connection. Once the connection is established, then the function WF_UNSOL_MSG( ) sets up the unsolicited messagebuffer.

b. Functions Performed by this Window

WF_UNSOL_MSG—This function initializes the unsolicited message buffer to recognize the newly established server connection. This function returns 0 if ok, −1 if buffer allocation fails.

18. Return to Sender

Figure 51:
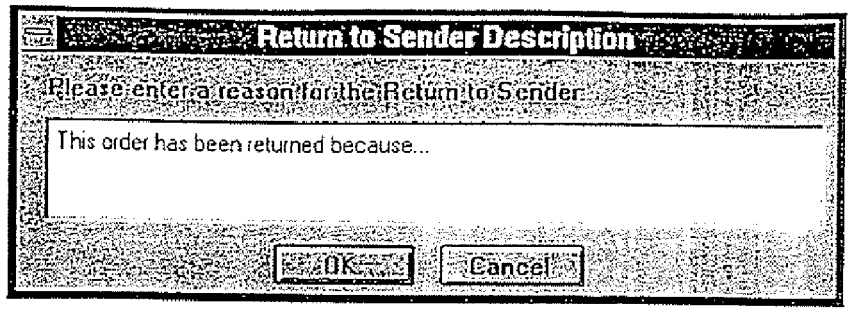
FIG. 51 is an exemplary graphical user interface screen illustrating a return to sender window.

The Window W_RET shown in FIG. 51 provides a simple mechanism for a user to enter a text line message that will be returned with the current selected Order Number on MI Schedule.

a. Events Called by this Window

CB_1.CLICKED—Calls GF_TAB_ENTER_NOTIFY( ) to determine if any illegally embedded characters (tab or carriage returns) are inside the text message. If not, the string is returned to the calling script on MI Schedule.

CB_2.CLICKED—Closes the screen with no text returned. This will stop the calling scripts execution.

19. Status Descriptions

Figure 52:
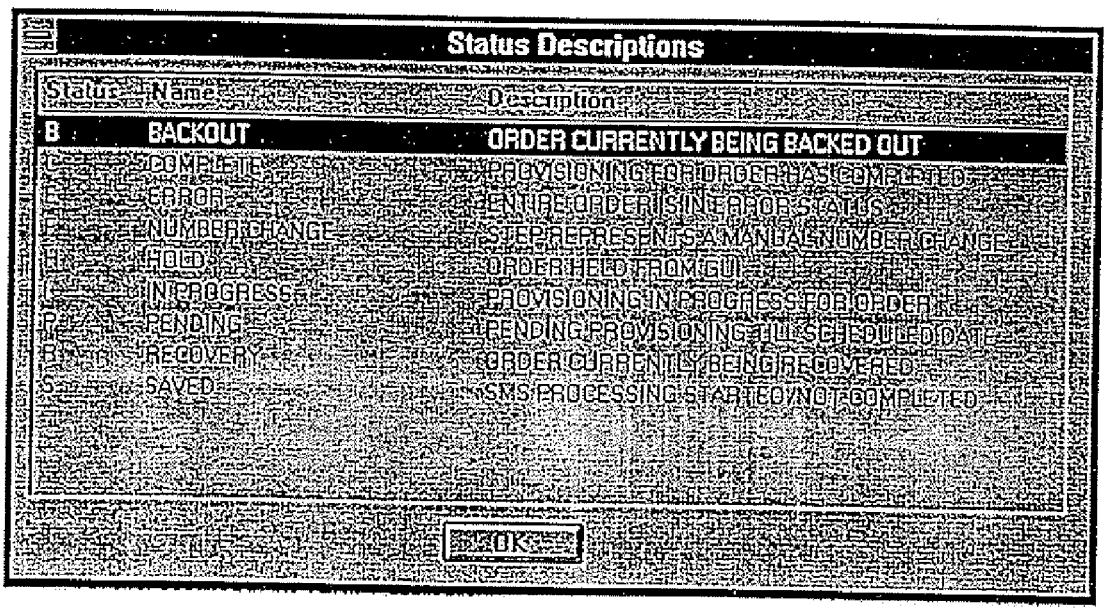
FIG. 52 is an exemplary graphical user interface screen illustrating a status descriptions window.

The Status Descriptions window shown in FIG. 52 is used to display descriptions of status for orders and steps. The window is opened by right mouse clicking on a status from the following windows Select Order, HOL Tables (HOL_CTL, HOL_FLOW, HOL_WTN), and MI Schedule.

a. Events Called by this Window

Open of window—Gets an action code passed from parent window to determine which descriptions to show. Call service to retrieve list directly into datawindow, GStatusXSel.

CB_CANCEL2—Closes the window.
CE_OK2—Not visible. (From ancestor)
DW_DESC—Datawindow that displays descriptions.

20. System Messages

Figure 53:
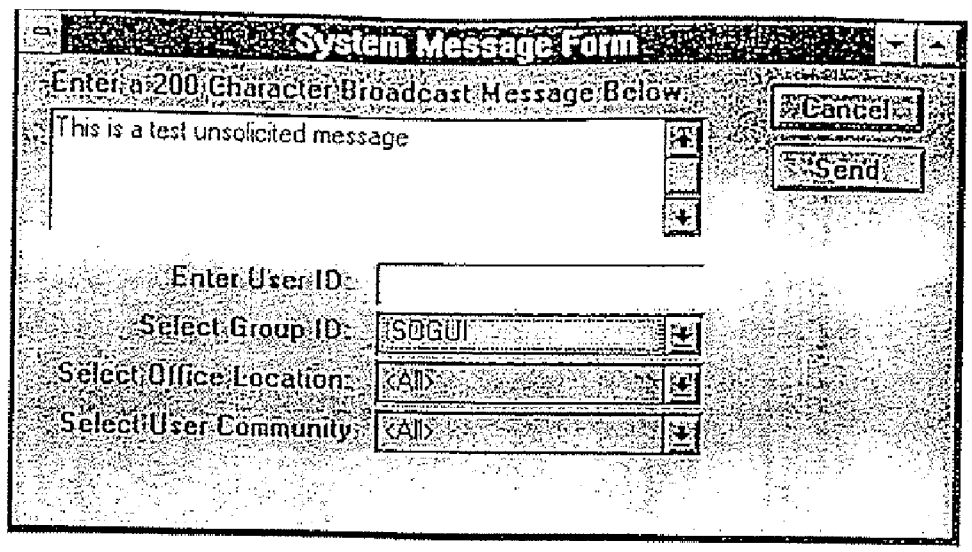
FIG. 53 is an exemplary graphical user interface screen illustrating a system messages window.

The Systems Messages window shown in FIG. 53 allows the user to send a 100 character FML broadcast message out to any user, group, or location within the AIN SMS environment. It is intended as a system administration tool, not an email client. In order for the messages to be received, the other system users must be logged in with a valid TUXEDO transaction manager connection through DCI when the message is sent. Modules invoked include: W_UNSOL_MSG, NVO_UNSOL_MSG, and W_FRAME.

TABLE 2 a. Unsolicited Message Structure

| | | |
|---|---|---|
| S_ACTION_CODE | STRING | 4 |
| S_REQ_USERID | STRING | 6 |
| S_USERID | STRING | 6 |
| S_OFFICE_LOC | STRING | 10 |
| S_USER_COMMUNITY | STRING | 10 |
| S_GROUP_ID | STRING | 8 |
| S_UNSOL_MESSAGE_TEXT | STRING | 100 |

The above structure in Table 2 must be followed for a proper message to be received and displayed correctly by other clients. Extra spaces in all parameters except MESSAGE_TEXT must contain spaces to fill to required length. This is also necessary if a UNIX administrator writes a client to send a message out. If the required fields are mistyped, inappropriate users may receive the broadcast message. The user object 'UE_UNSOL_MSG' contains the client logic for displaying a message or performing a message actions.

S_ACTION_CODE (table 2) determines what type of action should be taken when an unsolicited message is received by the client. Exemplary actions and action codes are:

| | |
|---|---|
| 1000 | Display message and S_REQ_USERID |
| 2000 | Logoff and shut down client |
| 3000 | Notify client of user profile change |
| 4000 | Notify client of configurable Parameter changes |
| 5000 | Perform specified action. |

S_USERID is utilized to determine actions in accordance with the following pseudo-code and Table 3:

TABLE 3 if UNSOL.S_USERID = CLIENT.S_USERID
    then perform Action for specified S_USERID
  if UNSOL.S_USERID = *
    then check S_OFFICE_LOC, S_USER_COMMUNITY,
      S_GROUP_ID

| User Id | Office Loc | User Community | Group ID | Action |
|---|---|---|---|---|
| User ID | n/a | n/a | n/a | perform action all specified User only |
| * | * | * | * | Perform action for all users |
| * | Office Loc | * | * | perform action all Users in Office Loc |
| * | * | User Community | * | perform action all Users in User Community |
| * | * | * | Group ID | perform action all Users in Group |
| * | Office Loc | User Community | * | perform action all Users in Office Loc and User Community |
| * | Office Loc | * | Group Id | perform action all Users in Office Loc and Group |
| * | Office Loc | User Community | Group Id | perform action all Users in Office Loc and and User Community and Group |
| * | * | User Community | Group ID | perform action all Users in User Community and Group | a. Events Called by this Window open—The three DropDownDatawindow Childs are populated with all Users, all Locations, and all Group Ids. If the user is part of the 'SYSADM' group, then they also have the <ALL> option.

CB_SEND.CLICKED—This script formats the broadcast message buffer for each field entered. Once the entire string, LS_MESSAGE, is populated, the service GBrdCstMsg is called to broadcast the unsolicited message string out to all DCI/TUXEDO clients.

EM_TEXT.EDITCHANGED—If any text is entered, enable the send button.

21. Title Screen

Figure 54:
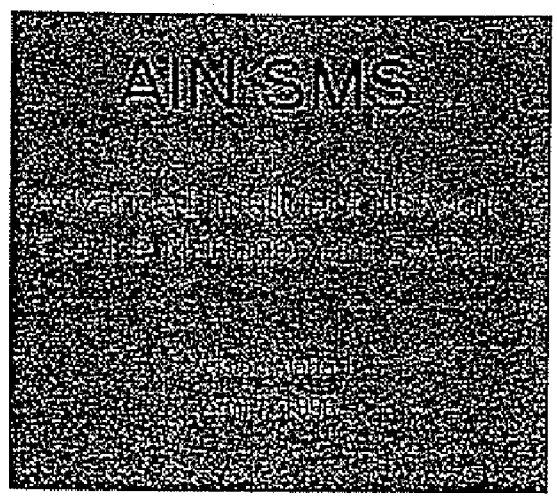
FIG. 54 is an exemplary graphical user interface screen illustrating a title screen window.

The title screen shown in FIG. 54 is displayed after the user has initialized a connection to TUXEDO. During menu initialization and password approval processes, this window remains open. If any irregular logon return codes are received or logon is completed, then the window is closed.

a. Events Called by this Window
Close—Contains script to play a .WAV file
open—code of triggering event "UE_PLAYSOUND".
UE_PLAYSOUND—This script plays a .WAV file.
constructor—The version number is computed and displayed from variable GS_VERSION.

22. User Maintenance

Figure 55:
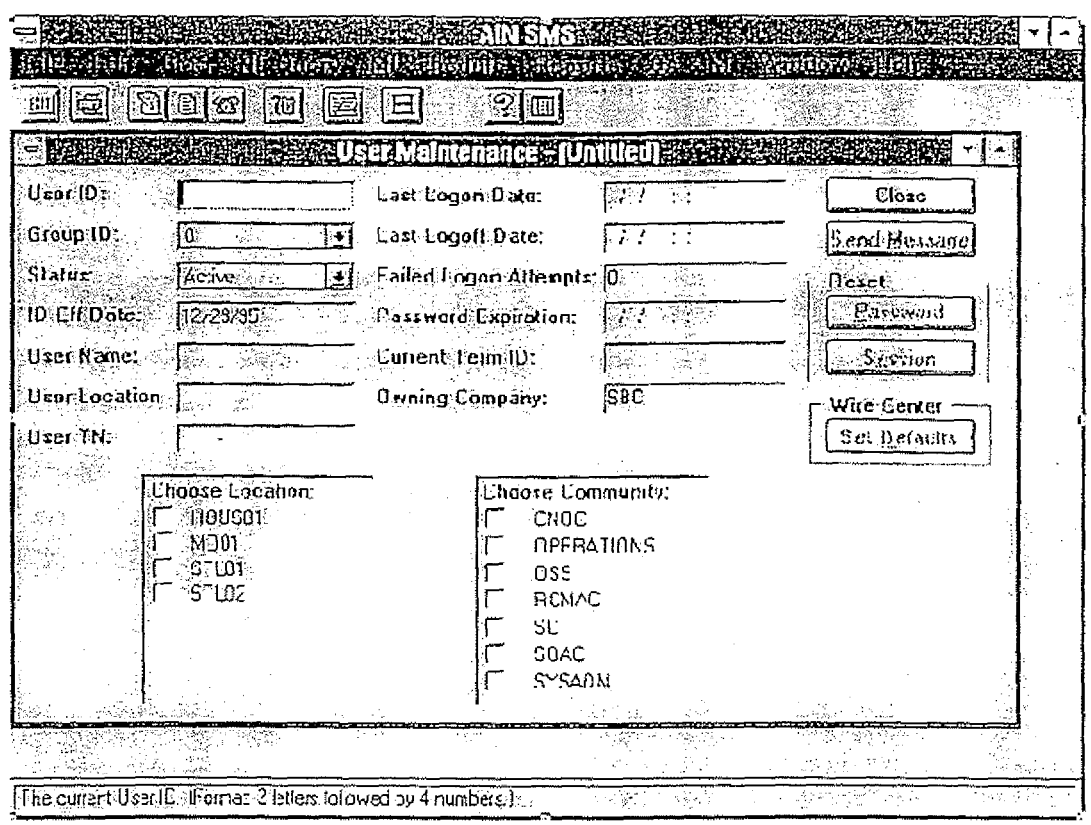
FIG. 55 is an exemplary graphical user interface screen illustrating a user maintenance window.

The User Maintenance screen shown in FIG. 55 allows a manager or system administrator to add, modify, or delete new users and user attributes from the AIN SMS system. The screen also allows assignment of default Office Locations, Wire Centers, and User Communities. Resetting of a User Password and session are allowed; as well as sending an unsolicited system message to a particular user.

a. Events Called by this Window

DW_USER—This datawindow contains personal attribute information on a User ID. The User ID must first be entered through either the edit line or through Open . . . menu item. Once an ID is entered, existing information, if available is retrieved and displayed. Validation is done in editchanged event. On the Sixth character of the User ID entry, event "UE_AUTOLOAD" calls the retrieve service GUsrProfSel. If this service fails, the ID is for a new user. If the user status reads Suspended, the User ID will not be able to log on to AIN SMS. Switching the Status from Suspended, Deleted, or Inactive, back to Active will reset the logon attempts counter and allow the user to log back on to AIN SMS. This is the first step the user should try when a User cannot determine why he/she is unable to log on. For Example, if the user forgets his/her Password, the requires that administrator use of Reset Password (See Below). Note, the File Save/Save As . . . routine must be used in order for the status and count to become effective.

DW_LOCATION—The office locations presented here are loaded in during logon and stored in the global GS_OFFICE_LOC array. A simple loop loads in all available locations. When an existing user is retrieved, the any locations assigned with a permission of 'Y' are checked.

DW_TEMP_LOC—This hidden datawindow stores all existing wire centers and any default wire centers selected for the current user. These wire centers are set on the Set Defaults screen (W_ADM_WC_SETTINGS). They are stored here so that wire centers can only be permanently saved on a File Save/Save As . . . routine. A 'D' is used to represent default wire centers, an 'A' is used for available wire centers. On a Save routine, the 'A's are filtered out so that only the default wire centers are sent to the server.

DW_COMMUNITY—The User Community datawindow is filled out on the open event of W_USER_MAINT. The Communities are stored in the global array GS_USER_COMMUNITY which is loaded in on logon. These are sent to the server on a file save routine as well.

CB_RESET and CB_PASSWORD—The Session Reset button clears the session flags set for a user when they log on to a TUXEDO server. This has no effect on whether a user is Suspended or Expired. The Password Reset button resets the selected User ID's password to be equal to their User ID. The expiration date for the Password is also reset for 30 days. The User will be prompted for a new password when logging back on to the SMS system 10.

CB_MESSAGE—If a users has permission to send system messages on the main menu, the shortcut option is available to send a message to a User ID. Clicking the Send Message button will open up the W_UNSOL_MESSAGE screen with the User ID pre-populated. If the logged on User does not have system message permissions, this button is disabled/destroyed.

23. User Maintenance—Enter User ID

Figure 56:
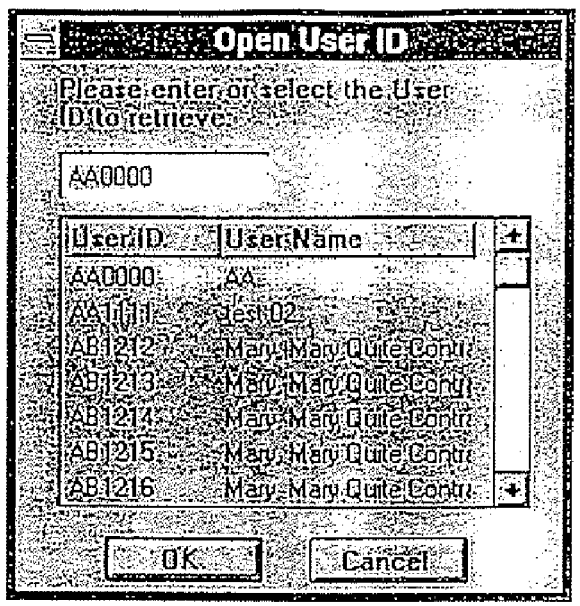
FIG. 56 is an exemplary graphical user interface screen illustrating a user maintenance—enter user Id window.

The User Maintenance screen shown in FIG. 56 allows the current user to choose an existing User ID to retrieve into the User Maintenance screen, W_USER_MAINT. The currently selected row will be retrieved when double-clicked on or highlighted and OK is pressed.

a. Events Called by this Window open—The event 'UE_GADMUSERSEL' is called to load all existing User Ids. The first row is selected from the datawindow and the EM_USER edit line is populated with the current User ID.

CE_OK2.CLICKED—The service GUsrProfSel is called on W_USER_MAINT to load User profile information into DW_USER. Other triggered events include 'UE_WC_EXISTING' to load all assigned and available wire centers, 'UE_LOAD_COM' loads all assigned and available office communities, and DW_USER.EDITCHANGED to set screen attributes properly.

DW_USERS.CLICKED—Triggers 'UE_ROWFOCUS'

DW_USERS.DOUBLECLICKED—Triggers the OK button, CB_OK2.

UE_GADMUSERSEL—Retrieves all Users ID values by calling service GAdmUserSel.

UE_ROWFOCUS—Assigns the User ID of the current row in DW_USERS to the EM_USER edit line.

UE_KEY—If the up, down, right, left arrows are pressed then UE_ROWFOCUS is triggered.

UE_KEYUP—Enables CB_OK2 if any key is pressed in DW_USERS that highlights a row.

24. User ID Save

Figure 57:
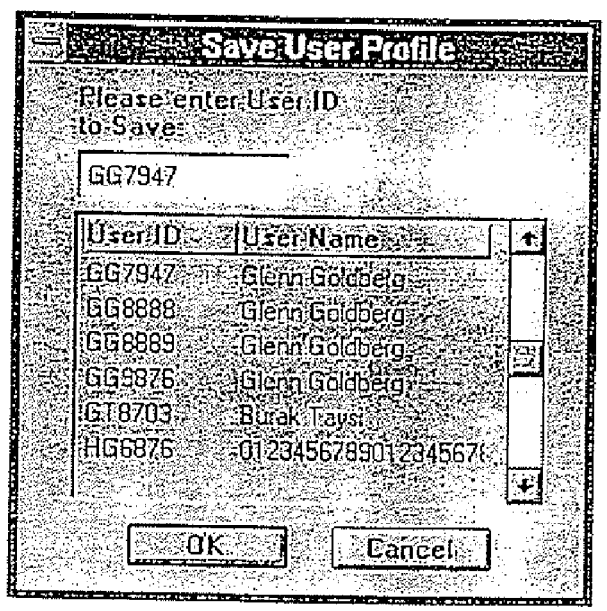
FIG. 57 is an exemplary graphical user interface screen illustrating a user id save window.

The User ID Save screen shown in FIG. 57 allows the user to type in an ID or select an ID from the datawindow, and save the current profile displayed in W_USER_MAINT to the entered ID. The value stored in EM_USER is taken from the edit line to save a profile. Highlighting any row will copy the User ID to the edit line.

a. Events Called by this Window open—This script triggers event 'UE_LOAD' to populate DW_USERS will all existing users If an active user Id is in use and stored in W_USER_MAINT.DW_USER.S_USERID, then the window will scroll to the closest matching User ID in the list. If no ID is available, then the first row is highlighted.

CB_OK2.CLICKED—This prompts the user for confirmation. After approval, event 'UE_FILE_SAVE' is triggered on W_USER_MAINT to save the profile, communities, and wire centers. Finally, W_USER_MAINT is automatically refreshed.

DW_SELECT.CLICKED—This is the trigger event 'UE_ROWFOCUS'.

UE_LOAD—Calls GAdmUserSel to populate DW_SELECT with existing User ID values.

UE_ROWFOCUS—Sets EM_USER to the current row User ID, and enables the OK button.

UE_KEY—If down, up, right, or left arrow is pressed, then this triggers UE_ROWFOCUS.

UE_KEYUP—If a letter is typed, the datawindow scrolls to the first letter types in, and OK is enabled.

25. USOC Descriptions

Figure 58:
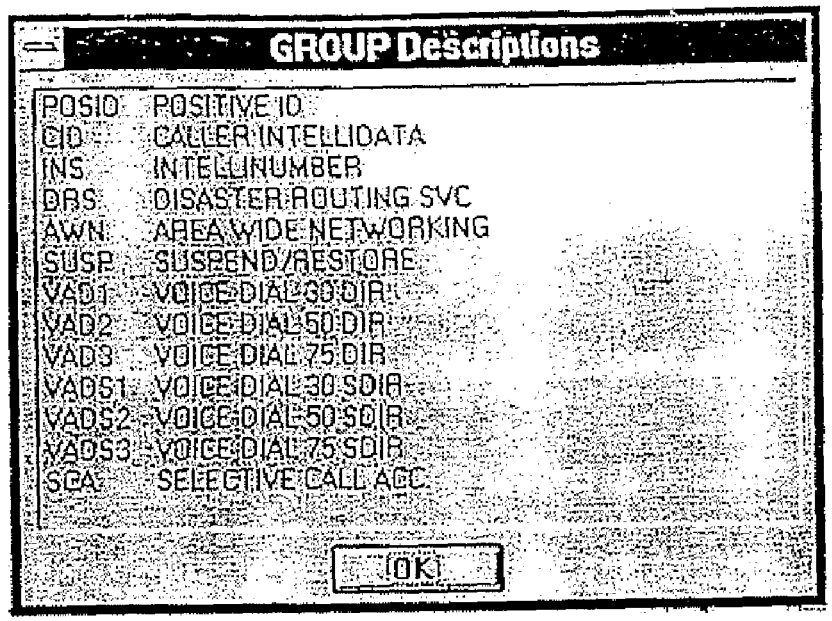
FIG. 58 is and exemplary graphical user interface screen illustrating a USOC descriptions window.

The USOC Descriptions windows shown in FIG. 58 is used to display descriptions of USOC Groups, USOCs and FIDs for a GROUP, or FIDs for a GROUP. The window is opened from order matrix with the right mouse button down on DW_MATRIX_RIGHT or from USOC/FID update and FID update with the right mouse button down on DW_FID_UPDATE.

a. Events Called by this Window

Open of window—Gets the action code passed from parent window to determine which descriptions to show. If FID information is passed, then this loads information into an array, (e.g., WF_LOAD_USOCS_AND_FIDS and GFeatFidSel) and then loops through the array inserting items for the usoc. If USOC information is passed in, the this function loads information into an array (e.g., WF_LOAD_USOCS_AND_FIDS and GfeatFidSel). A looping process is performed within another loop to retrieve in the order USOC1 and FIDs for USOC1, then USOC2 and FIDs for USOC2, etc. The FIDs are indented by, for example, a tab to indicate subordinate to the USOC. If GROUP is sent, use the global array that stores the groups and descriptions, GSA_USOC_GROUP, to add the items into the listbox.

CB_CANCEL—Closes the window, and is not visible.

CB_OK—Closes the window.

LB_USOC—Displays items and description.

DW_USOC_FIDS—Is an invisible datawindow, used to retrieve USOCs and FIDs and their descriptions.

26. Wire Center Default Settings

Figure 59:
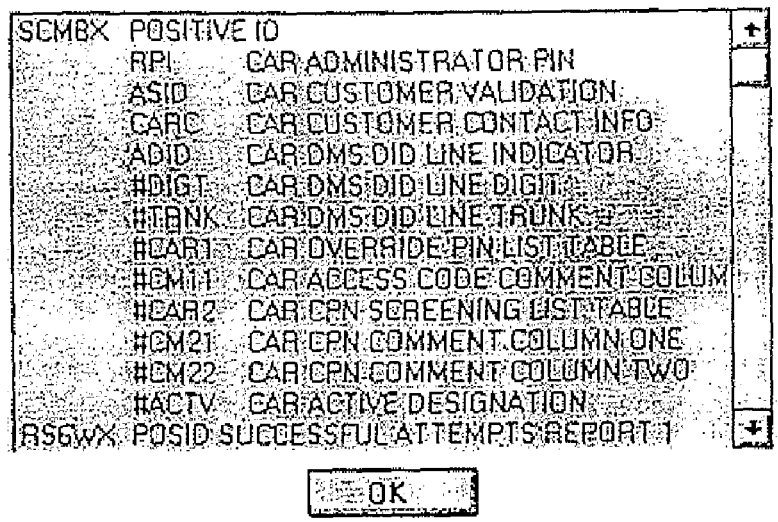
FIGS. 59-61 are exemplary graphical user interface screens illustrating wire center default settings windows.
Figure 60:
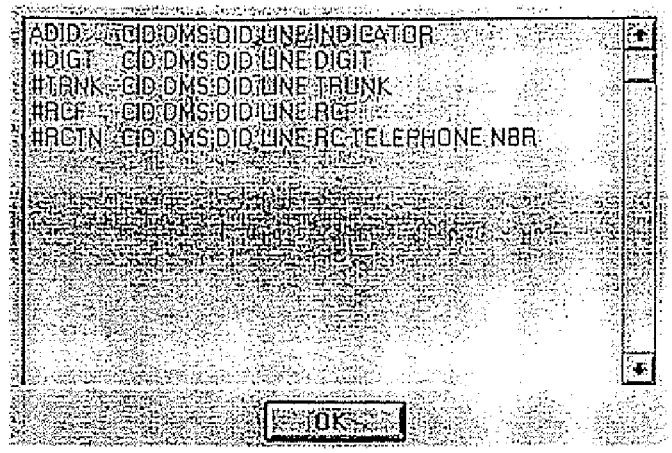
Figure 61:
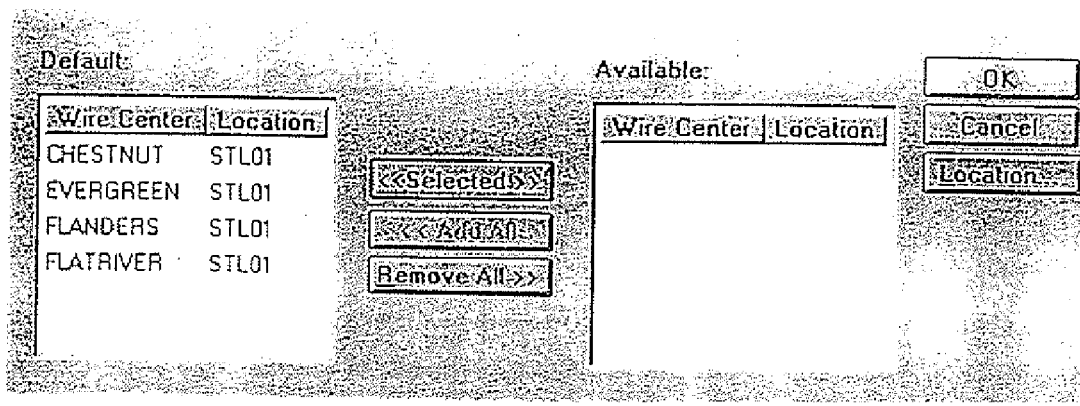

The Administration Wire Center Default Settings windows shown in FIGS. 59-61 are accessible only through User Maintenance (W_USER_MAINT)

a. Events Called by these Windows

CB_OK—Upon pressing this button, all default and available Wire Centers (for all locations) are copied back to the hidden datawindow on W_USER_MAINT called DW_TEMP_WC. Any Default Wire Centers are copied back with a 'D' for the usage indicator and all others are copied back with an 'A' for Available Wire Center.

DW_DEFAULT and DW_AVAILABLE—Wire Center rows can be moved back and forth by double clicking on a Wire Center, selecting rows and clicking CB_SELECTED, choosing "Add All", choosing "Remove All", and drag and dropping rows.

B. Order Matrix

1. Order Matrix

Figure 62:
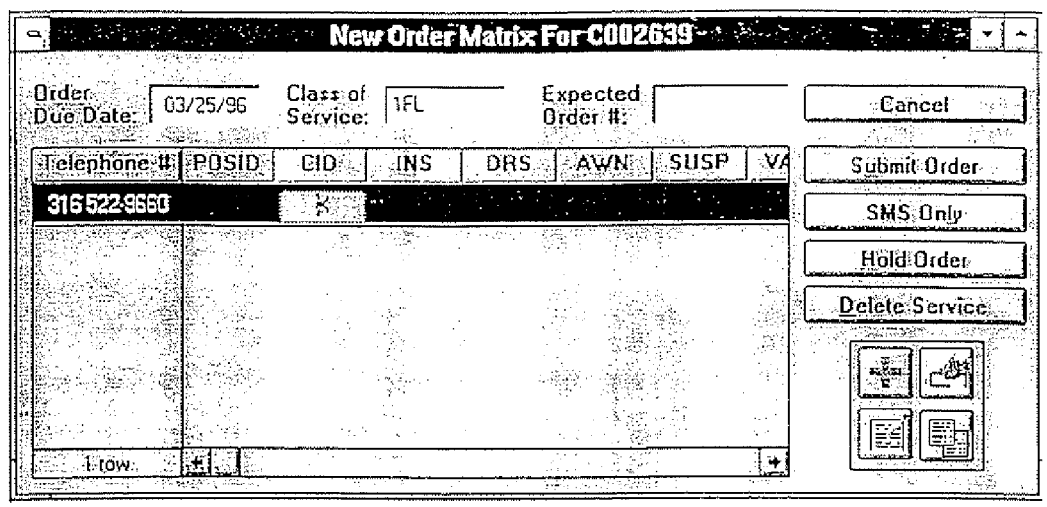
FIG. 62 is an exemplary graphical user interface screen illustrating an order matrix window.

The Order Matrix window shown in FIG. 62 allows a user to initiate a new order on the SMS 10, edit and/or view details of an existing order either initiated from SOAC 20 or GUI 42 systems. The screen changes appearance in accordance with the status of the order. For example, if the order is in Error then the screen opens to a larger size and a datawindow appears with the list of errors. This window is opened by scripts that open a pop up window (W_MATRIX_POPUP) which opens invisible and does some processing of the data before opening this window.

a. Events Called by this Window

Open of window—Determines if the window is opened to view an existing order or enter a new order. If no internal sequence number is passed, then type, status, access, and internal sequence numbers are set to indicate new order. If this window being used to view an existing order, then this event checks to see if there is a window open already showing the requested order. If so, that window is activated, otherwise the tag of this window is set to show the requested internal sequence number and filled with all existing information. The controls on the window are set to appear appropriately according to the status (UE_SET_UP_BUTTONS) and if the order is of Manual or Error type set up bottom datawindow to display additional information (WF_FILL_ERROR_OR_MANUAL, GManImageSel or GOrdErrorSel). Next, the headers on the top row of the matrix needs to be filled with USOC Groups (WF_FILL_USOC_HEADERS). Finally set the menu items up to show if the order is not a New one.

EM_SO_DUE_DATE—When this field is modified, it is checked to make sure that it contains a valid date and that it is a date today or later. The user can also enter the letter W, X, Y or Z. The letters will translate to a date during flow. Today's date is retrieved by the service GSysDate. If date is valid, then the buttons are enable, otherwise the buttons are disabled and the user informed.

SLE_CLASS—When modified, the instance variable that stores the class of service is updated.

EM_EXP_ORD_NUM—When modified, the instance variable that stores the expected order number is updated.

UO_ROWS—Is a user object displaying how many telephone numbers are part of the order.

PB_ADD—Opens a window for the user to enter a new TN and W_ENTER_TN. The TN entered is retrieved from the window. If the user hit cancel or errored-out, then the exit the script. The internal sequence number is retrieved if it is the first TN on a new order, and the row in the display matrix for new TN is inserted. The USOC cells are set to X for the USOC(s) that are on the TN, and the row indicator (UO_ROWS.ST_ROW_IND) is set.

PB_DELETE—Ensures that the user has a row selected, and verifies with the user that he/she want to delete the TN and all the USOC, FIDs, and FID Data. After which, the script deletes the TN from the database using GCompViewBld. All rows in DW_PCS_DATA_SEL_OUT are deleted, as are the rows in display matrix. The row indicator (UO_ROWS.ST_ROW_IND) is also set.

PD_CHANGE—Ensures that the user has a row selected, and opens a window for the user to enter new TN and W_ENTER_TN. The TN entered by the user is retrieved from the window. If the user hit cancel or it errored-out then exit script. The TN is deleted from the database using GCompViewfld. The TN in all rows of the DW_PCS_DATA_SEL_OUT is deleted.

PB_COPY—Ensures that the user has a row selected, and opens a window for the user to enter new TN and W_ENTER_TN. The TN entered by the user is retrieved from the window. If the user hit cancel or it errored-out then exit script. The row is inserted into the display matrix for new TN. The rows are copied and the USOC cells are set to X for the USOC(s) that are on the TN. The row indicator (UO_ROWS.ST_ROW_IND) is then set.

CE_CANCEL—Closes the window and the logic in CloseQuery catches orders that need to be saved.

CB_SUBMIT—If any FID Update or USOC/BID Update windows are open, user window is notified to open and then exits out of the script. All required fields are check to determine if values are entered and that the user has an internal sequence number with the order. Data is stored (e.g., USOCs, FIDs, and FID Data) to the PCS tables 204 (WF_WRITE_TN_ORDERS, GPCSDataWrt). A service is called to submit the order (e.g. GSubmitOrder). If there is a failure, then this script checks if it was because of a bad TN, and the window closes.

CB_SMS—If any FID Update or USOC/FID Update windows are open, the user is notified that the window is open and exits out of script. The script verifies that the user has an internal sequence number with the order and data is stored (USOCs, FIDs, and FID Data) to PCS tables 204 (WF_WRITE_TN_ORDERS, GPCSDataWrt). A service is called to submit the order (e.g. GSubmitOrder). If there is a failure, then this script checks if it was because of a bad TN, and the window closes.

CB_HOLD—If any FID Update or USOC/FID Update windows are open, the user is notified that the window is open and exits out of script. The script verifies that the user has an internal sequence number with the order and data is stored (USOCs, FIDs, and FID Data) to PCS tables 204 (WF_WRITE_TN_ORDERS, GPCSDataWrt). A service is called to submit the order (e.g. GSubmitOrder) If there is a failure, then this script checks if it was because of a bad TN, and the window closes.

CB_ACTIVTY—Verifies that the user has a TN selected and opens a TN Info window (e.g., W_TN_INFO) to perform a composite view for the requested TN.

CB_DELETE_USOC—Verifies that the user has a TN and a Group selected. This script loops through data and deletes rows with the selected TN and Group. The script also sets cells that the user selected to be " ".

CB_ERROR_OR_MANUAL—This button appears only when order is a Manual order that has errors. If the errors are showing, then the script switches to show manual blob. If manual service order is showing, then the script switches switch to show errors using GManImageSel or GOrdErrorSel.

CB_USOC_FID_IN_ERROR—This button appears only when a USOC/FID is in database that is not found the FID_REF or USOC_REF. This will open a window that shows the data as in the database W_ORDER_ERRORS.

DW_PCS_DATA_SEL_OUT—Is a datawindow that stores all of the data to the order shown on the matrix. This also stores all changes made while window is open.

DW_TEMP—Is used for many types of dataset, retrieving data related to a TN, and retrieving a list of bad TNs.

DW_MATRIX_LEFT—Displays Telephone numbers. This is separate from the right portion of the display so that the user can always see the TN and scroll through the USOCs.

DW_MATRIX_RIGHT—Displays USOC Groups for a TN in a matrix form. If user double clicks on cell, several things may happen. First, it is ensured that the user clicked on a cell and not a header and that the user selected a TN and USOC Group. If the user has capability to add a service then the script continues, otherwise the script exits.

According to the selected USOC Group, if it has: (1) only one USOC and no FIDs then a message appears informing the user that there are no usoc or FIDs, and marks the USOC Group and insert row into data DW_PCS_DATA_SEL_OUT; (2) only one USOC and multiple FIDs, then W_FID_UPDATE is opened; (3) multiple USOCs and one, none, or many FIDS, then W_USOC_FID_UPDATE is opened. If the user right-clicks the mouse down, the a window is displayed with a description of the usoc groups, W_USOC_DESR. If user scrolls vertically, then the corresponding left datawindow is scrolled.

DW_ERROR—Displays the errors or the Manual Blob (depends on the status of the order).

2. Order Matrix—Enter TN

Figure 63:
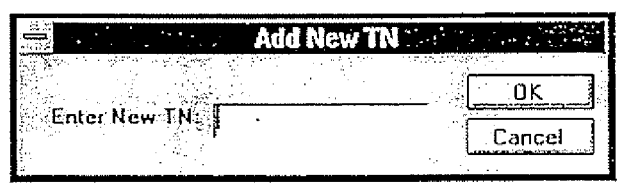
FIG. 63 is an exemplary graphical user interface screen illustrating an enter TN window.

The Enter TN window shown in FIG. 63 is used as a holder for the user to enter a Telephone Number either for adding a new number to an order, change an existing TN to a different TN, or coping a TN and all of its info to another telephone number.

a. Events Called by this Window

Open of window—Retrieves an action code passed from the order matrix to determine if this is to ADD, COPY, or CHANGE, and insert a row to allow for a place to enter TN.

CB_CANCEL—Closes the window and passes a field indicating that the user intentionally canceled out of window.

CB_OK—Disable buttons, and retrieves the number that the user entered. The number is check to ensure it is a valid number. A call to the function on parent Order Matrix, WF_ADD_TN_NUMBER is made. If the Add was successful, the window is closed, passing a field with new TN. If number already exists on the order, user is prompted to re-enter or cancel. If an error occurred, user is prompted to enter new TN or cancel, and the buttons are enabled.

DW_TN_NUMBER—Displays edit to enter telephone number.

3. Order Matrix—FID Update

Figure 64:
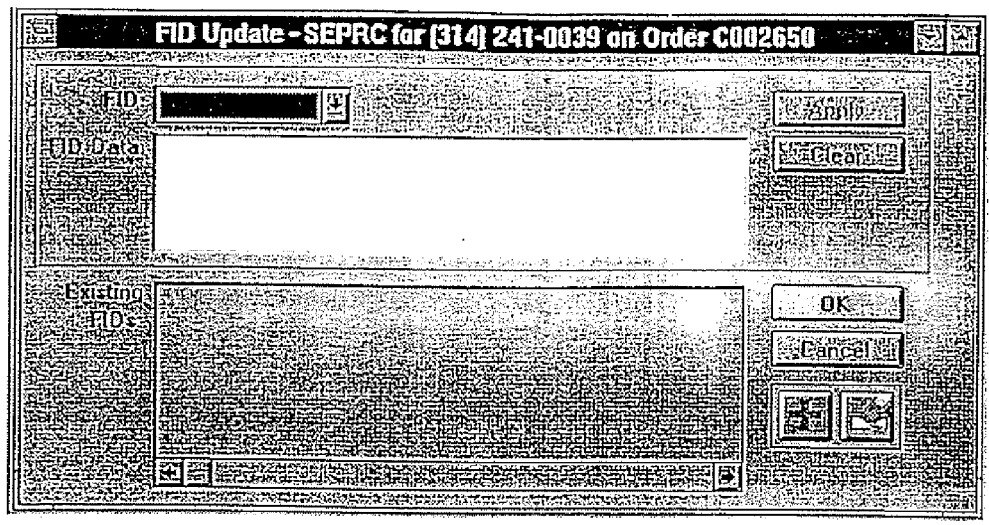
FIG. 64 is an exemplary graphical user interface screen illustrating an FID update window.

The Order Matrix—FID Update window shown in FIG. 64 is used to view, delete, or add FID and FID data to a service/USOC group that the user selected from order matrix by double-clicking on for a particular phone number. In the case shown above it is to select FIDs for SEPRC for the telephone number (314) 241-0039 on the Order C002650.

a. Events Called by this Window

Open of window—Retrieves data passed from order matrix, such as order number, telephone number, USOC group, and loads all of the FIDs for the specified USOC group (WF_LOAD_USOC_FIDS, GFeatFidSel) into an array which is an instance variable. Order related information is loaded (e.g., UE_LOAD_INFO) by the following methods. From the parent window which spawned this instance of FID Update, this script copies the order matrix and the rows of data which are for the specified telephone number and USOC group. If there are no existing FIDs, the datawindows are left blank. If there are existing FIDs, the first row of the bottom datawindow (DW_EXISTING) is selected. If it is a manual order, a datawindow in the bottom is shown, DW_MANUAL_BLOB and manual information is loaded by GManImageSel. The USOC number is initialized to be one because this window is only opened if the USOC group has only one USOC with FIDs. FIDs for the USOC are inserted into the drop down datawindow (e.g., "S_FID" on DW_FID_UPDATE). If the user has no update capability of FIDs, then the datawindow is modified to disable FID data. If there are no existing FIDs, then a row is insert to prepare the user to enter data. The title is set to reflect the USOC, Telephone Number, and order number. The current window is set up in the "UE_SET_ARRAY" array for the parent window. This will inform the parent if any update windows are opened. Note, the user can not submit or save an order with a FID Update window nor a USOC/FID update window.

PB_ADD—Ensures that update datawindow modifications were applied. If not, the user is prompted and "Apply" is triggered. A new row is inserted in the update datawindow enabling FID and disabling FID data.

PB_DELETE—Ensures that the user has a FID selected, and prompts the user for delete. If confirmed by the user, the row is deleted, otherwise the scripted is exited.

CE_CLEAR—This clears the upper datawindow, DW_FID_UPDATE, which is where all the updates to FIDs and FID Data are performed. The datawindow and flags are rest to show that no modifications were made.

CB_APPLY—Ensures there is a row (new or updated FIDs) to apply to existing FIDs. If the FID is marked as existing, the this script ensures that there are no tabs or other special characters are in the FID data, and sets the FID data field in existing datawindow, DW_EXISTING_FID, to the new value in the DW_FID_UPDATE. If there is not an existing datawindow, then the FID desc and the FID name are found in the array and a new row is set in DW_EXISTING_FID with the new values. The window is then set up for any other "Add" operations of new FID data by enabling FID/disabling FID Data, and inserting a new row in DW_FID_UPDATE.

CE_CANCEL—Closes the window and closequery holds logic.

CB_OK—Checks to determine if the last modifications were applied to the existing FIDs. If not, the user is prompted and the apply button is triggered. All rows in parent order matrix with this TN and service are deleted, and all rows of existing FIDs are copied from this window. If no FIDs were selected, then a row is inserted to indicate that the service turned ON, but without FIDs. Subsequently, the window closes.

DW_FID_UPDATE—This is the datawindow in which users modify FID data or add new FID and FID data information. As the user edits the data, once an FID is selected by mouse enable FID data and set focus there. Once user selects the FID using the keyboard, this script enables FID data but does not set the focus there immediately or the user would not be able to cursor down to the second FID before focus was changed. Once the user enters FID data, then this script enables the apply and cancel buttons. If user presses the right mouse button, a window is opened that will list the FIDs and their descriptions, W_USOC_DESC.

DW_EXISTING—This is the area the displays a list of the existing FIDs and data The user can select rows and the associated data will display in the update datawindow for modifications. Once the focus has changed rows, this script checks that the modifications made in update datawindow have been applied. If not, the user is prompted and apply is triggered. If so, then this script disable the FID field. If user does not have update capability, FID data field is disabled, otherwise it is enabled. The selected row to update is copied from the datawindow.

4. Order Matrix—USOC/FID Update

Figure 65:
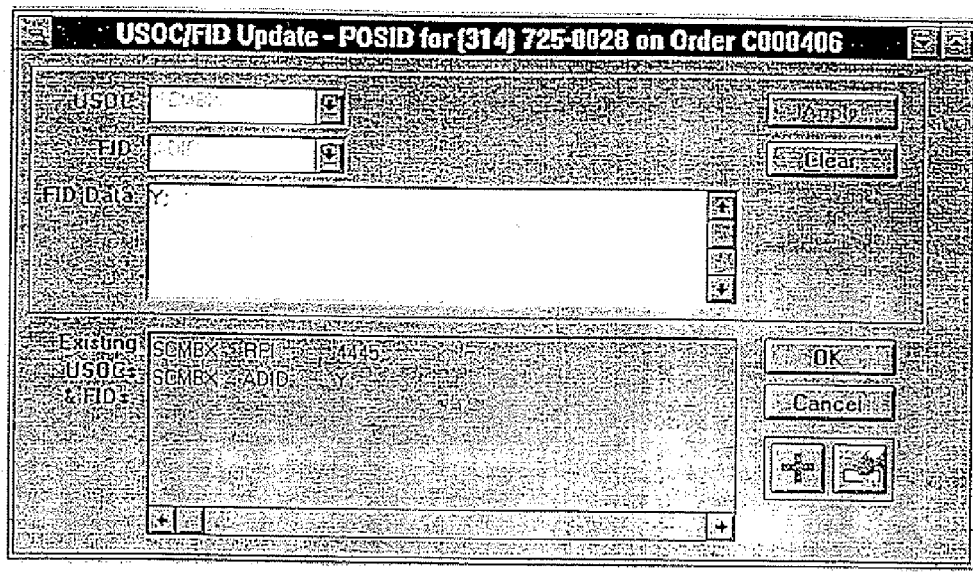
FIG. 65 is an exemplary graphical user interface screen illustrating a USOC/FID update window.

The Order Matrix—USOC/FID Update window shown in FIG. 65 is inherited from W_FID_UPDATE, therefore many view, delete, or add USOCs, FIDs and FID data to a service/USOC group that the user selected from order matrix are available by double-clicking on a particular phone number. In the example of FIG. 65, the window is selecting USOCs and FIDs for POSID (Positive ID service) for the telephone number (314) 725-0028 on the Order C000406.

a. Events Called by this Window

Open of window (Overrides Ansector Script)—Retrieves data passed from the order matrix, such as order number, telephone number, and USOC group, etc. Loads all of the FIDs for the specified USOC group (WF_LOAD_USOC_FIDS, GFeatFIDSel) into an array which is an instance variable. Loads information for the order (UE_LOAD_INFO) by the following methods. From the parent window, the order matrix which spawns this instance of USOC FID Update is opened, the rows of data which are for the specified telephone number and USOC group are copied. If there are no existing FIDs, the datawindows are left blank. If there are existing FIDs, the first row of the bottom datawindow (DW_EXISTING) is selected. If it is a manual order, a datawindow in the bottom is shown, DW_MANUAL_BLOB and manual information is loaded by GManImageSel. The USOC number is initialized to be one because this window is only opened if the USOC group has only one USOC with FIDs. FIDs for the USOC are inserted into the drop down datawindow (e.g., "S_FID" on DW_FID_UPDATE). If the user has no update capability of FIDs, then the datawindow is modified to disable FID data. If there are no existing FIDs, then a row is insert to prepare the user to enter data. The title is set to reflect the USOC, Telephone Number, and order number. The current window is set up in the "UE_SET_ARRAY" array for the parent window. This will inform the parent if any update windows are opened. Note, the user can not submit or save an order with a FID Update window nor a USOC/FID update window.

PB_ADD (Extended from Ancestor)—Ensures that the updates and modifications in the datawindow were applied. If not, the user is prompted and apply triggered. A new row in update datawindow is inserted enabling FID and disabling FID data. The USOC field is enabled and the focus is set to USOC field.

PB_DELETE (Same as Ancestor)—Ensures that the user has a FID selected, and prompts the user for delete. If confirmed by the user, the row is deleted, otherwise the scripted is exited.

CB_CLEAR (Same as Ancestor)—This clears the upper datawindow, DW_FID_UPDATE, which is where all the updates to FIDs and FID Data are performed. The datawindow and flags are rest to show that no modifications were made.

CB_APPLY (Extended from Ancestor)—Ensures there is a row (new or updated USOC/FIDs) to apply to existing USOC/FIDs. If the USOC is marked as existing, this script ensures that there are no tabs or other special characters are in the FID data, and sets FID data field in existing datawindow, DW_EXISTING_FID, to the new value in the DW_FID_UPDATE. If the USOC does not exist, then this script determines USOC, FID desc and USOC and FID names in the array and sets a new row in DW_EXISTING_FID with new values. The window is set up for an additional "Add" of a new USOC/FID by enabling USOC/disabling FID and FID Data, and inserting a new row in DW_FID_UPDATE.

CE_CANCEL (Same as Ancestor)—Closes window and closequery holds logic.

CE_OK (Same as Ancestor . . . )—Checks to make sure that last modifications were applied to the existing FIDs. If not, the user is prompted and the apply button is triggered. All rows in parent order matrix with this TN and service are deleted and copies all rows of existing USOC/FIDs from this window. If no USOCs were selected, then a row is inserted to indicate that the service turned ON, but without USOCs. The window is then closed.

DW_FID_UPDATE (Overrides Ancestor Script)—This is the datawindow in which users modify USOC/FID/FID Data or add new USOC/FID/FID Data information. As the user edits the data, once a USOC is chosen, then this script loads the FIDs for selected USOC. If no FIDs exist, Insert (None) and the FID and FID Data fields are disabled. If FIDs exist, then FID is enabled. As the user edits the data, if a FID is selected by the mouse, the FID data is enabled and the focus is set to that position. If a user selects FID by keyboard the FID data is enabled, but the focus is not set there immediately because the user will not be able to cursor down to the second FID before the focus was changed. Once the user enters FID data, then this script enables Apply and Cancel. If the user presses the right mouse button, a window is opened that will list the USOCs, FIDs, and their descriptions, W_USOC_DESC.

DW_EXISTING (Extended from Ancestor)—This is the area that displays a list of the existing USOC/FIDs and data. The user can select the rows and the associated data will be displayed in the update datawindow for modifications. Once the focus has changed rows, this script checks that modifications made in update datawindow have been applied. If not, the user is prompted and the trigger applied. If the modifications have been made, the disable USOC/FID fields. If user does not have update capability, disable the FID data field, otherwise else enable it. The selected row is copied to update datawindow.

5. Order Matrix—USOC/FID Errors

Figures 66, 67:
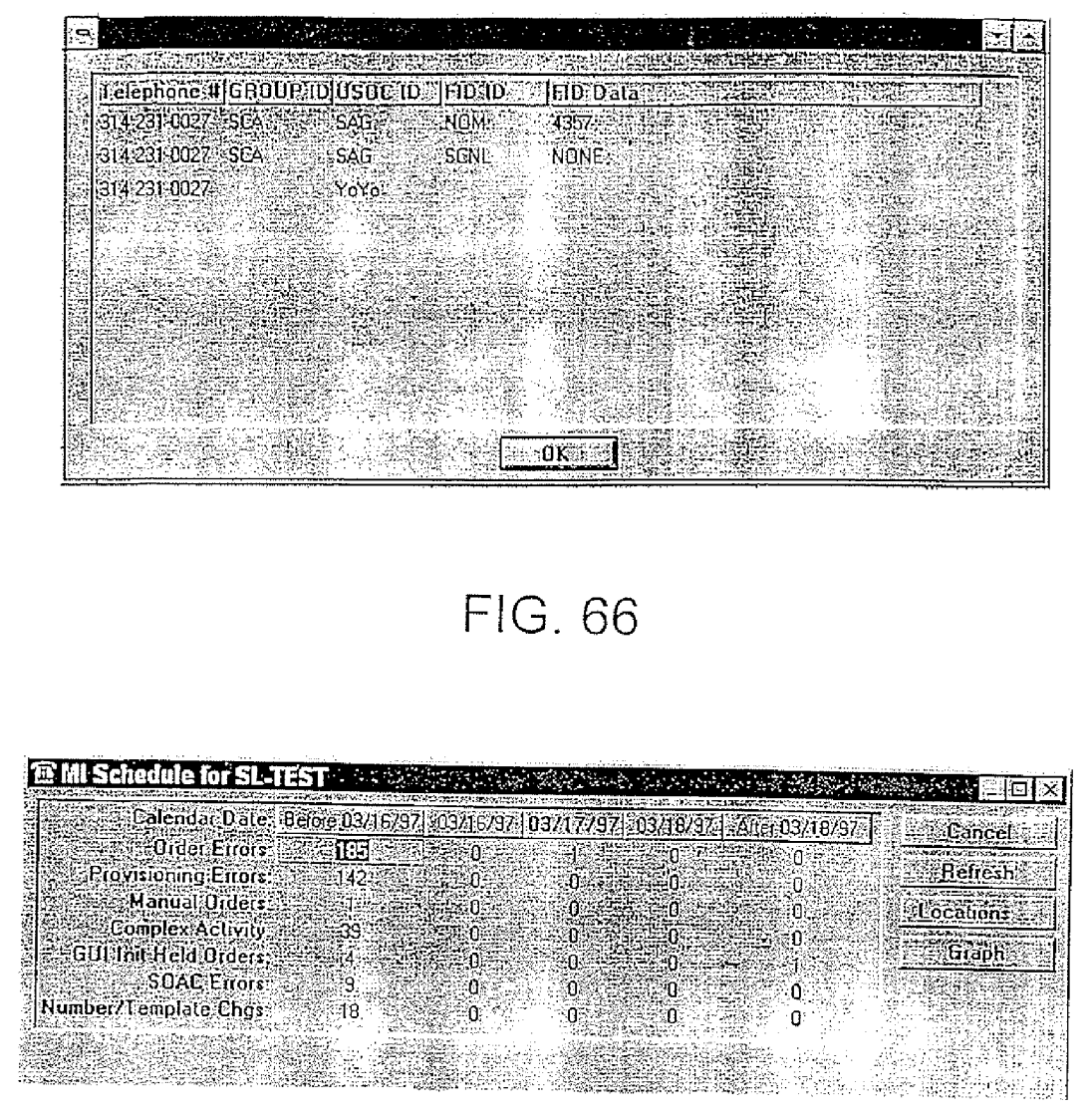

The Order Matrix—USOC/FID Errors window shown in FIG. 66 is used to display USOC Groups, USOC, FID, and FID Data on an order as it retrieves information from the database. This window is opened from order matrix, CB_ORDER_ERROR. This button is only visible if the service call to get the data in order matrix, GPCSDataSel, finds a USOC Group, USOC, or FID that it cannot find a corresponding entry in the USOC_REF or FID_REF table, therefore not being able for it to show up in the matrix. The GROUPs, USOCs, and FIDs that are not found may be indicated in a red font. In FIG. 65, YoYo is an invalid USOC and NOM is an invalid FID.

a. Events Called by this Window

Open of window—Retrieves internal sequence number passed from the order matrix to determine the order to be displayed and retrieves data from database using GPCSUsocFID.

CB_OK—Closes the window.

DW_ERRORS—Displays data related to the order as it reads in datawindow.

C. MI Schedule

1. MI Schedule

The MI Schedule window shown in FIG. 67 allows the user to view any orders that have erred out from COM 400 and any GUI 42 initiated orders in the 'Hold' status. Also, raw SOAC order errors can be accessed here as well. The user clicks on a date/row on DW_GMISCHEDSEL. This will then display the correct response detail in DW_GMIVIEWSEL. Depending on which type of MI data chosen, different datawindows and options become available. These are described later in detail.

a. Open event of MI Schedule

The variable GS_OFFICE_LOC is checked for a current location. If this variable is not greater than " " then the location response window (W_LOCATION_RESPONSE) is opened. Next, WF_SCHED_RETRIEVE is called. This function calls GMiSchedSel for the hidden datawindow DW_GMISCHEDSEL_SHARED which shares its data with DW_GMISCHEDSEL, and formats the data into grid form by date and type (300-Order Errors, 305-SMS PROV Errors, 310-Manual Orders, 320-Complex Activity Orders, 330-Held Orders, 350-Raw SOAC Orders, 360-Number Changes).

b. Double-Clicked Event of DW_GMISCHEDSEL

Double-clicking on any grid section with a value greater than 0 will pull up the respective data into DW_GMIVIEWSEL. If the value is zero, the computer beeps. DW_GMIVIEWSEL is a datawindow which contains detailed information on MI log entries from the date and category chosen from gmischedsel. Note that you may right click on any field called Status to view detailed information describing the status codes.

c. Errors

For order errors, the log record and any error log information may be viewed. Also, the record may be Returned to Sender if requested and it is SOAC initiated. This will in effect NEGACK the Record. A user can double-click on an order to view the Order Matrix. Note, the first click on a row will bring back any EDITS_ERROR log information. After this information is loaded, the user may then double-click on that same row to open Order Matrix.

For PROV errors, the log record and any EDITS_ERROR log information may be viewed.

For COMPLEX activity orders, the user may mark the record as complete which sends a POSACK through GOM 400.

For Manual Orders:

For GUI Initiated Held Orders, these orders are Submitted through SMS 10 as Local or SMS Only Orders on the Order Matrix. They may be double-clicked upon to open Order Matrix and continue with the regular submission.

For Raw SOAC Orders, Double-clicking on one of these will allow the user to view or Update the entire Raw SOAC Image. Also, information from the EDITS_ERROR table is shown below the Order Lines.

For number changes, these can be marked as investigated and marked as complete. No other action is permitted.

For all MI_LOG 214 types that allow entry to the Order Matrix or SOAC Image, these may be marked as investigated. If this operation is performed, the refresh must be manually initiated upon returning to MI_Schedule. For any action taken while in MI, the refresh should be done automatically.

d. Events Called by this Window

UE_ROWFOCUS2—This event calls GordErrorSel to populate DW_GORDERRORSEL. This is performed rather than the rowfocuschanged event, because the user can hold down an arrow key to scroll rapidly through the records without this call having to be made every time. The UE_KEYUP event, combined with rowfocuschagned allow for the call to be made when scrolling stops. Also, clicking once on a new row will trigger this event, thus, for a double-click event to register, the user must click or stop scrolling first, allowing the error text to be displayed, then double-click if allowed.

DW_GORDERRORSEL—This datawindow contains any information on a selected order that is contained in the Edits error table. This datawindow is populated through the event UE_ROWFOCUS2 in DW_GMIVIEWSEL. The service GOrdErrorSel is used to populate this datawindow. Double-clicking on an error code row will bring up a detailed description and resolution text for that error code number.

CB_RET_TO_SENDER—The Return to Sender button will open 'W_RET'. After the user enters any relevant text, the clicked script will call WF_RET_TO_SENDER( ). This function calls GRetToSender using the internal seq number, log seq num, TN, and order number as identifiers.

CB_MARK_AS_COMPLETE—This button will call either GNumChgMAC or GCmplxLouMAC depending on visible MI log type. Upon successful completion, the screen is refreshed and the corresponding record is filtered out of DW_GMIVIEWSEL.

CE_INVESTIGATED—This button will mark a record as investigated through the service GMIDatInvWrt. The record remains in the MI log but the investigated date/time and user are populated. Records other than Number Changes can be Investigated when exiting the drill down screens. (ex. order matrix and complex activity schedule.)

CB_LOCATION—The MI Schedule will show all relevant entries for one location at a time. A user cannot open MI Schedule unless a location is selected as a default in GS_OFFICE_LOC. This button allows the user to change the GS_OFFICE_LOC variable, allowing the viewing of other records. If a user only has one location, then this button is not visible. Also, if a user changes their default location on another screen, then returns to MI Schedule, then the screen should be undated.

CB_MORE_ROWS—If the FML buffer returned from a service call is filled with its 64K limit, DCIFX_MORE_ROWS_FLAG( ) is set. If this flag is set, the CB_MORE_ROWS button is enabled. This button takes the office location, MI type, MI type description, log sequence num, and an action code returned from WF_DOUBLECLICK for the last row returned and calls the gmiviewsel service again. The last row's information is stored in instance variables so that they can be stored before possible DW_GMIVIEWSEL resorting actions.

e. Troubleshooting

If no records are found in the MI Schedule, it should be determined if the user has wire centers defined, and default or temporary wire centers. This is the most likely cause of not having any records available.

2. Complex Activity

Figure 68:
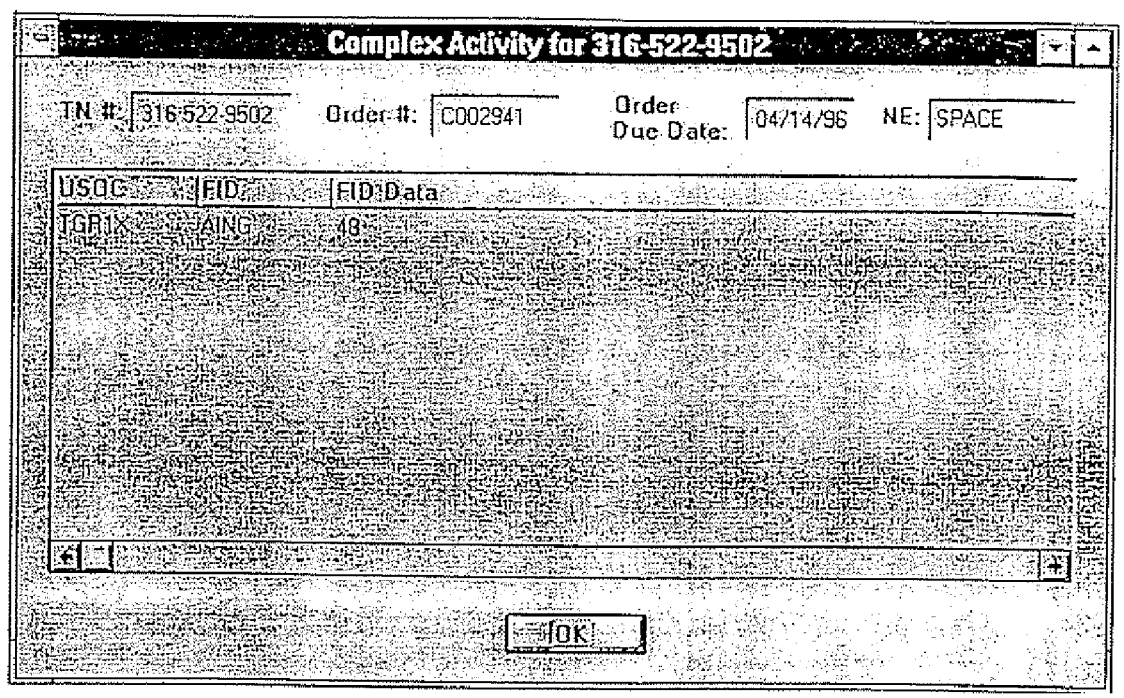
FIG. 68 is an exemplary graphical user interface screen illustrating a Complex activity window.

The Complex Activity windows of FIG. 68 is used to view complex step of an order.

a. Events Called by this Window

Open of window—Retrieves all the information for the complex step for the order specified (GCmplxActSel). This window is open from the MI Schedule window when a user double-clicks on the middle detail screen that is a Complex Activity. Also, this script sets edit masks and single line edit to display telephone number, service order number, NE Name, and service order due date.

Closequery of window—If this order has indicated that it may be marked as investigated and the opening of the window is not failing, then the user is prompted to mark the order as investigated. If the user answers 'Yes', the order is marked (GMIDatInvWrt).

CB_OK—Closes the window.

DW_DUMMY—Holds the Complex Order information.

EM_TELNO—Displays the telephone number where mask equals "### ###-####"

EM_SO_NUM—Displays the service order number where mask equals "!######"

SLE_NE—Displays NE Name.

EM_DUE_DATE and DW_EXISTING—Displays service order due date where mask equals "##/##/##"

D. Select Orders/Orders Found

1.—Select Orders/Orders Found

Figure 69:
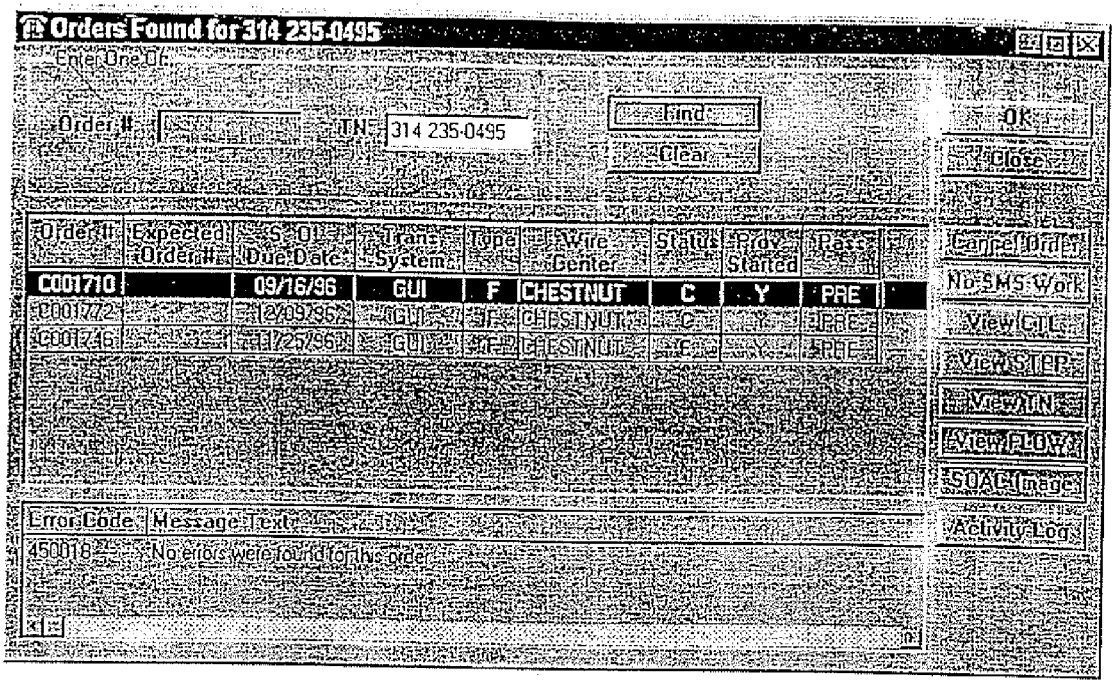
FIG. 69 is an exemplary graphical user interface screen illustrating a select orders window.

The Select Orders window shown in FIG. 69 provides a method for viewing existing orders. The window allows viewing of orders by Order Number or TN, and will display orders of all status types. The 'Order Found' response datawindow, DW_FOUND, is an access point to order matrix, as well as many HOL functions.

a. Instance Variable Notes

IL_HANDLE is assigned on W_SELECT_ORDER activation. It is referenced in UE_ROWFOCUS on DW_FOUND.

IS_SEQ is the internal sequence number for selected row in DW_FOUND.

b. Events Called by this Window activate—Enables all W_SELECT_ORDER menu items, including View SOAC Image, HOL CTL, HOL TN, HOL Step, HOL Flow, and Cancel Order. Also enables these menu items if their window object is enabled.

deactivate—This script hides all W_SELECT_ORDER specific menu items including View SOAC Image, HOL CTL, HOL TN, HOL Step, HOL Flow, and Cancel Order. The global variable GE_FRAME_CLOSING is used to determine if the application is closing. If so, the deactivate script is not processed to smooth redrawing.

UE_SOAC_IMAGE—Script triggered from CB_SOAC, and takes the current row in DW_FOUND and opens W_RAW_SOAC with the internal sequence number as an argument.

UE_HOL—This event is triggered if an HOL menu item is selected. This script then triggers the appropriate HOL button. The number assignments are: 1 (HOL_CTL to trigger CB_CTL), 2 (HOL_Step to trigger CB_STEP) 3 (HOL_TN to trigger CB_WTN), and 4 (HOL_Flow CB_FLOW).

CB_FIND.CLICKED—This command button script validates the TN or Order Number before calling GOrdInfoSel to retrieve data into DW_FOUND. If the retrieve operation fails, the focus is set back to the entry fields. If the retrieve is successful, the focus is set to DW_FOUND and all HOL buttons, e.g., Cancel Button, DW_FOUND, and error log objects are enabled and made visible. Matching menu items are also enabled. If the service fails, all Orders Found objects are hidden.

CB_OK—Triggers the double-clicked! event in DW_FOUND.

DW_FOUND.DOUBLECLICKED—For the selected row, passes the internal sequence number to Order Matrix (W_MATRIX_POPUP). Also verifies that the orders has not been Canceled.

DW_FOUND.UE_RIGHTMOUSEDWN—If the right mouse button is clicked while over the status column, the Status description window, W_STATUS_DESC, is opened with a type value of 'CONTROL'.

DW_FOUND.ROWFOCUSCHANGED—This script performs verification that an order can be canceled. Criteria include: S_ORIG_TYPE='GUI', S_PROV_STARTED='N', and S_SO_STATUS< > 'C' and < >'S'. The rowfocuschanged script then populates DW_ERROR with information on the selected order row from the EDITS_ERROR table. The service "GOrdErrorSel" is called using the internal sequence number.

DW_FOUND.UE_SCROLL—This script will scroll to the first occurrence of the pressed letter a to z.

CB_CO (Cancel Order)—This script attempts to issue a CAN pass to an order to cancel. The service 'GOrderCan' is called using the selected row's internal sequence number. If successful, a screen refresh occurs.

EM_ORDER.UE_SUCCESSFUL—This script validates the order number typed in. It will disable EM_TN if any characters are typed.

EM_ORDER.UE_FOCUS—Sets microhelp text.

EM_TN.UE_KEYUP—This script validates the TN as it is entered. Find is enabled if a complete TN is entered.

CB_CTL—Calls WF_VIEW_HOL with report ID of 1.

CB_STEP—Calls WF_VIEW_HOL with report ID of 2.

CB_WTN—Calls WF_VIEW_HOL with report ID of 3.

CB_FLOW—Calls WF_VIEW_HOL with report ID of 4.

CB_CLEAR—Hides all "Order Found" objects. Resets TN and Order number SLE fields. Disables all "Orders Found" menu items as well.

CB_SOAC—Triggers event UE_SOAC_IMAGE.

CB_ERROR—Opens Order Log display screen. This requires passing the internal sequence number and a title to W_CUST_SCVS_NE_ERROR.

c. Functions Performed by this Window

WF_VIEW_HOL—This function accepts an HOL report ID. This value and the select record internal sequence number are passed to the child window, W_HOL_TABLES. It returns the GUO_RESOURCE_MGR return code.

2. Orders Found—HOL tables

Figure 70:
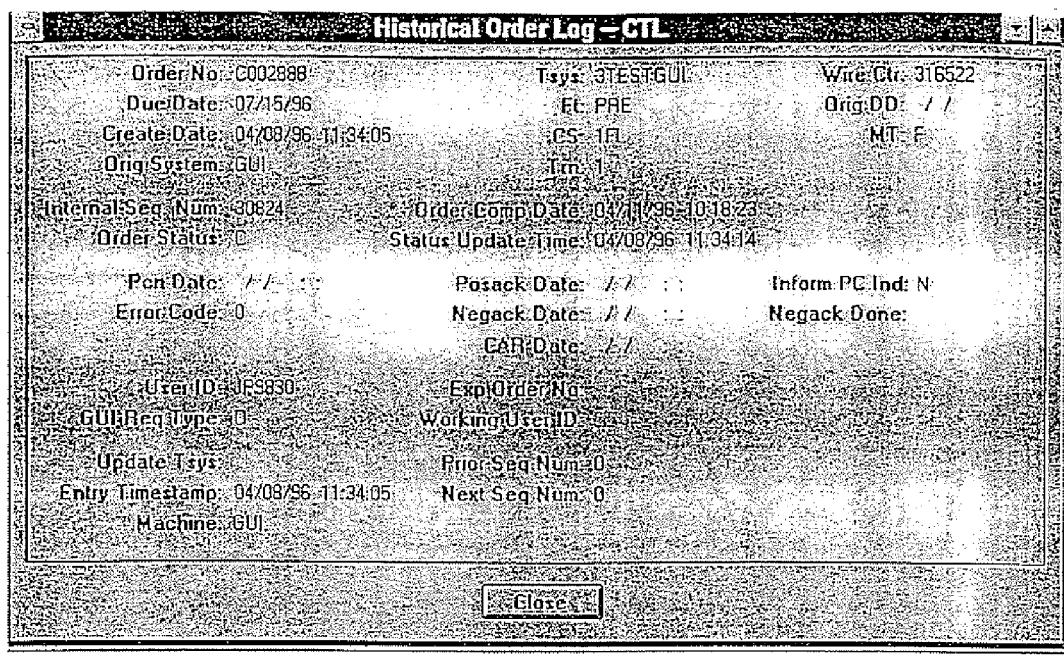
Figure 71:
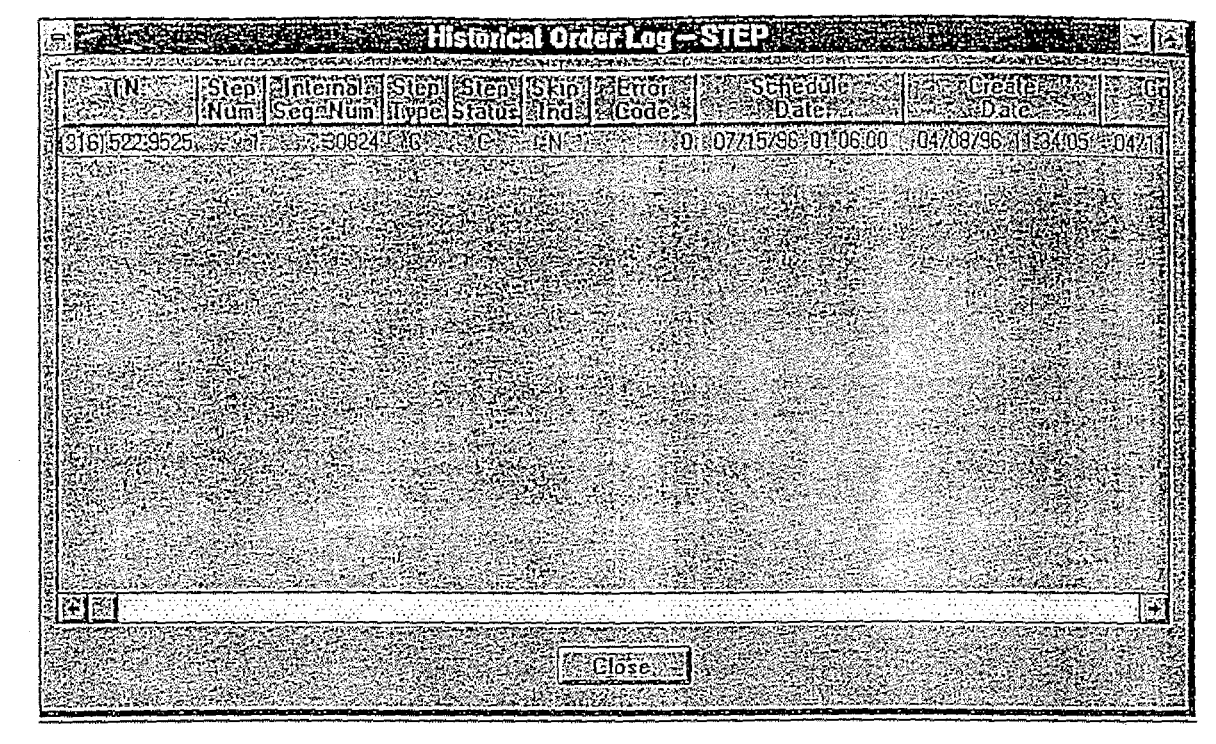
Figure 72:
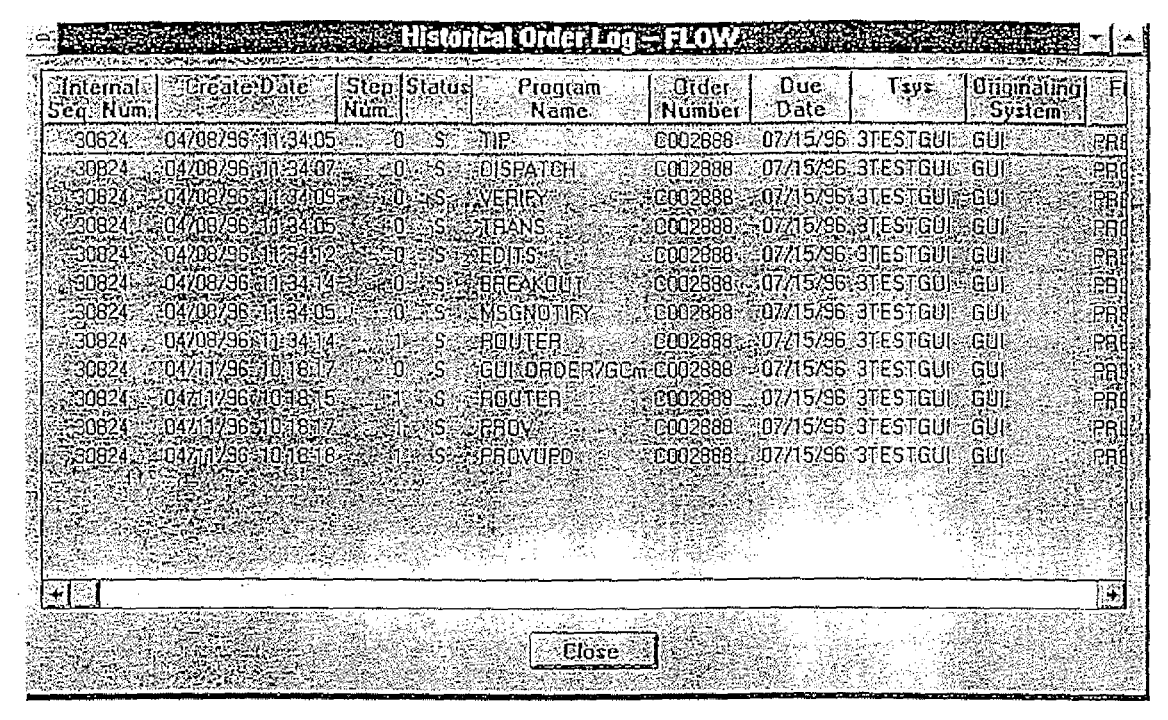

The Orders Found HOL tables window shown in FIGS. 70-72 provide information pertaining to a particular order number. These screens are mainly accessed through Select Orders (W_SELECT_ORDER) and Order Matrix (W_MATRIX_POPUP) and are for read access only. The tour types of tables are discussed below. Each one requires a different dataobject assigned to DW_TABLE and a unique service name. DW_TABLE is the main response datawindow.

a. Events Called by these Windows open—The open script assigns a dataobject for each HOL report ID that is passed in. This also allows the same script to assign a service name used for each retrieve statement. The data is stored in various HOL tables on the server. Exemplary assignments are listed in Table 4:

HOL CTL
ID=1
dataobject='D_HOLCTLSEL_OUT'
service name='GHolCtlSel'
HOL STEP
ID=2
dataobject='D_HOLSTEPSEL_OUT'
service name='GHolStepSel'
HOL TN
ID=3
dataobject='D_HOLWTNSEL_OUT'
service name='GHolWtnSel'
HOL FLOW
ID=4
dataobject='D_HOLFLOWSEL_OUT'
service name='GHolFlowSel'

TABLE 4

DW_TABLE.GETFOCUS—This script sets the rowfocusindicator as FocusRect! for all Hol tables except HOL CTL. HOL CTL gets no indicator.

DW_TABLE.RBUTTONDOWN—This event script pops up the Status Description table if the mouse pointer is over a valid status column or field.

3. Raw SOAC Image

Figure 73:
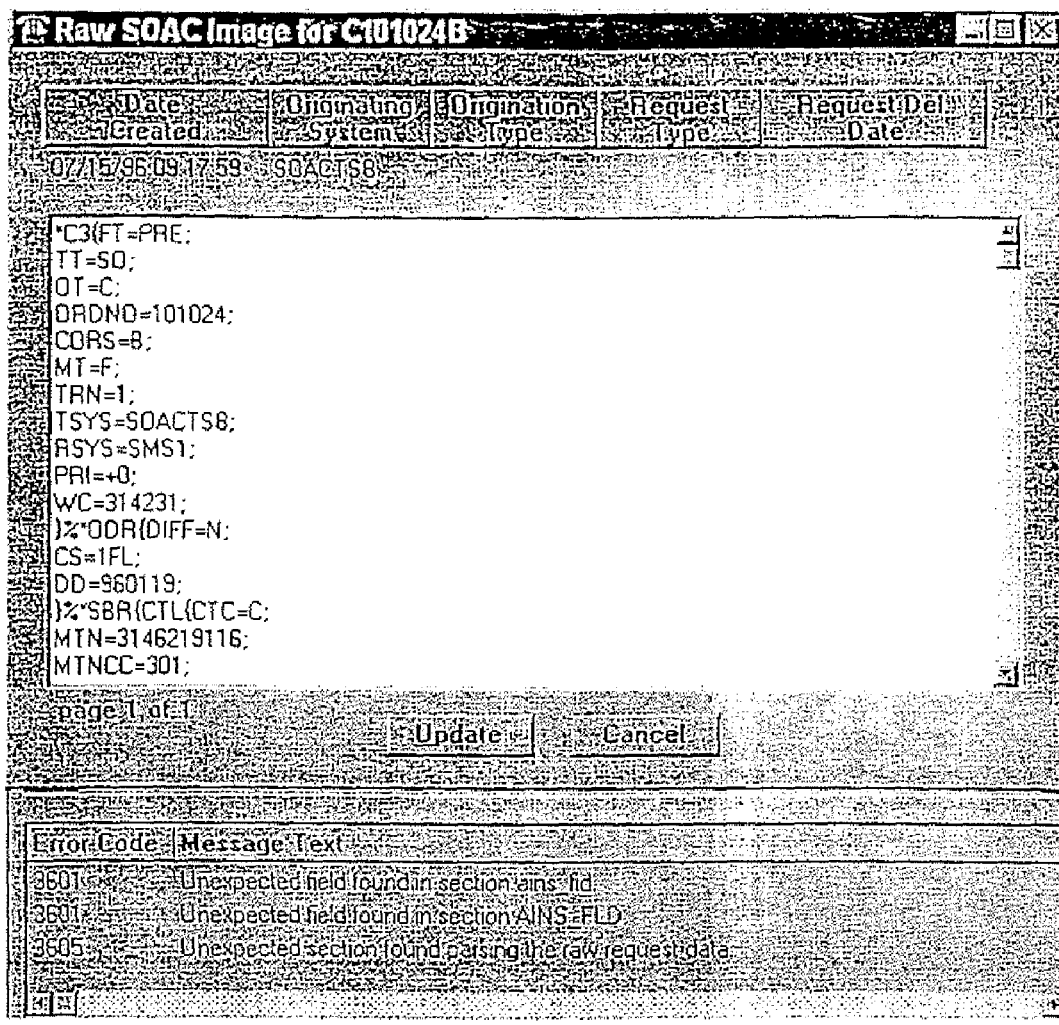
FIG. 73 is an exemplary graphical user interface screen illustrating a raw SOAC image window.

The View Raw SOAC image window shown in FIG. 73 is used to view the Raw SOAC image for the selected order. This window can be opened from the MI Schedule (when a user double-clicks on middle detail screen on SOAC error order), from Select Orders window, or the Order Matrix.

a. Events Called by this Window

Open of window—Obtains information passed to window. Checks fields to determine if the order is in Read Only mode or if it should be updatable. If not updatable, this script disables the update command button and makes the raw image display only. This script retrieves the Raw SOAC image and other information and calls the global function, GF_DEHEXIFY, to "dehexify" the raw image. This is a step used to avoid sending tabs, carriage returns, and other special characters that may cause DCI errors. The "dehexified" image is moved to the mle.

Closequery of window—If this order has indicated that it may be marked as investigated and the open of the window is not failing, then the user is prompted to mark the order as investigated. If the user answers 'Yes', then the order (GMI-DatInvWrt) is marked.

CB_CANCEL—Closes the window.

CB_UPDATE—Calls global function, GF_HEXIFY, to change the raw image into its "hexified" form. This is to avoid sending tab, carriage returns, and other special characters because these characters confuse DCI and cause errors. Also sends updated, hexified raw image to database to be saved, GRawImageWrt.

DW_GRAWIMAGESEL—Holds top information about the Raw SOAC image such as Date Created, Originating System, Origination Type, Request Type, and Request Delete Date.

E. Network Element/Template Query

1. NE Query Submit

Figure 74:
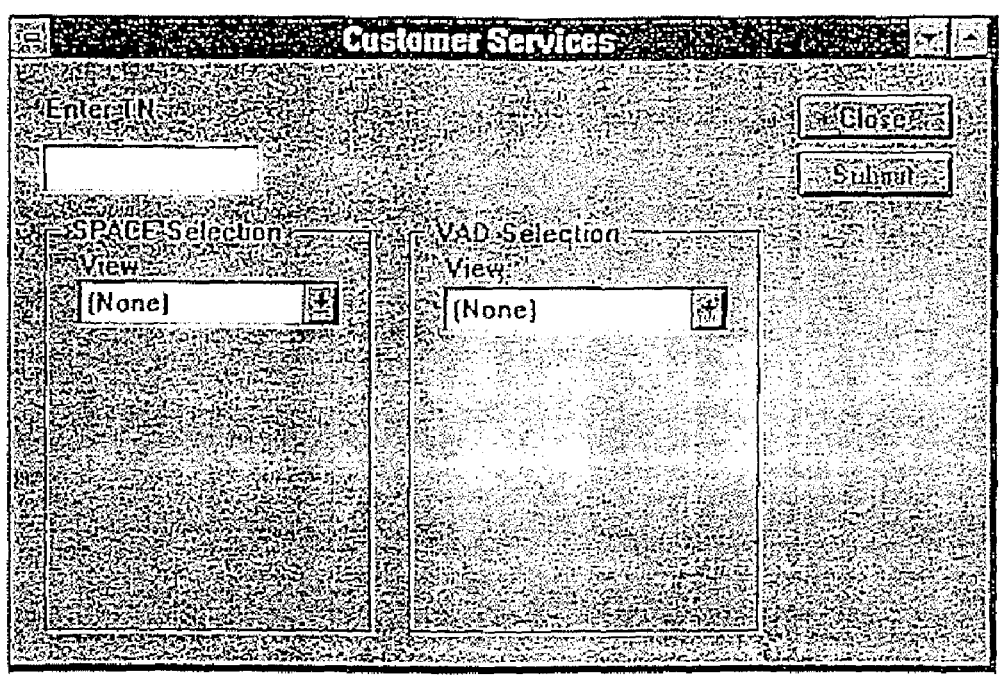

The Customer Services Query Submit screen shown in FIG. 74 allows a user to enter a TN and Space choice to query against. The results of this query will appear in the Customer Service Results Log.

a. Events Called by this Window open—Assigns the active space selection to variable IDDLB_CURRENT_BOX.

DDLB_AINIP.CONSTRUCTOR—Sets the tag value to AINIP for sending a query.

DDLS_AINIP.GETFOCUS—Sets microhelp for listbox.

DDLB_AINIP.SELECTIONCHANGED—Checks to see if that a phone number is entered, if so, then enable Submit button. <None> is a valid view for a query.

DDLE_SPACE.CONSTRUCTOR—Tag value is assigned as "SPACE01"

CB_SUBMIT.CLICKED—Verifies that the dataobject is a "D_NEQRYSUBMIT_OUT". The TN and SPACE view are formatted into LS_PARMSTRING, which is sent to GNEQrySubmit for processing. If an error occurs, the user is notified of the reason. The estimated time is returned and is placed into string LS_NE_QRY_EST_TIME. This time is used in user notification and verification of return of query. If query is to be canceled, then service GQryRespLog is used to delete the query from its queue.

EM_TELNO.KEYUP—Script that verifies the validity of the TN before enabling Submit button.

DDLB_SPACE.SELECTIONCHANGED—The Submit button is enabled if TN is a valid 10 digit number.

2. NE Query Response Log

Figure 75:
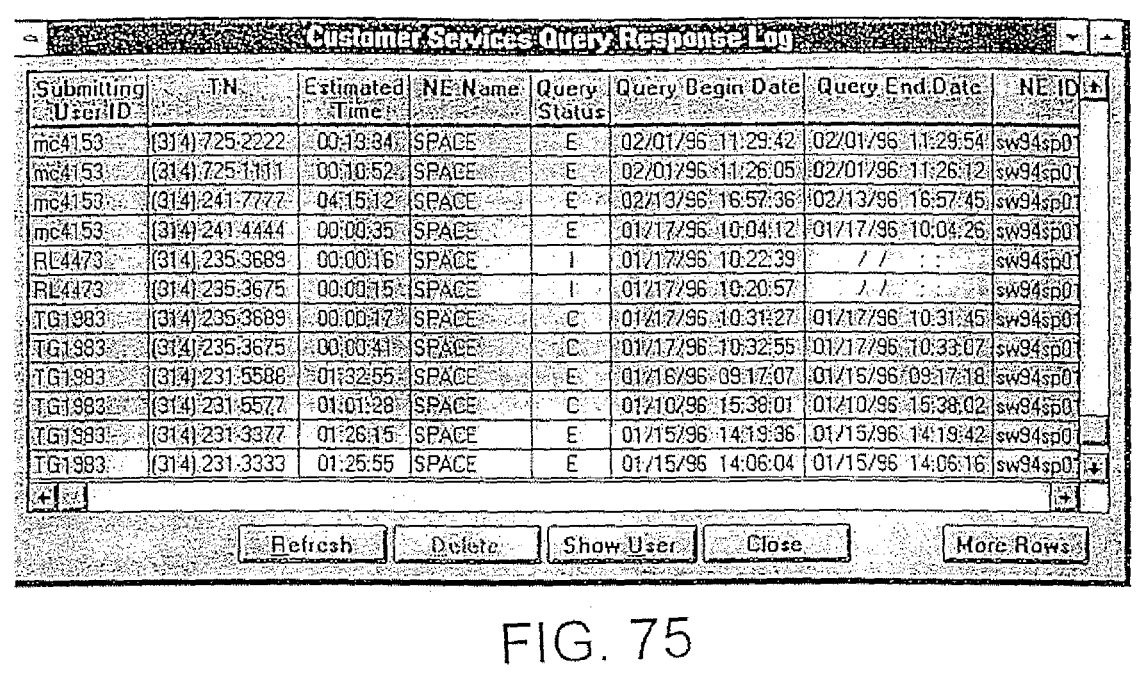

The NE Query Response log screen shown in FIG. 75 allows a user to view status of his/her query or all users. Clicking the Show User/All button toggles between these views. Rows created by the current user can also be deleted easily. Pressing refresh updates the entire screen and large results sets will cause the more rows button to become available. Finally, double-clicking on a row will allow the user to view the actual results of any query.

a. Events Called by this Window open—The function WF_RETRIEVE returns all rows of data for a user ("U") or all users ("A").

resize—This script resizes the window to the user specifications.

timer—Every 15 minutes, the screen will refresh itself.

CB_REFRESH.CLICKED—Calls WF_RETRIEVE and resets timer counter.

CB_DELETE—Pass query status, corr id, query name, and queue name to service GQryRespLog with action code of "D".

CB_ALL.CLICKED—Switches the action code between "U" and "A" and then calls WF_RETRIEVE.

DW_RESPONSE.DOUBLECLICKED—This script verifies that the record show have a result view. Then it loads LSTR_WINDOWPARM and opens W_CUSTOMER_SERVICES or W_CUST_SVCS_NE_ERROR if applicable depending on the Query Status.

DW_RESPONSE.RBUTTONDOWN—If the status field is right clicked on, then display the status description screen with type="QUERY".

DW_REPONSE.ROWFOCUSCHANGED—Disables/enables delete if user id=creator id.

CB_MORE_ROWS.CLICKED—Sets reset receive to FALSE and call WF_RETRIEVE.

b. Functions Performed by this Window

WF_RETRIEVE—Calls service GQryRespLog to with an action code of "U" for a user or "A" for all users. If the service was successful, then sort by previous column if applicable. If the result set to 'huge', then display the More Rows command button.

3. NE Query Results

Figures 76, 77:
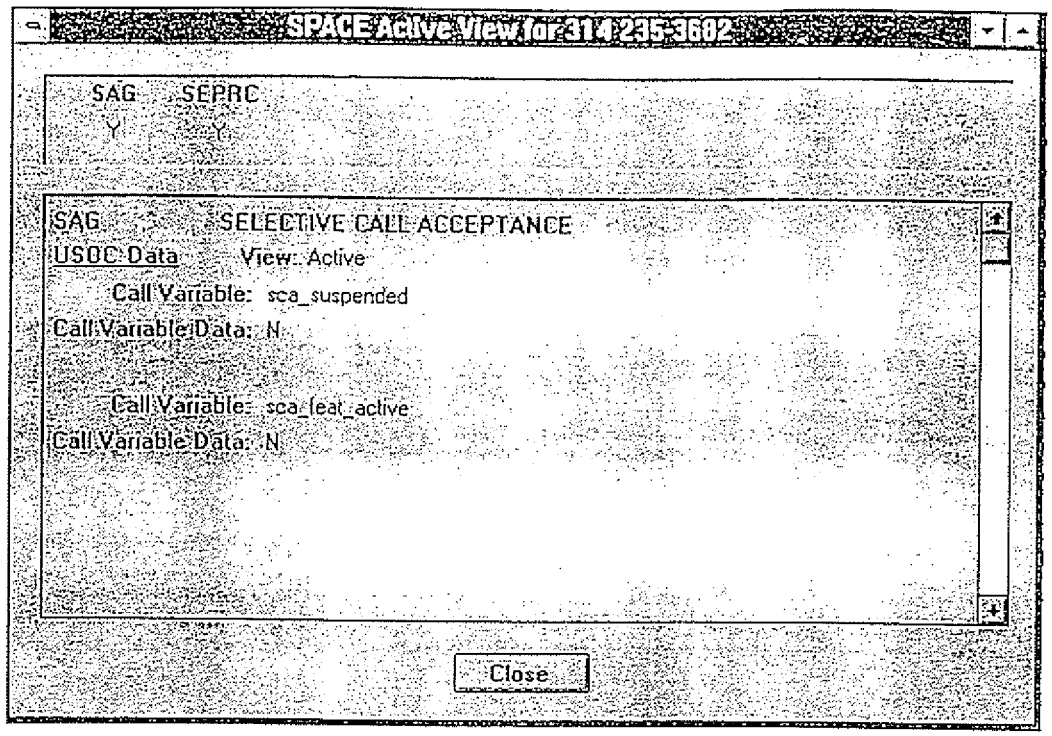

The Ne Query Results screen shown in FIG. 76 displays all results of a Customer Service Query. Included is a list of USOCs, USOC data, Call Variables, and Call Variable Data. Clicking on a 'Y' at the top of the screen quickly pulls up the selected USOC. Also, double-clicking on a line that states "Embedded Table Data" will open the Embedded Information window.

a. Events Called by this Window open—The service GNEQryResults returns all NE Query data into datawindow DW_GNEQRYSLTS. Any embedded data is then filtered by calling function WF_EMBEDDED_TABLE. Next the window is sorted and the title is set to show the type of view returned.

b. Functions Performed by this Window

WF_POP_HEADER—This function loops through the data in DW_GNEQRYSLTS and moves the header information to DW_HEADER where subscription='Y'.

WF_FINDUSOC—Scrolls screen to where selected USOC is location in DW_GNEQRYSLTS.

WF_EMBEDDED_TABLE—If any rows contain embedded table information, then they are filtered out into DW_EMBEDDED_TABLE. Also, a bookmark is inserted into DW_GNEQRYRESLTS to allow user access to the embedded table information.

DW_GNEQRYRSLTS.DOUBLECLICKED—Opens W_EMBEDDED_TABLE and passes in the current FID and the embedded table datawindow.

DW_HEADER.CLICKED—Retrieves the selected row's USOC and calls WF_FINDUSOC to scroll results datawindow.

4. NE Query Results—Emb. Table

The NE Query Results Embedded Table window is shown in FIG. 77, and displays embedded table data from the SPACE query in a table format. The data exists as multiple lines indicating the data value and which row and column to display value at. The column headings are indicated by the appropriate column number and row zero.

a. Events Called by this Window

Open of window—Retrieves information passed when the window was opened from W_CUST_SVCS_RESPONSE. Filters the datawindow (that was passed in to window with the query result data) to only hold the data for the selected FID. Sorts data by row and column in ascending order to make populating in table form easier. Loops through all the rows and retrieves row and column. If the row is zero, then this script populates the header datawindow, otherwise this script populates the table datawindow. This script also sets the title to show selected FID.

CB_CANCEL2—Closes the window.

CB_OK2—Invisible.

DW_TABLE_FORM—Is a datawindow that displays data in a table format. As the user scrolls horizontally, the header datawindow must be kept in synch.

DW_HEADER—Is a datawindow that displays headers for each column of the table.

5. NE Query Error Log

Figure 78:
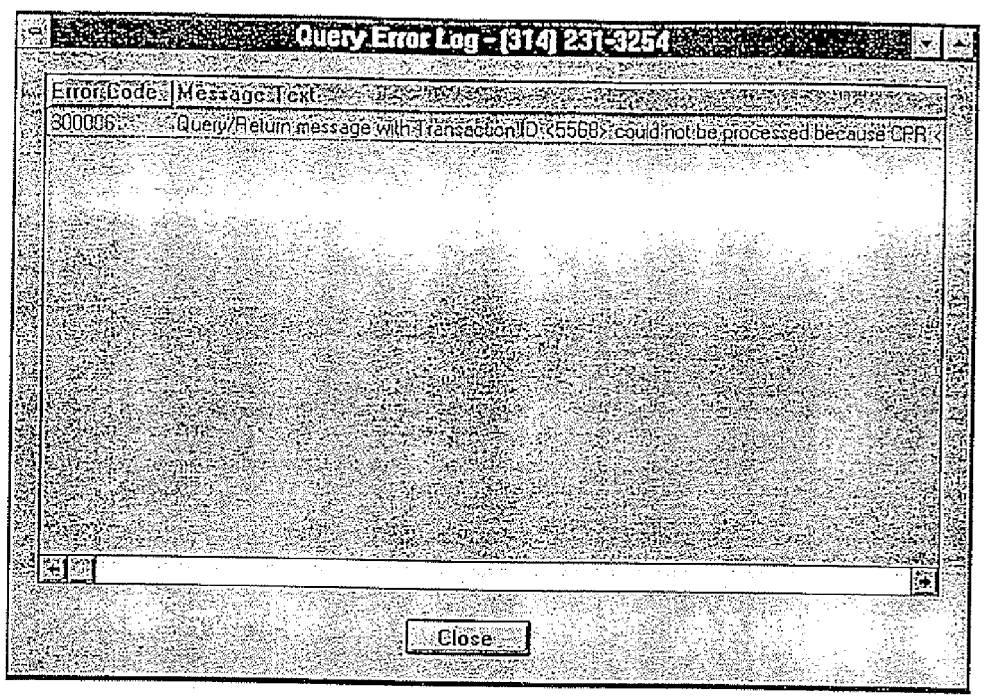

The NE Query Error Log screen shown in FIG. 78 is used to display error information from the error log and Order Errors from EDITS_ERROR log.

a. Events Called by this Window open—This script accepts an input structure of either " " or "Error Log". If "error log", then the service GErrorLogSel is called to populate the reply datawindow. If a blank is passed in, then GOrdErrorSel is called to populate this reply datawindow. Next, the appropriate title is set or an error message is displayed if a problem occurred.

6. Template Query

Figure 79:
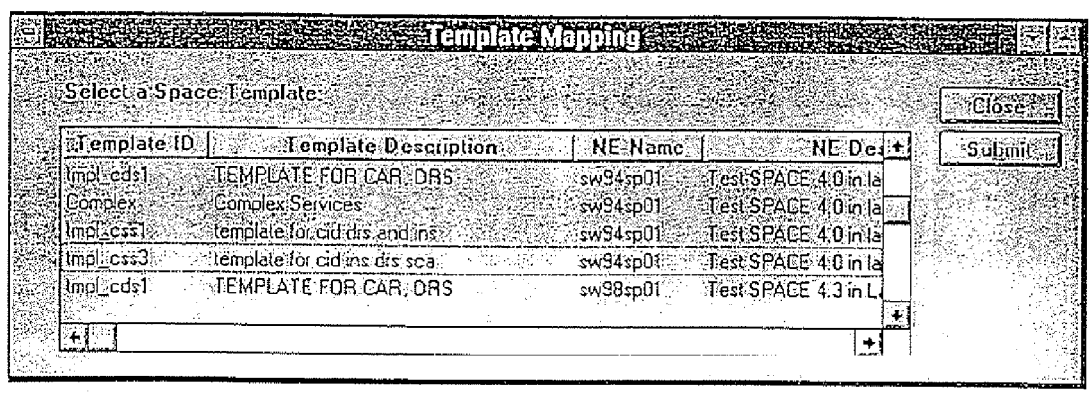

The Template Query screen shown in FIG. 79 allows a user to choose an existing Provisioning template to query for a list of all services associated with it. The status of the query is displayed on the template query response log and the actual query results are accessed by double clicking on a row in the response log.

a. Events Called by this Window open—The valid template Ids are loaded by calling GTmpIdSel.

CB_SUBMIT—Using the selected row's values, GTmplQrySbmt, the template query is initiated. The user may then decide to cancel the query or let it continue. If the user wants to cancel the query, the service GQryRespLog is used to remove the template query from the queue.

7. Template Query Response Log

Figures 80, 81:
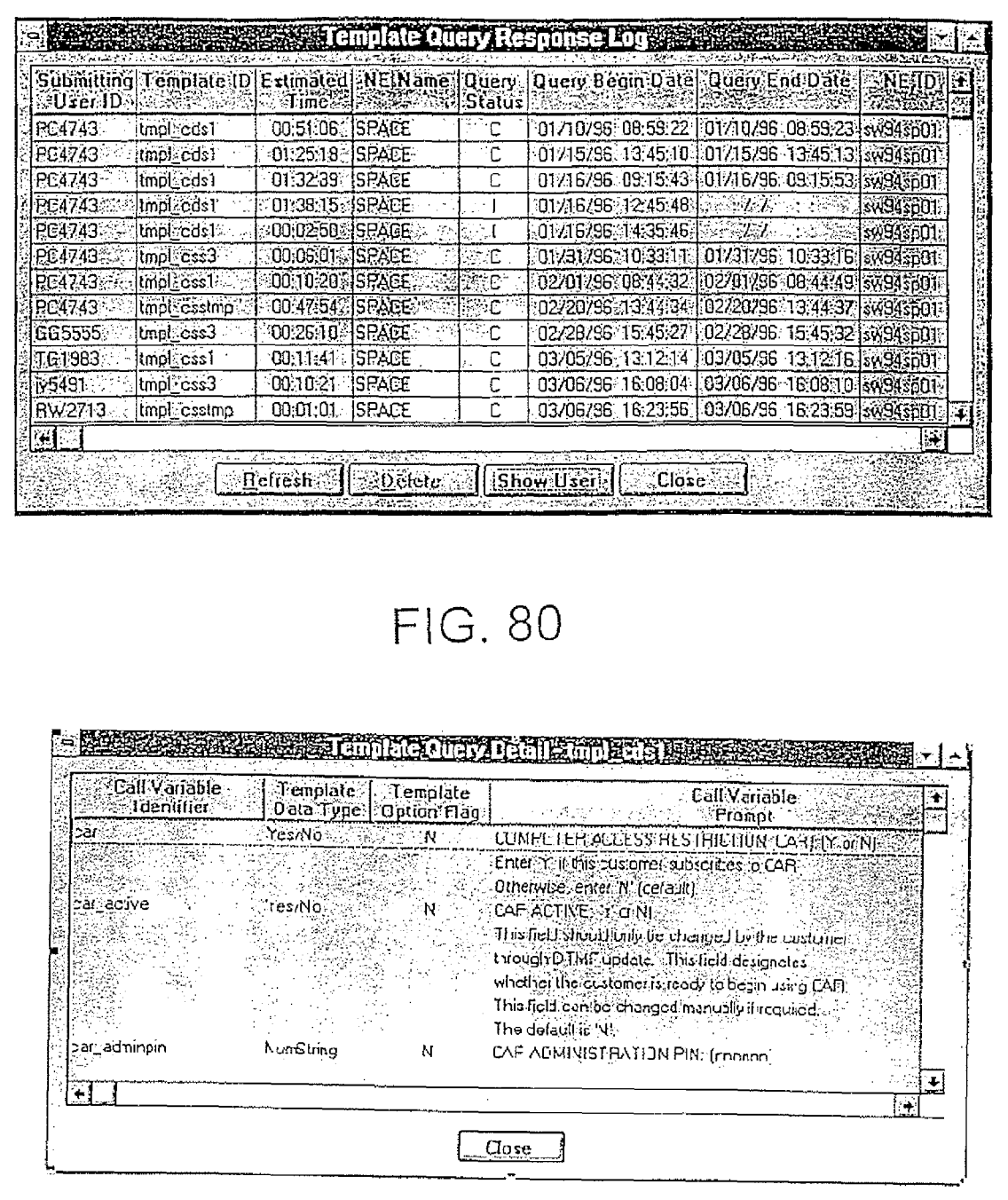

The Template Query Response Log screen shown in FIG. 80 allows a user to view status of his/her template queries or all user queries. Clicking the Show User/All button toggles between these views. Rows created by the current user can also be deleted easily. Pressing refresh updates the entire screen and large results sets will cause the more rows button to become available. Finally, double-clicking on a row will allow the user to view the actual results of any template query.

a. Events Called by this Window open—The function WF_RETRIEVE returns all rows of data for a user ("U") or all users ("A").

resize—This script resizes the window to the user specifications.

CB_REFRESH.CLICKED—Calls WF_RETRIEVE. If the retrieve fails, then reset the datawindow.

CB_DELETE—Passes query status, corr id, query name, and queue name to service GQryRespLog with action code of "D".

CB_SWITCH.CLICKED—Switches the action code between "U" and "A", corrects text on button, and then calls WF_RETRIEVE.

DW_RESPONSE.CONSTRUCTOR—Extra columns for TN and NE View Sent are made invisible.

DW_RESPONSE.DOUBLECLICKED—This script verifies that the record showing has a result view. Then it loads LSTR_WINDOWPARM and opens W_TEMPALTE_SERVICES or W_CUST_SVCS_NE_ERROR if applicable depending on the Query Status.

DW_RESPONSE.RBUTTONDOWN—If the status field is right clicked on, then display the status description screen with type="QUERY".

DW_REPONSE.ROWFOCUSCHANGED—Disables/enables delete if user id=creator id.

CB_MORE_ROWS.CLICKED—Sets reset receive to false and call WF_RETRIEVE.

b. Functions Performed by this Window

WF_RETRIEVE—Calls service GQryRespLog to with a action type of "TEMPLATE" and an action code of "U" for a user or "A" for all users. If the service was successful, then sort by previous column if applicable. Finally, if the result set to huge, display the More Rows command button. Also, the last selected row is rehighlighted and scrolled to.

8. Template Query Results

The Template Query Results window shown in FIG. 81 displays the existing Template data for the requested Template ID. This screen is accessed by selected a row on W_TEMPLATE_RESPONSE_LOG.

a. Events Called by this Window open—Calls GTmpQryRslts no populate window with all template detail information.

F. TN Info

1. TN Info—Composite View

Figure 82:
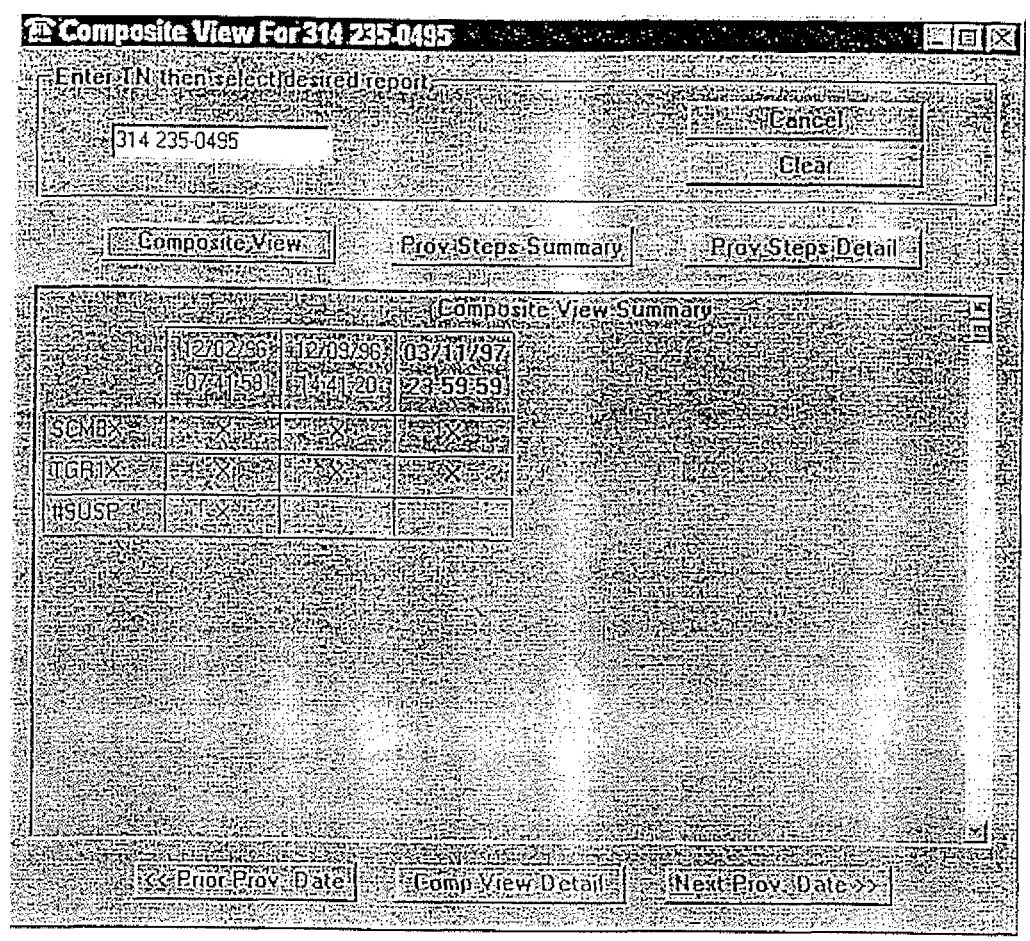
FIGS. 82-85 are exemplary graphical user interface screens illustrating TN composite view windows.

The TN Information—Composite View windows shown in FIG. 82 provides a mechanism for viewing a summary of how a phone number looks or will look after each step has been provisioned. If a TN has any USOC active for a particular date/time, it will show on the composite view as an 'X'. If no USOC service data is defined for a particular date/time, the matrix will show a blank value. Multiple USOC services are handled by added a new row with a new USOC label.

Data is first retrieved by pressing the Composite View command button. This will retrieve data for the last two historic provisioning step views, the current date with a time of 23:59:59, and the first two future provisioning step views. If the user is shown two prior or future steps, the user may click the Next/Prior SMS Step buttons to try and pull back more data. If no more data exists on that phone number, a message will pop up informing the user of this.

a. Events Called by this Window

Open—The open event sizes the TN Info window according to the screen resolution.

Clear—This command button hides all detail datawindows and disables all TN Info report buttons.

Cancel—This will close TN Information completely.

CB_PROV clicked—The composite view button first clears the response datawindow of any data from other TN Info queries. The DW_RESPONSE dataobject is set to D_SMS_PROV_STEPS, and the DW_TEMP datawindow is set to D_GPROVSTEPSEL_OUT. Next, WF_GET_CURRENT_COMP_VIEW is called which returns the complete composite view into DW_TEMP. If the retrieve is successful, the steps are loaded into DW_RESPONSE through event UE_LOAD_SMS_STEPS. This event formats the matrix which is visible to the user (see below). Finally, this script makes the datawindow DW_RESPONSE visible which displays the Composite View grid.

CB_PD, CB_ND clicked—If the composite view is displayed, the prior or next SMS step button calls the window user event UE_PRIOR_SMS_STEP or UE_NEXT_SMS_STEP respectively.

CB_COMP_DETAIL clicked—Clicking the Composite View Detail button will open up child window W_COMP_VIEW_DETAIL. A detailed view will display all USOC, FID, and FID data for the selected date and time in W_COMP_VIEW_DETAIL.

UE_PRIOR_SMS_STEP—This script uses the earliest data and time displayed on composite view to make another service call to SProStepSel which will append data on to DW_TEMP. The instance variable II_MAX_STEPS stores the number of steps to be returned from this service call. The data returned is then sorted by date, time, usoc, and FID respectively. If new data is returned, the columns are shifted for to the right using the modify statement. Finally, today's date is bolded.

UE_NEXT_SMS_STEP—Similar to the prior step process, the next step uses the latest date and time to retrieve II_MAX_STEP future composite view dates. Composite view columns are shifted left and, using modify statements, the next data is added on to the end of the view one step at a time.

UE_LOAD_SMS_STEP—This event loads the initial five composite views stored in DW_TEMP. They are formatted and copied from DW_TEMP to DW_RESPONSE. Unused columns are removed from the datawindow display and today's date is boldfaced.

DW_RESPONSE.CLICKED—Whatever column detail or heading is clicked on, then the heading date is changed to a three-dimensional raised border. This is the active date and time used for pulling up a composite view detail report. If the dataobject equals "D_SMS_PROV_STEPS" and a valid column or heading is selected, then a modify statement raises the date border to a three dimensional view. Any previous border is returned to normal state. The composite view detail button is enabled the first time a user successfully clicks on a valid column.

b. Functions Performed by this Window

WF_FIND_AND_FILL_USOC—This function places an 'X' in the composite view matrix for a specific date and time if that view has the current USOC as active. This is a simple loop of dates and comparing with the passed in USOC argument.

WF_FILL_STEP_HEADING—This function accepts a current date and time. It then sets the first column heading values to equal these arguments.

WF_SHIFT_HEADINGS—This function shifts the column headings to either the left (Prior) or right (Future) depending on the action code passed in to the function. It sets the last column to right or left back to " " for other overriding processing.

WF_HIDE_STEPS—If any columns do not contain values, then this function hides them. This function finds the proper length of the visible horizontal line and used modify to set the proper datawindow attributes.

WF_BOLD_TODAY—Using the value for today, contained in IS_CURR_DATE and a time of 23:59:59, the function boldfaces the current dates headers and column lines using modify statements on font attributes.

WF_DELETE_BLANK_ROW—If a row has no USOC assigned, the row number is passed to this function. This function works only if there is at least two rows inserted into the composite view. It uses setitem statements to shift the rows and headings down one line. It then deletes the left over blank row. If only one row exists and it is blank, no composite view is shown.

WF_GET_CURRENT_COMP_VIEW—This function retrieves into DW_TEMP today's current composite view, the last two prior views, and the next two future views. It starts by setting DW_TEMP reset receive attribute to false. Next it calls GProvStepSel with today's date and a time of 23:59:59. It then calls GProvStepSel with a 'P' action code and requests the past two dates. It then requests the first two future dates. If no view is available for the current date, this function sets default values for date and time.

2. TN Info—Composite View Detail

Figure 83:
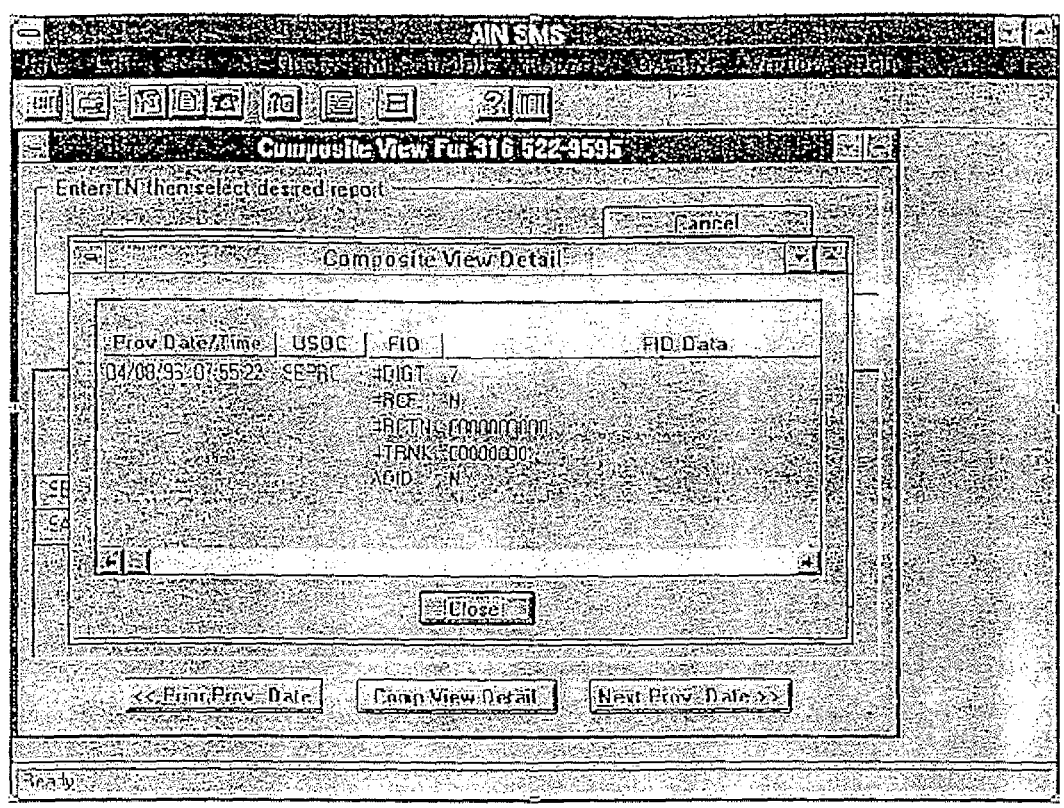

The Composite View Detail window shown in FIG. 83 is a child window that provides an extensive view of the selected date and time from Composite View on TN Info. This window uses the data stored in the hidden datawindow, DW_TEMP on TN Info, to populate the datawindow display, DW_DETAIL. This screen is accessed from TN Info—Composite View only.

a. Events Called by this Window open—When the window opens, the step date and step time columns are made visible to the user in place of the static text, Current View, used in Prov Step Detail. Next, DW_DETAIL receives shared data from the primary data source, W_TN_INFO.DW_TEMP. The data is then filtered by the selected data and time passed in from W_TN_INFO.CB_DETAIL.

close—Before the window closes, the W_TN_INFO.DW_TEMP data is reset to setfilter=" ".

3. TN Info—Prov Step Summary

Figure 84:
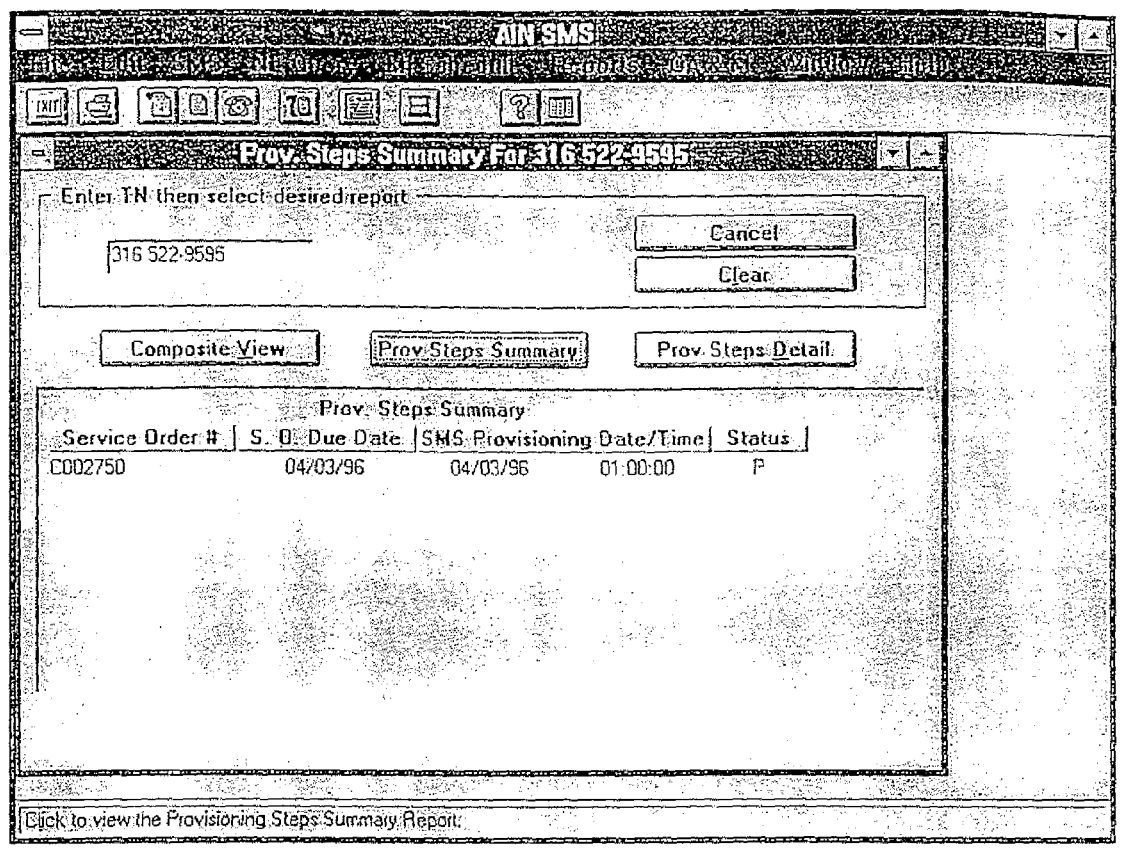

The TN Information—Prov Step Summary window shown in FIG. 84 provides a mechanism for viewing a summary of all pending steps waiting to be completed for the requested TN. If a provisioned order errors out or never was completed, then older pending steps may still show up. Future pending steps should always appear.

a. Events Called by this Window

Open—The open event sizes the TN Info window according to the screen resolution.

Clear—This command button hides all detail datawindows and disables all TN Info report buttons.

Cancel—This will close TN Info completely.

CB_ACTIVITY—This command button will call GTNActLstSel to retrieve data into DW_RESPONSE for all Provisioning Steps. The datawindow is first cleared of other data by assigned dataobject "D_GTNACTLSTSEL_OUT" to it. After a successful retrieve, the datawindow is made visible to the end user. Also, WF_CLOSE_CHILD( ) is called to verify that Composite View Detail was not left open.

DW_RESPONSE.CLICKED—Clicking on a row will set focus to that row.

DW_RESPONSE.RIGHTMOUSEDOWN—If the mouse is over the status field, the Status Description window is opened. The parameter used is 'MS_TYPE=CONTROL'.

DW_RESPONSE.DOUBLECLICK—If the user double-clicks on a valid row, the order matrix is opened up using the selected Order number's internal sequence number as a parameter.

b. Functions Performed by this Window

WF_CLOSE_CHILD—If the child window W_COMP_VIEW_DETAIL is open, this function closes it.

4. TN Info—Prov Step Detail

Figure 85:
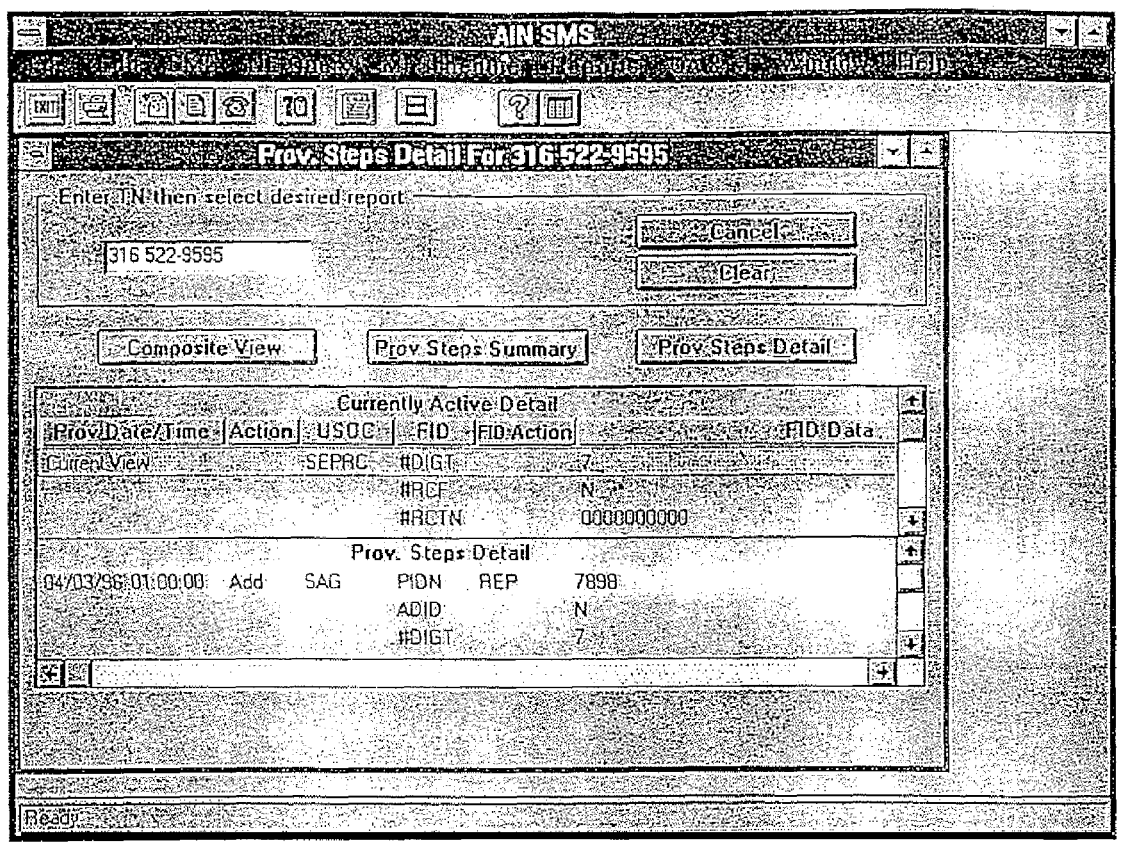

The TN Information—Prov Step Detail window shown in FIG. 85 provides a mechanism for viewing expanded information pertaining to any provisioning steps not yet completed. It also displays the current composite view in the upper half of the datawindow to use for comparisons. The bottom half of the window, DW_FUTURE, contains all provisioning step detail information in descending order.

a. Events Called by this Window

Open—The open event sizes the TN Info window according to the screen resolution.

Clear—This command button hides all detail datawindows and disables all TN Info report buttons.

Cancel—This will close TN Info completely.

CB_TN—This command button will call 'GTNActSumSel' twice to populate both the current view and the future view. The dataobject assigned to DW_RESPONSE is D_GTNACTSUMSEL_OUT. The functions WF_GET_CURRENT and WF_GET_FUTURE retrieve the data for the TN requested.

DW_RESPONSE.CLICKED and DW_FUTURE.CLICKED—Clicking on a row will set focus to that row.

CB_ND—This command button can be used to retrieve five future steps by triggering the event UE_TN_SUM_NEXT. This should be visible if the initial call from CB_TN is made to return only a limited number of future dates.

UE_TN_SUM_NEXT—This function first finds the last date contained in DW_REPONSE. It then uses this value, along with TN to recall GTNActSumSel. This button will request a configurable number of future steps. The data contained in DW_RESPONSE is then sorted by USOC, FID, FID Data.

b. Functions Performed by this Window

WF_GET_CURRENT—This function calls GTNActSumSel with an action code of 'C' and the current TN to populate DW_RESPONSE.

WF_GET_FUTURE—This function calls GTNActSumSel with an action code of 'N', the current TN and a request for all future records (Number Returned Required=0).

WF_CLOSE_CHILD—If the child window W_COMP_VIEW_DETAIL is open, this function closes it.

G. GUI Services

As noted above, there are GUI Services associated with the screen. Information on GUT 42 Screens provides detail on these interfaces and can be found from the link indicated above. The various services are outlined below and attached hereto as Appendix P.

GusrPermSel—Retrieves permissions for GUI Client Interface 308. This service is called immediately after login by the interface. This service will check the user's password expiration. If the password is expired it will return a status indicating such a condition. If the user's password is not expired, the buffer is populated with rows of user permissions. Permissions are stored in the database.

GusrChgPsswd—Changes the Password for SMS User. This service is invoked by the interface to change the login password for the current user. The password is only changed upon the return status of GSV_SUCCESS. All other return codes indicate that the password was not changed.

GgrpListSel—Retrieves the Group List. This service is called by the interface to obtain a list of groups. Groups are stored in the database with Group as the key. This service will retrieve all defined groups.

GgrpPermSel—Retrieves Permissions for Selected Group. This service is called by the interface to obtain a list of group permissions for the passed group id at the passed location.

GgrpPermWrt—Updates Permissions for Selected Group. This service is called by the interface to delete, insert, or update group permissions for a GROUP_ID.

GusrLocSel—Retrieves a list of Locations for a USER_ID. If the USER_ID field is blank then this service will retrieve a list of available locations.

GusrComSel—Retrieves a list of Communities for a USER_ID. If the USER_ID field is blank then this service will retrieve a list of available communities.

GusrProfWrt—Updates a User Profile This service is called by the interface to update or insert a user's profiles GusrProfSel—Retrieves the User Profile. This service is called by the interface to obtain a user's profile.

GadmUsrReset—Is the administrative function that resets the user password to a default password. This service is called by the interface to modify the passed USER_ID'S password and session information.

GusrWCWrt—Is the administrative function that maintains a list of default and temporary WCs for user. This service is called by the interface to write a user's CO.

GusrWCSel—Retrieve a list of Wire Centers for a User and/or Office Location. This service is called by the interface to obtain for a user a list of Wire centers. The USER_ID and/or the location is passed to the service.

GfeatFIDSel—Retrieve all available AIN USOCs and FIDs.

GcompViewBld—Builds PCS table entries for New GUI 42 Initiated Order, Append/Delete WTNs for other orders. The service is responsible for: validating WTN, establishing the PCS database 204 (ODR, SBR sections), retrieving a COMP_VIEW 44 for WTN on Due Date, inserting the COMP_VIEW 44 into the 'Old' side of PCS table entries, and returning the INT_SEQ_NUM and the COMP_VIEW 44 to the interface.

GPCSDataSel—Retrieve all WTNs, USOCs, FIDs, and FIDData from PCS.

GPCSUSOCFID—Retrieve all WTNs, USOCs, FIDs.

GPCSDataWrt—Update USOC FID and FID Data in PCS. Used to insert all WTNs, USOCs, FIDs and FID_DATA into New side of the PCS table entries.

GsubmitOrder—Submits Order for Hold, gOM, or Local Only Update.

GordErrorSel—Retrieves all errors for an Order.

GordInfoSel—Retrieves information for an Order.

GmanImageSel—Retrieves image section of an Order.

GorderCan—Cancels existing GUI initiated Order.

GTNActLstSel—Retrieves Activity List of Pending Telephone.

GTNActSumSel—Retrieves COMP_VIEW(s), Current, Next and Previous.

GprovStepSel—Retrieves COMP_VIEW(s), Current, Next and Previous.

GNEQrySubmit—Submit NE Query for selected WTN.

GqryRespLog—Retrieves/Changes records in QUERY_RESP table.

GMISchedSel—Retrieves MI Summary information by Type.

GMIViewSel—Retrieve MI Detail information by Type.

GretToSender—Returns To Sender (NEGACK to SOAC 20 and mark MI_Log record).

GMIDatInvWrt—Updates MI Log with date Investigated and Status.

GcmplxActSel—Retrieve COMPLEX activity that must be provisioned manually.

GcmplxLouMAC—COMPLEX Local Only UPD and Mark Activity Complete.

GchgSvrDebug—sets debug Flag Toggle.

GadmUserSel—Gets USER_IDS for location.

GusrLocWrt—Updates Locations for a USER_ID. This service is responsible for updating the location table, cleaning up the wire center table for all records that do not have a corresponding location in the location table.

GusrComWrt—Updates Communities for a USER_ID. This service is responsible for updating the community table.

GrawImageSel—Retrieves the Raw SOAC Image if it can not be parsed. This service is responsible for retrieving the FCIF data and the other fields.

GrawImageWrt—Updates Raw SOAC Image if it can not be parsed. This service is responsible for updating the FCIF data, the row count is set to '0' on the reply sending Message to TIP 402.

GWCXrefSel—Updates Raw SOAC Image if it can not be parsed. This service is responsible for retrieving cross reference data.

Glogout—Is a user function to Log Out of current session. The service is responsible for updating the User's term information and updating logout date and time.

GerrorMsgSel—Is a user function to retrieve error message information from database. If error code is specified as 0 then all GUI Client Interface 308 error messages are returned.

GintrfcStatl—Is a user function to retrieve Interface Status. This includes NEs, SOAC 20 and other interfaces that store status in the database.

GNEQryRslts—Is a user function to retrieve NE query results.

GSPACEAudSel—Is a user function to retrieve SPACE Audit Scheduling Information.

GSPACEAudWrt—Is a user function to write SPACE Audit Scheduling Information.

GprovIdList—Is a user function to select a list of valid Provisioning Ids.

GsysDate—Is a user function to return the Server's Data and Time.

GholCtlSel—Is a user function to return rows from the HOL_CTL table 216 for the passed L_INT_SEQ_NUM.

GholFlowSel—Is a user function to return rows from the HOL_FLOW table 218 for the passed L_INT_SEQ_NUM.

GholStepSel—Is a user function to return rows from the HOL_STEP table 222 for the passed L_INT_SEQ_NUM.

GholWtnSel—Is a user function to return rows from the HOL_WTN table 220 for the passed L_INT_SEQ_NUM.

GnetElemSel—Is a user function to return rows from the NETWORK_ELEMENT table.

GnetElemWrt—Is a user function to insert, update; or delete rows from the NETWORK_ELEMENT table. Action codes include I(nsert), U(pdate), or I(nsert) When the U action code is provided the interface must provide two rows of data. The first row is the original row and the second is the updated row.

GUSOCRefSel—Is a user function to return rows from the USOC_REF table.

GUSOCRefWrt—Is a user function to insert, update, or delete rows from the USOC_REF table. Action codes include I(nsert), U(pdate), or I(nsert). When the U action code is provided the interface must provide two rows of data. The first row is the original row and the second is the updated row.

GUSOCProvSel—Is a user function to return rows from the USOC_PROV_REF table.

GUSOCProvWrt—Is a user function to insert, update, or delete a row in the USOC_PROV_REF table.

GUSOCTmpXSel—Is a user function to return rows from the USOC_TEMPLATE_XREF table.

GUSOCTmpXWrt—Is a user function to insert, update, or delete rows from the USOC_TEMPLATE_XREF table. Action codes include I(nsert), U(pdate), or I(nsert). When the U action code is provided the interface must provide two rows of data. The first row is the original row and the second is the updated row.

GtmpNEXSel—Is a user function to return rows from the TEMPLATE_NE_XREF table.

GtmpNEXWrt—Is a user function to insert, update, or delete rows from the TEMPLATE_NE_XREF table. Action codes include I(nsert), U(pdate), or I(nsert). When the U action code is provided the interface must provide two rows of data. The first row is the original row and the second is the updated row.

GtmpDetlSel—Is a user function to return rows from the TEMPLATE_DETL table.

GtmpDetlWrt—Is a user function to insert, update, or delete rows from the TEMPLATE_DETL table. Action codes include I(nsert), U(pdate), or I(nsert). When the U action code is provided the interface must provide two rows of data. The first row is the original row and the second is the updated row.

GerrCodeSel—Is a user function to return a row from the ERROR_CODE tables

GerrCodeWrt—Is a user function to insert, update, or delete rows from the ERROR_CODE table. Action codes include I(nsert), U(pdate), or I(nsert). When the U action code is provided the interface must provide two rows of data. The first row is the original row and the second is the updated row.

GtmpIdSel—Is a user function to return template ids for a given NE.

GUSOCGrpSel—Is a user function to return USOC group information.

GclrOrdLock—Is a user function to clear the user lock on order.

GtsysRefSel—Is a user function to return rows from the TSYS_REF table.

GtsysRefWrt—Is a user function to insert, update, or delete rows from the TSYS_REF table. Action codes include I(nsert), U(pdate), or I(nsert). When the U action code is provided the interface must provide two rows of data. The first row is the original row and the second is the updated row.

GclassSvcSel—Is a user function to return rows from the CLASS_OF_SVC_REF table.

GclassSvcWrt—Is a user function to insert, update, or delete rows from the CLASS_OF_SVC_REF table. Action codes include I(nsert), U(pdate), or I(nsert). When the U action code is provided the interface must provide two rows of data. The first row is the original row and the second is the updated row.

GtmpQryRslts—Is a user function to retrieve NE Template query results.

GtmplQrySbmt—Submits a NE query for a selected template.

GFIDRefSel—Is a user function to return rows from the FID_REF table.

GFIDRefWrt—Is a user function to insert, update, or delete rows from the FID_REF table. Action codes include I(nsert), U(pdate), or I(nsert). When the U action code is provided the interface must provide two rows of data. The first row is the original row and the second is the updated row.

GcallVarSel—Is a user function to return rows from the CALL_VARIABLE_REF table.

GcallVarWrt—Is a user function to insert, update, or delete rows from the CALL_VARIABLE_REF table. Action codes include I(nsert) U(pdate), or I(nsert). When the U action code is provided the interface must provide two rows of data. The first row is the original row and the second is the updated row.

GofcLoctSel—Is a user function to return rows from the OFFICE_LOCT table.

GofcLoctWrt—Is a user function to insert, update, or delete rows from the OFFICE_LOCT table. Action codes include I(nsert), U(pdate), or I(nsert). When the U action code is provided the interface must provide two rows of data. The first row is the original row and the second is the updated row.

GqueStatsSel—Is a user function to return rows from the QUEUE_STATS table.

GuserCommSel—Is a user function to return rows from the USER_COMMUNITY table.

GuserCommWrt—Is a user function to insert, update, or delete rows from the USER_COMMUNITY table. Action codes include I(nsert), U(pdate), or I(nsert). When the U action code is provided the interface must provide two rows of data. The first row is the original row and the second is the updated row.

GintrfaceSel—Is a user function to return rows from the NE_INTRFC table.

GintrfaceWrt—Is a user function to insert, update, or delete rows from the NE_INTRFC table. Action codes include I(nsert), U(pdate), or I(nsert). When the U action code is provided the interface must provide two rows of data. The first row is the original row and the second is the updated row.

GswtchCtlSel—Is a user function to return rows from the SWITCH_CONTROL table.

GswtchCtlWrt—Is a user function to insert, update and delete into/from the SWITCH_CONTROL table.

GswtchNEXSel—Is a user function to return rows from the SWITCH_NE_XREF table.

VI. Administration

A. Generally

The administration functions serve to maintain and support the SMS 10. As shown in FIG. 32, the administrative functions and services include, but are not limited to, backup/recovery of the database and system files, setting of configurable parameters, CRON scheduling, database administration, disaster recovery, release procedures, shutdown, and system performance monitoring. The administrative functions may be implemented by known techniques and software, e.g., backup/recovery of data to tape or CD-ROM archives for disaster recovery, purging of obsolete data based on a datestamp or timestamp, and scheduling of maintenance procedures and new release upgrades during low-usage periods. As is evident to one of skill in the art, additional administrative functions may be added as necessary to maintain the SMS 10.

In addition to the above-mentioned maintenance and administrative features, additional features are provided to support the SMS 10. These will now be described in greater detail.

B. AUDITS

AUDITS 602 provides a comparison between SPACE data and SMS data. The data to be audited is retrieved from SPACE "active" view and the SMS current view at the same time so that equivalent data is compared. This feature is advantageous because with 24×7 processing (i.e., twenty-four hours a day, seven days a week), it is possible to have activity in progress which may cause discrepancies. The object is to minimize the number of disparities within the SMS 10 in order to minimize the need for this service. All available data elements related to customer services, except DTMF data are compared. DTMF data is any type of data that the customer can directly update. An indicator on the CALL_VARIABLE_REF table in SMS 10 notes whether a CALL VARIABLE is DTMF.

Each account audited by AUDITS 602 will retain, for example, the date and time of the audit. Audit results are made available as a report. Exceptions found during the audit process are mechanically corrected as necessary. That the exceptions will not include DTMF data disparities because DTMF data is not being compared by AUDITS 602. Preferably, every subscriber on the SMS 10 and every subscriber on SPACE 24, for the NPA/NXX/line range and template requested, is compared. Accounts that exist on the SMS 10 but not on SPACE 24, and vice versa, are marked as errors. In addition, if SPACE 24 indicates the customer subscribes to a service, but the SMS 10 does not, or vice versa, this situation is marked as an error. For services indicated by SPACE 24 and SMS 10 as being subscribed to by a customer, all data elements (except DTMF) that differ between SPACE 24 and SMS 10 are marked as errors. The values of the disparate data elements both the SPACE 24 value and the SMS 10 value are made available to the RCMAC/GUI 42 and/or other personnel for investigation and correction via GUI 42.

The audit report made available online, preferably via a MVS WSF2 facility 66 (available from IBM Corp.), and may contain the date and time the audit was run, by whom it was requested, the range of accounts audited (begin and end NPA/NXX/Line-number), the template id audited, the number of accounts selected from SMS 10, the number of accounts selected from SPACE 24, the number of accounts on SMS 10 that were not on SPACE 24, the number of accounts on SPACE 24 that were not on SMS 10, the total number of accounts compared (i.e., retrieved from SPACE 24 and SMS 10), and the number of accounts that had a discrepancy of one or more services or data elements. The number of accounts having a discrepancy may also be provided as percentage of the total number compared the number of accounts that did not differ (i.e., where SMS data equals SPACE data), and may also be provided as percentage of the total number of accounts compared. Each audit report preferably remains available online for a configurable time from the audit date. This may be performed by WSF2 66. Specific reports 606 are retrievable by audit date, range audited, template audited, or USER_ID of the requester. The audit data is extracted from SPACE 24 via SQL queries using SQLNet (available from ORACLE) via SMS 10 or a PC (GUI 42), which will issue a remote Query to the SPACE 24 server(s) database. The system is designed such that there cannot be more than a configurable number of pending audits for a particular date at any time.

A GUI 42 front-end (i.e., input screen and associated logic) allows the requester to input the beginning and end NPA/NXX/Line-number and TEMPLATE_ID to be audited (no default), the date/time for the audit to occur (date defaults to current date, time defaults to midnight), and a TEMPLATE_ID (selected from drop down list). The input data that is edited to insure that begin NPA, NXX, Line Number is less than or equal to the End NPA, NXX Line Number; begin and End NPA, NXX, Line number are numeric; the TEMPLATE_ID is a valid TEMPLATE_ID; date/time is a valid date/time (e.g., date not already past and not more than three months in the future, and the time must be after 11:30 p.m. and before 6:00 a.m.).

If the audit request passes the editing, the GUI 42 will make an entry in the Audit Request table. This table will contain begin NPA, NXX, line-number, end NPA, NXX, line-number, template id, date/time, for audit to run, date/time audit request was input, USER_ID of the requester, status of this audit (e.g. 'p' for pending which will change to 'c' when completed), and RUN_DATE_TIME (set to NULL; AUDITS 602 will set to current date/time when run).

A GUI screen is provided to view the entries in the audit table which displays detail about the audits that are scheduled by, for example, the date, and detail about the audits that have run over the last 10 or 20 days. A screen (which may be the same screen as above), may be provided to edit or delete the scheduled entries in the audit table. This screen will also display detail about the audits that are scheduled by, for example, the date. To edit or delete an entry, the USER_ID is checked to insure that the user has permission to edit or delete the entry, or the USER_ID must match the USER_ID of the requester of that audit. The date/time the audit is schedule to be run is the only entry that should be updatable. Additionally, deleted entries are logged.

AUDITS 602 will check the audit table at regular intervals and determines if a request has been made, and if so, if the current date/time is greater than or equal to its date/time to run. If it is time to run the request, the AUDITS 602 will initiate the remote SQL query(s) to the appropriate SPACE 24(s), using the parameters provided (NPA/NXX/Line-range, and template id). A query request is made to the SMS 10 database, using the same parameters. When the data is returned, AUDITS 602 compares the SPACE 24 and SMS 10 data, updates each SMS 10 account with the date/time of the audit, and creates the report. As noted, the report is sent to MVS WSF2 66 for review by RCMAC or other personnel. The audit process will update the status on the audit request table, to indicate that audit has completed.

When the audit is completed, the audit process will check the current time. If it is before, for example, 5:00 a.m., a check may be performed if there is an additional audit that was requested (i.e., pending) having a date/time less than or equal to the current time and. If such an additional audit exists, AUDITS 602 begins again using the new parameters.

OA&M 68 will use a method to override and stop AUDITS 602 at any time, as in other process. If AUDITS 602 is stopped, an audit report is generated for the audit results to that point. The report will also indicate that the process was terminated prior to completion, the date/time it was stopped, and the USER_ID of the person who stopped it.

Each time a new template is defined in SPACE 24, the AUDITS 602 is revised (i.e., coded), tested, and installed. AUDITS 602, by its nature, is specific to templates. A template with an embedded table requires two queries to SPACE 24. The first query is for CALL VARIABLE(s) that are not an embedded table, and the second query is for the embedded table(s). The SQL for retrieving embedded tables retrieves all embedded tables in the CPR.

SPACE 24 version 3.4 has current limitations on the size of an SQL query, as no more than 50 TNs (CPRs) should be requested in one query. Because of the limitation, the AUDITS 602 will break down the request into 50 TN "chunks" and request multiple queries (if necessary), and group the results together as one report.

The SMS 10 is mechanically updated when there is an audit discrepancy between SPACE 24 and the SMS 10. However, all discrepancies should be written to a report. For example, if SPACE 24 contains a service and the SMS 10 does not, AUDITS 602 will automatically update the SMS 10 with the service. However, if the SMS 10 contains a service and SPACE 24 does not, AUDITS 602 should not update SPACE 24 with the service. In this case, manual investigation should be used to determine what is reflected in CRIS 26, if a service order should be generated, or if a SPACE 24 update is needed.

C Initial Load—Customer Data

The INITIAL LOAD 604 feature is used to load existing subscriber and subscription data into the SMS 10 databases prior to initial installation of the SMS 10. Complete and current data from SPACE 24, VAD 32, CIDB, and/or SORD 18 should be loaded to insure the accuracy of the initial load. For SPACE 24 and VAD 32 IP, if data is needed from these elements, the manual updating must be discontinued prior to querying the data for the SMS 10. The manual updating should be performed up until the time the SMS 10 is ready to be loaded and mechanically updated. For CIDB (posted service orders) and SORD 18 (pending service orders), all data from completed service orders or in process service orders are selected (see below). The data from SPACE 24, VAD 32, CIDB and/or SORD 18 for a bulk load is loaded into the SMS 10 tables. The SMS 10 and its interfaces are then started. The various features of the initial customer load follow below including building the initial SMS 10 database from SPACE 24 and VAD 32 and CIDB.

Any data that resides on SPACE 24 and VAD 32 that is needed on the SMS 10 also resides in the CIDB. Therefore, the necessary data is queried from CIDB, rather than SPACE 24 so the SPACE 24 bulk download capability is not needed for the initial/bulk load of the SMS 10 database.

For the CIDB/SORD 18 load, the necessary data may be taken from the CIDB database and merged, edited, sorted, and loaded into the SMS 10. Since CIDB contains data from posted service orders, and the SMS 10 will process based on pending orders, it is necessary to extract the data from any pending orders from the SORD 18 database. These pending orders are service orders which have already been issued but not completed.

In this regard, SORD 18 pending orders fall into two categories. The first is orders which have been completed but erred-out in the posting process, and the second is orders which have been issued and are waiting until the due date to be completed. The necessary data from those orders which have been completed but erred in posting is extracted (category 1 above) from SORD 18. The SORD 18 data must be extracted after CRIS/CIDB runs, because CRIS is what posts and forwards to CIDB for updates to CIDB database.

This group of SORD 18 pending/erred subscriber and subscription data is added to the data from the CIDB. This data, which contains CIDB and SORD 18 pending/erred data, is sorted and loaded into the SMS 10. After the data has been loaded into the SMS 10 database, a count of the number of subscribers added should be determined for verification purposes. Additional information, such as each telephone number loaded, should be provided so that the customer base can be verified.

Regarding the second category, it must be determined which orders from SORD 18 have been issued, but have not yet reached the due date. These service orders will then be corrected (by SORD 18) so that a COR pass of each of these orders is mechanically issued. Performing this correction will allow these service orders to mechanically flow through to SOAC 20 and to the SMS 10 via the SOAC Client Interface 306. SOAC 20 will assign a function type of 'PRE' to these orders since they have not been sent to the SMS 10.

The following is an exemplary time line of events to clarify the order in which events occur: discontinue manual updates to SPACEs 24, VAD 32, and/or AIN-IP; SORD 18 goes down and CRIS/CIDB 26 completes the daily cycle; extract data from CIDB; extract pending orders which erred at posting from SORD 18 and add to CIDB file (s); provide CIDB/SORD 18 pending/erred data for loading SMS 10; identify pending orders waiting on due date (this operation may occur concurrently with loading SMS 10 database); load SMS 10 database (this operation may occur concurrently with identifying pending orders waiting on due date); start up the SMS 10 and its interfaces; issue corrections to each of the pending orders waiting on the due date (SORD 18 must be up for this); and SOAC 20 receives these corrected orders and forwards to SMS 10 with function type of 'PRE'.

The data that is extracted from CIDB/SORD 18 pending/erred to be loaded into the SMS 10 currently includes, for example, the 10 digit working-telephone-number (WTN); SCA USOC if the customer subscribes to Selective Call Acceptance (SCA), VAD USOC if the customer subscribes to Voice Activated Dialing (VAD), CID USOC if the customer subscribes to Caller IntelliData (CID), ICF USOC if the customer subscribes to Intelligent Call Forwarding (ICF), and for each customer that subscribes to SCA, a 10 digit alternate-telephone-number may be provided. If one is provided, it must be loaded on the SMS 10 database. If one is not provided, the alternate-telephone-number for that customer is "blank".

For each customer that subscribes to VAD 32, a 10 digit shared-voice-directory-telephone-number may be provided, and if so, the number is loaded into SMS 10. For each customer that subscribes to CID, no additional data specific to CID is provided. For each subscription record to be loaded into the SMS 10 database, default values may be assigned. Edits are performed on the CIDB/SORD 18 pending/erred data prior to loading the SMS 10.

D. Reference Tables

Reference tables are used throughout the SMS services primarily for editing of activation requests and determining provisioning information. For example, the WTN being provisioned is edited for valid NPA_NXX, LOW_LINE, HIGH_LINE. USOCs and FIDs are edited for validity in addition to determining default data and the associated CALL VARIABLE name. The appropriate Network Element(s) is determined based on the NPA_NXX, LOW_LINE, HIGH_LINE, and service, The reference tables do not contain account specific information. A listing of exemplary SMS reference tables are attached hereto as Appendix Q.

Some tables may be populated mechanically using information from other systems such as the Corporate Data Warehouse (CDW) However, in most cases, the tables are populated manually either by the SMS 10 administrator or SMS 10 support personnel. When manual updates are required, a GUI 42 screen is provided.

E. Maintenance

In order to maintain a suitable and controlled environment on the SMS 10, certain periodic processing must take place. Such processing may take place on a daily interval and is referred to as "End of Day Processing" 610. This processing will purge old data from tables, provide daily activity reports, and will perform other processing suitable for such an interval. Further, as external systems require changes to be made to the SMS 10 miscellaneous table information, these changes must be compensated for by the SMS maintenance and administration procedures.

F. UNIX Access/Security

UNIX security 608 provides access control to the SMS 10 platform. As noted, the SMS 10 server hardware consists of two SPARC 2000 systems 76 running the Solaris 2.4 operating system at the data center 80. As noted, there may also be several SPARC 20 Servers 78 in remote locations which are used as GUT 42 servers. The environment where both systems are located should be secure to limit physical access the SMS hardware.

However, the more difficult problem, as with any computer system having a large number of users, is preventing access to the systems via network connections while still allowing access to users who require information from the SMS 10. The SPARC 2000 systems 78 are preferrably provided with a security package prior to the systems being attached to the network. The SPARC 2000 systems 78 should also be tested to insure that they conform with established guidelines and procedures.

While the invention has been described with reference to a preferred embodiment, it is understood that the words which have been used herein are words of description and illustration, rather than words of limitations. Changes may be made, within the purview of the appended claims, as presently stated and as amended, without departing from the scope and spirit of the invention in its aspects. Although the invention has been described herein with reference to particular hardware, software, means, materials and embodiments, the invention is not intended to be limited to the particulars disclosed herein; rather, the invention extends to all functionally equivalent structures, methods and uses, such as are within the scope of the appended claims.

For example, the Database Services may be implemented using a relational database development tools other than those provided by the ORACLE database software. Further, the various communications interfaces and protocols may be implemented using other applications and protocols than those specified.

In addition, the GUI client software may be developed using an application other than the PowerBuilder products identified herein. Also, while the transaction and system control component has been described as being provided by the TUXEDO /T and /Q applications, and the messaging component as being provided by the TUXEDO /WS application, it is noted that other transaction and system control applications and messaging applications may be utilized.

Further, a programming language and programming tools other than those associated with the C programming language may be utilized. In addition, the alert system utilized to issued messages to pagers to notify the appropriate personnel of system errors and failures may be an application other than PATROL.

Also, other hardware platforms may be utilized to implement the service management system and servers, and GUI client and servers.

What is claimed:

1. A service order management system for provisioning service orders in a communications network comprising a plurality of network elements, the service order management system comprising:
   an order manager for receiving requests representative of service orders for at least one communications service from a plurality of dissimilar service order sources internal to the communications network, the order manager comprising an input process and an output process which determine, at least in part, service implementing information provided to the plurality of network elements to implement the at least one communications service; and
   an interface configured to interface the service order management system with the plurality of dissimilar service order sources.

2. The system according to claim 1, wherein the input process is configured to accept input data from the plurality of service order sources and verify that each of the inputted data contains a predetermined minimum content.

3. The system according to claim 2, wherein the input process is configured to populate a database with raw data associated with the requests, and wherein sequence numbers are generated and associated with the requests.

4. The system according to claim 3, wherein the database stores the raw data according to a hierarchical format comprising tables having fields, the tables being associated by the sequence numbers.

5. The system according to claim 2, wherein the input process is configured to correct errors determined in the requests.

6. The system according to claim 2, wherein the input process is configured to identify duplicative requests and to process only one request of the duplicative requests.

7. The system according to claim 1, wherein the output process is configured to send the service implementing information to queues associated with the network elements.

8. The system according to claim 7, wherein the output process comprises a network element implementer configured to interface with the network elements to output the service implementing information in a format appropriate for each of the network elements, wherein the network element implementer is configured to determine a proper sequence of the service implementing information to be outputted to the network elements and outputs the service implementing information to at least one queue associated with at least one of the network elements.

9. The system according to claim 8, wherein the network element implementer is further configured to send a portion of the service implementing information to a local update queue in accordance with a predetermined time, such that the portion of the service implementing information is not sent to the at least one queue associated with the at least one of the network elements.

10. The system according to claim 8, wherein the network element implementer is further configured to update a database to indicate that the at least one communications service has been implemented by the network elements.

11. The system according to claim 8, wherein the network element implementer is further configured to requeue at least one portion of the service implementing information to the network elements when an error is encountered.

12. The system according to claim 11, wherein the network implementer requeues a dependent portion of the at least one portion of the service implementing information automatically.

13. A service order management system for provisioning service orders in a communications network comprising a plurality of network elements, the service order management system comprising:
an order manager for receiving a request representative of a service order for at least one service associated with a directory number from at least one service order source, the order manager comprising processes which determine provisioning information that is output to at least one of the plurality of network elements to implement the at least one service, the order manager processing synchronous network element responses and asynchronous network element responses in a standardized manner; and
an interface for interfacing the order manager with the at least one service order source and the plurality of network elements.

14. The system according to claim 13, wherein the processes and the interface are interrupted to read a configurable parameter file in order to modify at least one of the processes and the interface.

15. A method for managing service orders in a network comprising at least one network element, the network receiving a request representative of a service order for at least one service associated with a directory number, the method comprising:
interfacing with a service order source from which the request originates;
receiving the request from the service order source;
determining service implementing information to implement the at least one service;
updating at least one of the at least one network element, the service order source and an order manager data repository;
monitoring transactions executed at predetermined times by the network; and
controlling the network in accordance with the messages.

16. The method according to claim 15, the messages comprising at least one of a query, an acknowledgment, a transaction type, a function type, a broadcast, an informational message and an error notice.

17. The method according to claim 16, further comprising:
verifying that the request includes a predetermined minimum content.

18. The method according to claim 17, further comprising:
populating a database with raw data associated with the request; and
generating an internal sequence number associated with the request.

19. The method according to claim 18, further comprising:
reformatting the raw data into a hierarchical format of the database, the hierarchical format comprising a table that can be associated using the internal sequence number.

20. The method according to claim 19, further comprising:
selectively updating a lock table to prevent concurrent processing of multiple requests associated with the directory number;
performing at least one of exception processing, order matching, correction order processing, order cancellation, local service provider order matching and number change processing; and
creating a first saved table in the database, the first saved table containing activity information and service order code information in accordance with the request.

21. The method according to claim 20, further comprising:
creating a second saved table containing information related to a difference of services between a current service and the at least one service which is being added, removed or modified by the request, such that the difference is implemented by the network elements; and
verifying that the services represented by the request can be provided by the network elements at a scheduled date for implementation.

22. The method according to claim 15, wherein determining service implementing information comprises routing the service implementing information to at least one queue associated with the at least one network element.

23. The method according to claim 22, wherein the routing comprises requeuing at least one portion of the service implementing information to the at least one network element when an error is encountered, and requeuing a dependent portion of the at least one portion of the service implementing information after manual intervention if the error is not resolved.

24. The method according to claim 15, further comprising:
storing copies of the service implementing information and the messages; and
storing the request until one of a future date, a future time or a future event, after which the request is output to the network.

25. The method according to claim 24, further comprising:
storing non-implementing information related to the request which is not used in the service implementing information, the non-implementing information being associated with the directory number upon the service implementing information being output to the at least one network element.

26. The method according to claim 15, the updating further comprising:
at least one of distributing a message to at least one of the at least one network element, distributing an acknowledgement to the service order source and updating the order manager data repository.

27. The method according to claim 15, the updating further comprising:
outputting the service implementing information to the at least one network element.

* * * * *

UNITED STATES PATENT AND TRADEMARK OFFICE
CERTIFICATE OF CORRECTION

| | |
|---|---|
| PATENT NO. | : 8,139,742 B2 |
| APPLICATION NO. | : 11/535103 |
| DATED | : March 20, 2012 |
| INVENTOR(S) | : T. Klos et al. |

It is certified that error appears in the above-identified patent and that said Letters Patent is hereby corrected as shown below:

On page 2, References Cited (56), Other Publications, Column 2, line 65 of the printed patent, "supermarkert" should be --supermarket--.

Signed and Sealed this
Third Day of July, 2012

David J. Kappos
*Director of the United States Patent and Trademark Office*